US012760148B2

(12) United States Patent
Williams et al.

(10) Patent No.: US 12,760,148 B2
(45) Date of Patent: Oct. 13, 2026

(54) POLYMERISATION PROCESS

(71) Applicant: Oxford University Innovation Limited, Oxford (GB)

(72) Inventors: Charlotte Williams, Oxford (GB); Arron Deacy, Oxford (GB); Wouter Lindeboom, Oxford (GB); Emma Moreby, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 939 days.

(21) Appl. No.: 18/014,346

(22) PCT Filed: Jul. 8, 2021

(86) PCT No.: PCT/GB2021/051744
§ 371 (c)(1),
(2) Date: Jan. 4, 2023

(87) PCT Pub. No.: WO2022/008919
PCT Pub. Date: Jan. 13, 2022

(65) Prior Publication Data

US 2023/0323027 A1 Oct. 12, 2023

(30) Foreign Application Priority Data

Jul. 8, 2020 (GB) ...................................... 2010484

(51) Int. Cl.
*C08G 64/34* (2006.01)
*B01J 31/22* (2006.01)

(52) U.S. Cl.
CPC .......... *C08G 64/34* (2013.01); *B01J 31/2217* (2013.01); *B01J 31/2239* (2013.01)

(58) Field of Classification Search
CPC ... B01J 31/2217; B01J 31/2239; C08G 64/34; C08G 65/266; C07F 15/065; C07F 11/005
See application file for complete search history.

(56) References Cited

U.S. PATENT DOCUMENTS

| | | | |
|---|---|---|---|
| 6,713,599 | B1 | 3/2004 | Hinz et al. |
| 7,244,805 | B2 | 7/2007 | Park et al. |

(Continued)

FOREIGN PATENT DOCUMENTS

| | | | |
|---|---|---|---|
| CN | 103396457 | A | 11/2013 |
| CN | 110603280 | A | 12/2019 |

(Continued)

OTHER PUBLICATIONS

Thomas, C et al; Quaternary ammoniums and a cationic sodium complex as supramolecular catalysts in ring-opening of epoxides by amines; Tetrahedron; 2014; p. 1646-4650; 70; Elsevier; Talence cedex, France.

(Continued)

*Primary Examiner* — Shane Fang
(74) *Attorney, Agent, or Firm* — Thomas|Horstemeyer, LLP

(57) ABSTRACT

A process for the ring-opening copolymerisation of epoxides with carbon dioxide for the preparation of a polycarbonate is described. Also described are catalysts useful in the aforementioned process. The heterobimetallic catalysts present a number of advantages over catalysts that have conventionally been used for this process.

19 Claims, 9 Drawing Sheets

(56) References Cited

U.S. PATENT DOCUMENTS

| | | | |
|---|---|---|---|
| 7,304,172 | B2 | 12/2007 | Coates et al. |
| 8,093,351 | B2 | 1/2012 | Coates et al. |
| 8,633,123 | B2 | 1/2014 | Allen et al. |
| 8,791,274 | B2 | 7/2014 | Ok et al. |
| 8,871,898 | B2 | 10/2014 | Jeong et al. |
| 9,403,861 | B2 | 8/2016 | Job et al. |
| 9,771,388 | B2 | 9/2017 | Job et al. |
| 9,771,453 | B2 | 9/2017 | Ok et al. |
| 10,030,102 | B2 | 7/2018 | Keyworth et al. |
| 2010/0256329 | A1 | 10/2010 | Nozaki et al. |
| 2013/0123532 | A1 | 5/2013 | Gurtler et al. |
| 2018/0179242 | A1 | 6/2018 | Allen et al. |

FOREIGN PATENT DOCUMENTS

| | | | |
|---|---|---|---|
| EP | 3 019 512 | B1 | 5/2016 |
| EP | 3 312 214 | A1 | 4/2018 |
| JP | 2013163772 | A | 8/2013 |
| JP | 2020509128 | A | 3/2020 |
| WO | 03/029240 | A1 | 4/2003 |
| WO | 2009/137540 | A1 | 11/2009 |
| WO | 2010/147421 | A2 | 12/2010 |
| WO | 2015/118100 | A1 | 8/2015 |
| WO | 2019/048878 | A1 | 3/2019 |

OTHER PUBLICATIONS

Fringuelli, F et al; Ring Opening of Epoxides with Sodium Azide in Water. A Regioselective pH-Controlled Reaction; J. Org. Chem.; 1999; p. 6094-6096; 64; American Chemical Society; Perugia, Italy.

Fieser, M et al; Mechanistic Insights into the Alternating Copolymerization of Epoxides and Cyclic Anhydrides Using a (Salph)AICI and Iminium Salt Catalytic System; J. Am. Chem. Soc.; 2017; p. 15222-15231; 139; ACS Publications; Minnesota and New York, USA.

Dudev, T et al; Competitive Binding in Magnesium Coordination Chemistry: Water versus Ligands of Biological Interest; J. Am. Chem. Soc.; 1999; p. 7665-7673; 121; American Chemical Society; Taiwan, China.

Zheng, H et al; CheckMyMetal: a macromolecular metal-binding validation tool; Acta Cryst.; 2017; p. 223-233; D73; Research Papers; Charlottesville; USA.

Kissling, S et al; Mechanistic Aspects of a Highly Active Dinuclear Zinc Catalyst for the Co-polymerization of Epoxides and CO2; Chem. Eur. J.; 2015; p. 8148-8157; 21; Wiley-VCH; Garching and Ludwigshafen, Germany.

Chadwick Ellis, W et al; Copolymerization of CO2 and meso epoxides using enantioselective b-diiminate catalysts: a route to highly isotactic polycarbonates; Chem. Sci.; 2014; p. 4004-4011; 5; The Royal Society of Chemistry; New York, USA.

Ozutsumi, K et al; Thermodynamics of Complexation of 18-Crown-6 with Sodium, Potassium, Rubidium, Caesium and Ammonium lons in N, N-Dimethylformamide; J. Chem. Soc. Faraday Trans.; 1994; p. 127-131; 90(1); Royal Society of Chemistry; Tsukuba, Japan.

Kikuchi, Y et al; Complex formation of alkali metal ions with 18-crown-6 and its derivatives in 1,2-dichloroethane; Analytica Chimica Acta; 2000; p. 325-332; 403; Elsevier; Morioka, Japan.

Igumnov, S et al; Stability Constants for the 18-Crown-6-Sodium lon Complex in Mixtures of Water and Butan-1-ol or Butan-2-ol; Journal of Chemical & Engineering Data; 2012; p. 456-461; 57; ACS Publications; Moscow, Russia.

Xia, W et al; Concerning the Deactivation of Cobalt(III)-Based Porphyrin and Salen Catalysts in Epoxide/CO2 Copolymerization; Chem. Eur. J; 2015; p. 4384-4390; 21; Wiley-VCH; Garching bei Munchen, Germany and Gallen, Switzerland.

Nishioka, K et al; Dual Catalyst System for Asymmetric Alternating Copolymerization of Carbon Dioxide and Cyclohexene Oxide with Chiral Aluminum Complexes: Lewis Base as Catalyst Activator and Lewis Acid as Monomer Activator; Macromolecules; 2012; p. 8172-8192; 45; ACS Publications; Tokyo, Japan.

Romain, C et al; Chemoselective Polymerization Control: From Mixed-Monomer Feedstock to Copolymers; Angewandte Chemie Int. Ed.; 2014; p. 1607-1610; 53; Wiley-VCH; London, UK.

Romain, C et al; Chemoselective Polymerizations from Mixtures of Epoxide, Lactone, Anhydride, and Carbon Dioxide; Journal of the American Chemical Society; 2016; p. 4120-4131; 138; ACS Publications; London and Bath, UK.

Zhu,Y et al; Selective Polymerization Catalysis: Controlling the Metal Chain End Group to Prepare Block Copolyesters; Journal of the American Chemical Society; 2015; p. 12179-12182; 137; ACS Publications; London, UK.

Chen, T et al; Pentablock Copolymer from Tetracomponent Monomer Mixture Using a Switchable Dizinc Catalyst; Macromolecules; 2018, p. 5346-5351; 51; ACS Publications; Oxford, UK.

Stober, T et al; 'Switch' catalysis: from monomer mixtures to sequence-controlled block copolymers; Philosophical Transactions R. Soc.; 2017; p. 1-14; A376 20170066; The Royal Society Publishing; Oxford, UK.

Chen, T et al; Bio-based and Degradable Block Polyester Pressure-Sensitive Adhesives; Angewandte Chemie; 2020; p. 23450-23455; 59; Wiley-VCH; Oxford, UK.

Gregory, G et al; Triblock polyester thermoplastic elastomers with semi-aromatic polymer end blocks by ring-opening copolymerization; Chemical Science; 2020, p. 6567-6581; 11; The Royal Society of Chemistry; Oxford. UK.

Stober, T et al; Switch Catalysis To Deliver Multi-Block Polyesters from Mixtures of Propene Oxide, Lactide, and Phthalic Anhydride; Angewandte Chemie Int. Ed.; 2018, p. 16893-16897; 57; Wiley-VCH; Weinheim.

Stober, T et al; Angewandte Chemie; Selective Polymerization Catalysis from Monomer Mixtures: Using a Commercial Cr-Salen Catalyst To Access ABA Block Polyesters; 2018; p. 6337-6341; 57; Wiley-VCH Verlag GmbH & Co.; Oxford, UK.

Stober, T et al; Easy access to oxygenated block polymers via switchable catalysis; Nature Communications; 2019; p. 1-9; Oxford, UK.

Wang, Y et al; Trivalent Titanium Salen Complex: Thermally Robust and Highly Active Catalyst for Copolymerization of CO2 and Cyclohexene Oxide; ACS Catalysis; 2015, p. 393-39; 5; ACS Publications; Changchun, China.

Chinese Office Action for Patent Application No. 202180061649.2, dated Apr. 30, 2025, pp. 1-39 (Translation Not Included).

Japanese Office Action for Patent Application No. 2023-501080, dated Jun. 12, 2025, pp. 1-8 (Translation Included).

International Preliminary Report on Patentability for WO 2022/008919 (PCT/GB2021/051744), dated Jan. 10, 2023, pp. 1-8.

International Search Report and Written Opinion for WO 2022/008919 (PCT/GB2021/051744), dated Sep. 30, 2021, pp. 1-15.

UK Search Report for GB 2010484.0, dated Jan. 11, 2021, pp. 1-4.

Reath Alexander H. et al: "Redox Potential and Electronic Structure Effects of Proximal Nonredox Active Cations in Cobalt Schiff Base Complexes", Inorganic Chemistry, vol. 56, No. 6, Mar. 20, 2017 (Mar. 20, 2017), pp. 3713-3718.

Kumar Amit et al: "Trivalent Lewis Acidic Cations Govern the Electronic Properties and Stability of Heterobimetallic Complexes of Nickel", Chemistry—A European Journal, vol. 24, No. 1, Nov. 6, 2017 (Nov. 6, 2017), pp. 141-149.

Casellato U et al: "Cyclic and acyclic compartmental Schiff bases, their reduced analogues and related mononuclear and heterodinuclear complexes", Inorganica Chimica Acta, Elsevier BV, NL, vol. 357, No. 14, Nov. 15, 2004 (Nov. 15, 2004), pp. 4191-4207.

Deacy Arron C et al: "Understanding metal synergy in heterodinuclear catalysts for the copolymerization of COand epoxides", Nature Chemistry, Nature Publishing Group UK, London, vol. 12, No. 4, Mar. 27, 2020 (Mar. 27, 2020), pp. 372-380.

Inorganic Chemistry, vol. 36(22), 1997, (Ciringh, Yangzhen et al), pp. 4968-4982.

Inorganic Chemistry, vol. 58(18), 2019, (Najafian, Ahmad et al), pp. 12254-12263.

European Journal ofInorganic Chemistry, vol. 8, 2005, (Barge, Alessandro et al), pp. 1492-1499.

Chemical Communications (Cambridge), vol. 2, 2000, (Casellato, Umberto et al), pp. 145-146.

(56) References Cited

OTHER PUBLICATIONS

Hauenstein, O et al; Bio-based polycarbonate as synthetic toolbox; Nature Communications; 2016; 7; Article No. 11862; Bayreuth, Germany.
Darensbourg, D.J. et al; An Efficient Method of Depolymerization of Poly(cyclopentene carbonate) to Its Comonomers: Cyclopentene Oxide and Carbon Dioxide; Macromolecules; 2013; p. 5850-5855; 46; ACS Publications; Texas & New York, USA.
Darensbourg, D.J. et al; Catalytic Coupling of Cyclopentene Oxide and CO2 Utilizing Bifunctional (salen)Co(III) and (salen)Cr(III) Catalysts: Comparative Processes Involving Binary (salen)Cr(III) Analogs; ACS Catalysis; 2013; p. 3050-3057; 3; ACS Publications; Texas, USA.
Cyriac, A et al; Unusual coordination mode of tetradentate Schiff base cobalt(III) complexes; Dalton Transactions; 2012; p. 1444-1447; 41; The Royal Society of Chemistry.
Artz, J et al; Sustainable Conversion of Carbon Dioxide: An Integrated Review of Catalysis and Life Cycle Assessment; Chemical Reviews; 2018; p. 434-504; 118; ACS Publications; Aachen, Germany.
Yhu Y et al ; Sustainable polymers from renewable resources; Nature; Dec. 15, 2016; p. 354-362; 540; Macmillan Publishers Limited; Oxford and London, UK.
Liu Y et al; Mechanistic Understanding of Dinuclear Cobalt(III) Complex Mediated Highly Enantioselective Copolymerization of meso-Epoxides with CO2; 2014; p. 7775-7788; 47; ACS Publications; Dalian, China.
Liu, J et al; Kinetic Study on the Coupling of CO2 and Epoxides Catalyzed by Co(III) Complex with an Inter- or Intramolecular Nucleophilic Cocatalyst; Macromolecules; 2013, p. 1343-1349; 46; ACS Publications; Dalian, China.
Ohkawara, T et al; Facile Estimation of Catalytic Activity and Selectivities in Copolymerization of Propylene Oxide with Carbon Dioxide Mediated by Metal Complexes with Planar Tetradentate Ligand; J. Am. Chem. Soc; 2014; p. 10728-10735; 136; ACS Publications; Tokyo, Japan and Ibaraka, Japan.
Yoo, J et al; Anion variation on a cobalt(III) complex of salen-type ligand tethered by four quaternary ammonium salts for CO2/epoxide copolymerization; Dalton Transactions; 2010; p. 2622-2630; 39; The Royal Society of Chemistry.
Jae Na, S et al; Elucidation of the Structure of a Highly Active Catalytic System for CO2/Epoxide Copolymerization: A salen-Cobaltate Complex of an Unusual Binding Mode; Inorganic Chemistry; 2009; p. 10455-10465; 48; American Chemical Society; Seoul, Korea.
Ren, W-M et al; Highly Active, Bifunctional Co(III)-Salen Catalyst for Alternating Copolymerization of CO2 with Cyclohexene Oxide and Terpolymerization with Aliphatic Epoxides; Macromolecules; 2010; p. 1396-1402; 43; ACS Publications; Dalian, China.
Wu, G-P et al; Highly Selective Synthesis of CO2 Copolymer from Styrene Oxide; Macromolecules; 2010; p. 9202-9204; 43; American Chemical Society; Dalian, China and Texas, USA.
Wu, G-P et al; Perfectly Alternating Copolymerization of CO2 and Epichlorohydrin Using Cobalt(III)-Based Catalyst Systems; J. Am. Chem. Soc; 2011; p. 15191-15199; 133; ACS Publications; Dalian, China and Texas, USA.
Ren, W-M et al; Mechanistic Aspects of the Copolymerization of CO2 with Epoxides Using a Thermally Stable Single-Site Cobalt(III) Catalyst; J. Am. Chem. Soc. 2009; p. 11509-11518; 131; American Chemical society; Dalian, China.
Lee, B.Y. et al; Bimetallic Anilido-Aldimine Zinc Complexes for Epoxide/CO2 Copolymerization; J. Am. Chem. Soc.; 2005; p. 3031-3037; 127; American Chemical society; Daejon, Korea.
Bok, T ey al; Bimetallic Fluorine-Substituted Anilido-Aldimine Zinc Complexes for CO2/(Cyclohexene Oxide) Copolymerization; Inorganic Chemistry; 2006; p. 4228-4237; 45; 10; American Chemical Society; Suwon, Korea.
Kissling, S; Dinuclear zinc catalysts with unprecedented activities for the copolymerization of cyclohexene oxide and CO2; Chem. Commun.; 2015; p. 4579-4582; 51; The Royal Society of Chemistry; Garching and Ludwighshafen, Germany.
Lehnmeier, M et al; Flexibly Tethered Dinuclear Zinc Complexes: A Solution to the Entropy Problem in CO2/Epoxide Copolymerization Catalysis?; Angew. Chem. Int. Ed.; 2013; p. 9821-9826; 52; Wiley-VCH; Garching and Ludwigshafen, Germany.
Buchard, A et al; Experimental and Computational Investigation of the Mechanism of Carbon Dioxide/Cyclohexene Oxide Copolymerization Using a Dizinc Catalyst; Macromolecules; 2012; p. 6781-6795; 45; ACS Publications; London, UK.
Jutz F et al; Mechanistic Investigation and Reaction Kinetics of the Low-Pressure Copolymerization of Cyclohexene Oxide and Carbon Dioxide Catalyzed by a Dizinc Complex; J. Am. Chem. Soc.; 2011; p. 17395-17405; 133; ACS Publications; London, UK and Stathelle, Norway.
Saini, P. K et al; Dinuclear metal catalysts: improved performance of heterodinuclear mixed catalysts for CO2-epoxide copolymerization; Chem. Commun.; 2014; p. 4164-4167; 50; The Royal Society of Chemistry; London, UK.
Kember, M et al; Highly Active Dizinc Catalyst for the Copolymerization of Carbon Dioxide and Cyclohexene Oxide at One Atmosphere Pressure; Angew. Chem. Int. Ed.; p. 931-933; 2009; 48; Wiley-VCH; London, UK.
Garden, J et al; Greater than the Sum of Its Parts: A Heterodinuclear Polymerization Catalyst; J. Am. Chem. Soc.; 2015; p. 15078-15081; 137; ACS Publications; London, UK.
Trott, G; Heterodinuclear zinc and magnesium catalysts for epoxide/CO2 ring opening copolymerizations; Chem. Sci.; 2019; p. 4618-4627; 10; The Royal Society of Chemistry; Oxford and Edinburgh, UK.
Deacy, A et al; Groups 1, 2 and Zn(II) Heterodinuclear Catalysts for Epoxide/CO2 Ring-Opening Copolymerization; Inorg. Chem.; 2018; p. 15575-15583; 57; ACS Publications; Oxford and London, UK.
Qin, J et al; Cooperative rare earth metal-zinc based heterometallic catalysts for copolymerization of CO2 and cyclohexene oxide; Green Chem.; 2016; p. 4270-4275; 18; The Royal Society of Chemistry; Suxhou, China.
Nagae, H; Lanthanide Complexes Supported by a Trizinc Crown Ether as Catalysts for Alternating Copolymerization of Epoxide and CO2 : Telomerization Controlled by Carboxylate Anions; Angew. Chem. Int. Ed.; 2018; p. 2492-2496; 57; Willey-VCH; Osaka, Japan and Aachen, Germany.
Van Veggel, F et al; Metallomacrocycles: Synthesis, X-ray Structure, Electrochemistry, and ESR Spectroscopy of Mononuclear and Heterodinuclear Complexes; Inorg. Chem.; 1989; p. 1133-1148; 28; American Chemical Society; AE Enschede, The Netherlands.
Casellato, U et al; Preparation, properties and X-ray structure of a cyclic compartmental Schiff base and related complexes containing d- or f-metal ions; Inorganica Chimica Acta; 1997; p. 117-121; 262; Elsevier; Padua, Italy.
Casellato, U et al; Synthesis, X-ray Structure, and Solution NMR Studies of Ln(III) Complexes with a Macrocyclic Asymmetric Compartmental Schiff Base. Preference of the Ln(III) Ions for a Crown-Like Coordination Site; Inorg. Chem.; 1999; p. 2906-2916; 38; The American Chemical Society; Padova, Torino and Alessandria, Italy.
Brianese, N et al; Asymmetric compartmental macrocyclic ligands and related mononuclear and hetero-dinuclear complexes with d- and/or f-metal ions; Inorganica Chimica Acta; 1999; p. 178-194; 293; Elsevier; Padova Italy.
Cassol, A et al; New Complexes of Ditopic Ligands with "d" and/or "s" Metal Ions; Supramolecular Chemistry; 2001; p. 469-488; 13; Taylor & Francis; Padova, Italy.
Caneschi, A et al; d- or f-Mononuclear and Related Heterodinuclear Complexes With [1+1] Asymmetric Compartmental Macrocycles; Eur. J. Inorg. Chem; 2004; p. 3887-3900; Wiley VCH; Weinheim, Germany.
Martinez et al; Synthesis and activity of macrocyclized chiral Mn(III)-Schiff-base epoxidation catalysts; Journal of Organo metallic Chemistry; 2005; p. 2163-2171; 690; Elsevier; Toulouse, France.
Tamburini, S et al; Molecular movements inside [1+1] asymmetric compartmental macrocycles: Formation of positional mononuclear

(56) References Cited

OTHER PUBLICATIONS and hetero-dinuclear lanthanide(III) isomers and related homo-dinuclear complexes; Inorganica Chimica Acta; 2005; p. 183-196; 359; Elsevier; Padova, Italy.
Tamburini, S et al; The Role of Functionalisation, Asymmetry and Shape of a New Macrocyclic Compartmental Ligand in the Formation of Mononuclear, Homo- and Heterodinuclear Lanthanide(III) Complexes; Eur. J. Inorg. Chem; 2009; p. 155-167; Wiley VCH; Weinheim, Germany.
Chantarojsiri T, Cationic Charges Leading to an Inverse Free-Energy Relationship for N—N Bond Formation by MnVl Nitrides; Angew. Chem. Int. Ed; 2018; p. 14037-14042; 57; Wiley-VCH Verlag GmbH & Co; Weinheim.
Chantarojsiri T, Incorporation of redox-inactive cations promotes iron catalyzed aerobic C—H oxidation at mild potentials; Chem. Sci.; 2018; p. 2567-2574; 9; Royal Society of Chemistry; Irvine, USA.
Du, K et al.; Selective Binding and Quantitation of Calcium with a Cobalt-Based Magnetic Resonance Probe; Journal of the American Chemical Society; 2019; P7163-7122; 141; ACS Publications; Illinois, US.
Kang, K et al; Installation of Internal Electric Fields by Non-Redox Active Cations in Transition Metal Complexes; Chem. Sci.; 2019; p. 10135-10142; 10; Royal Society of Chemistry; Irvine, USA.
Kumar, A et al; Redox-Inactive Metal Cations Modulate the Reduction Potential of the Uranyl Ion in Macrocyclic Complexes; J. Am. Chem. Soc. 2020; p. 3032-3041; 142; ACS Publications; Kansas, USA.
Burkart, M et al ; Opportunities and Challenges for Catalysis in Carbon Dioxide Utilization; ACS Catal.; 2019, p. 7937-7956; 9; ACS Publications; California, United States.
Hepburn, C et al; The technological and economic prospects for CO2 utilization and removal; Nature; 2019; p. 87-97; 575; Perspective; Oxford, UK.
Darensbourg, D; Chain transfer agents utilized in epoxide and CO2 copolymerization processes; Green Chem.; 2019; p. 2214-2223; 21; The Royal Society of Chemistry; Texas, USA.
Alagi, P et al; Carbon Dioxide-Based Polyols as Sustainable Feedstock of Thermoplastic Polyurethane for Corrosion-Resistant Metal Coating; ACS Sustainable Chemistry & Engineering; 2017; p. 3871-3881; 5; ACS Publications; Seoul, Republic of Korea.
Sulley G et al; Switchable Catalysis Improves the Properties of CO2 Derived Polymers: Poly(cyclohexene carbonate b decalactone b cyclohexene carbonate) Adhesives, Elastomers, and Toughened Plastics; J. Am. Chem. Soc; 2020; p. 4367-4378; 142; ACS Publications; Oxford and London, UK.
Leow W et al; Chloride-mediated selective electrosynthesis of ethylene and propylene oxides at high current density; Science; 2020; p. 1228-1233; 368; AAAS; Toronto, Canada; Singapore.
Lu X et al; CO2 Copolymers from Epoxides: Catalyst Activity, Product Selectivity, and Stereochemistry Control; Accounts of Chemical Research; 2012; p. 1721-1735; 45; American Chemical Society; Dalian, China.
Nakano K et al; Tetravalent Metal Complexes as a New Family of Catalysts for Copolymerization of Epoxides with Carbon Dioxide; J. Am. Chem. Soc.; 2011: p. 10720-10723; 133; ACS Publications; Tokyo, Japan.
Nakano K et al; Bimetallic mechanism operating in the copolymerization of propylene oxide with carbon dioxide catalyzed by cobalt-salen complexes; Chem. Sci.; 2010; p. 369-373; 1; The Royal Society of Chemistry; Tokyo, Japan.
Cohen C et al; Cobalt Catalysts for the Alternating Copolymerization of Propylene Oxide and Carbon Dioxide: Combining High Activity and Selectivity; J. Am. Chem. Soc.; 2005; p. 10869-10878; 127; American Chemical Society; New York, USA.
Allen S et al; High-Activity, Single-Site Catalysts for the Alternating Copolymerization of CO2 and Propylene Oxide; J. Am. Chem. Soc.; 2002; p. 14284-14285; 124; American Chemical Society; New York; USA.
Vagin S et al; Conformationally Flexible Dimeric Salphen Complexes for Bifunctional Catalysis; J. Am. Chem. Soc.; 2010; p. 14367-14369; 132; American Chemical Society; Garching, Germany.
Zhang D et al; Metal-Free Alternating Copolymerization of CO2 with Epoxides: Fulfilling “Green” Synthesis and Activity; J. Am. Chem. Soc.; 2016; p. 11117-11120; 138; ACS Publications; Thuwal, Saudi Arabia.
Jia M et al; Monomodal Ultrahigh-Molar-Mass Polycarbonate Homopolymers and Diblock Copolymers by Anionic Copolymerization of Epoxides with CO2; ACS Macro Letters; 2019, p. 1594-1598; 8; ACS Publicaitions; Thuwal, Saudi Arabia.
WU G-P et al; Mechanistic Insights into Water-Mediated Tandem Catalysis of Metal-Coordination CO2/Epoxide Copolymerization and Organocatalytic Ring-Opening Polymerization: One-Pot, Two Steps, and Three Catalysis Cycles for Triblock Copolymers Synthesis; Macromolecules; 2016, p. 807-814; 49; ACS Publications; Hanzhou, China.
Cyriac A et al; Immortal CO2/Propylene Oxide Copolymerization: Precise Control of Molecular Weight and Architecture of Various Block Copolymers; Macromolecules; 2010 p. 7398-7401; 43; American Chemical Society; Suwon, Korea.
Kember M et al; Efficient Magnesium Catalysts for the Copolymerization of Epoxides and CO2; Using Water to Synthesize Polycarbonate Polyols; J. Am. Chem. Soc.; 2012, p. 15676-15679; 134; ACS Publications; London, UK.
Buchard A et al; A bimetallic iron(III) catalyst for CO2/epoxide coupling; Chem. Commun.; 2011, p. 212-214; 47; The Royal Society of Chemistry; London, UK.
Trott G et al; Catalysts for CO2/epoxide ring-opening copolymerization; Philosophical Transactions R. Soc.; 2015; A374; The Royal Society; London, UK.
Kember, M et al; Di-cobalt(II) catalysts for the copolymerisation of CO2 and cyclohexene oxide: support for a dinuclear mechanism?; Chemical Science; 2012, p. 1245-1255; 3; The Royal Society of Chemistry; London, UK.
Kember, M et al; Highly Active Di- and Trimetallic Cobalt Catalysts for the Copolymerization of CHO and CO2 at Atmospheric Pressure; Macromolecules; 2010; p. 2291-2298; 43; American Chemical Society; London, UK.
Asaba, H et al; Alternating Copolymerization of CO2 and Cyclohexene Oxide Catalyzed by Cobalt-Lanthanide Mixed Multinuclear Complexes; Inorganic Chemistry; 2020; p. 7928-7933; 59; ACS Publications; Tokyo and Osaka, Japan.
Deacy, A et al; Heterodinuclear complexes featuring Zn(II) and M = Al(III), Ga(III) or In(III) for cyclohexene oxide and CO2 copolymerisation; Dalton Translations; 2020, p. 223-231; 49; The Royal Society of Chemistry; Oxford, UK.
Klaus, S et al; J. Am. Chem. Soc; Mechanistic Insights into Heterogeneous Zinc Dicarboxylates and Theoretical Considerations for CO2-Epoxide Copolymerization; J. Am. Chem. Soc,; 2011; p. 13151-13161; 133; ACS Publications; Munchen, Germany.
Chauvel, C; Incompatible Elements; Encyclopedia of Geochemistry; 2018; p. 719-769; Springer Int. Publ.; Grenoble, France.
Darensbourg, D et al; Copolymerization of Epoxides and Carbon Dioxide. Evidence Supporting the Lack of Dual Catalysis at a Single Metal Site; Inorg. Chem; 2009; p. 8668-8677; 48; American Chemical Society; Texas, USA.
Romain, C et al; Dinuclear Metal Complex-Mediated Formation of CO2-Based Polycarbonates; Topics in Organometallic Chemsitry; 2015; Springer International Publishing Switzerland, London, UK.
Mang, S et al; Copolymerization of CO2 and 1,2-Cyclohexene Oxide Using a CO2-Soluble Chromium Porphyrin Catalyst; Macromolecules; 2000; p. 303-308; 33; American Chemical Society; Cambridge and Kent, UK.
Chukanova; O et al; The Kinetics of Carbon Dioxide and Propylene Oxide Copolymerization Catalyzed by Binary Catalyst System; Polumer Science, Ser. B; 2015; p. 224-227; 57; No. 3; Pleiades Publishing; Ivanovo, Russia.
Darensbourg, D et al; Terpolymerization of propylene oxide and vinyl oxides with CO2: copolymer cross-linking and surface modification via thiol-ene click chemistry; Polym. Chem. 2015, p. 1768-1776; 6; The Royal Society of Chemistry; Texas, USA.

(56) References Cited

OTHER PUBLICATIONS

Scharfenberg, M et al; Functional Polycarbonates from Carbon Dioxide and Tailored Epoxide Monomers: Degradable Materials and Their Application Potential; Adv. Funct .Mater.; 2018; p. 1-16; 28; 1704302; Wiley-VCH; Mainz, Germany.
Darensbourg, D et al; Postpolymerization Functionalization of Copolymers Produced from Carbon Dioxide and 2 Vinyloxirane: Amphiphilic/Water-Soluble CO2 Based Polycarbonates; Macromolecules; 2014; p. 3806-3813; 47; ACS Publications; Texas, US.
Chen, K et al; Design of Betaine Functional Catalyst for Efficient Copolymerization of Oxirane and CO2; Macromolecules; 2018; p. 6057-6062; 51; ACS Publications; Hangzhou, China and Texas, USA.
Kozak, C et al; Copolymerization of carbon dioxide and epoxides by metal coordination complexes; Coordination Chemistry Reviews; 2018, p. 565-587; 376; Elsevier; Newfoundland; Canada.
Kember, M et al; Catalysts for CO2/epoxide copolymerisation; Chem. Commun.; 2011; p. 141-163; 47; The Royal Society of Chemistry; London, UK.
Klaus, S et al; Recent advances in CO2/epoxide copolymerization—New strategies and cooperative mechanisms; Coordination Chemistry Reviews; 2010; p. 1460-1479; 255; Elsevier; Munchen, Germany.
Inoue, S et al; Copolymerization of Carbon Dioxide and Epoxide; Polymer Letters; 1969; p. 287-292; 7; Wiley online Library; Toyko, Japan.
Chen et al; Double Metal Cyanide Complex Based on Zn3[Co(CN)6]2 as Highly Active Catalyst for Copolymerization of Carbon Dioxide and Cyclohexene Oxide; Journal of Polymer Science; Part A ; Polymer Chemistry; 2004; p. 5284-5291; 42; Wiley Interscience; Hangzhou, China.
Hirano, T et al; Stereochemistry of Copolymerization of Optically Active 3-Phenyl-1,2-epoxypropane with Carbon Dioxide; Makromol. Chem.; 1976; p. 3245-3253; 177; Wiley online Library; Tokyo; Japan.
Hirano, T et al; Stereochemistry of Copolymerization of carbon Dioxide with Optically Active Phenylepoxyethane; Makromol. Chem.; 1975; p. 1913-1917; 176; Wiley online Library; Tokyo; Japan.
Inoue, S et al; Ternary Copolymerization of Carbon Dioxide with Optical Isomers of 1,2-Epoxypropane and Phenylepoxyethane; Polymer Journal; 1977; p. 101-106; 9; 1; Tokyo; Japan.
Eberhardt, R et al; New Zinc Dicarboxylate Catalysts for the CO2/Propylene Oxide Copolymerization Reaction: Activity Enhancement Through Zn(II)-Ethylsulfinate Initiating Groups; Macromol. Chem. Phys.; 2004; p. 42-47; 205; Wiley-VCH; Ulm and Ludwigshafen, Germany.
Kim, J-S et al; NEXAFS spectroscopy study of the surface properties of zinc glutarate and its reactivity with carbon dioxide and propylene oxide; Journal of Catalysis; 2003; p. 386-395; 218; Elsevier; Pohang, Republic of Korea and Stanford, USA.
Ree, M et al; A New Copolymerization Process Leading to Poly(propylene carbonate) with a Highly Enhanced Yield from Carbon Dioxide and Propylene Oxide; Journal of Polymer Science; Part A ; Polymer Chemistry; 1999; p. 1863-1876; 37; Wiley online Library; Pohang; Korea.
Hwang, Y et al—Zinc Glutarate Catalyzed Synthesis and Biodegradability of Poly(carbonate-co-ester)s from CO,, Propylene Oxide, and e-Caprolactone; Macromol. Symp.; 2005; p. 227-237; 224; International Union of Pure and Applied Chemistry; Pohang and Gyeongju, Korea.
Robertson, N et al; Two-dimensional double metal cyanide complexes: highly active catalysts for the homopolymerization of propylene oxide and copolymerization of propylene oxide and carbon dioxide; Dalton, Trans.; 2006; p. 5390-5395; The Royal Society of Chemistry; New York, USA.
Yang, G-W et al; Scalable Bifunctional Organoboron Catalysts for Copolymerization of CO2 and Epoxides with Unprecedented Efficiency; J. Am. Chem. Soc.; 2020; p. 12245-12255; 142; ACS Publications; Hangzhou; China.
Deacy, A et al; Co(III)/Alkali-Metal(I) Heterodinuclear Catalysts for the Ring-Opening Copolymerization of CO2 and Propylene Oxide; J. Am. Chem. Soc.; 2020; p. 19150-19160; 142; ACS Publications; Oxford, UK.

POLYMERISATION PROCESS

CROSS-REFERENCE TO RELATED APPLICATIONS

This application is the National Stage of International Application No. PCT/GB2021/051744, filed Jul. 8, 2021, which claims priority to GB 2010484.0, filed Jul. 8, 2020, which are entirely incorporated herein by reference.

INTRODUCTION

The present invention relates to a polymerisation process for the preparation of a polycarbonate in the presence of a catalytic compound. More specifically, the present invention relates to the ring-opening copolymerisation of epoxides with carbon dioxide for the preparation of a polycarbonate, said copolymerisation being conducted in the presence of a catalytic compound. The present invention also relates to catalytic compounds themselves.

BACKGROUND OF THE INVENTION

The preparation of polycarbonates by the ring-opening copolymerisation (ROCOP) of epoxides in the presence of $CO_2$ is seen as an attractive means of utilizing $CO_2$, an otherwise unwanted greenhouse gas. The polycarbonates formed from the ROCOP of epoxides have been touted as an alternative starting point in the synthesis of polyurethanes, which can be applied as flexible and rigid foams, elastomers, coatings, adhesives and scratch-resistant materials[1 2 3 4 5 6]. When compared with polyurethane production starting from polyether polyols, the synthesis of polyurethanes using polycarbonates formed from the ROCOP of epoxides has shown a reduction in both greenhouse gas emission and fossil fuel consumption in a life-cycle analysis.

The coupling reaction of $CO_2$ with epoxides, such as propylene oxide (PO), has two competing reaction pathways: the first being the copolymerization reaction to form polypropylene carbonate (PPC); and the second a cyclisation reaction in which propylene carbonate (PC) is formed, which is the thermodynamic product of these two competing reactions. In order to negate the cyclisation reaction and thus promote the formation of PPC by copolymerization, highly optimized catalysts and conditions are required.

A number of $CO_2$/epoxide ring opening monometallic catalysts have been previously reported with an overwhelming focus on transition metal salen derivates of Co(III), Cr(III) and AI(III)[7 8 9 10 11]. However, these catalysts typically only perform well when combined with an exogenous co-catalyst such as bis(triphenylphosphine)iminium chloride (PPNCl) to form a binary catalyst system, in which the co-catalyst is necessary in order to enhance the rate and selectivity. The use of such a co-catalyst, however, is generally undesirable due to its expense, toxicity, insolubility, corrosive nature to steel, complex mechanistic rate laws and loss of activity when the binary catalyst formulation is diluted. Furthermore, as a bimolecular process, such systems are optimal at high catalyst loadings and concentrated conditions, which imposes a cap on the molecular weight of the formed polymer. In addition, these binary systems typically produce cyclic carbonate byproducts at elevated temperatures, which limits their potential application[12 13 14 15].

A common strategy to overcome the numerous limitations of binary catalyst systems has been to tether the co-catalyst to the salen motif. Lee et al reported a Co(Ill) salen complex para-functionalised with ammonium 2,4-dinitrophenolate ions, which displayed high turnover frequencies at low catalyst loading relative to monometallic catalysts[1617]. However, such salen ligands with pendant co-catalysts are often very difficult to synthesize and can only be isolated after complex work-up and purification procedures. Additionally, the use salen ligands with pendant co-catalyst in the synthesis of polyols, the precursors of polyurethanes, often requires an undesirable level of acidity in the reaction conditions in order to control the molar mass and end-group chemistry.

Therefore, there remains a need for catalysts for the ROCOP of epoxides in the presence of $CO_2$.

The present invention was devised with the foregoing in mind.

SUMMARY OF THE INVENTION

According to a first aspect of the present invention there is provided a process for the preparation of a polycarbonate, the process comprising the following step:

a) contacting carbon dioxide with at least one epoxide, wherein step a) is conducted in the presence of a compound of Formula I as defined herein.

According to a second aspect of the present invention there is provided a process for the preparation of a polyester, the process comprising the following step:

a) contacting at least one epoxide with at least one cyclic anhydride, wherein step a) is conducted in the presence of a compound of Formula I as defined herein.

According to a third aspect of the present invention there is provided a compound having a structure according to Formula I as defined herein.

To the extent that they have features in common, optional, preferred and suitable features of the first aspect of the invention are respectively optional, preferred and suitable features of the second and third aspects of the invention.

DETAILED DESCRIPTION OF THE INVENTION

Definitions

The term "(m-nC)" or "(m-nC) group" used alone or as a prefix, refers to any group having m to n carbon atoms.

The term "alkyl" as used herein refers to straight or branched chain alkyl moieties, typically having 1, 2, 3, 4, 5 or 6 carbon atoms. This term includes reference to groups such as methyl, ethyl, propyl (n-propyl or isopropyl), butyl (n-butyl, sec-butyl or tert-butyl), pentyl, hexyl and the like. Most suitably, an alkyl may have 1, 2, 3 or 4 carbon atoms.

The term "alkylene" as used herein refers to a divalent equivalent of an alkyl group as described above.

The term "alkenyl" as used herein refers to straight or branched chain alkenyl moieties, typically having 1, 2, 3, 4, 5 or 6 carbon atoms. The term includes reference to alkenyl moieties containing 1, 2 or 3 carbon-carbon double bonds (C═C). This term includes reference to groups such as ethenyl (vinyl), propenyl (allyl), butenyl, pentenyl and hexenyl, as well as both the cis and trans isomers thereof.

The term "alkenylene" as used herein refers to a divalent equivalent of an alkenyl group as described above.

The term "alkynyl" as used herein refers to straight or branched chain alkynyl moieties, typically having 1, 2, 3, 4, 5 or 6 carbon atoms. The term includes reference to alkynyl moieties containing 1, 2 or 3 carbon-carbon triple bonds (C≡C). This term includes reference to groups such as ethynyl, propynyl, butynyl, pentynyl and hexynyl.

The term "alkynylene" as used herein refers to a divalent equivalent of an alkynyl group as described above.

The term "heteroaliphatic" as used herein refers to a straight or branched alkyl, alkenyl or alkynyl group as defined herein, wherein one or more (e.g. up to 5, preferably up to 3, more preferably up 1) of the carbon atoms is replaced with a heteroatom selected from N, O and S, provided that the number of carbon atoms is greater than or equal to the number of heteroatoms.

The term "haloalkyl" as used herein refers to alkyl groups being substituted with one or more halogens (e.g. F, Cl, Br or I). This term includes reference to groups such as 2-fluoropropyl, 3-chloropentyl, as well as perfluoroalkyl groups, such as perfluoromethyl.

The term "alkoxy" as used herein refers to —O-alkyl, wherein alkyl is a straight or branched chain and comprises 1, 2, 3, 4, 5 or 6 carbon atoms. In one class of embodiments, alkoxy has 1, 2, 3 or 4 carbon atoms. This term includes reference to groups such as methoxy, ethoxy, propoxy, isopropoxy, butoxy, tert-butoxy, pentoxy, hexoxy and the like.

The term "aryl" or "aromatic" as used herein means an aromatic ring system comprising 6, 7, 8, 9 or 10 ring carbon atoms. Aryl is often phenyl but may be a polycyclic ring system, having two or more rings, at least one of which is aromatic. This term includes reference to groups such as phenyl, naphthyl and the like.

The term "aryl(m-nC)alkyl" means an aryl group covalently attached to a (m-nC)alkylene group, both of which are described herein. Examples of aryl-(m-nC)alkyl groups include benzyl, phenylethyl, and the like.

The term "heteroaryl" or "heteroaromatic" means an aromatic mono-, bi-, or polycyclic ring incorporating one or more (for example 1-4, particularly 1, 2 or 3) heteroatoms selected from nitrogen, oxygen or sulfur. Examples of heteroaryl groups are monocyclic and bicyclic groups containing from five to twelve ring members, and more usually from five to ten ring members.

The heteroaryl group can be, for example, a 5- or 6-membered monocyclic ring or a 9- or 10-membered bicyclic ring, for example a bicyclic structure formed from fused five and six membered rings or two fused six membered rings. Each ring may contain up to about four heteroatoms typically selected from nitrogen, sulfur and oxygen. Typically, the heteroaryl ring will contain up to 3 heteroatoms, more usually up to 2, for example a single heteroatom.

The term "heteroaryl(m-nC)alkyl" means an heteroaryl group covalently attached to a (m-nC)alkylene group, both of which are described herein.

The term "carbocyclyl", "carbocyclic" or "carbocycle" means a non-aromatic saturated or partially saturated monocyclic, or a fused, bridged, or spiro bicyclic carbocyclic ring system(s).

Monocyclic carbocyclic rings contain from about 3 to 12 (suitably from 3 to 7) ring atoms. Bicyclic carbocycles contain from 7 to 17 carbon atoms in the rings, suitably 7 to 12 carbon atoms, in the rings. Bicyclic carbocyclic rings may be fused, spiro, or bridged ring systems.

The term "heterocyclyl", "heterocyclic" or "heterocycle" means a non-aromatic saturated or partially saturated monocyclic, fused, bridged, or spiro bicyclic heterocyclic ring system(s). Monocyclic heterocyclic rings contain from about 3 to 12 (suitably from 3 to 7) ring atoms, with from 1 to 5 (suitably 1, 2 or 3) heteroatoms selected from nitrogen, oxygen or sulfur in the ring. Bicyclic heterocycles contain from 7 to 17 member atoms, suitably 7 to 12 member atoms, in the ring. Bicyclic heterocyclic(s) rings may be fused, spiro, or bridged ring systems.

The term "halogen" or "halo" as used herein refers to F, Cl, Br or I. In a particular, halogen may be F or Cl, of which Cl is more common.

The term epoxide as used herein refers to any compound comprising an epoxide moiety. The epoxide substrate may contain more than one epoxide moiety, i.e. it may be a bis-epoxide, a tris-epoxide, or a multi-epoxide containing moiety. It will be understood that reactions carried out in the presence of one or more compounds having more than one epoxide moiety may lead to cross-linking in the resulting polymer. It will be understood that the term "an epoxide" is intended to encompass one or more epoxides. In other words, the term "an epoxide" refers to a single epoxide, or a mixture of two or more different epoxides.

The term "substituted" as used herein in reference to a moiety means that one or more, especially up to 5. Preferably, "substituted" as used herein in reference to a moiety means that 1, 2 or 3, of the hydrogen atoms in said moiety are replaced independently of each other by the corresponding number of the described substituents. Even more preferred, "substituted" as used herein in reference to a moiety means that 1 or 2, of the hydrogen atoms in said moiety are replaced independently of each other by the corresponding number of the described substituents. The term "optionally substituted" as used herein means substituted or unsubstituted.

It will, of course, be understood that substituents are only at positions where they are chemically possible, the person skilled in the art being able to decide (either experimentally or theoretically) without inappropriate effort whether a particular substitution is possible.

Catalytic Process for the Preparation of a Polycarbonate

According to a first aspect of the present invention there is provided a process for the preparation of a polycarbonate, the process comprising the following step:

a) contacting carbon dioxide with at least one epoxide, wherein step a) is conducted in the presence of a compound of Formula I shown below:

Formula I

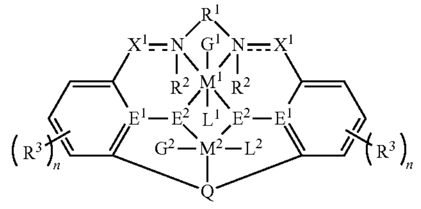

wherein $M^1$ is selected from the group consisting of a group 2 metal, a group 3 metal, a transition metal a group 13 metal, a group 14 metal and a lanthanide;

$M^2$ is selected from a group 1 metal, a group 2 metal, a group 3 metal, a group 13 metal and a lanthanide;

$R^1$ is selected from (2-5C)alkylene, (2-5C)alkenylene and (2-5C)alkynylene, wherein 0, 1 or 2 carbon atoms within any one of the said (2-5C)alkylene, (2-5C) alkenylene and (2-5C)alkynylene is replaced with a heteroatom selected from O and N, and wherein any carbon, O or N atom within the said (2-5C)alkylene, (2-5C)alkenylene and (2-5C)alkynylene may be independently optionally substituted with one or more $R^x$;

each $R^x$ is independently selected from halo, hydroxy, cyano, nitro, (1-20C)alkyl, (2-20C)alkenyl, (2-20C) alkynyl, (1-20C)haloalkyl, (1-20C)alkoxy, aryl, heteroaryl and —$NR^{xa}R^{xb}$, where any aryl or heteroaryl in $R^x$ is optionally substituted with one or more groups independently selected from halo, hydroxy, cyano, nitro, (1-20C)alkyl, (1-20C)haloalkyl and (1-20C) alkoxy, and where $R^{xa}$ and $R^{xb}$ are independently selected from hydrogen and (1-3C)alkyl, and/or two or more $R^x$ located on adjacent atoms are linked to one another, such that when taken in combination with the atoms to which they are attached, they form a monocyclic or bicyclic aromatic, heteroaromatic, carbocyclic or heterocyclic ring system, wherein any of the said monocyclic or bicyclic aromatic, heteroaromatic, carbocyclic or heterocyclic ring system is optionally substituted with one or more groups independently selected from halo, hydroxy, cyano, nitro, (1-20C)alkyl, (1-20C)haloalkyl and (1-20C)alkoxy;

each $R^2$ is independently selected from absent, hydrogen, (1-4C)alkyl, (2-4C)alkenyl, (2-4C)alkynyl, (1-4C)haloalkyl, aryl, aryl(1-2C)alkyl, heteroaryl, heteroaryl(1-2C)alkyl, —C(O)—$R^{2a}$, —C(O)—$OR^{2a}$ and —C(O)—$NR^{2a}R^{2b}$, where any aryl, aryl(1-2C)alkyl, heteroaryl and heteroaryl(1-2C)alkyl in $R^2$ is optionally substituted with one or more groups independently selected from halo, hydroxy, cyano, nitro, (1-4C)alkyl, (1-4C) haloalkyl and (1-4C)alkoxy, and where $R^{2a}$ and $R^{2b}$ are independently selected from hydrogen and (1-3C)alkyl;

each $X^1$ is independently selected from —CH—, —$CR^4$—, —$CH_2$—, —$CHR^4$—, —$CR^4R^4$ and —$PR^4R^4$—, where each $R^4$ is independently selected from (1-4C)alkyl, (2-4C)alkenyl, (2-4C)alkynyl, (1-4C)haloalkyl, aryl, aryl(1-2C)alkyl, heteroaryl and heteroaryl(1-2C)alkyl, where any aryl, aryl(1-2C)alkyl, heteroaryl and heteroaryl(1-2C)alkyl in $R^4$ is optionally substituted with one or more groups independently selected from halo, hydroxy, cyano, nitro, (1-4C)alkyl, (1-4C)haloalkyl and (1-4C)alkoxy;

$E^1$ is C and $E^2$ is O, S or N; or $E^1$ is N and $E^2$ is O;

each $R^3$ is independently selected from halo, hydroxy, cyano, nitro, (1-4C)alkyl, (2-4C)alkenyl, (2-4C)alkynyl, (1-4C)haloalkyl, (1-4C)alkoxy, aryl, aryl(1-2C) alkyl, heteroaryl, heteroaryl(1-2C)alkyl, —C(O)—$R^{3a}$, —C(O)—$OR^{3a}$, —O—C(O)—$R^{3a}$, —C(O)—$NR^{3a}R^{3b}$, —$N(R^{3a})$C(O)—$R^{3b}$ and —$NR^{3a}R^{3b}$, where any aryl, aryl(1-2C)alkyl, heteroaryl and heteroaryl(1-2C)alkyl in $R^3$ is optionally substituted with one or more groups independently selected from halo, hydroxy, cyano, nitro, (1-4C)alkyl, (1-4C)haloalkyl and (1-4C)alkoxy, and where $R^{3a}$ and $R^{3b}$ are independently selected from hydrogen and (1-3C)alkyl;

and/or two $R^3$ located on adjacent atoms are linked to one another, such that when taken in combination with the atoms to which they are attached, they form a monocyclic aromatic, heteroaromatic, carbocyclic or heterocyclic ring system, wherein any of the said monocyclic aromatic, heteroaromatic, carbocyclic or heterocyclic ring system is optionally substituted with one or more groups independently selected from halo, hydroxy, cyano, nitro, (1-4C)alkyl, (1-4C)haloalkyl and (1-4C) alkoxy;

each n is independently selected from 0, 1, 2 and 3;

$L^1$ and $L^2$ are independently selected from absent, halo, nitrate, hydroxy, (1-20C)alkyl, (2-20C)alkenyl, (2-20C)alkynyl, (1-20C)heteroaliphatic, carbocyclyl, carbocyclyl(1-3C)alkyl, heterocyclyl, heterocyclyl(1-3C)alkyl, aryl, aryl(1-3C)alkyl, heteroaryl, heteroaryl (1-3C)alkyl, —O—C(O)—$R^a$, —O—C(O)O—$R^a$, —OP(O)$(R^a)_2$, —P(O)$(OR^a)_2$, —OR a, —O—$S(O)_2$—$R^a$ (e.g. triflate), —O—S(O)—$(R^a)_2$, —O—S(O)—$R^a$, —S(O)—$R^a$, —S—C(O)—$R^a$, —S—C(S)—O—$R^a$, —N(H)$S(O)_2$—$R^a$ (e.g. triflamide), —N—$(S(O)_2$—$R^a)_2$ (e.g. triflimide), —S—$R^a$, —$N(R^a)$—C(O)—$R^a$, —C(O)—$N(R^a)_2$, —$N(R^a)_2$ and —O—$Si(R^a)_x(OR^a)_y$ (where x and y are independently 0, 1, 2 or 3, with the proviso that x+y=3), in which any of the said (1-20C) alkyl, (2-20C)alkenyl, (2-20C)alkynyl, (1-20C)heteroaliphatic, carbocyclyl, carbocyclyl(1-3C)alkyl, heterocyclyl, heterocyclyl(1-3C)alkyl, aryl, aryl(1-3C) alkyl, heteroaryl and heteroaryl(1-3C)alkyl within $L^1$ or $L^2$ is optionally substituted with one or more $R^b$, with the proviso that at least one of $L^1$ and $L^2$ is not absent;

$R^a$ is independently selected from hydrogen, (1-25C) alkyl, (2-25C)alkenyl, (2-25C)alkynyl, (1-25C)heteroaliphatic, carbocyclyl, carbocyclyl(1-3C)alkyl, heterocyclyl, heterocyclyl(1-3C)alkyl, aryl, aryl(1-3C) alkyl, heteroaryl and heteroaryl(1-3C)alkyl, where any (1-25C)alkyl, (2-25C)alkenyl, (2-25C)alkynyl, (1-25C) heteroaliphatic, carbocyclyl, carbocyclyl(1-3C)alkyl, heterocyclyl, heterocyclyl(1-3C)alkyl, aryl, aryl(1-3C) alkyl, heteroaryl or heteroaryl(1-3C)alkyl present in $R^a$ is independently substituted with one or more groups independently selected from halo, cyano, nitro, amino, hydroxy, (1-4C)alkyl, (2-4C)alkenyl, (2-4C)alkynyl and (1-4C)alkoxy;

each $R^b$ is independently substituted with one or more groups independently selected from halo, cyano, nitro, amino, hydroxy, (1-4C)alkyl, (1-4C)haloalkyl, (2-4C) alkenyl, (2-4C)alkynyl and (1-4C)alkoxy;

$G^1$ and $G^2$ are independently selected from absent and a neutral or anionic donor ligand that is a Lewis base;

Q has a structure according to Q-I or Q-II shown below:

Q-I

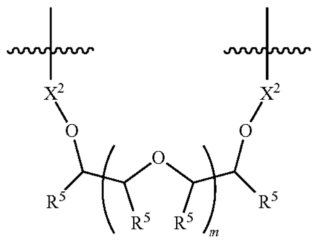

Q-II

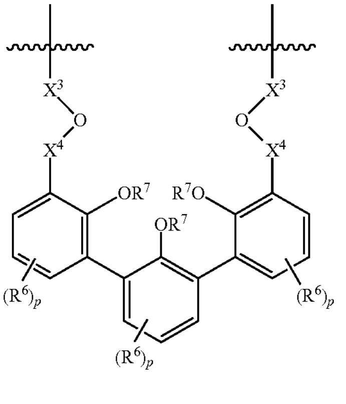

each $X^2$ is independently absent or (1-3C)alkylene, where said (1-3C)alkylene is optionally substituted with 1 or 2 groups independently selected from (1-2C)alkyl;

each $X^3$ is independently absent or (1-3C)alkylene, where said (1-3C)alkylene is optionally substituted with 1 or 2 groups independently selected from (1-2C)alkyl;

each $X^4$ is independently absent or methylene that is optionally substituted with 1 or 2 groups independently selected from (1-2C)alkyl;

m is 1, 2, 3 or 4;

each $R^5$ is independently selected from hydrogen, halo, hydroxy, cyano, nitro, (1-4C)alkyl, (2-4C)alkenyl, (2-4C)alkynyl, (1-4C)haloalkyl, (1-4C)alkoxy, aryl, aryl(1-2C)alkyl, heteroaryl, heteroaryl(1-2C)alkyl, —C(O)—$R^{5a}$, —C(O)—$OR^{5a}$, —O—C(O)—$R^{5a}$, —C(O)—$NR^{5a}R^{5b}$, —$N(R^{5a})$C(O)—$R^{5b}$ and —$NR^{5a}R^{5b}$, where any aryl, aryl(1-2C)alkyl, heteroaryl and heteroaryl(1-2C)alkyl in $R^5$ is optionally substituted with one or more groups independently selected from halo, hydroxy, cyano, nitro, (1-4C)alkyl, (1-4C)haloalkyl and (1-4C)alkoxy, and where $R^{5a}$ and $R^{5b}$ are independently selected from hydrogen and (1-3C)alkyl, and/or two $R^5$ located on adjacent atoms are linked to one another, such that when taken in combination with the atoms to which they are attached, they form a monocyclic aromatic, heteroaromatic, carbocyclic or heterocyclic ring system, wherein any of the said monocyclic aromatic, heteroaromatic, carbocyclic or heterocyclic ring system is optionally substituted with one or more groups independently selected from halo, hydroxy, cyano, nitro, (1-4C)alkyl, (1-4C)haloalkyl and (1-4C) alkoxy;

each $R^6$ is independently selected from halo, hydroxy, cyano, nitro, (1-4C)alkyl, (2-4C)alkenyl, (2-4C)alkynyl, (1-4C)haloalkyl, (1-4C)alkoxy, aryl, aryl(1-2C) alkyl, heteroaryl, heteroaryl(1-2C)alkyl, —C(O)—$R^{6a}$, —C(O)—$OR^{6a}$, —O—C(O)—$R^{6a}$, —C(O)—$NR^{6a}R^{6b}$, —$N(R^{6a})$C(O)—$R^{6b}$ and —$NR^{6a}R^{6b}$, where any aryl, aryl(1-2C)alkyl, heteroaryl and heteroaryl(1-2C)alkyl in $R^6$ is optionally substituted with one or more groups independently selected from halo, hydroxy, cyano, nitro, (1-4C)alkyl, (1-4C)haloalkyl and (1-4C)alkoxy, and where $R^{6a}$ and $R^{6b}$ are independently selected from hydrogen and (1-3C)alkyl, and/or two $R^6$ located on adjacent atoms are linked to one another, such that when taken in combination with the atoms to which they are attached, they form a monocyclic aromatic, heteroaromatic, carbocyclic or heterocyclic ring system, wherein any of the said monocyclic aromatic, heteroaromatic, carbocyclic or heterocyclic ring system is optionally substituted with one or more groups independently selected from halo, hydroxy, cyano, nitro, (1-4C)alkyl, (1-4C)haloalkyl and (1-4C) alkoxy;

each p is independently selected from 0, 1, 2 or 3; and each $R^7$ is independently selected from hydrogen or (1-3C)alkyl.

Through detailed investigations, the inventors have surprisingly found that a family of heterobimetallic catalysts represented by Formula I are capable of catalysing the ROCOP of epoxides in the presence of $CO_2$ to prepare polycarbonates, such as PPC. The use of this new family of catalysts in the ROCOP of epoxides represents a significant departure from the use of monometallic catalytic complexes in combination with co-catalysts, either in binary systems or as a tether on the ligand framework. The family of heterobimetallic catalysts described herein comprise half-crown complexes of main group metals, transition metals and lanthanides. The metal localised in a crown-ether binding site is shown to engender both excellent activity and selectivity in the ROCOP of epoxides. Dispensing with the need for a separate (or tethered) co-catalyst allows for greater control over the polymer molar mass, and allows polycarbonates exhibiting monomodal molar mass distribution and controllable end-groups to be facilely prepared. The kinetic studies described herein show the copolymerisation rate law to be second order, with first order dependency on both the epoxide monomer and catalyst concentrations and a zeroth order dependence of $CO_2$ pressure, allowing for low pressures of carbon dioxide to be deployed (e.g. as low as 1 bar $CO_2$). Having a thorough understanding of the rate law underpinning the polymerisation process of the present invention will facilitate future industrial optimisation and scale up.

In an embodiment, $M^1$ is selected from Co, Fe, Cr, Ni, Al, Ti and Zn. More suitably, $M^1$ is selected from Co, Fe, Cr, Ni, Al and Zn. Even more suitably, $M^1$ is selected from Co, Ni and Zn. Most suitably, $M^1$ is Co.

In an embodiment, $M^1$ is selected from Co, Fe, Cr, Ni, Al, Ti, Zn and Mg. More suitably, $M^1$ is selected from Co, Fe, Cr, Ni, Al, Zn and Mg. Even more suitably, $M^1$ is selected from Co, Ni, Zn and Mg. Most suitably, $M^1$ is Co.

In an embodiment, $M^2$ is selected from Li, Na, K, Rb, Cs, Mg, Ca, Sr, Ba, Y, Ln, Al, Ga and Sn. More suitably, $M^2$ is selected from Na, K, Rb and Cs. Even more suitably, $M^2$ is K or Na. Most suitably, $M^2$ is K.

In an embodiment, $M_1$ is selected from Co, Fe, Cr, Ni, Al, Ti, Zn and Mg; and $M_2$ is selected from Li, Na, K, Rb, Cs, Mg, Ca, Sr, Ba, Y, Ln, Al, Ga and Sn.

In an embodiment, $M^1$ is selected from Co, Fe, Cr, Ni, Al, Ti and Zn; and $M^2$ is selected from Li, Na, K, Rb, Cs, Mg, Ca, Sr, Ba, Y, Ln, Al, Ga and Sn.

In an embodiment, $M^1$ is selected from Co, Fe, Cr, Ni and Zn; and $M^2$ is selected from Na, K, Rb and Cs.

In an embodiment, $M^1$ is selected from Co, Ni and Zn; and $M^2$ is selected from Na, K, Rb and Cs.

In an embodiment, $M^1$ is Co and $M^2$ is selected from Na, K, Rb and Cs.

In a particularly suitable embodiment, $M^1$ and $M^2$ are respectively Zn and Na, Ni and Na, Mg and Na, Co and Na, Co and Rb, Co and Cs, Zn and Mg, Co and K, Fe and Na, Fe and K, Cr and Na, Cr and K, Al and K, Co and Ca, Co and Sr, or Co and Ba.

In a particularly suitable embodiment, $M^1$ and $M^2$ are respectively Zn and Na, Ni and Na, Mg and Na, Co and Na, Co and Rb, Co and Cs, Zn and Mg, Co and K, Fe and Na, Fe and K, Cr and Na, or Cr and K.

In an embodiment, $R^1$ is (2-5C)alkylene, wherein 0, 1 or 2 carbon atoms within the said (2-5C)alkylene is replaced by a heteroatom selected from O and N, and wherein any carbon, O or N atom within the said (2-5C)alkylene may be independently optionally substituted with one or more $R^x$.

In an embodiment, each $R^x$ is independently selected from halo, hydroxy, cyano, nitro, (1-10C)alkyl, (2-10C)alkenyl, (2-10C)alkynyl, (1-10C)haloalkyl, (1-10C)alkoxy, aryl, heteroaryl and —$NR^{xa}R^{xb}$, where any aryl or heteroaryl in $R^x$ is optionally substituted with one or more groups independently selected from halo, hydroxy, cyano, nitro, (1-10C) alkyl, (1-10C)haloalkyl and (1-10C)alkoxy, and where $R^{xa}$ and $R^{xb}$ are independently selected from hydrogen and (1-3C)alkyl, and/or two or more $R^x$ located on adjacent atoms are linked to one another, such that when taken in combination with the atoms to which they are attached, they form a monocyclic or bicyclic aromatic, heteroaromatic, carbocyclic or heterocyclic ring system, wherein any of the said monocyclic or bicyclic aromatic, heteroaromatic, carbocyclic or heterocyclic ring system is optionally substituted with one or more groups independently selected from halo, hydroxy, cyano, nitro, (1-10C)alkyl, (1-10C)haloalkyl and (1-10C)alkoxy.

More suitably, each $R^x$ is independently selected from halo, hydroxy, cyano, nitro, (1-4C)alkyl, (1-4C)haloalkyl, (1-4C)alkoxy, phenyl, 5-6 membered heteroaryl and —$NR^{xa}R^{xb}$, where any phenyl or 5-6 membered heteroaryl in $R^x$ is optionally substituted with one or more groups independently selected from halo, hydroxy, cyano, nitro, (1-4C)alkyl, (1-4C)haloalkyl and (1-4C)alkoxy, and where $R^{xa}$ and $R^{xb}$ are independently selected from hydrogen and (1-3C)alkyl, and/or two or more $R^x$ located on adjacent atoms are linked to one another, such that when taken in combination with the atoms to which they are attached, they form a 5-7 membered monocyclic or 8-10 membered bicyclic aromatic, heteroaromatic, carbocyclic or heterocyclic ring system, wherein any of the said 5-7 membered monocyclic or 8-10 membered bicyclic aromatic, heteroaromatic, carbocyclic or heterocyclic ring system is optionally substituted with one or more groups independently selected from halo, hydroxy, cyano, nitro, (1-4C)alkyl, (1-4C)haloalkyl and (1-4C)alkoxy.

More suitably, each $R^x$ is independently selected from halo, hydroxy, (1-4C)alkyl, (1-4C)haloalkyl, (1-4C)alkoxy, phenyl, 5-6 membered heteroaryl and —$NR^{xa}R^{xb}$, where any phenyl or 5-6 membered heteroaryl in $R^x$ is optionally substituted with one or more groups independently selected from halo, hydroxy, (1-2C)alkyl, (1-2C)haloalkyl and (1-2C)alkoxy, and where $R^{xa}$ and $R^{xb}$ are independently selected from hydrogen and (1-3C)alkyl, and/or two or more $R^x$ located on adjacent atoms are linked to one another, such that when taken in combination with the atoms to which they are attached, they form a benzene, cyclohexane or naphthalene group, wherein either of the said benzene, cyclohexane or naphthalene groups is optionally substituted with one or more groups independently selected from halo, hydroxy, (1-2C)alkyl, (1-2C)haloalkyl and (1-2C)alkoxy.

In an embodiment $R^1$ has a structure according to Formula A shown below:

Formula A

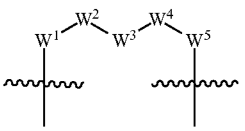

wherein $W^1$, $W^2$, $W^3$, $W^4$ and $W^5$ are each independently selected from absent, —$CH_2$—, —NH— and —O—, with the provisos that:

i) no more than 3 of $W^1$, $W^2$, $W^3$, $W^4$ and $W^5$ are absent, ii) at least 2 of $W^1$, $W^2$, $W^3$, $W^4$ and $W^5$ are —$CH_2$—, and iii) —NH— is not adjacent —O—;

and any —$CH_2$— is optionally substituted with one or two $R^x$, and any —NH— is optionally substituted with one $R^x$.

Suitably, at least 3 of $W^1$, $W^2$, $W^3$, $W^4$ and $W^5$ are —$CH_2$—.

Suitably, $W^1$, $W^2$, $W^3$, $W^4$ and $W^5$ are each independently selected from absent and —$CH_2$—, where any —$CH_2$— is optionally substituted with one or two $R^x$.

In an embodiment, $R^1$ has a structure according to any one of the following:

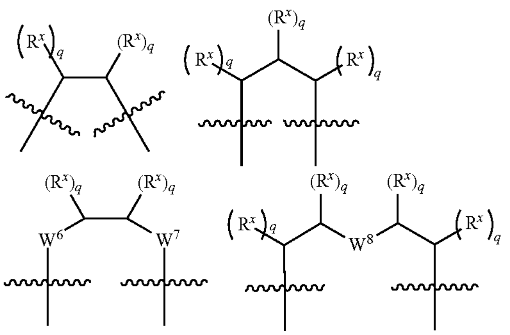

wherein both of $W^6$ and $W^7$ are —O— or both of $W^6$ and $W^7$ are —$CH_2$—, where each —$CH_2$— may be independently substituted with one or two $R^x$;

$W^6$ is —O— or —NH—, where —NH— may be substituted with $R^x$; and each q is 0, 1 or 2.

Suitably, when $W^6$ and $W^7$ are —$CH_2$—, each —$CH_2$— may be independently substituted with one $R^x$.

Suitably, each q is 0 or 1.

In an embodiment, $R^1$ has a structure according to any one of the following:

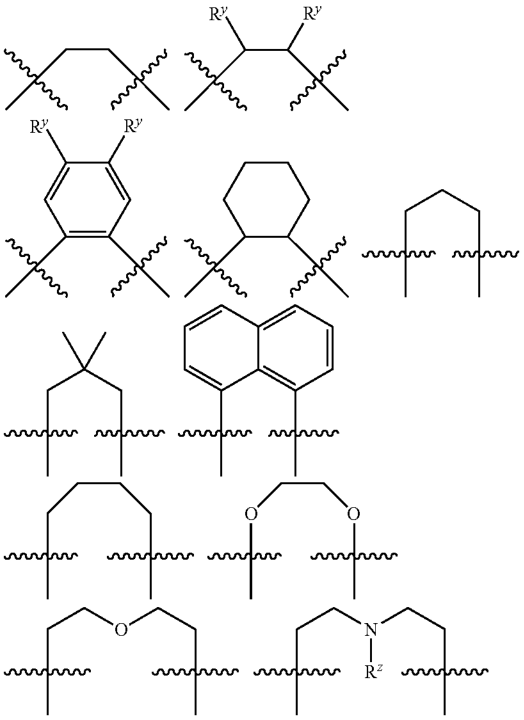

wherein each $R^y$ is independently selected from hydrogen, halo, cyano, (1-4C)alkyl, (1-4C)alkoxy, (1-4C)haloalkyl, phenyl, —$NH_2$ and $NMe_2$; and $R^Z$ is selected from hydrogen and (1-2C)alkyl.

Suitably, each $R^y$ is independently selected from hydrogen, halo, cyano, (1-2C)alkyl, (1-2C)alkoxy, (1-2C)haloalkyl, phenyl, —$NH_2$ and $NMe_2$, and $R^Z$ is selected from hydrogen and methyl.

In an embodiment, $M^1$ is selected from Co, Fe, Cr, Ni, Al, Ti and Zn;

$M^2$ is selected from Li, Na, K, Rb, Cs, Mg, Ca, Sr, Ba, Y, Ln, Al, Ga and Sn; and $R^1$ has a structure according to any one of the following:

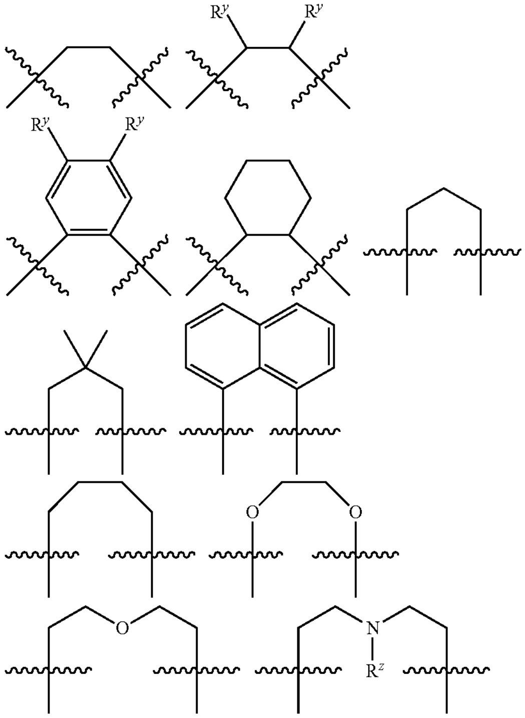

wherein each $R^y$ is independently selected from hydrogen, halo, cyano, (1-2C)alkyl, (1-2C)alkoxy, (1-2C)haloalkyl, phenyl, —$NH_2$ and $NMe_2$, and $R^Z$ is selected from hydrogen and methyl.

In a particularly suitable embodiment, $R^1$ has a structure according to any one of the following:

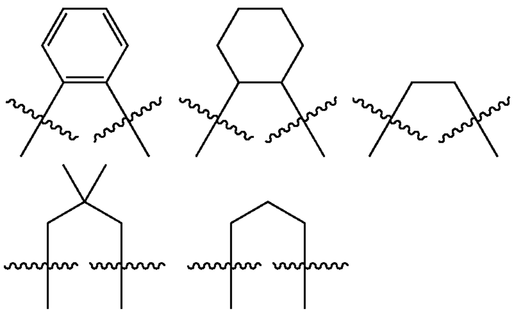

In a particularly suitable embodiment, $R^1$ has a structure according to any one of the following:

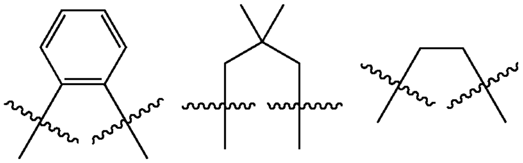

The bond between $X^1$ and N may be a single bond or a double bond. It will be understood that when $R^2$ is absent, the bond between $X^1$ and N is necessarily a double bond, and that when $R^2$ is other than absent, the bond between $X^1$ and N is necessarily a single bond.

In an embodiment, each $R^2$ is independently selected from absent, hydrogen, (1-4C)alkyl, (2-4C)alkenyl, (2-4C)alkynyl, phenyl, phenyl(1-2C)alkyl, 5-6 membered heteroaryl, 5-6 membered heteroaryl(1-2C)alkyl and —C(O)—$NR^{2a}R^{2b}$, where any phenyl, phenyl(1-2C)alkyl, 5-6 membered heteroaryl, 5-6 membered heteroaryl(1-2C)alkyl in $R^2$ is optionally substituted with one or more groups independently selected from halo, hydroxy, cyano, nitro, (1-4C)alkyl, (1-4C)haloalkyl and (1-4C)alkoxy, and where $R^{2a}$ and $R^{2b}$ are independently selected from hydrogen and (1-3C)alkyl.

Suitably, each $R^2$ is independently selected from absent, hydrogen, (1-3C)alkyl, (2-3C)alkenyl, (2-3C)alkynyl, phenyl, benzyl and —C(O)—$NR^{2a}R^{2b}$, where any phenyl or benzyl in $R^2$ is optionally substituted with one or more groups independently selected from halo, hydroxy, cyano, nitro, (1-4C)alkyl, (1-4C)haloalkyl and (1-4C)alkoxy, and where $R^{2a}$ and $R^{2b}$ are independently selected from hydrogen and (1-3C)alkyl.

More suitably, each $R^2$ is independently selected from absent, hydrogen, (1-3C)alkyl, phenyl, benzyl and —C(O)—$NR^{2a}R^{2b}$, where any phenyl or benzyl in $R^2$ is optionally substituted with one or more groups independently selected from halo, hydroxy, cyano, nitro, (1-4C)alkyl, (1-4C)haloalkyl and (1-4C)alkoxy, and where $R^{2a}$ and $R^{2b}$ are independently selected from hydrogen and (1-2C)alkyl.

Even more suitably each $R^2$ is independently selected from absent, hydrogen, (1-3C)alkyl, phenyl, benzyl and —C(O)—$NR^{2a}R^{2b}$, where any phenyl or benzyl in $R^2$ is optionally substituted with one or more groups independently selected from halo, hydroxy, (1-2C)alkyl, (1-2C)haloalkyl and (1-2C)alkoxy, and where $R^{2a}$ and $R^{2b}$ are independently selected from hydrogen and (1-2C)alkyl.

Yet even more suitably, each $R^2$ is independently selected from absent, hydrogen and (1-2C)alkyl.

Most suitably, each $R^2$ is independently selected from absent or hydrogen.

Suitably, both $R^2$ are the same.

It will be understood that when $X^1$ is —CH— or —$CR^4$—, the bond between $X^1$ and N is necessarily a double bond, and that when $X^1$ is —$CH_2$—, —$CHR^4$—, —$CR^4R^4$— or —$PR^4R^4$—, the bond between $X^1$ and N is necessarily a single bond.

In an embodiment, each $X^1$ is independently selected from —CH—, —$CR^4$—, —$CH_2$—, —$CHR^4$—, —$CR^4R^4$— and —$PR^4R^4$—, where each $R^4$ is independently selected from (1-4C)alkyl, phenyl and phenyl(1-2C)alkyl, where any phenyl and phenyl(1-2C)alkyl in $R^4$ is optionally substituted with one or more groups independently selected from halo, hydroxy, cyano, nitro, (1-4C) alkyl, (1-4C)haloalkyl and (1-4C)alkoxy.

Suitably, each $X^1$ is independently selected from —CH—, —$CR^4$—, —$CH_2$—, —$CHR^4$—, —$CR^4R^4$— and —$PR^4R^4$—, where each $R^4$ is independently selected from (1-2C)alkyl and phenyl, where any phenyl in $R^4$ is optionally substituted with one or more groups independently selected from halo, hydroxy, cyano, nitro, (1-2C)alkyl, (1-2C)haloalkyl and (1-2C)alkoxy.

More suitably, each $X^1$ is independently selected from —CH—, —$CR^4$—, —$CH_2$—, —$CHR^4$— and —$CR^4R^4$, where each $R^4$ is independently selected from (1-2C)alkyl and phenyl, where any phenyl in $R^4$ is optionally substituted with one or more groups independently selected from halo, hydroxy, (1-2C)alkyl, (1-2C)haloalkyl and (1-2C)alkoxy.

Even more suitably, each $X^1$ is independently selected from —CH—, —$CR^4$—, —$CH_2$—, —$CHR^4$— and —$CR^4R^4$, where each $R^4$ is independently (1-2C)alkyl.

Most suitably, each $X^1$ is independently selected from —CH— or —$CH_2$—.

Suitably, both $X^1$ are the same.

In an embodiment, each $R^2$ is independently selected from absent, hydrogen, (1-3C)alkyl, phenyl, benzyl and —C(O)—$NR^{2a}R^{2b}$, where any phenyl or benzyl in $R^2$ is optionally substituted with one or more groups independently selected from halo, hydroxy, (1-2C)alkyl, (1-2C) haloalkyl and (1-2C)alkoxy, and where $R^{2a}$ and $R^{2b}$ are independently selected from hydrogen and (1-2C)alkyl; and each $X^1$ is independently selected from —CH—, —$CR^4$—, —$CH_2$—, —$CHR^4$— and —$CR^4R^4$, where each $R^4$ is independently selected from (1-2C)alkyl and phenyl, where any phenyl in $R^4$ is optionally substituted with one or more groups independently selected from halo, hydroxy, (1-2C) alkyl, (1-2C)haloalkyl and (1-2C)alkoxy.

In an embodiment $E^1$ is C and $E^2$ is O, S or N; or $E^1$ is N and $E^2$ is O. Most suitably, $E^1$ is C and $E^2$ is O.

In an embodiment, each $R^3$ is independently selected from halo, hydroxy, cyano, nitro, (1-4C)alkyl, (2-4C)alkenyl, (2-4C)alkynyl, (1-4C)haloalkyl, (1-4C)alkoxy, aryl, aryl(1-2C)alkyl, heteroaryl, heteroaryl(1-2C)alkyl, —C(O)—$R^{3a}$, —C(O)—$OR^{3a}$, —O—C(O)—$R^{3a}$, —C(O)—$NR^{3a}R^{3b}$, —$N(R^{3a})$C(O)—$R^{3b}$ and —$NR^{3a}R^{3b}$, where any aryl, aryl (1-2C)alkyl, heteroaryl and heteroaryl(1-2C)alkyl in $R^3$ is optionally substituted with one or more groups independently selected from halo, hydroxy, cyano, nitro, (1-4C) alkyl, (1-4C)haloalkyl and (1-4C)alkoxy, and where $R^{3a}$ and $R^{3b}$ are independently selected from hydrogen and (1-3C) alkyl.

Suitably, each $R^3$ is independently selected from halo, hydroxy, cyano, nitro, (1-4C)alkyl, (2-4C)alkenyl, (2-4C) alkynyl, (1-4C)haloalkyl, (1-4C)alkoxy, aryl, aryl(1-2C)alkyl, 5-6 membered heteroaryl, 5-6 membered heteroaryl(1-2C)alkyl and —$NR^{3a}R^{3b}$, where any aryl, aryl(1-2C)alkyl, 5-6 membered heteroaryl, 5-6 membered heteroaryl(1-2C) alkyl in $R^3$ is optionally substituted with one or more groups independently selected from halo, hydroxy, cyano, nitro, (1-4C)alkyl, (1-4C)haloalkyl and (1-4C)alkoxy, and where $R^{3a}$ and $R^{3b}$ are independently selected from hydrogen and (1-3C)alkyl.

More suitably, each $R^3$ is independently selected from halo, hydroxy, cyano, nitro, (1-4C)alkyl, (1-4C)haloalkyl, (1-4C)alkoxy, phenyl, 5-6 membered heteroaryl and —$NR^{3a}R^{3b}$, where any phenyl and 5-6 membered heteroaryl in $R^3$ is optionally substituted with one or more groups independently selected from halo, hydroxy, cyano, nitro, (1-4C)alkyl, (1-4C)haloalkyl and (1-4C)alkoxy, and where $R^{3a}$ and $R^{3b}$ are independently selected from hydrogen and (1-3C)alkyl.

Yet more suitably, each $R^3$ is independently selected from halo, hydroxy, cyano, nitro, (1-2C)alkyl, (1-2C)haloalkyl, (1-2C)alkoxy, phenyl and —$NR^{3a}R^{3b}$, where any phenyl in $R^3$ is optionally substituted with one or more groups independently selected from halo, hydroxy, (1-2C)alkyl, (1-2C) haloalkyl and (1-2C)alkoxy, and where $R^{3a}$ and $R^{3b}$ are independently selected from hydrogen and (1-3C)alkyl.

Most suitably, each $R^3$ is independently selected from halo, hydroxy, (1-2C)alkyl, (1-2C)haloalkyl, (1-2C)alkoxy and —$NR^{3a}R^{3b}$, where $R^{3a}$ and $R^{3b}$ are independently selected from hydrogen and (1-3C)alkyl.

Suitably, all $R^3$ are the same.

In an embodiment, each n is independently selected from 0, 1, 2 and 3. Suitably, each n is independently selected from 0, 1 and 2. More suitably, each n is independently selected from 0 and 1. When n is 1, $R^3$ is suitably meta to the $X^1$. Most suitably, each n is 0.

In an embodiment, each $R^3$ is independently selected from halo, hydroxy, (1-2C)alkyl, (1-2C)haloalkyl, (1-2C)alkoxy and —$NR^{3a}R^{3b}$, where $R^{3a}$ and $R^{3b}$ are independently selected from hydrogen and (1-3C)alkyl;

each n is independently selected from 0 and 1; and when n is 1, $R^3$ is suitably meta to the $X^1$.

It will be understood that the presence, absence and nature of $L^1$, $L^2$, $G^1$ and $G^2$ will depend on the nature of $M^1$ and $M^2$ (e.g. in terms of their size and electronic configuration).

Although $L^1$ and $L^2$ are, for reasons of simplicity, shown in Formula I being each associated with only one of $M^1$ and $M^2$, the skilled person will appreciate that $L^1$ (and/or $L^2$) may be associated with both of $M^1$ and $M^2$, thereby forming a bridge between them. Alternatively, $L^1$ and $L^2$ may both be solely associated with a single metal (e.g. $M^1$, such as Co). It will be further appreciated that $L^1$ (and/or $L^2$), when present, may be associated with metals of two different compounds of Formula I, thus forming a bridge between the two compounds of Formula I.

Accordingly, multiple compounds of Formula I can be linked together in this manner via their respective $L^1$ (and/or $L^2$). The same logic applies to $G^1$ and $G^2$, when present.

In an embodiment, $L^1$ and $L^2$ are independently selected from absent, halo, nitrate, hydroxy, (1-15C)alkyl, (2-15C) alkenyl, (2-15C)alkynyl, (1-15C)heteroaliphatic, carbocyclyl, heterocyclyl, aryl, heteroaryl, —O—C(O)—$R^a$, —O—C(O)O—$R^a$, —$OP(O)(R^a)_2$, —$P(O)(OR^a)_2$, —$OR^a$, —O—$S(O)_2$—$R^a$ (e.g. triflate), —O—S(O)—$(R^a)_2$, —O—S(O)—$R^a$, —S(O)—$R^a$, —S—C(O)—$R^a$, —S—C(S)—O—$R^a$, —N(H)$S(O)_2$—$R^a$ (e.g. triflamide), —N—$(S(O)_2$—$R^a)_2$ (e.g. triflimide), —S—$R^a$, —$N(R^a)$—C(O)—$R^a$, —C(O)—$N(R^a)_2$, —$N(R^a)_2$ and —O—$Si(R^a)_x(OR^a)_y$ (where x and y are independently 0, 1, 2 or 3, with the proviso that x+y=3), in which any of the said (1-15C)alkyl, (2-15C)alkenyl, (2-15C)alkynyl, (1-15C)heteroaliphatic, carbocyclyl, heterocyclyl, aryl and heteroaryl within $L^1$ or $L^2$ is optionally substituted with one or more $R^b$.

Suitably, $L^1$ and $L^2$ are independently selected from absent, halo, nitrate, hydroxy, (1-10C)alkyl, (2-10C)alkenyl, (2-10C)alkynyl, (1-10C)heteroaliphatic, phenyl, 5-6 membered heteroaryl, —O—C(O)—$R^a$, —O—C(O)O—$R^a$, —$OP(O)(R^a)_2$, —$P(O)(OR^a)_2$, —$OR^a$, —O—$S(O)_2$—$R^a$ (e.g. triflate), —O—S(O)—$(R^a)_2$, —O—S(O)—$R^a$, —S(O)—$R^a$, —S—C(O)—$R^a$, —S—C(S)—O—$R^a$, —N(H)$S(O)_2$—$R^a$ (e.g. triflamide), —N—$(S(O)_2$—$R^a)_2$ (e.g. triflimide), —S—$R^a$, —$N(R^a)$—C(O)—$R^a$, —C(O)—$N(R^a)_2$, —$N(R^a)_2$ and —O—$Si(R^a)_x(OR^a)_y$ (where x and y are independently 0, 1, 2 or 3, with the proviso that x+y=3), in which any of the said (1-10C)alkyl, (2-10C)alkenyl, (2-10C)alkynyl, (1-10C)heteroaliphatic, phenyl and 5-6 membered heteroaryl within $L^1$ or $L^2$ is optionally substituted with one or more $R^b$.

In an embodiment, each $R^a$ is independently selected from hydrogen, (1-20C)alkyl, (2-20C)alkenyl, (2-20C)alkynyl, (1-20C)heteroaliphatic, carbocyclyl, heterocyclyl, aryl and heteroaryl, where any (1-20C)alkyl, (2-20C)alkenyl, (2-20C)alkynyl, (1-20C)heteroaliphatic, carbocyclyl, heterocyclyl, aryl or heteroaryl present in $R^a$ is independently substituted with one or more groups independently selected from halo, cyano, nitro, amino, hydroxy, (1-4C)alkyl, (2-4C) alkenyl, (2-4C)alkynyl and (1-4C)alkoxy.

Suitably, each $R^a$ is independently selected from hydrogen, (1-6C)alkyl, (2-6C)alkenyl, (2-6C)alkynyl, (1-6C)heteroaliphatic, phenyl and 5-6 membered heteroaryl, where any (1-6C)alkyl, (2-6C)alkenyl, (2-6C)alkynyl, (1-6C)heteroaliphatic, phenyl or 5-6 membered heteroaryl present in $R^a$ is independently substituted with one or more groups independently selected from halo, amino, hydroxy, (1-2C) alkyl and (1-4C)alkoxy.

In an embodiment, each $R^b$ is independently substituted with one or more groups independently selected from halo, amino, hydroxy, (1-4C)alkyl, (1-4C)haloalkyl and (1-4C) alkoxy.

Particular, non-limiting examples of $L^1$ and $L^2$ include acetate, stearate, oleate, triflate (i.e. $—O—S(O)_2—CF_3$), triflamide (i.e. $—N(H)—S(O)_2—CF_3$), triflimide (i.e. $—N—(S(O)_2—CF_3)_2$ and xanthate (e.g. $—S—C(S)—O—C_2H_5$). In any of these, $L^1$ and $L^2$ may also be independently selected from O-benzoyl (i.e. “OBz”).

In a particularly suitable embodiment, $L^1$ and $L^2$ are independently selected from absent and $—O—C(O)—R^a$, where $R^a$ is (1-20C)alkyl (e.g. acetate, i.e. “OAc”, or stearate) or (2-25C)alkenyl (e.g. oleate). Most suitably, $L^1$ and $L^2$ are independently selected from absent and acetate. In any of these, $L^1$ and $L^2$ may also be independently selected from O-benzoyl (i.e. “OBz”).

In an embodiment, $G^1$ and $G^2$ are each independently selected from absent, a Lewis base, and a solvent (e.g. water or an alcohol).

In a particularly suitable embodiment, $G^1$ and $G^2$ are absent.

It will be appreciated that, aside from $L^1$, $L^2$, $G^1$ and $G^2$, one or more additional ligands may or may not be coordinated to $M^1$ and/or $M^2$ depending on, for example, their size and electronic configuration.

In an embodiment, each $X^2$ is independently absent or (1-2C)alkylene, where said (1-2C)alkylene is optionally substituted with 1 or 2 groups independently selected from (1-2C)alkyl. Suitably, each $X^2$ is independently absent or methylene, where said methylene is optionally substituted with 1 or 2 groups independently selected from (1-2C)alkyl. More suitably, each $X^2$ is independently absent or methylene, where said methylene is optionally substituted with 1 or 2 methyl groups. Most suitably, each $X^2$ is independently absent or methylene.

Suitably, both $X^2$ are the same.

In an embodiment, each $X^3$ is independently absent or (1-2C)alkylene, where said (1-2C)alkylene is optionally substituted with 1 or 2 groups independently selected from (1-2C)alkyl.

Suitably, each $X^3$ is independently absent or methylene, where said methylene is optionally substituted with 1 or 2 groups independently selected from (1-2C)alkyl. More suitably, each $X^3$ is independently absent or methylene, where said methylene is optionally substituted with 1 or 2 methyl groups. Most suitably, each $X^3$ is independently absent or methylene.

Suitably, both $X^3$ are the same.

In an embodiment, each $X^4$ is independently methylene that is optionally substituted with 1 or 2 methyl groups. Most suitably, each $X^4$ is methylene.

Suitably, both $X^4$ are the same.

In an embodiment, each $X^2$ is independently absent or methylene, where said methylene is optionally substituted with 1 or 2 groups independently selected from (1-2C)alkyl; each $X^3$ is independently absent or methylene, where said methylene is optionally substituted with 1 or 2 groups independently selected from (1-2C)alkyl; and each $X^4$ is independently methylene that is optionally substituted with 1 or 2 methyl groups.

In an embodiment, m is 1, 2 or 3. Most suitably, m is 2.

In an embodiment, each $R^5$ is independently selected from hydrogen, halo, hydroxy, cyano, nitro, (1-4C)alkyl, (2-4C) alkenyl, (2-4C)alkynyl, (1-4C)haloalkyl, (1-4C)alkoxy, phenyl, phenyl(1-2C)alkyl, 5-6 membered heteroaryl, 5-6 membered heteroaryl(1-2C)alkyl and $—NR^{5a}R^{5b}$ where any phenyl, phenyl(1-2C)alkyl, 5-6 membered heteroaryl, 5-6 membered heteroaryl(1-2C)alkyl in $R^5$ is optionally substituted with one or more groups independently selected from halo, hydroxy, cyano, nitro, (1-4C)alkyl, (1-4C)haloalkyl and (1-4C)alkoxy, and where $R^{5a}$ and $R^{5b}$ are independently selected from hydrogen and (1-3C)alkyl, and/or two $R^5$ located on adjacent atoms are linked to one another, such that when taken in combination with the atoms to which they are attached, they form a benzene, 5-6 membered heteroaromatic, 5-6 membered carbocyclic or 5-6 membered heterocyclic ring, wherein any of the said benzene, 5-6 membered heteroaromatic, 5-6 membered carbocyclic or 5-6 membered heterocyclic rings is optionally substituted with one or more groups independently selected from halo, hydroxy, cyano, nitro, (1-4C)alkyl, (1-4C)haloalkyl and (1-4C)alkoxy.

Suitably, each $R^5$ is independently selected from hydrogen, halo, hydroxy, cyano, nitro, (1-4C)alkyl, (1-4C)haloalkyl, (1-4C)alkoxy, phenyl, phenyl(1-2C)alkyl and $—NR^{5a}R^{5b}$, where any phenyl and phenyl(1-2C)alkyl in $R^5$ is optionally substituted with one or more groups independently selected from halo, hydroxy, (1-2C)alkyl, (1-2C) haloalkyl and (1-2C)alkoxy, and where $R^{5a}$ and $R^{5b}$ are independently selected from hydrogen and (1-2C)alkyl, and/or two $R^5$ located on adjacent atoms are linked to one another, such that when taken in combination with the atoms to which they are attached, they form a benzene, 5-6 membered heteroaromatic, 5-6 membered carbocyclic or 5-6 membered heterocyclic ring, wherein any of the said benzene, 5-6 membered heteroaromatic, 5-6 membered carbocyclic or 5-6 membered heterocyclic rings is optionally substituted with one or more groups independently selected from halo, hydroxy, (1-2C)alkyl, (1-2C)haloalkyl and (1-2C)alkoxy.

More suitably, each $R^5$ is independently selected from hydrogen, halo, hydroxy, (1-3C)alkyl, (1-3C)haloalkyl, (1-3C)alkoxy, phenyl, phenyl(1-2C)alkyl and $—NR^{5a}R^{5b}$, where any phenyl and phenyl(1-2C)alkyl in $R^5$ is optionally substituted with one or more groups independently selected from halo, hydroxy, (1-2C)alkyl, (1-2C)haloalkyl and (1-2C)alkoxy, and where $R^{5a}$ and $R^{5b}$ are independently selected from hydrogen and (1-2C)alkyl, and/or two $R^5$ located on adjacent atoms are linked to one another, such that when taken in combination with the atoms to which they are attached, they form a benzene or 5-6 membered heteroaromatic ring, wherein any of the said benzene and 5-6 membered heteroaromatic rings is optionally substituted with one or more groups independently selected from halo, hydroxy, (1-2C)alkyl, (1-2C)haloalkyl and (1-2C)alkoxy.

Even more suitably, each $R^5$ is independently selected from hydrogen and (1-2C)alkyl, and/or two $R^5$ located on adjacent atoms are linked to one another, such that when taken in combination with the atoms to which they are attached, they form a benzene ring that is optionally substituted with one or more groups independently selected from halo, hydroxy, (1-2C)alkyl, (1-2C)haloalkyl and (1-2C) alkoxy.

More suitably, each $R^5$ is independently selected from hydrogen and (1-2C)alkyl.

In an embodiment, each $R^6$ is independently selected from halo, hydroxy, cyano, nitro, (1-4C)alkyl, (2-4C)alkenyl, (2-4C)alkynyl, (1-4C)haloalkyl, (1-4C)alkoxy, aryl, aryl(1-2C)alkyl, heteroaryl, heteroaryl(1-2C)alkyl, —C(O)—$R^{6a}$, —C(O)—$OR^{6a}$, —O—C(O)—$R^{6a}$, —C(O)—$NR^{5a}R^{5b}$, —$N(R^{6a})$C(O)—$R^{6b}$ and —$NR^{6a}R^{6b}$, where any aryl, aryl (1-2C)alkyl, heteroaryl and heteroaryl(1-2C)alkyl in $R^6$ is optionally substituted with one or more groups independently selected from halo, hydroxy, cyano, nitro, (1-4C) alkyl, (1-4C)haloalkyl and (1-4C)alkoxy, and where $R^{6a}$ and $R^{6b}$ are independently selected from hydrogen and (1-3C) alkyl.

Suitably, each $R^6$ is independently selected from halo, hydroxy, cyano, nitro, (1-2C)alkyl, (1-2C)haloalkyl, (1-2C) alkoxy, phenyl and —$NR^{6a}R^{6b}$, where any phenyl in $R^6$ is optionally substituted with one or more groups independently selected from halo, hydroxy, (1-2C)alkyl, (1-2C) haloalkyl and (1-2C)alkoxy, and where $R^{6a}$ and $R^{6b}$ are independently selected from hydrogen and (1-3C)alkyl.

More suitably, each $R^6$ is independently selected from halo, cyano, (1-2C)alkyl, (1-2C)haloalkyl, (1-2C)alkoxy and —$NR^{6a}R^{6b}$, where $R^{6a}$ and $R^{6b}$ are independently selected from hydrogen and (1-2C)alkyl.

Even more suitably each $R^6$ is independently selected from halo, (1-2C)alkyl, (1-2C)haloalkyl, (1-2C)alkoxy and —$NR^{6a}R^{6b}$, where $R^{6a}$ and $R^{6b}$ are independently selected from hydrogen and methyl.

Most suitably, each $R^6$ is independently selected from halo, methyl and methoxy.

In an embodiment, each p is independently selected from 0, 1 or 2. Most suitably, each p is independently selected from 0 and 1. Suitably, when p is 1, $R^6$ is para to —$OR^7$.

In an embodiment, each $R^7$ is independently selected from hydrogen or (1-2C)alkyl. Suitably, each $R^7$ is independently selected from hydrogen or methyl. Yet more suitably, each $R^7$ is methyl.

In an embodiment, each $R^5$ is independently selected from hydrogen, halo, hydroxy, (1-3C)alkyl, (1-3C)haloalkyl, (1-3C)alkoxy, phenyl, phenyl(1-2C)alkyl and —$NR^{5a}R^{5b}$, where any phenyl and phenyl(1-2C)alkyl in $R^5$ is optionally substituted with one or more groups independently selected from halo, hydroxy, (1-2C)alkyl, (1-2C)haloalkyl and (1-2C)alkoxy, and where $R^{5a}$ and $R^{5b}$ are independently selected from hydrogen and (1-2C)alkyl, and/or two $R^5$ located on adjacent atoms are linked to one another, such that when taken in combination with the atoms to which they are attached, they form a benzene or 5-6 membered heteroaromatic ring, wherein any of the said benzene and 5-6 membered heteroaromatic rings is optionally substituted with one or more groups independently selected from halo, hydroxy, (1-2C)alkyl, (1-2C)haloalkyl and (1-2C)alkoxy;

each $R^6$ is independently selected from halo, cyano, (1-2C)alkyl, (1-2C)haloalkyl, (1-2C)alkoxy and —$NR^{6a}R^{6b}$, where $R^{6a}$ and $R^{6b}$ are independently selected from hydrogen and (1-2C)alkyl;

each p is independently selected from 0 and 1; and each $R^7$ is independently selected from hydrogen or methyl.

It will be appreciated that Formula I is schematic in its representation of how Q is associated with $M^2$. Depending on the nature of $M^2$ (in terms of its size and electronic configuration), Q may be associated with $M^2$ via 3 or more oxygen atoms within Q, as outlined in the accompanying examples.

In a particularly suitable embodiment, Q is Q-I.

In a particularly suitable embodiment, Q has a structure according to any of the following:

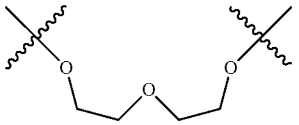

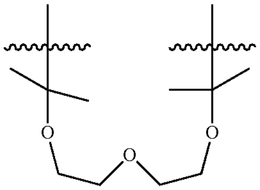

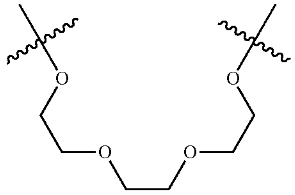

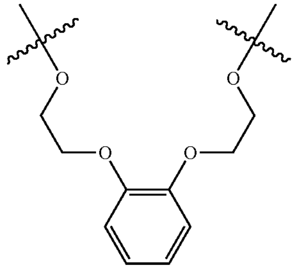

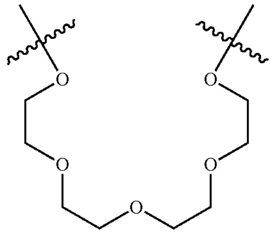

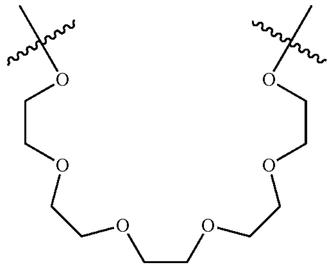

-continued

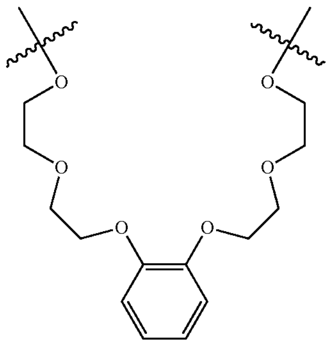

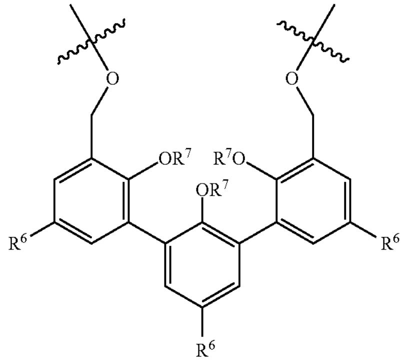

where each $R^6$ and $R^7$ independently has any of the definitions appearing hereinbefore. Suitably, each $R^6$ is independently halo, methyl and methoxy and each $R^7$ is independently hydrogen or methyl.

In a more suitable embodiment, Q has a structure according to the following:

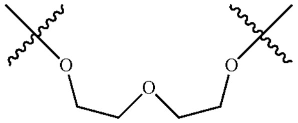

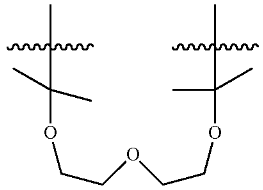

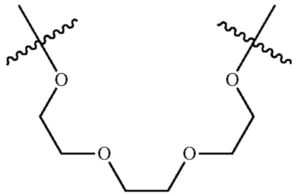

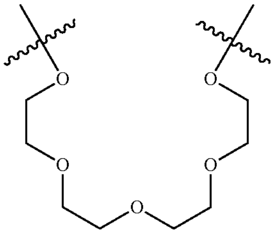

-continued

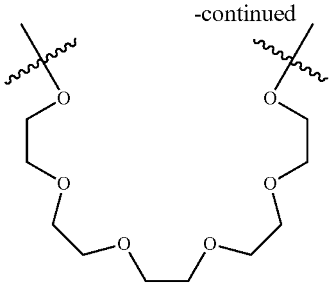

In an even more suitable embodiment, Q has a structure according to the following:

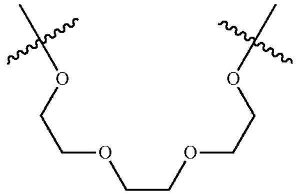 [SMILES: *OCCOCCOCCO*]

In a particular embodiment, the compound of Formula I has a structure according to Formula I-1 (which is a sub-definition of Formula I), shown below:

Formula I-I

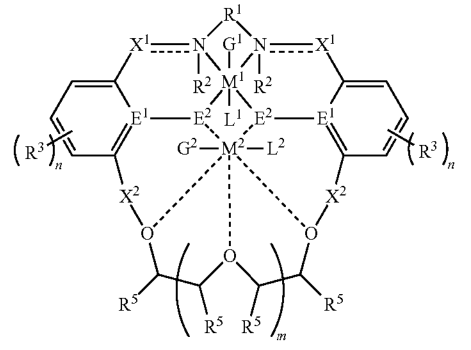

wherein $M^1$, $M^2$, $R^1$, $R^2$, $R^3$, $R^5$, $X^1$, $X^2$, $E^1$, $E^2$, $L^1$, $L^2$, $G^1$, $G^2$, m, n and any sub-groups associated therewith have any of the definitions outlined hereinbefore and/or appearing in the following embodiments:

In an embodiment, $M_1$ is selected from Co, Fe, Cr, Ni, Al, Ti, Zn and Mg; and $M_2$ is selected from Li, Na, K, Rb, Cs, Mg, Ca, Sr, Ba, Y, Ln, Al, Ga and Sn.

In an embodiment, $M^1$ is selected from Co, Fe, Cr, Ni, Al, Ti and Zn; and $M^2$ is selected from Li, Na, K, Rb, Cs, Mg, Ca, Sr, Ba, Y, Ln, Al, Ga and Sn.

In an embodiment, $M^1$ is selected from Co, Fe, Cr, Ni and Zn; and $M^2$ is selected from Na, K, Rb and Cs.

In an embodiment, $M^1$ is Co and $M^2$ is selected from Na, K, Rb and Cs.

In an embodiment, $M^1$ and $M^2$ are respectively Zn and Na, Ni and Na, Mg and Na, Co and Na, Co and Rb, Co and Cs, Zn and Mg, Co and K, Fe and Na, Fe and K, Cr and Na, Cr and K, Al and K, Co and Ca, Co and Sr, or Co and Ba.

In an embodiment, $M^1$ and $M^2$ are respectively Zn and Na, Ni and Na, Mg and Na, Co and Na, Co and Rb, Co and Cs, Zn and Mg, Co and K, Fe and Na, Fe and K, Cr and Na, or Cr and K.

In an embodiment, $R^1$ is (2-5C)alkylene, wherein 0, 1 or 2 carbon atoms within the said (2-5C)alkylene is replaced with a heteroatom selected from 0 and N, and wherein any carbon, O or N atom within the said (2-5C)alkylene may be independently optionally substituted with one or more $R^x$;

each $R^x$ is independently selected from halo, hydroxy, cyano, nitro, (1-10C)alkyl, (2-10C)alkenyl, (2-10C) alkynyl, (1-10C)haloalkyl, (1-10C)alkoxy, aryl, heteroaryl and —$NR^{xa}R^{xb}$, where any aryl or heteroaryl in $R^x$ is optionally substituted with one or more groups independently selected from halo, hydroxy, cyano, nitro, (1-10C)alkyl, (1-10C)haloalkyl and (1-10C) alkoxy, and where $R^{xa}$ and $R^{xb}$ are independently selected from hydrogen and (1-3C)alkyl, and/or two or more $R^x$ located on adjacent atoms are linked to one another, such that when taken in combination with the atoms to which they are attached, they form a monocyclic or bicyclic aromatic, heteroaromatic, carbocyclic or heterocyclic ring system, wherein any of the said monocyclic or bicyclic aromatic, heteroaromatic, carbocyclic or heterocyclic ring system is optionally substituted with one or more groups independently selected from halo, hydroxy, cyano, nitro, (1-10C)alkyl, (1-10C)haloalkyl and (1-10C)alkoxy.

In an embodiment, $R^1$ is (2-5C)alkylene, wherein 0, 1 or 2 carbon atoms within the said (2-5C)alkylene is replaced with a heteroatom selected from O and N, and wherein any carbon, O or N atom within the said (2-5C)alkylene may be independently optionally substituted with one or more $R^x$;

each $R^x$ is independently selected from halo, hydroxy, (1-4C)alkyl, (1-4C)haloalkyl, (1-4C)alkoxy, phenyl, 5-6 membered heteroaryl and —$NR^{xa}R^{xb}$, where any phenyl or 5-6 membered heteroaryl in $R^x$ is optionally substituted with one or more groups independently selected from halo, hydroxy, (1-2C)alkyl, (1-2C)haloalkyl and (1-2C)alkoxy, and where $R^{xa}$ and $R^{xb}$ are independently selected from hydrogen and (1-3C)alkyl, and/or two or more $R^x$ located on adjacent atoms are linked to one another, such that when taken in combination with the atoms to which they are attached, they form a benzene, cyclohexane or naphthalene group, wherein either of the said benzene, cyclohexane or naphthalene groups is optionally substituted with one or more groups independently selected from halo, hydroxy, (1-2C)alkyl, (1-2C)haloalkyl and (1-2C) alkoxy.

In an embodiment, $R^1$ has a structure according to any one of the following:

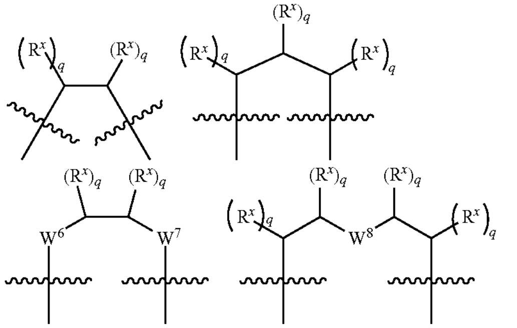

wherein both of $W^6$ and $W^7$ are —O— or both of $W^6$ and $W^7$ are —$CH_2$—, where each —$CH_2$— may be independently substituted with one or two $R^x$;

$W^6$ is —O— or —NH—, where —NH— may be substituted with $R^x$; and each q is 0, 1 or 2;

In an embodiment, $R^1$ has a structure according to any one of the following:

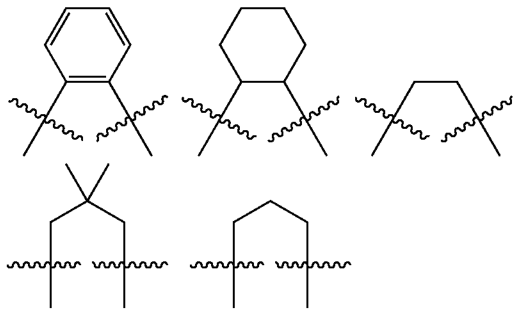

In an embodiment, each $R^2$ is independently selected from absent, hydrogen, (1-3C)alkyl, (2-3C)alkenyl, (2-3C)alkynyl, phenyl, benzyl and —C(O)—$NR^{2a}R^{2b}$, where any phenyl or benzyl in $R^2$ is optionally substituted with one or more groups independently selected from halo, hydroxy, cyano, nitro, (1-4C)alkyl, (1-4C)haloalkyl and (1-4C) alkoxy, and where $R^{2a}$ and $R^{2b}$ are independently selected from hydrogen and (1-3C)alkyl. Suitably, each $R^2$ is independently selected from absent, hydrogen and (1-2C)alkyl.

In an embodiment, $E^1$ is C and $E^2$ is O.

In an embodiment, each $X^1$ is independently selected from —CH—, —$CR^4$—, —$CH_2$—, —$CHR^4$—, —$CR^4R^4$— and —$PR^4R^4$—, where each $R^4$ is independently selected from (1-2C)alkyl and phenyl, where any phenyl in $R^4$ is optionally substituted with one or more groups independently selected from halo, hydroxy, cyano, nitro, (1-2C)alkyl, (1-2C)haloalkyl and (1-2C)alkoxy. Suitably, each $X^1$ is independently selected from —CH—, —$CR^4$—, —$CH_2$—, —$CHR^4$— and —$CR^4R^4$, where each $R^4$ is independently (1-2C)alkyl.

In an embodiment, each $R^3$ is independently selected from halo, hydroxy, cyano, nitro, (1-4C)alkyl, (1-4C)haloalkyl, (1-4C)alkoxy, phenyl, 5-6 membered heteroaryl and —$NR^{3a}R^{3b}$, where any phenyl and 5-6 membered heteroaryl in $R^3$ is optionally substituted with one or more groups independently selected from halo, hydroxy, cyano, nitro, (1-4C)alkyl, (1-4C)haloalkyl and (1-4C)alkoxy, and where $R^{3a}$ and $R^{3b}$ are independently selected from hydrogen and (1-3C)alkyl.

Suitably, each $R^3$ is independently selected from halo, hydroxy, (1-2C)alkyl, (1-2C)haloalkyl, (1-2C)alkoxy and —$NR^{3a}R^{3b}$, where $R^{3a}$ and $R^{3b}$ are independently selected from hydrogen and (1-3C)alkyl. In such an embodiment, each n is independently selected from 0, 1 and 2. Suitably, each n is independently is 0 or 1.

In an embodiment, $L^1$ and $L^2$ are independently selected from absent, halo, nitrate, hydroxy, (1-10C)alkyl, (2-10C) alkenyl, (2-10C)alkynyl, (1-10C)heteroaliphatic, phenyl, 5-6 membered heteroaryl, —O—C(O)—$R^a$, —O—C(O) O—$R^a$, —$OP(O)(R^a)_2$, —$P(O)(OR^a)_2$, —$OR^a$, —O—$S(O)_2$ —$R^a$(e.g. triflate), —O—S(O)—$(R^a)_2$, —O—S(O)—$R^a$, —S(O)—$R^a$, —S—C(O)—$R^a$, —S—C(S)—O—$R^a$, —N(H)$S(O)_2$—$R^a$ (e.g. triflamide), —N—$(S(O)_2$—$R^a)_2$ (e.g. triflimide), —S—$R^a$, —N($R^a$)—C(O)—$R^a$, —C(O)—N($R^a$)$_2$, —N($R^a$)$_2$ and —O—Si($R^a$)$_x$(O$R^a$)$_y$ (where x and y are independently 0, 1, 2 or 3, with the proviso that x+y=3), in which any of the said (1-10C)alkyl, (2-10C)alkenyl, (2-10C)alkynyl, (1-10C)heteroaliphatic, phenyl and 5-6 membered heteroaryl within $L^1$ or $L^2$ is optionally substituted with one or more $R^b$; each $R^a$ is independently selected from hydrogen, (1-20C)alkyl, (2-20C)alkenyl, (2-20C)alkynyl, (1-20C)heteroaliphatic, carbocyclyl, heterocyclyl, aryl and heteroaryl, where any (1-20C)alkyl, (2-20C)alkenyl, (2-20C)alkynyl, (1-20C)heteroaliphatic, carbocyclyl, heterocyclyl, aryl or heteroaryl present in $R^a$ is independently substituted with one or more groups independently selected from halo, cyano, nitro, amino, hydroxy, (1-4C)alkyl, (2-4C)alkenyl, (2-4C)alkynyl and (1-4C)alkoxy;

each $R^b$ is independently substituted with one or more groups independently selected from halo, amino, hydroxy, (1-4C)alkyl, (1-4C)haloalkyl and (1-4C)alkoxy.

In an embodiment, $L^1$ and $L^2$ are independently selected from absent and —O—C(O)—$R^a$, where $R^a$ is (1-20C)alkyl (e.g. acetate, i.e. "OAc", or stearate) or (2-25C)alkenyl (e.g. oleate).

Suitably, $L^1$ and $L^2$ are independently selected from absent and —O—C(O)—$R^a$, where $R^a$ is (1-12C)alkyl. Most suitably, $L^1$ and $L^2$ are independently selected from absent and —O—C(O)—$R^a$, where $R^a$ is (1-6)alkyl. In a particularly suitable embodiment, $L^1$ and $L^2$ are independently selected from absent and acetate. In any of these, $L^1$ and $L^2$ may also be independently selected from O-benzoyl (i.e. "OBz").

In an embodiment, $G^1$ and $G^2$ are absent.

In an embodiment, each $X^2$ is independently absent or methylene, where said methylene is optionally substituted with 1 or 2 groups independently selected from (1-2C)alkyl. Suitably, each $X^2$ is independently absent or methylene.

In an embodiment, m is 2.

In an embodiment, each $R^5$ is independently selected from hydrogen, halo, hydroxy, (1-3C)alkyl, (1-3C)haloalkyl, (1-3C)alkoxy, phenyl, phenyl(1-2C)alkyl and —N$R^{5a}R^{5b}$, where any phenyl and phenyl(1-2C)alkyl in $R^5$ is optionally substituted with one or more groups independently selected from halo, hydroxy, (1-2C)alkyl, (1-2C)haloalkyl and (1-2C)alkoxy, and where $R^{5a}$ and $R^{5b}$ are independently selected from hydrogen and (1-2C)alkyl, and/or two $R^5$ located on adjacent atoms are linked to one another, such that when taken in combination with the atoms to which they are attached, they form a benzene or 5-6 membered heteroaromatic ring, wherein any of the said benzene and 5-6 membered heteroaromatic rings is optionally substituted with one or more groups independently selected from halo, hydroxy, (1-2C)alkyl, (1-2C)haloalkyl and (1-2C)alkoxy. Suitably, each $R^5$ is independently selected from hydrogen and (1-2C)alkyl.

In an embodiment, $M^1$ is selected from Co, Fe, Cr, Ni, Al, Ti and Zn;

$M^2$ is selected from Li, Na, K, Rb, Cs, Mg, Ca, Sr, Ba, Y, Ln, Al, Ga and Sn;

$R^1$ has a structure according to any one of the following:

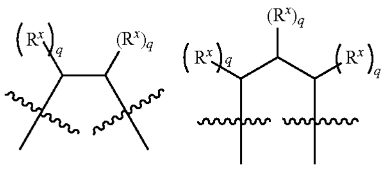

-continued

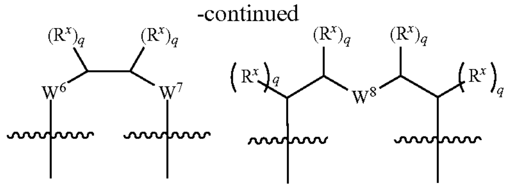

wherein both of $W^6$ and $W^7$ are —O— or both of $W^6$ and $W^7$ are —$CH_2$—, where each —$CH_2$— may be independently substituted with one or two $R^x$;

$W^6$ is —O— or —NH—, where —NH— may be substituted with $R^x$; and each q is 0, 1 or 2; $R^2$ is independently selected from absent, hydrogen and (1-2C)alkyl;

each $R^x$ is independently selected from halo, hydroxy, (1-4C)alkyl, (1-4C)haloalkyl, (1-4C)alkoxy, phenyl, 5-6 membered heteroaryl and —N$R^{xa}R^{xb}$, where any phenyl or 5-6 membered heteroaryl in $R^x$ is optionally substituted with one or more groups independently selected from halo, hydroxy, (1-2C)alkyl, (1-2C)haloalkyl and (1-2C)alkoxy, and where $R^{xa}$ and $R^{xb}$ are independently selected from hydrogen and (1-3C)alkyl, and/or two or more $R^x$ located on adjacent atoms are linked to one another, such that when taken in combination with the atoms to which they are attached, they form a benzene, cyclohexane or naphthalene group, wherein either of the said benzene, cyclohexane or naphthalene groups is optionally substituted with one or more groups independently selected from halo, hydroxy, (1-2C)alkyl, (1-2C)haloalkyl and (1-2C)alkoxy;

each $R^3$ is independently selected from halo, hydroxy, (1-2C)alkyl, (1-2C)haloalkyl, (1-2C)alkoxy and —N$R^{3a}R^{3b}$, where $R^{3a}$ and $R^{3b}$ are independently selected from hydrogen and (1-3C)alkyl;

each n is independently selected from 0, 1 and 2; and m is 2.

In an embodiment, $M^1$ is selected from Co, Ni and Zn; and $M^2$ is selected from Na, K, Rb and Cs;

$R^1$ has a structure according to any one of the following:

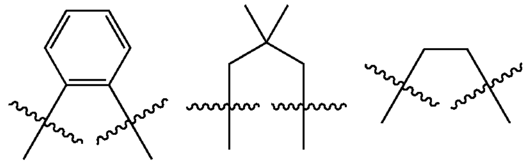

each $R^2$ is independently selected from absent, hydrogen, (1-3C)alkyl, (2-3C)alkenyl, (2-3C)alkynyl, phenyl, benzyl and —C(O)—N$R^{2a}R^{2b}$, where any phenyl or benzyl in $R^2$ is optionally substituted with one or more groups independently selected from halo, hydroxy, cyano, nitro, (1-4C)alkyl, (1-4C)haloalkyl and (1-4C)alkoxy, and where $R^{2a}$ and $R^{2b}$ are independently selected from hydrogen and (1-3C)alkyl;

$E^1$ is C and $E^2$ is O;

each $R^3$ is independently selected from halo, hydroxy, (1-2C)alkyl, (1-2C)haloalkyl, (1-2C)alkoxy and —N$R^{3a}R^{3b}$, where $R^{3a}$ and $R^{3b}$ are independently selected from hydrogen and (1-3C)alkyl;

each n is independently selected from 0, 1 and 2;

each $X^2$ is independently absent or methylene;

each $R^5$ is independently selected from hydrogen, halo, hydroxy, (1-3C)alkyl, (1-3C)haloalkyl, (1-3C)alkoxy, phenyl, phenyl(1-2C)alkyl and —$NR^{5a}R^{5b}$, where any phenyl and phenyl(1-2C)alkyl in $R^5$ is optionally substituted with one or more groups independently selected from halo, hydroxy, (1-2C)alkyl, (1-2C)haloalkyl and (1-2C)alkoxy, and where $R^{5a}$ and $R^{5b}$ are independently selected from hydrogen and (1-2C)alkyl, and/or two $R^5$ located on adjacent atoms are linked to one another, such that when taken in combination with the atoms to which they are attached, they form a benzene or 5-6 membered heteroaromatic ring, wherein any of the said benzene and 5-6 membered heteroaromatic rings is optionally substituted with one or more groups independently selected from halo, hydroxy, (1-2C)alkyl, (1-2C)haloalkyl and (1-2C)alkoxy; and m is 2.

In a particular embodiment, the compound of Formula I has a structure according to Formula I-II (which is a sub-definition of Formula I), shown below:

Formula I-II

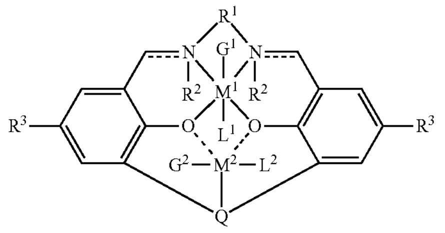

wherein $M^1$, $M^2$, $R^1$, $R^2$, $R^3$, $L^1$, $L^2$, $G^1$, $G^2$, Q and any sub-groups associated therewith have any of the definitions outlined hereinbefore and/or appearing in the following embodiments:

In an embodiment, $M_1$ is selected from Co, Fe, Cr, Ni, Al, Ti, Zn and Mg; and $M_2$ is selected from Li, Na, K, Rb, Cs, Mg, Ca, Sr, Ba, Y, Ln, Al, Ga and Sn.

In an embodiment, $M^1$ is selected from Co, Fe, Cr, Ni, Al, Ti and Zn; and $M^2$ is selected from Li, Na, K, Rb, Cs, Mg, Ca, Sr, Ba, Y, Ln, Al, Ga and Sn.

In an embodiment, $M^1$ is selected from Co, Fe, Cr, Ni and Zn; and $M^2$ is selected from Na, K, Rb and Cs.

In an embodiment, $M^1$ is Co and $M^2$ is selected from Na, K, Rb and Cs.

In an embodiment, $M^1$ and $M^2$ are respectively Zn and Na, Ni and Na, Mg and Na, Co and Na, Co and Rb, Co and Cs, Zn and Mg, Co and K, Fe and Na, Fe and K, Cr and Na, Cr and K, Al and K, Co and Ca, Co and Sr, or Co and Ba.

In an embodiment, $M^1$ and $M^2$ are respectively Zn and Na, Ni and Na, Mg and Na, Co and Na, Co and Rb, Co and Cs, Zn and Mg, Co and K, Fe and Na, Fe and K, Cr and Na, or Cr and K.

In an embodiment, $R^1$ is (2-5C)alkylene, wherein 0, 1 or 2 carbon atoms within the said (2-5C)alkylene is replaced with a heteroatom selected from O and N, and wherein any carbon, O or N atom within the said (2-5C)alkylene may be independently optionally substituted with one or more $R^x$;

each $R^x$ is independently selected from halo, hydroxy, cyano, nitro, (1-10C)alkyl, (2-10C)alkenyl, (2-10C)alkynyl, (1-10C)haloalkyl, (1-10C)alkoxy, aryl, heteroaryl and —$NR^{xa}R^{xb}$, where any aryl or heteroaryl in $R^x$ is optionally substituted with one or more groups independently selected from halo, hydroxy, cyano, nitro, (1-10C)alkyl, (1-10C)haloalkyl and (1-10C)alkoxy, and where $R^{xa}$ and $R^{xb}$ are independently selected from hydrogen and (1-3C)alkyl, and/or two or more $R^x$ located on adjacent atoms are linked to one another, such that when taken in combination with the atoms to which they are attached, they form a monocyclic or bicyclic aromatic, heteroaromatic, carbocyclic or heterocyclic ring system, wherein any of the said monocyclic or bicyclic aromatic, heteroaromatic, carbocyclic or heterocyclic ring system is optionally substituted with one or more groups independently selected from halo, hydroxy, cyano, nitro, (1-10C)alkyl, (1-10C)haloalkyl and (1-10C)alkoxy.

In an embodiment, $R^1$ is (2-5C)alkylene, wherein 0, 1 or 2 carbon atoms within the said (2-5C)alkylene is replaced with a heteroatom selected from O and N, and wherein any carbon, O or N atom within the said (2-5C)alkylene may be independently optionally substituted with one or more $R^x$;

each $R^x$ is independently selected from halo, hydroxy, (1-4C)alkyl, (1-4C)haloalkyl, (1-4C)alkoxy, phenyl, 5-6 membered heteroaryl and —$NR^{xa}R^{xb}$, where any phenyl or 5-6 membered heteroaryl in $R^x$ is optionally substituted with one or more groups independently selected from halo, hydroxy, (1-2C)alkyl, (1-2C)haloalkyl and (1-2C)alkoxy, and where $R^{xa}$ and $R^{xb}$ are independently selected from hydrogen and (1-3C)alkyl, and/or two or more $R^x$ located on adjacent atoms are linked to one another, such that when taken in combination with the atoms to which they are attached, they form a benzene, cyclohexane or naphthalene group, wherein either of the said benzene, cyclohexane or naphthalene groups is optionally substituted with one or more groups independently selected from halo, hydroxy, (1-2C)alkyl, (1-2C)haloalkyl and (1-2C)alkoxy.

In an embodiment, $R^1$ has a structure according to any one of the following:

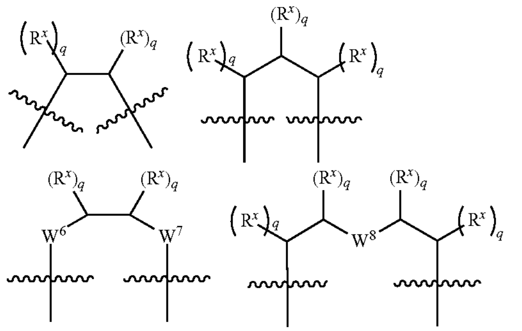

wherein both of $W^6$ and $W^7$ are —O— or both of $W^6$ and $W^7$ are —$CH_2$—, where each —$CH_2$— may be independently substituted with one or two $R^x$;

$W^6$ is —O— or —NH—, where —NH— may be substituted with $R^x$; and each q is 0, 1 or 2;

In an embodiment, $R^1$ has a structure according to any one of the following:

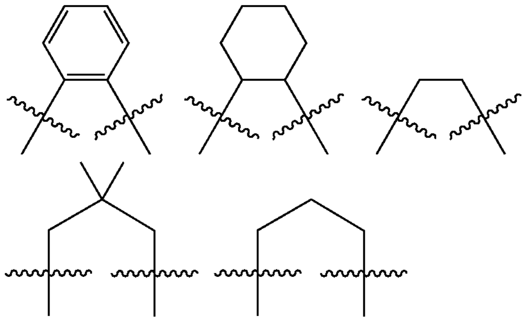

In an embodiment, each $R^2$ is independently selected from absent, hydrogen, (1-3C)alkyl, (2-3C)alkenyl, (2-3C)alkynyl, phenyl, benzyl and —C(O)—$NR^{2a}R^{2b}$, where any phenyl or benzyl in $R^2$ is optionally substituted with one or more groups independently selected from halo, hydroxy, cyano, nitro, (1-4C)alkyl, (1-4C)haloalkyl and (1-4C) alkoxy, and where $R^{2a}$ and $R^{2b}$ are independently selected from hydrogen and (1-3C)alkyl. Suitably, each $R^2$ is independently selected from absent, hydrogen and (1-2C)alkyl.

In an embodiment, each $R^3$ is independently selected from halo, hydroxy, cyano, nitro, (1-4C)alkyl, (1-4C)haloalkyl, (1-4C)alkoxy, phenyl, 5-6 membered heteroaryl and —$NR^{3a}R^{3b}$ where any phenyl and 5-6 membered heteroaryl in $R^3$ is optionally substituted with one or more groups independently selected from halo, hydroxy, cyano, nitro, (1-4C)alkyl, (1-4C)haloalkyl and (1-4C)alkoxy, and where $R^{3a}$ and $R^{3b}$ are independently selected from hydrogen and (1-3C)alkyl.

Suitably, each $R^3$ is independently selected from halo, hydroxy, (1-2C)alkyl, (1-2C)haloalkyl, (1-2C)alkoxy and —$NR^{3a}R^{3b}$, where $R^{3a}$ and $R^{3b}$ are independently selected from hydrogen and (1-3C)alkyl.

In an embodiment, $L^1$ and $L^2$ are independently selected from absent, halo, nitrate, hydroxy, (1-10C)alkyl, (2-10C) alkenyl, (2-10C)alkynyl, (1-10C)heteroaliphatic, phenyl, 5-6 membered heteroaryl, —O—C(O)—$R^a$, —O—C(O) O—$R^a$, —OP(O)$(R^a)_2$, —P(O)$(OR^a)_2$, —$OR^a$, —O—$S(O)_2$ —$R^a$(e.g. triflate), —O—S(O)—$(R^a)_2$, —O—S(O)—$R^a$, —S(O)—$R^a$, —S—C(O)—$R^a$, —S—C(S)—O—$R^a$, —N(H)$S(O)_2$—$R^a$ (e.g. triflamide), —N—$(S(O)_2—R^a)_2$ (e.g. triflimide), —S—$R^a$, —N($R^a$)—C(O)—$R^a$, —C(O)—N$(R^a)_2$, —N$(R^a)_2$ and —O—Si$(R^a)_x(OR^a)_y$ (where x and y are independently 0, 1, 2 or 3, with the proviso that x+y=3), in which any of the said (1-10C)alkyl, (2-10C)alkenyl, (2-10C)alkynyl, (1-10C)heteroaliphatic, phenyl and 5-6 membered heteroaryl within $L^1$ or $L^2$ is optionally substituted with one or more $R^b$; each $R^a$ is independently selected from hydrogen, (1-20C)alkyl, (2-20C)alkenyl, (2-20C)alkynyl, (1-20C)heteroaliphatic, carbocyclyl, heterocyclyl, aryl and heteroaryl, where any (1-20C)alkyl, (2-20C)alkenyl, (2-20C)alkynyl, (1-20C)heteroaliphatic, carbocyclyl, heterocyclyl, aryl or heteroaryl present in $R^a$ is independently substituted with one or more groups independently selected from halo, cyano, nitro, amino, hydroxy, (1-4C)alkyl, (2-4C) alkenyl, (2-4C)alkynyl and (1-4C)alkoxy; each $R^b$ is independently substituted with one or more groups independently selected from halo, amino, hydroxy, (1-4C)alkyl, (1-4C)haloalkyl and (1-4C)alkoxy.

In an embodiment, $L^1$ and $L^2$ are independently selected from absent and —O—C(O)—$R^a$, where $R^a$ is (1-20C)alkyl (e.g. acetate, i.e. "OAc", or stearate) or (2-25C)alkenyl (e.g. oleate). In any of these, $L^1$ and $L^2$ may also be independently selected from O-benzoyl (i.e. "OBz").

In an embodiment, $G^1$ and $G^2$ are absent.

In an embodiment, Q has a structure according to any one of the following:

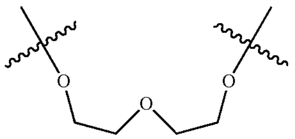

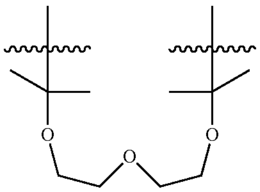

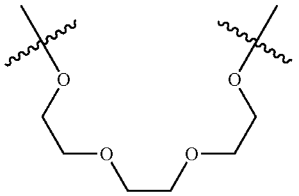

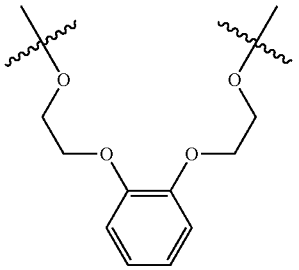

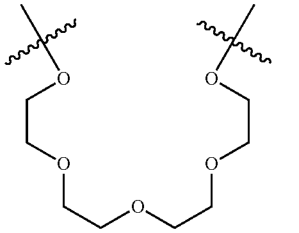

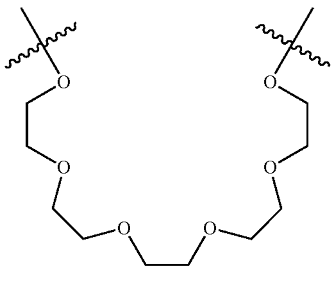

-continued

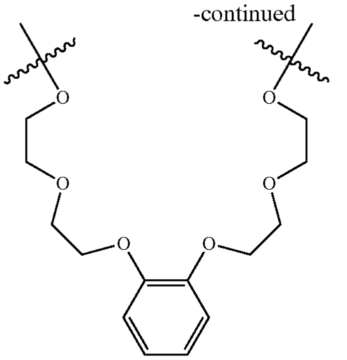

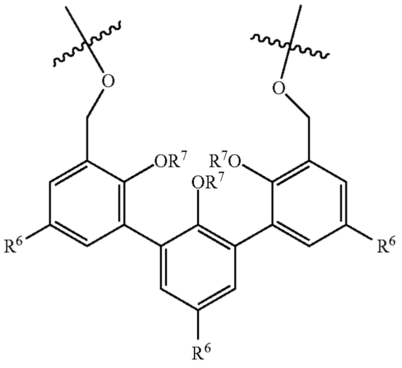

where each $R^6$ is independently halo, methyl and methoxy and each $R^7$ is independently hydrogen or methyl.

In an embodiment, $M^1$ is selected from Co, Fe, Cr, Ni, Al, Ti and Zn;

$M^2$ is selected from Li, Na, K, Rb, Cs, Mg, Ca, Sr, Ba, Y, Ln, Al, Ga and Sn;

$R^1$ has a structure according to any one of the following:

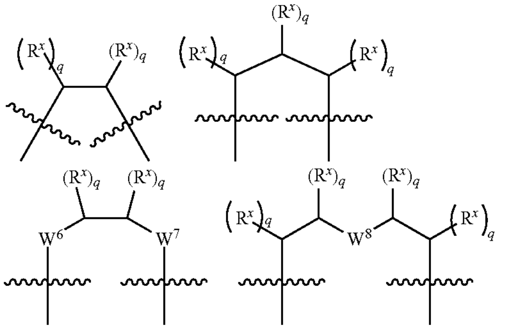

wherein both of $W^6$ and $W^7$ are —O— or both of $W^6$ and $W^7$ are —$CH_2$—, where each —$CH_2$— may be independently substituted with one or two $R^x$;

$W^6$ is —O— or —NH—, where —NH— may be substituted with $R^x$; and each q is 0, 1 or 2; $R^2$ is independently selected from absent, hydrogen and (1-2C)alkyl;

each $R^x$ is independently selected from halo, hydroxy, (1-4C)alkyl, (1-4C)haloalkyl, (1-4C)alkoxy, phenyl, 5-6 membered heteroaryl and —$NR^{xa}R^{xb}$, where any phenyl or 5-6 membered heteroaryl in $R^x$ is optionally substituted with one or more groups independently selected from halo, hydroxy, (1-2C)alkyl, (1-2C)haloalkyl and (1-2C)alkoxy, and where $R^{xa}$ and $R^{xb}$ are independently selected from hydrogen and (1-3C)alkyl, and/or two or more $R^x$ located on adjacent atoms are linked to one another, such that when taken in combination with the atoms to which they are attached, they form a benzene, cyclohexane or naphthalene group, wherein either of the said benzene, cyclohexane or naphthalene groups is optionally substituted with one or more groups independently selected from halo, hydroxy, (1-2C)alkyl, (1-2C)haloalkyl and (1-2C) alkoxy; and each $R^3$ is independently selected from halo, hydroxy, (1-2C)alkyl, (1-2C)haloalkyl, (1-2C)alkoxy and —$NR^{3a}R^{3b}$, where $R^{3a}$ and $R^{3b}$ are independently selected from hydrogen and (1-3C)alkyl.

In an embodiment, $M^1$ is selected from Co, Ni and Zn; and $M^2$ is selected from Na, K, Rb and Cs;

$R^1$ has a structure according to any one of the following:

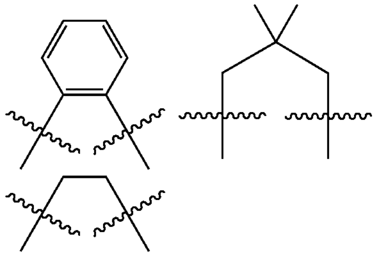

each $R^2$ is independently selected from absent, hydrogen, (1-3C)alkyl, (2-3C)alkenyl, (2-3C)alkynyl, phenyl, benzyl and —C(O)—$NR^{2a}R^{2b}$, where any phenyl or benzyl in $R^2$ is optionally substituted with one or more groups independently selected from halo, hydroxy, cyano, nitro, (1-4C)alkyl, (1-4C)haloalkyl and (1-4C) alkoxy, and where $R^{2a}$ and $R^{2b}$ are independently selected from hydrogen and (1-3C)alkyl;

each $R^3$ is independently selected from halo, hydroxy, (1-2C)alkyl, (1-2C)haloalkyl, (1-2C)alkoxy and —$NR^{3a}R^{3b}$, where $R^{3a}$ and $R^{3b}$ are independently selected from hydrogen and (1-3C)alkyl; and Q has a structure according to any one of the following:

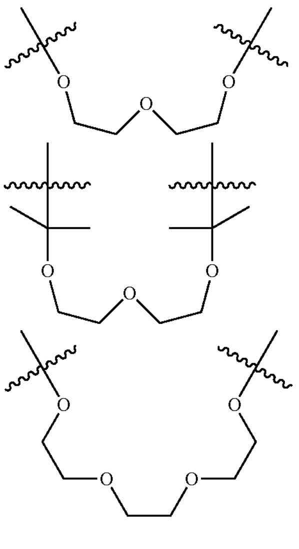

-continued

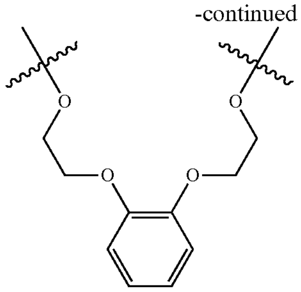

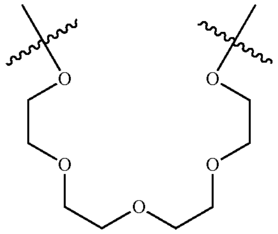

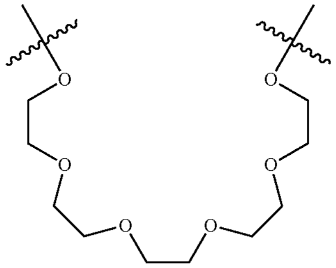

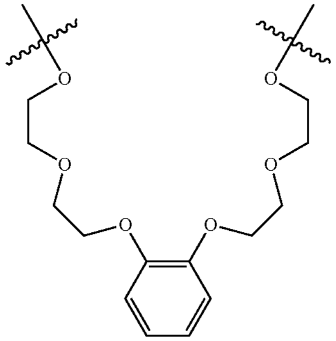

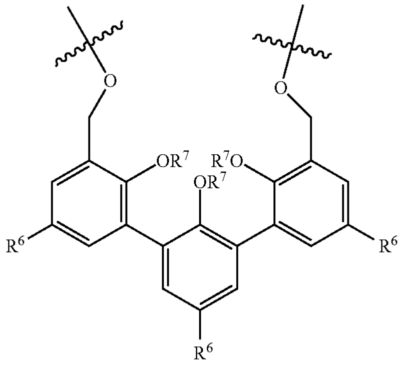

where each $R^6$ is independently halo, methyl and methoxy and each $R^7$ is independently hydrogen or methyl.

In a particular embodiment, the compound of Formula I has a structure according to Formula I-III (which is a sub-definition of Formula I), shown below:

Formula I-III

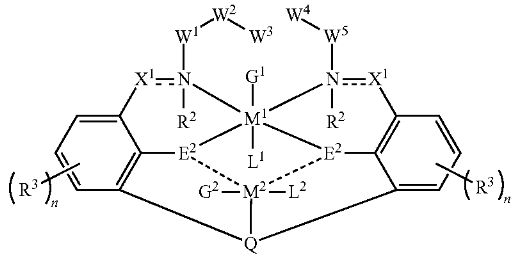

wherein $M^1$, $M^2$, $X^1$, $R^2$, $R^3$, $E^2$, $L^1$, $L^2$, $G^1$, $G^2$, n, Q, $W^1$, $W^2$, $W^3$, $W^4$, $W^5$ and any sub-groups associated therewith have any of the definitions outlined hereinbefore and/or appearing in the following embodiments:

In an embodiment, $W^1$, $W^2$, $W^3$, $W^4$ and $W^5$ are each independently selected from absent and —$CH_2$—, where any —$CH_2$— is optionally substituted with one or two $R^x$. Suitably, each $R^x$ is independently selected from halo, hydroxy, (1-4C)alkyl, (1-4C)haloalkyl, (1-4C)alkoxy, phenyl, 5-6 membered heteroaryl and —$NR^{xa}R^{xb}$, where any phenyl or 5-6 membered heteroaryl in $R^x$ is optionally substituted with one or more groups independently selected from halo, hydroxy, (1-2C)alkyl, (1-2C)haloalkyl and (1-2C)alkoxy, and where $R^{xa}$ and $R^{xb}$ are independently selected from hydrogen and (1-3C)alkyl, and/or two or more $R^x$ located on adjacent atoms are linked to one another, such that when taken in combination with the atoms to which they are attached, they form a benzene, cyclohexane or naphthalene group, wherein either of the said benzene, cyclohexane or naphthalene groups is optionally substituted with one or more groups independently selected from halo, hydroxy, (1-2C)alkyl, (1-2C)haloalkyl and (1-2C) alkoxy.

In an embodiment, the group:

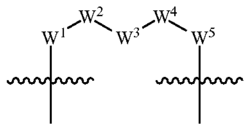

has a structure according to any one of the following:

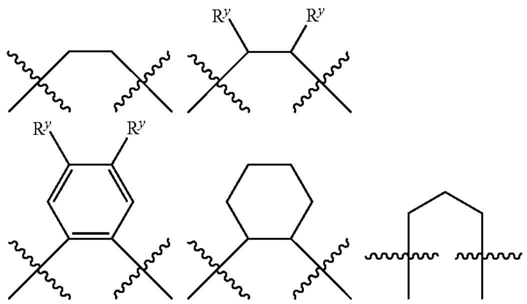

-continued

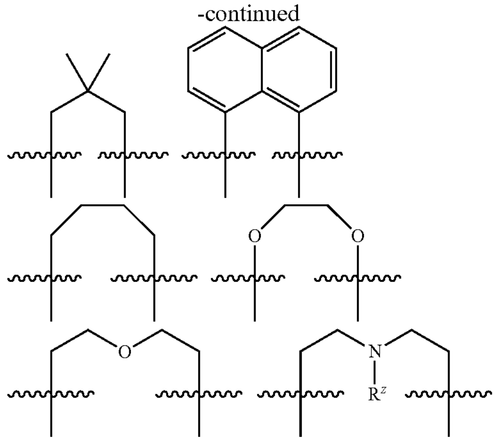

where $R^y$ and $R^z$ are as defined herein. Suitably, each $R^y$ is independently selected from hydrogen, halo, cyano, (1-2C)alkyl, (1-2C)alkoxy, (1-2C)haloalkyl, phenyl, —$NH_2$ and $NMe_2$, and $R^z$ is selected from hydrogen and methyl.

In an embodiment, each $X^1$ is independently selected from —CH—, —$CR^4$—, —$CH_2$—, —$CHR^4$—, —$CR^4R^4$— and —$PR^4R^4$—, where each $R^4$ is independently selected from (1-2C)alkyl and phenyl, where any phenyl in $R^4$ is optionally substituted with one or more groups independently selected from halo, hydroxy, cyano, nitro, (1-2C)alkyl, (1-2C)haloalkyl and (1-2C)alkoxy. Suitably, each $X^1$ is independently selected from —CH—, —$CR^4$—, —$CH_2$—, —$CHR^4$— and —$CR^4R^4$, where each $R^4$ is independently (1-2C)alkyl.

In an embodiment, $M_1$ is selected from Co, Fe, Cr, Ni, Al, Ti, Zn and Mg; and $M_2$ is selected from Li, Na, K, Rb, Cs, Mg, Ca, Sr, Ba, Y, Ln, Al, Ga and Sn.

In an embodiment, $M^1$ is selected from Co, Fe, Cr, Ni, Al, Ti and Zn; and $M^2$ is selected from Li, Na, K, Rb, Cs, Mg, Ca, Sr, Ba, Y, Ln, Al, Ga and Sn.

In an embodiment, $M^1$ is selected from Co, Fe, Cr, Ni and Zn; and $M^2$ is selected from Na, K, Rb and Cs.

In an embodiment, $M^1$ is Co and $M^2$ is selected from Na, K, Rb and Cs.

In an embodiment, $M^1$ and $M^2$ are respectively Zn and Na, Ni and Na, Mg and Na, Co and Na, Co and Rb, Co and Cs, Zn and Mg, Co and K, Fe and Na, Fe and K, Cr and Na, Cr and K, Al and K, Co and Ca, Co and Sr, or Co and Ba.

In an embodiment, $M^1$ and $M^2$ are respectively Zn and Na, Ni and Na, Mg and Na, Co and Na, Co and Rb, Co and Cs, Zn and Mg, Co and K, Fe and Na, Fe and K, Cr and Na, or Cr and K.

In an embodiment, $E^2$ is O.

In an embodiment, each $R^2$ is independently selected from absent, hydrogen, (1-3C)alkyl, (2-3C)alkenyl, (2-3C)alkynyl, phenyl, benzyl and —C(O)—$NR^{2a}R^{2b}$, where any phenyl or benzyl in $R^2$ is optionally substituted with one or more groups independently selected from halo, hydroxy, cyano, nitro, (1-4C)alkyl, (1-4C)haloalkyl and (1-4C)alkoxy, and where $R^{2a}$ and $R^{2b}$ are independently selected from hydrogen and (1-3C)alkyl. Suitably, each $R^2$ is independently selected from absent, hydrogen and (1-2C)alkyl.

In an embodiment, each $R^3$ is independently selected from halo, hydroxy, cyano, nitro, (1-4C)alkyl, (1-4C)haloalkyl, (1-4C)alkoxy, phenyl, 5-6 membered heteroaryl and —$NR^{3a}R^{3b}$, where any phenyl and 5-6 membered heteroaryl in $R^3$ is optionally substituted with one or more groups independently selected from halo, hydroxy, cyano, nitro, (1-4C)alkyl, (1-4C)haloalkyl and (1-4C)alkoxy, and where $R^{3a}$ and $R^{3b}$ are independently selected from hydrogen and (1-3C)alkyl.

Suitably, each $R^3$ is independently selected from halo, hydroxy, (1-2C)alkyl, (1-2C)haloalkyl, (1-2C)alkoxy and —$NR^{3a}R^{3b}$, where $R^{3a}$ and $R^{3b}$ are independently selected from hydrogen and (1-3C)alkyl. In such an embodiment, each n is independently selected from 0, 1 and 2. Suitably, each n is independently is 0 or 1.

In an embodiment, $L^1$ and $L^2$ are independently selected from absent, halo, nitrate, hydroxy, (1-10C)alkyl, (2-10C)alkenyl, (2-10C)alkynyl, (1-10C)heteroaliphatic, phenyl, 5-6 membered heteroaryl, —O—C(O)—$R^a$, —O—C(O)O—$R^a$, —$OP(O)(R^a)_2$, —$P(O)(OR^a)_2$, —$OR^a$, —O—$S(O)_2$—$R^a$(e.g. triflate), —O—S(O)—$(R^a)_2$, —O—S(O)—$R^a$, —S(O)—R a, —S—C(O)—$R^a$, —S—C(S)—O—R a, —N(H)$S(O)_2$—$R^a$ (e.g. triflamide), —N—$(S(O)_2—R^a)_2$ (e.g. triflimide), —S—$R^a$, —$N(R^a)$—C(O)—$R^a$, —C(O)—$N(R^a)_2$, —$N(R^a)_2$ and —O—$Si(R^a)_x(OR^a)_y$ (where x and y are independently 0, 1, 2 or 3, with the proviso that x+y=3), in which any of the said (1-10C)alkyl, (2-10C)alkenyl, (2-10C)alkynyl, (1-10C)heteroaliphatic, phenyl and 5-6 membered heteroaryl within $L^1$ or $L^2$ is optionally substituted with one or more $R^b$; each $R^a$ is independently selected from hydrogen, (1-20C)alkyl, (2-20C)alkenyl, (2-20C)alkynyl, (1-20C)heteroaliphatic, carbocyclyl, heterocyclyl, aryl and heteroaryl, where any (1-20C)alkyl, (2-20C)alkenyl, (2-20C)alkynyl, (1-20C)heteroaliphatic, carbocyclyl, heterocyclyl, aryl or heteroaryl present in $R^a$ is independently substituted with one or more groups independently selected from halo, cyano, nitro, amino, hydroxy, (1-4C)alkyl, (2-4C)alkenyl, (2-4C)alkynyl and (1-4C)alkoxy; each $R^b$ is independently substituted with one or more groups independently selected from halo, amino, hydroxy, (1-4C)alkyl, (1-4C)haloalkyl and (1-4C)alkoxy.

In an embodiment, $L^1$ and $L^2$ are independently selected from absent and —O—C(O)—$R^a$, where $R^a$ is (1-20C)alkyl (e.g. acetate, i.e. "OAc", or stearate) or (2-25C)alkenyl (e.g. oleate). In any of these, $L^1$ and $L^2$ may also be independently selected from O-benzoyl (i.e. "OBz").

In an embodiment, $G^1$ and $G^2$ are absent.

In an embodiment, Q has a structure according to any one of the following:

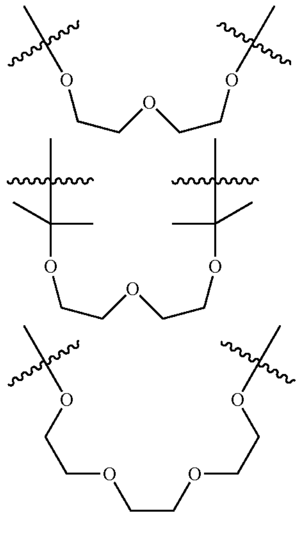

-continued

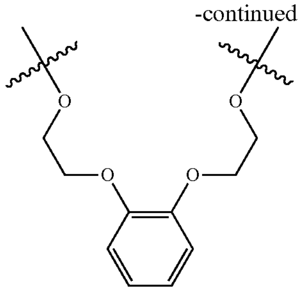

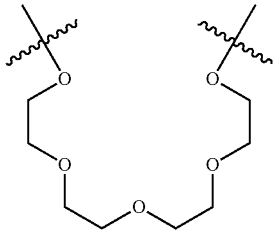

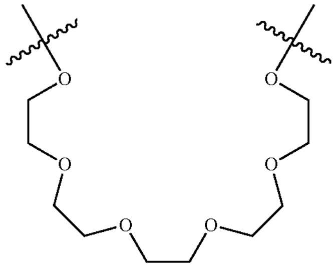

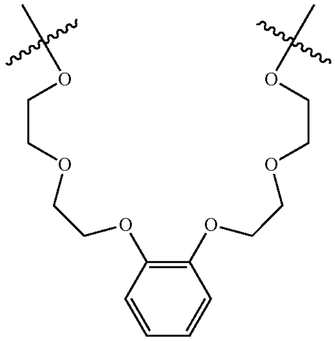

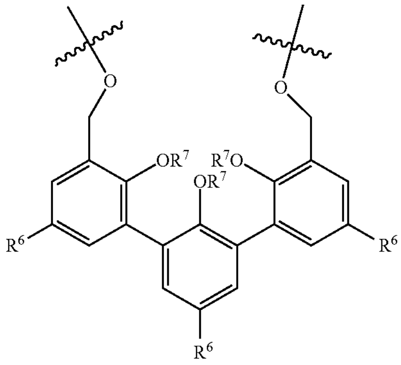

where each $R^6$ is independently halo, methyl and methoxy and each $R^7$ is independently hydrogen or methyl.

In an embodiment, $M^1$ is selected from Co, Fe, Cr, Ni, Al, Ti and Zn;

$M^2$ is selected from Li, Na, K, Rb, Cs, Mg, Ca, Sr, Ba, Y, Ln, Al, Ga and Sn;

$W^1$, $W^2$, $W^3$, $W^4$ and $W^5$ are each independently selected from absent and —$CH_2$—, where any —$CH_2$— is optionally substituted with one or two $R^x$;

each $R^x$ is independently selected from halo, hydroxy, (1-4C)alkyl, (1-4C)haloalkyl, (1-4C)alkoxy, phenyl, 5-6 membered heteroaryl and —$NR^{xa}R^{xb}$, where any phenyl or 5-6 membered heteroaryl in $R^x$ is optionally substituted with one or more groups independently selected from halo, hydroxy, (1-2C)alkyl, (1-2C)haloalkyl and (1-2C)alkoxy, and where $R^{xa}$ and $R^{xb}$ are independently selected from hydrogen and (1-3C)alkyl, and/or two or more $R^x$ located on adjacent atoms are linked to one another, such that when taken in combination with the atoms to which they are attached, they form a benzene, cyclohexane or naphthalene group, wherein either of the said benzene, cyclohexane or naphthalene groups is optionally substituted with one or more groups independently selected from halo, hydroxy, (1-2C)alkyl, (1-2C)haloalkyl and (1-2C) alkoxy;

$E^2$ is O;

each $R^2$ is independently selected from absent, hydrogen, (1-3C)alkyl, (2-3C)alkenyl, (2-3C)alkynyl, phenyl, benzyl and —C(O)—$NR^{2a}R^{2b}$, where any phenyl or benzyl in $R^2$ is optionally substituted with one or more groups independently selected from halo, hydroxy, cyano, nitro, (1-4C)alkyl, (1-4C)haloalkyl and (1-4C) alkoxy, and where $R^{2a}$ and $R^{2b}$ are independently selected from hydrogen and (1-3C)alkyl;

each $X^1$ is independently selected from —CH—, —$CR^4$—, —$CH_2$—, —$CHR^4$—, —$CR^4R^4$ and —$PR^4R^4$—, where each $R^4$ is independently selected from (1-2C)alkyl and phenyl, where any phenyl in $R^4$ is optionally substituted with one or more groups independently selected from halo, hydroxy, cyano, nitro, (1-2C)alkyl, (1-2C) haloalkyl and (1-2C)alkoxy;

each $R^3$ is independently selected from halo, hydroxy, (1-2C)alkyl, (1-2C)haloalkyl, (1-2C)alkoxy and —$NR^{3a}R^{3b}$, where $R^{3a}$ and $R^{3b}$ are independently selected from hydrogen and (1-3C)alkyl;

each n is independently selected from 0, 1 and 2; and

Q has a structure according to any one of the following:

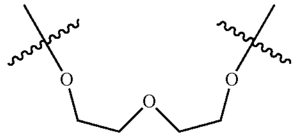

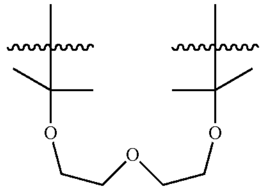

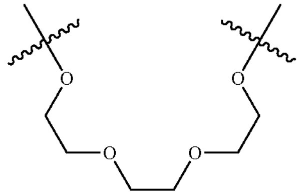

-continued

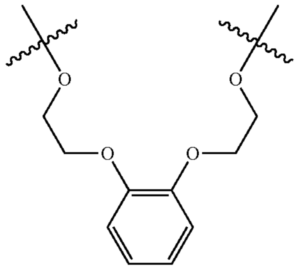

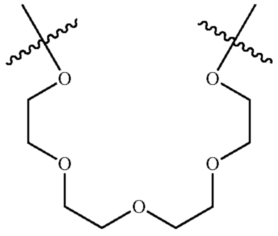

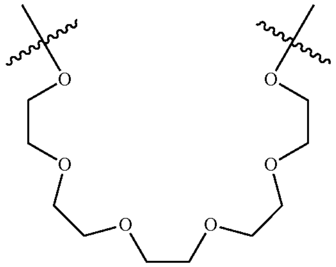

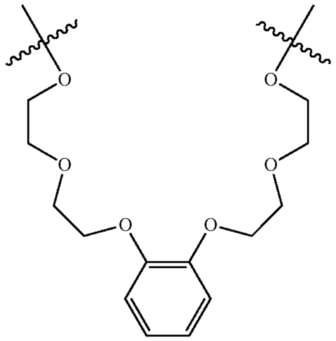

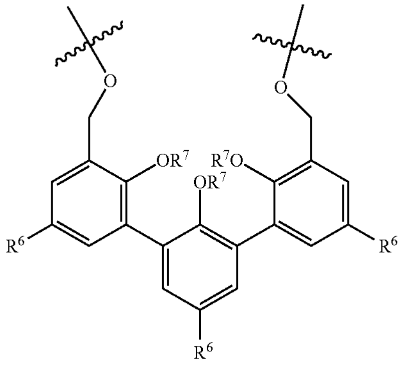

where each $R^6$ is independently halo, methyl and methoxy and each $R^7$ is independently hydrogen or methyl.

In an embodiment, $M^1$ is selected from Co, Ni and Zn; and $M^2$ is selected from Na, K, Rb and Cs;

the group:

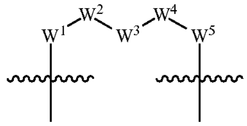

has a structure according to any one of the following:

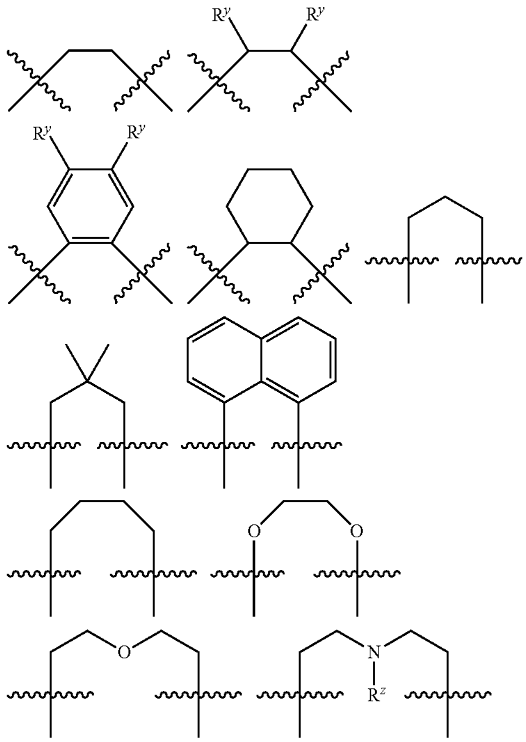

where each $R^y$ is independently selected from hydrogen, halo, cyano, (1-2C)alkyl, (1-2C)alkoxy, (1-2C)haloalkyl, phenyl, —$NH_2$ and $NMe_2$, and $R^Z$ is selected from hydrogen and methyl;

each $X^1$ is independently selected from —CH—, —$CR^4$—, —$CH_2$—, —$CHR^4$—, —$CR^4R^4$— and —$PR^4R^4$—, where each $R^4$ is independently selected from (1-2C)alkyl and phenyl, where any phenyl in $R^4$ is optionally substituted with one or more groups independently selected from halo, hydroxy, cyano, nitro, (1-2C)alkyl, (1-2C) haloalkyl and (1-2C)alkoxy;

each $R^2$ is independently selected from absent, hydrogen, (1-3C)alkyl, (2-3C)alkenyl, (2-3C)alkynyl, phenyl, benzyl and —C(O)—$NR^{2a}R^{2b}$, where any phenyl or benzyl in $R^2$ is optionally substituted with one or more groups independently selected from halo, hydroxy, cyano, nitro, (1-4C)alkyl, (1-4C)haloalkyl and (1-4C) alkoxy, and where $R^{2a}$ and $R^{2b}$ are independently selected from hydrogen and (1-3C)alkyl;

each $R^3$ is independently selected from halo, hydroxy, (1-2C)alkyl, (1-2C)haloalkyl, (1-2C)alkoxy and —$NR^{3a}R^{3b}$, where $R^{3a}$ and $R^{3b}$ are independently selected from hydrogen and (1-3C)alkyl;

each n is independently selected from 0, 1 and 2; and

Q has a structure according to any one of the following:

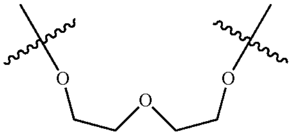

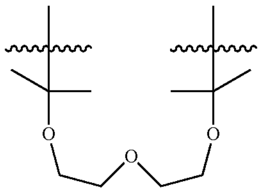

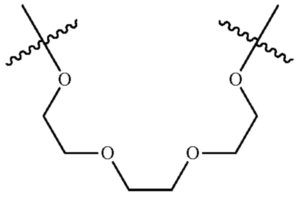

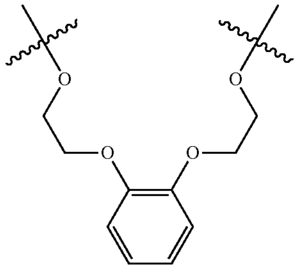

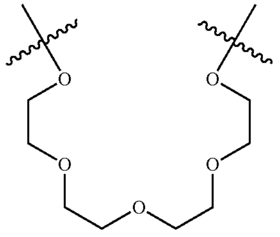

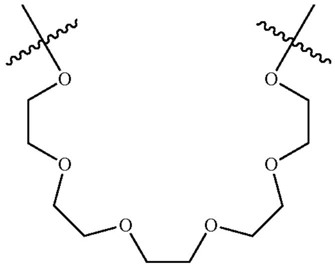

-continued

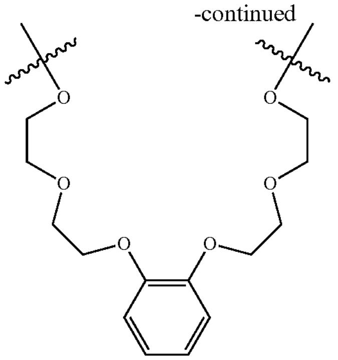

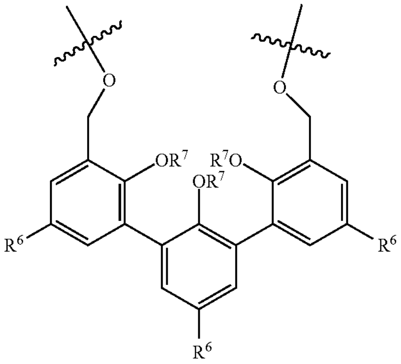

where each $R^6$ is independently halo, methyl and methoxy and each $R^7$ is independently hydrogen or methyl.

In a particular embodiment, the compound of Formula I has a structure according to Formula I-IV (which is a sub-definition of Formula I), shown below:

Formula I-IV

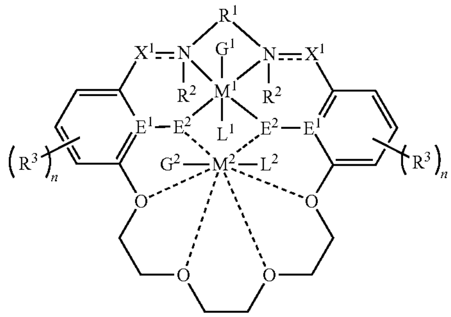

wherein $M^1$, $M^2$, $X^1$, $E^1$, $E^2$, $R^1$, $R^2$, $R^3$, $L^1$, $L^2$, $G^1$, $G^2$, n and any sub-groups associated therewith have any of the definitions outlined hereinbefore and/or appearing in the following embodiments:

In an embodiment, $M_1$ is selected from Co, Fe, Cr, Ni, Al, Ti, Zn and Mg; and $M_2$ is selected from Li, Na, K, Rb, Cs, Mg, Ca, Sr, Ba, Y, Ln, Al, Ga and Sn.

In an embodiment, $M^1$ is selected from Co, Fe, Cr, Ni, Al, Ti and Zn; and $M^2$ is selected from Li, Na, K, Rb, Cs, Mg, Ca, Sr, Ba, Y, Ln, Al, Ga and Sn.

In an embodiment, $M^1$ is selected from Co, Fe, Cr, Ni and Zn; and $M^2$ is selected from Na, K, Rb and Cs.

In an embodiment, $M^1$ is Co and $M^2$ is selected from Na, K, Rb and Cs.

In an embodiment, $M^1$ and $M^2$ are respectively Zn and Na, Ni and Na, Mg and Na, Co and Na, Co and Rb, Co and Cs, Zn and Mg, Co and K, Fe and Na, Fe and K, Cr and Na, Cr and K, Al and K, Co and Ca, Co and Sr, or Co and Ba.

In an embodiment, $M^1$ and $M^2$ are respectively Zn and Na, Ni and Na, Mg and Na, Co and Na, Co and Rb, Co and Cs, Zn and Mg, Co and K, Fe and Na, Fe and K, Cr and Na, or Cr and K.

In an embodiment, $R^1$ is (2-5C)alkylene, wherein 0, 1 or 2 carbon atoms within the said (2-5C)alkylene is replaced with a heteroatom selected from 0 and N, and wherein any carbon, o or N atom within the said (2-5C)alkylene may be independently optionally substituted with one or more $R^x$:

each $R^x$ is independently selected from halo, hydroxy, cyano, nitro, (1-10C)alkyl, (2-10C)alkenyl, (2-10C) alkynyl, (1-10C)haloalkyl, (1-10C)alkoxy, aryl, heteroaryl and —$NR^{xa}R^{xb}$, where any aryl or heteroaryl in $R^x$ is optionally substituted with one or more groups independently selected from halo, hydroxy, cyano, nitro, (1-10C)alkyl, (1-10C)haloalkyl and (1-10C) alkoxy, and where $R^{xa}$ and $R^{xb}$ are independently selected from hydrogen and (1-3C)alkyl, and/or two or more $R^x$ located on adjacent atoms are linked to one another, such that when taken in combination with the atoms to which they are attached, they form a monocyclic or bicyclic aromatic, heteroaromatic, carbocyclic or heterocyclic ring system, wherein any of the said monocyclic or bicyclic aromatic, heteroaromatic, carbocyclic or heterocyclic ring system is optionally substituted with one or more groups independently selected from halo, hydroxy, cyano, nitro, (1-10C)alkyl, (1-10C)haloalkyl and (1-10C)alkoxy.

In an embodiment, $R^1$ is (2-5C)alkylene, wherein 0, 1 or 2 carbon atoms within the said (2-5C)alkylene is replaced with a heteroatom selected from O and N, and wherein any carbon, O or N atom within the said (2-5C)alkylene may be independently optionally substituted with one or more $R^x$;

each $R^x$ is independently selected from halo, hydroxy, (1-4C)alkyl, (1-4C)haloalkyl, (1-4C)alkoxy, phenyl, 5-6 membered heteroaryl and —$NR^{xa}R^{xb}$, where any phenyl or 5-6 membered heteroaryl in $R^x$ is optionally substituted with one or more groups independently selected from halo, hydroxy, (1-2C)alkyl, (1-2C)haloalkyl and (1-2C)alkoxy, and where $R^{xa}$ and $R^{xb}$ are independently selected from hydrogen and (1-3C)alkyl, and/or two or more $R^x$ located on adjacent atoms are linked to one another, such that when taken in combination with the atoms to which they are attached, they form a benzene, cyclohexane or naphthalene group, wherein either of the said benzene, cyclohexane or naphthalene groups is optionally substituted with one or more groups independently selected from halo, hydroxy, (1-2C)alkyl, (1-2C)haloalkyl and (1-2C) alkoxy.

In an embodiment, $R^1$ has a structure according to any one of the following:

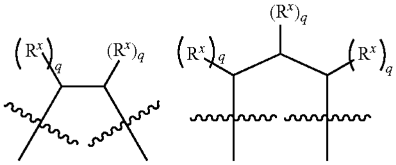

-continued

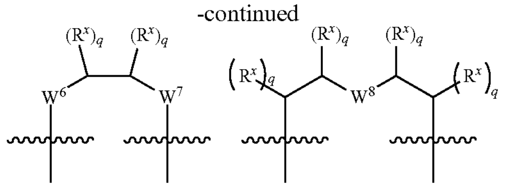

wherein both of $W^6$ and $W^7$ are —O— or both of $W^6$ and $W^7$ are —$CH_2$—, where each —$CH_2$— may be independently substituted with one or two $R^x$;

$W^6$ is —O— or —NH—, where —NH— may be substituted with $R^x$; and each q is 0, 1 or 2;

In an embodiment, $R^1$ has a structure according to any one of the following:

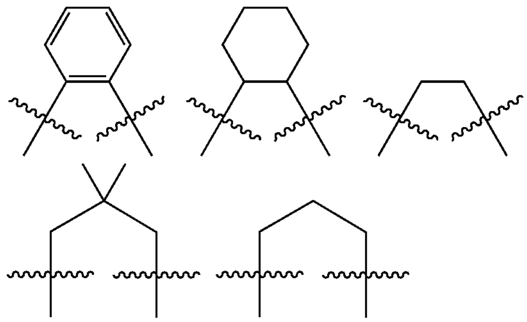

In an embodiment, each $X^1$ is independently selected from —CH—, —$CR^4$—, —$CH_2$—, —$CHR^4$—, —$CR^4R^4$— and —$PR^4R^4$—, where each $R^4$ is independently selected from (1-2C)alkyl and phenyl, where any phenyl in $R^4$ is optionally substituted with one or more groups independently selected from halo, hydroxy, cyano, nitro, (1-2C)alkyl, (1-2C)haloalkyl and (1-2C)alkoxy. Suitably, each $X^1$ is independently selected from —CH—, —$CR^4$—, —$CH_2$—, —$CHR^4$— and —$CR^4R^4$, where each $R^4$ is independently (1-2C)alkyl.

In an embodiment, each $R^2$ is independently selected from absent, hydrogen, (1-3C)alkyl, (2-3C)alkenyl, (2-3C)alkynyl, phenyl, benzyl and —C(O)—$NR^{2a}R^{2b}$, where any phenyl or benzyl in $R^2$ is optionally substituted with one or more groups independently selected from halo, hydroxy, cyano, nitro, (1-4C)alkyl, (1-4C)haloalkyl and (1-4C) alkoxy, and where $R^{2a}$ and $R^{2b}$ are independently selected from hydrogen and (1-3C)alkyl. Suitably, each $R^2$ is independently selected from absent, hydrogen and (1-2C)alkyl.

In an embodiment, each $R^3$ is independently selected from halo, hydroxy, cyano, nitro, (1-4C)alkyl, (1-4C)haloalkyl, (1-4C)alkoxy, phenyl, 5-6 membered heteroaryl and —$NR^{3a}R^{3b}$, where any phenyl and 5-6 membered heteroaryl in $R^3$ is optionally substituted with one or more groups independently selected from halo, hydroxy, cyano, nitro, (1-4C)alkyl, (1-4C)haloalkyl and (1-4C)alkoxy, and where $R^{3a}$ and $R^{3b}$ are independently selected from hydrogen and (1-3C)alkyl.

Suitably, each $R^3$ is independently selected from halo, hydroxy, (1-2C)alkyl, (1-2C)haloalkyl, (1-2C)alkoxy and —$NR^{3a}R^{3b}$, where $R^{3a}$ and $R^{3b}$ are independently selected from hydrogen and (1-3C)alkyl. In such an embodiment, each n is independently selected from 0, 1 and 2. Suitably, each n is independently is 0 or 1.

In an embodiment, $E^1$ is C and $E^2$ is O.

In an embodiment, $L^1$ and $L^2$ are independently selected from absent, halo, nitrate, hydroxy, (1-10C)alkyl, (2-10C) alkenyl, (2-10C)alkynyl, (1-10C)heteroaliphatic, phenyl, 5-6 membered heteroaryl, $—O—C(O)—R^a$, $—O—C(O)O—R^a$, $—OP(O)(R^a)_2$, $—P(O)(OR^a)_2$, $—OR^a$, $—O—S(O)_2—R^a$(e.g. triflate), $—O—S(O)—(R^a)_2$, $—O—S(O)—R^a$, $—S(O)—R^a$, $—S—C(O)—R^a$, $—S—C(S)—O—R^a$, $—N(H)S(O)_2—R^a$ (e.g. triflamide), $—N—(S(O)_2—R^a)_2$ (e.g. triflimide), $—S—R^a$, $—N(R^a)—C(O)—R^a$, $—C(O)—N(R^a)_2$, $—N(R^a)_2$ and $—O—Si(R^a)_x(OR^a)_y$ (where x and y are independently 0, 1, 2 or 3, with the proviso that x+y=3), in which any of the said (1-10C)alkyl, (2-10C)alkenyl, (2-10C)alkynyl, (1-10C)heteroaliphatic, phenyl and 5-6 membered heteroaryl within $L^1$ or $L^2$ is optionally substituted with one or more $R^b$; each $R^a$ is independently selected from hydrogen, (1-20C)alkyl, (2-20C)alkenyl, (2-20C)alkynyl, (1-20C)heteroaliphatic, carbocyclyl, heterocyclyl, aryl and heteroaryl, where any (1-20C)alkyl, (2-20C)alkenyl, (2-20C)alkynyl, (1-20C)heteroaliphatic, carbocyclyl, heterocyclyl, aryl or heteroaryl present in $R^a$ is independently substituted with one or more groups independently selected from halo, cyano, nitro, amino, hydroxy, (1-4C)alkyl, (2-4C) alkenyl, (2-4C)alkynyl and (1-4C)alkoxy; each $R^b$ is independently substituted with one or more groups independently selected from halo, amino, hydroxy, (1-4C)alkyl, (1-4C)haloalkyl and (1-4C)alkoxy.

In an embodiment, $L^1$ and $L^2$ are independently selected from absent and $—O—C(O)—R^a$, where $R^a$ is (1-20C)alkyl (e.g. acetate, i.e. "OAc", or stearate) or (2-25C)alkenyl (e.g. oleate). In any of these, $L^1$ and $L^2$ may also be independently selected from O-benzoyl (i.e. "OBz").

In an embodiment, $G^1$ and $G^2$ are absent.

In an embodiment, $M^1$ is selected from Co, Ni and Zn; and $M^2$ is selected from Na, K, Rb and Cs;

$R^1$ has a structure according to any one of the following:

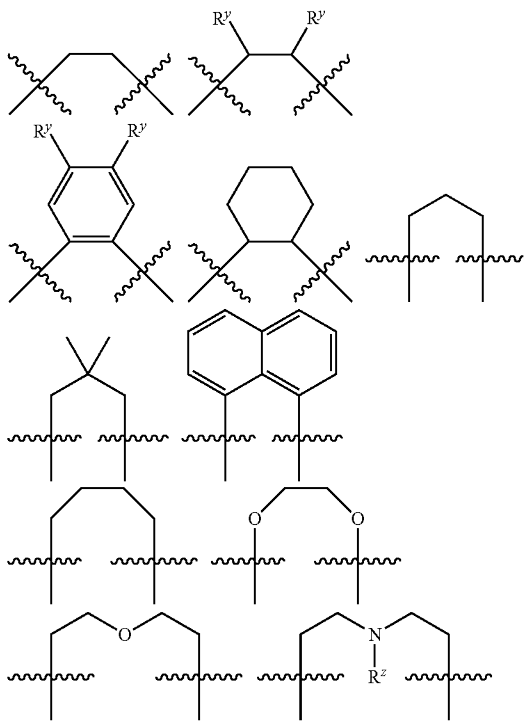

where each $R^y$ is independently selected from hydrogen, halo, cyano, (1-2C)alkyl, (1-2C)alkoxy, (1-2C)haloalkyl, phenyl, $—NH_2$ and $NMe_2$, and $R^Z$ is selected from hydrogen and methyl; each $X^1$ is independently selected from —CH—, $—CR^4—$, $—CH_2—$, $—CHR^4—$, $—CR^4R^4—$ and $—PR^4R^4—$, where each $R^4$ is independently selected from (1-2C)alkyl and phenyl, where any phenyl in $R^4$ is optionally substituted with one or more groups independently selected from halo, hydroxy, cyano, nitro, (1-2C)alkyl, (1-2C) haloalkyl and (1-2C)alkoxy;

$L^1$ and $L^2$ are independently selected from absent and $—O—C(O)—R^a$, where $R^a$ is (1-6C)alkyl (e.g. acetate) or (2-25C)alkenyl (e.g. stearate or oleate);

each $R^3$ is independently selected from halo, hydroxy, (1-2C)alkyl, (1-2C)haloalkyl, (1-2C)alkoxy and $—NR^{3a}R^{3b}$, where $R^{3a}$ and $R^{3b}$ are independently selected from hydrogen and (1-3C)alkyl; and each n is independently selected from 0, 1 and 2.

In an embodiment, $M^1$ is selected from Co, Fe, Cr, Ni, Al, Ti and Zn;

$M^2$ is selected from Li, Na, K, Rb, Cs, Mg, Ca, Sr, Ba, Y, Ln, Al, Ga and Sn;

$R^1$ has a structure according to any one of the following:

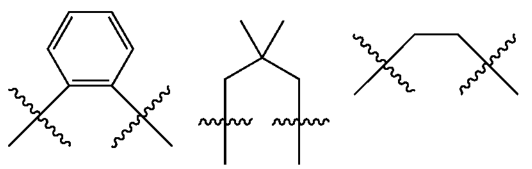

each $X^1$ is independently selected from —CH—, $—CR^4—$, $—CH_2—$, $—CHR^4—$ and $—CR^4R^4$, where each $R^4$ is independently (1-2C)alkyl;

each $R^2$ is independently selected from absent, hydrogen, (1-3C)alkyl, (2-3C)alkenyl, (2-3C)alkynyl, phenyl, benzyl and $—C(O)—NR^{2a}R^{2b}$, where any phenyl or benzyl in $R^2$ is optionally substituted with one or more groups independently selected from halo, hydroxy, cyano, nitro, (1-4C)alkyl, (1-4C)haloalkyl and (1-4C) alkoxy, and where $R^{2a}$ and $R^{2b}$ are independently selected from hydrogen and (1-3C)alkyl;

$E^1$ is C and $E^2$ is O;

each $R^3$ is independently selected from halo, hydroxy, (1-2C)alkyl, (1-2C)haloalkyl, (1-2C)alkoxy and $—NR^{3a}R^{3b}$, where $R^{3a}$ and $R^{3b}$ are independently selected from hydrogen and (1-3C)alkyl; and each n is independently selected from 0 and 1.

In a particular embodiment, the compound of Formula I has a structure according to Formula I-V (which is a sub-definition of Formula I), shown below:

Formula I-V

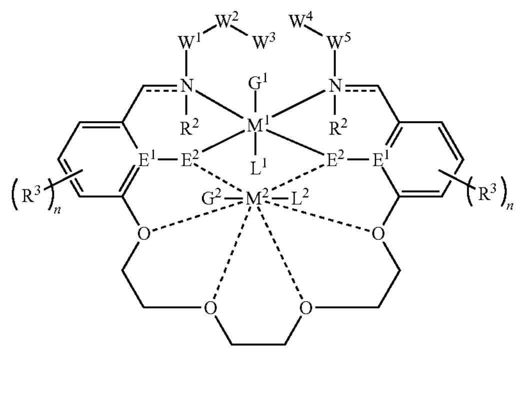

wherein $M^1$, $M^2$, $R^2$, $R^3$, $E^1$, $E^2$, $L^1$, $L^2$, $G^1$, $G^2$, $W^1$, $W^2$, $W^3$, $W^4$, $W^5$, n and any sub-groups associated therewith have any of the definitions outlined hereinbefore and/or appearing in the following embodiments:

In an embodiment, $W^1$, $W^2$, $W^3$, $W^4$ and $W^5$ are each independently selected from absent and —$CH_2$—, where any —$CH_2$— is optionally substituted with one or two $R^x$. Suitably, each $R^x$ is independently selected from halo, hydroxy, (1-4C)alkyl, (1-4C)haloalkyl, (1-4C)alkoxy, phenyl, 5-6 membered heteroaryl and —$NR^{xa}R^{xb}$, where any phenyl or 5-6 membered heteroaryl in $R^x$ is optionally substituted with one or more groups independently selected from halo, hydroxy, (1-2C)alkyl, (1-2C)haloalkyl and (1-2C)alkoxy, and where $R^{xa}$ and $R^{xb}$ are independently selected from hydrogen and (1-3C)alkyl, and/or two or more $R^x$ located on adjacent atoms are linked to one another, such that when taken in combination with the atoms to which they are attached, they form a benzene, cyclohexane or naphthalene group, wherein either of the said benzene, cyclohexane or naphthalene groups is optionally substituted with one or more groups independently selected from halo, hydroxy, (1-2C)alkyl, (1-2C)haloalkyl and (1-2C)alkoxy.

In an embodiment, the group:

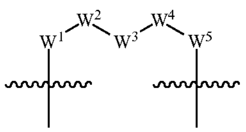

has a structure according to any one of the following:

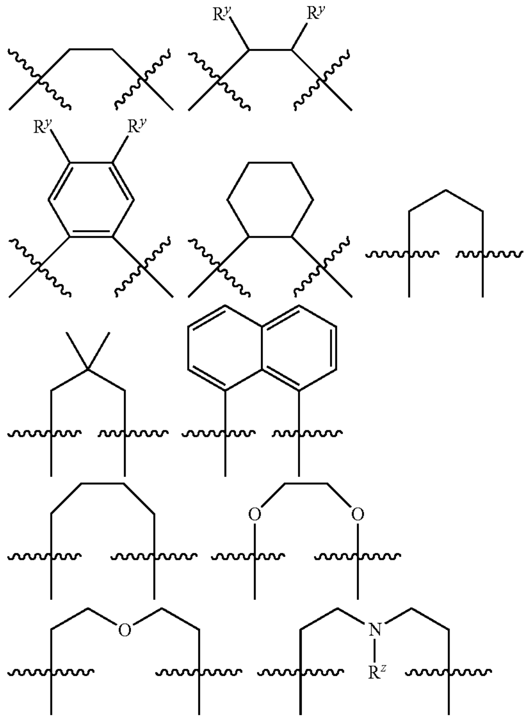

where $R^y$ and $R^z$ are as defined herein. Suitably, each Rv is independently selected from hydrogen, halo, cyano, (1-2C)alkyl, (1-2C)alkoxy, (1-2C)haloalkyl, phenyl, —$NH_2$ and $NMe_2$, and $R^z$ is selected from hydrogen and methyl.

In an embodiment, $M_1$ is selected from Co, Fe, Cr, Ni, Al, Ti, Zn and Mg; and $M_2$ is selected from Li, Na, K, Rb, Cs, Mg, Ca, Sr, Ba, Y, Ln, Al, Ga and Sn.

In an embodiment, $M^1$ is selected from Co, Fe, Cr, Ni, Al, Ti and Zn; and $M^2$ is selected from Li, Na, K, Rb, Cs, Mg, Ca, Sr, Ba, Y, Ln, Al, Ga and Sn.

In a embodiment, $M^1$ is selected from Co, Fe, Cr, Ni and Zn; and $M^2$ is selected from Na, K, Rb and Cs.

In an embodiment, $M^1$ is Co and $M^2$ is selected from Na, K, Rb and Cs.

In an embodiment, $M^1$ and $M^2$ are respectively Zn and Na, Ni and Na, Mg and Na, Co and Na, Co and Rb, Co and Cs, Zn and Mg, Co and K, Fe and Na, Fe and K, Cr and Na, Cr and K, Al and K, Co and Ca, Co and Sr, or Co and Ba.

In an embodiment, $M^1$ and $M^2$ are respectively Zn and Na, Ni and Na, Mg and Na, Co and Na, Co and Rb, Co and Cs, Zn and Mg, Co and K, Fe and Na, Fe and K, Cr and Na, or Cr and K.

In an embodiment, each $R^2$ is independently selected from absent, hydrogen, (1-3C)alkyl, (2-3C)alkenyl, (2-3C)alkynyl, phenyl, benzyl and —C(O)—$NR^{2a}R^{2b}$, where any phenyl or benzyl in $R^2$ is optionally substituted with one or more groups independently selected from halo, hydroxy, cyano, nitro, (1-4C)alkyl, (1-4C)haloalkyl and (1-4C) alkoxy, and where $R^{2a}$ and $R^{2b}$ are independently selected from hydrogen and (1-3C)alkyl. Suitably, each $R^2$ is independently selected from absent, hydrogen and (1-2C)alkyl.

In an embodiment, $E^1$ is C and $E^2$ is O.

In an embodiment, each $R^3$ is independently selected from halo, hydroxy, cyano, nitro, (1-4C)alkyl, (1-4C)haloalkyl, (1-4C)alkoxy, phenyl, 5-6 membered heteroaryl and —$NR^{3a}R^{3b}$ where any phenyl and 5-6 membered heteroaryl in $R^3$ is optionally substituted with one or more groups independently selected from halo, hydroxy, cyano, nitro, (1-4C)alkyl, (1-4C)haloalkyl and (1-4C)alkoxy, and where $R^{3a}$ and $R^{3b}$ are independently selected from hydrogen and (1-3C)alkyl. Suitably, each $R^3$ is independently selected from halo, hydroxy, (1-2C)alkyl, (1-2C)haloalkyl, (1-2C) alkoxy and —$NR^{3a}R^{3b}$, where $R^{3a}$ and $R^{3b}$ are independently selected from hydrogen and (1-3C)alkyl. In such an embodiment, each n is independently selected from 0, 1 and 2. Suitably, each n is independently is 0 or 1.

In an embodiment, $L^1$ and $L^2$ are independently selected from absent, halo, nitrate, hydroxy, (1-10C)alkyl, (2-10C) alkenyl, (2-10C)alkynyl, (1-10C)heteroaliphatic, phenyl, 5-6 membered heteroaryl, —O—C(O)—$R^a$, —O—C(O) O—$R^a$, —$OP(O)(R^a)_2$, —$P(O)(OR^a)_2$, —$OR^a$, —O—$S(O)_2$ —$R^a$(e.g. triflate), —O—S(O)—$(R^a)_2$, —O—S(O)—$R^a$, —S(O)—$R^a$, —S—C(O)—$R^a$, —S—C(S)—O—$R^a$, —N(H)$S(O)_2$—$R^a$ (e.g. triflamide), —N—$(S(O)_2$—$R^a)_2$ (e.g. triflimide), —S—$R^a$, —N($R^a$)—C(O)—$R^a$, —C(O)—$N(R^a)_2$, —$N(R^a)_2$ and —O—$Si(R^a)_x(OR^a)_y$ (where x and y are independently 0, 1, 2 or 3, with the proviso that x+y=3), in which any of the said (1-10C)alkyl, (2-10C)alkenyl, (2-10C)alkynyl, (1-10C)heteroaliphatic, phenyl and 5-6 membered heteroaryl within $L^1$ or $L^2$ is optionally substituted with one or more $R^b$; each $R^a$ is independently selected from hydrogen, (1-20C)alkyl, (2-20C)alkenyl, (2-20C)alkynyl, (1-20C)heteroaliphatic, carbocyclyl, heterocyclyl, aryl and heteroaryl, where any (1-20C)alkyl, (2-20C)alkenyl, (2-20C)alkynyl, (1-20C)heteroaliphatic, carbocyclyl, heterocyclyl, aryl or heteroaryl present in $R^a$ is independently substituted with one or more groups independently selected from halo, cyano, nitro, amino, hydroxy, (1-4C)alkyl, (2-4C) alkenyl, (2-4C)alkynyl and (1-4C)alkoxy; each $R^b$ is independently substituted with one or more groups independently selected from halo, amino, hydroxy, (1-4C)alkyl, (1-4C)haloalkyl and (1-4C)alkoxy.

In an embodiment, $L^1$ and $L^2$ are independently selected from absent and —O—C(O)—$R^a$, where $R^a$ is (1-20C)alkyl (e.g. acetate, i.e. "OAc", or stearate) or (2-25C)alkenyl (e.g. oleate). In any of these, $L^1$ and $L^2$ may also be independently selected from O-benzoyl (i.e. "OBz").

In an embodiment, $G^1$ and $G^2$ are absent.

In an embodiment, $W^1$, $W^2$, $W^3$, $W^4$ and $W^5$ are each independently selected from absent and —$CH_2$—, where any —$CH_2$— is optionally substituted with one or two $R^x$;

each $R^2$ is independently selected from absent, hydrogen, (1-3C)alkyl, (2-3C)alkenyl, (2-3C)alkynyl, phenyl, benzyl and —C(O)—$NR^{2a}R^{2b}$, where any phenyl or benzyl in $R^2$ is optionally substituted with one or more groups independently selected from halo, hydroxy, cyano, nitro, (1-4C)alkyl, (1-4C)haloalkyl and (1-4C) alkoxy, and where $R^{2a}$ and $R^{2b}$ are independently selected from hydrogen and (1-3C)alkyl;

each $R^3$ is independently selected from halo, hydroxy, (1-2C)alkyl, (1-2C)haloalkyl, (1-2C)alkoxy and —$NR^{3a}R^{3b}$, where $R^{3a}$ and $R^{3b}$ are independently selected from hydrogen and (1-3C)alkyl; and each n is independently selected from 0, 1 and 2.

In an embodiment, $M^1$ is selected from Co, Fe, Cr, Ni, Al, Ti and Zn; and $M^2$ is selected from Li, Na, K, Rb, Cs, Mg, Ca, Sr, Ba, Y, Ln, Al, Ga and Sn; the group:

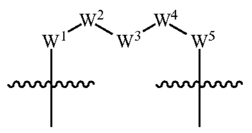

has a structure according to any one of the following:

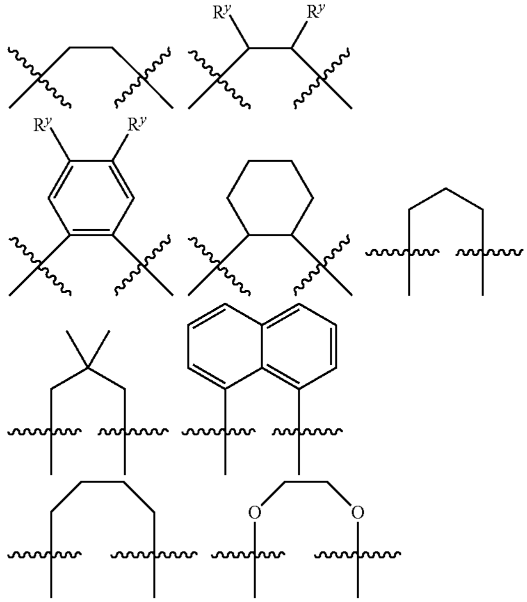

-continued

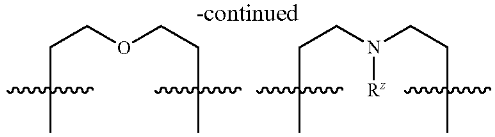

where each $R^y$ is independently selected from hydrogen, halo, cyano, (1-2C)alkyl, (1-2C)alkoxy, (1-2C)haloalkyl, phenyl, —$NH_2$ and $NMe_2$, and $R^Z$ is selected from hydrogen and methyl;

each $R^2$ is independently selected from absent, hydrogen and (1-2C)alkyl;

$E^1$ is C and $E^2$ is O;

each $R^3$ is independently selected from halo, hydroxy, (1-2C)alkyl, (1-2C)haloalkyl, (1-2C)alkoxy and —$NR^{3a}R^{3b}$, where $R^{3a}$ and $R^{3b}$ are independently selected from hydrogen and (1-3C)alkyl;

each n is independently selected from 0, 1 and 2.

In a particular embodiment, the compound of Formula I has a structure according to Formula I-VI (which is a sub-definition of Formula I), shown below:

Formula I-VI

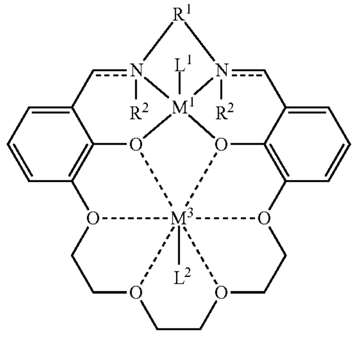

wherein $M^1$, $M^2$, $R^1$, $R^2$, $L^1$, $L^2$ and any sub-groups associated therewith have any of the definitions outlined hereinbefore and/or appearing in the following embodiments:

In an embodiment, $R^1$ has a structure according to any one of the following:

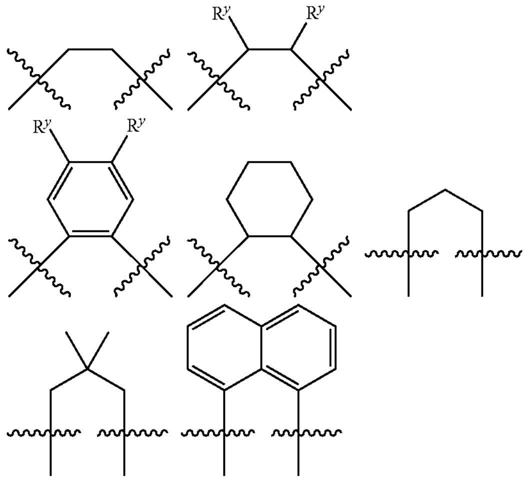

-continued

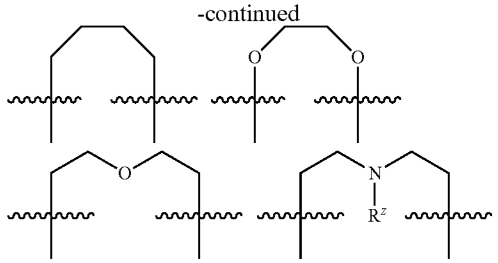

$M^1$ is selected from Co, Fe, Cr, Ni, Al, Ti and Zn;

$M^2$ is selected from Li, Na, K, Rb, Cs, Mg, Ca, Sr, Ba, Y, Ln, Al, Ga and Sn;

$L^1$ and $L^2$ have any of the definitions appearing hereinbefore. Most suitably, at least one of $L^1$ and $L^2$ is acetate and the other is acetate or is absent In an embodiment, $R^1$ has a structure according to any one of the following:

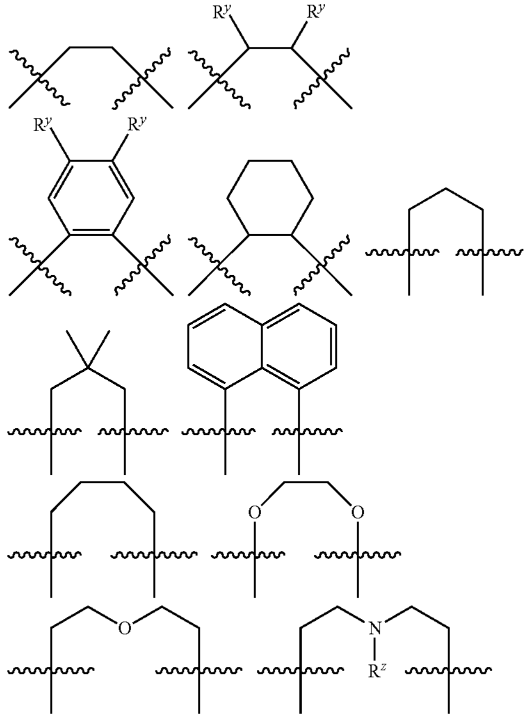

$M^1$ is selected from Co, Fe, Cr, Ni, Al, Ti, Zn and Mg;

$M^2$ is selected from Li, Na, K, Rb, Cs, Mg, Ca, Sr, Ba, Y, Ln, Al, Ga and Sn;

$L^1$ and $L^2$ have any of the definitions appearing hereinbefore. Most suitably, at least one of $L^1$ and $L^2$ is acetate and the other is acetate or is absent In an embodiment, $R^1$ has a structure according to any one of the following:

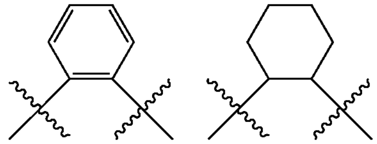

-continued

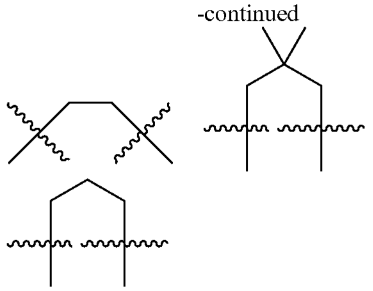

$M^1$ and $M^2$ are respectively Zn and Na, Ni and Na, Mg and Na, Co and Na, Co and Rb, Co and Cs, Zn and Mg, Co and K, Fe and Na, Fe and K, Cr and Na, or Cr and K; and $L^1$ and $L^2$ have any of the definitions appearing hereinbefore. Most suitably, at least one of $L^1$ and $L^2$ is acetate and the other is acetate or is absent.

In an embodiment, $R^1$ has a structure according to any one of the following:

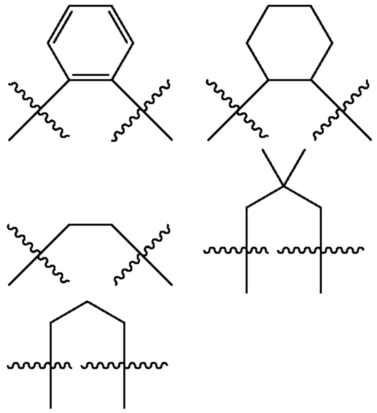

$M^1$ and $M^2$ are respectively Zn and Na, Ni and Na, Mg and Na, Co and Na, Co and Rb, Co and Cs, Zn and Mg, Co and K, Fe and Na, Fe and K, Cr and Na, Cr and K, Al and K, Co and Ca, Co and Sr, or Co and Ba.; and $L^1$ and $L^2$ have any of the definitions appearing hereinbefore. Most suitably, at least one of $L^1$ and $L^2$ is acetate and the other is acetate or is absent.

In a particular embodiment, the compound of Formula I has a structure according to any of the following:

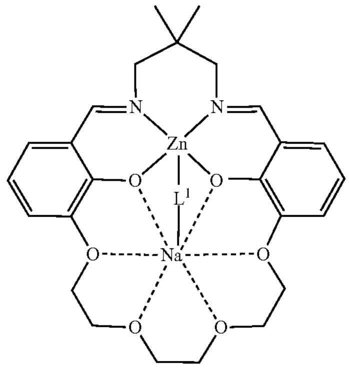

-continued
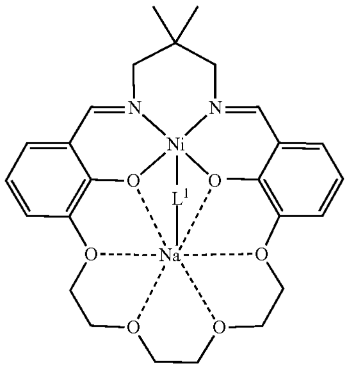
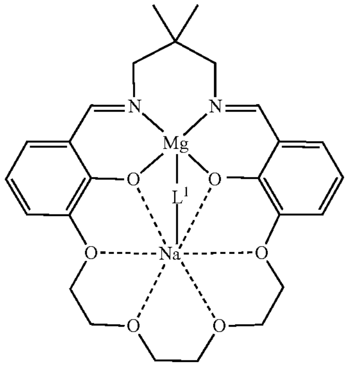
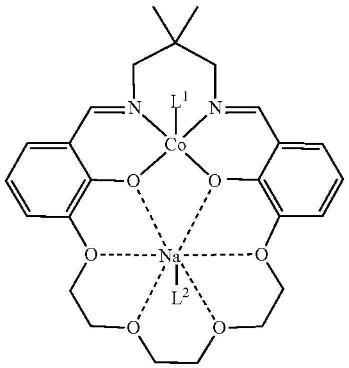
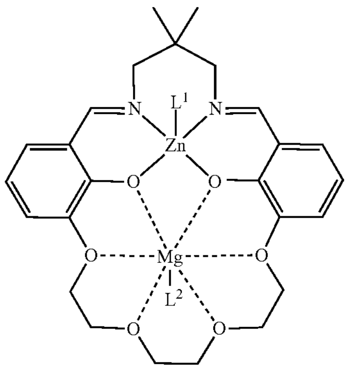
-continued
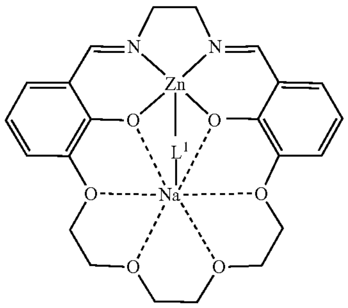
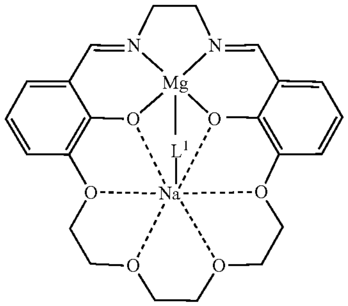
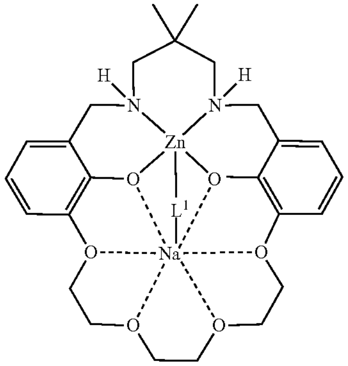
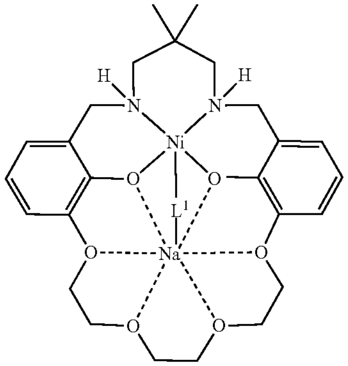
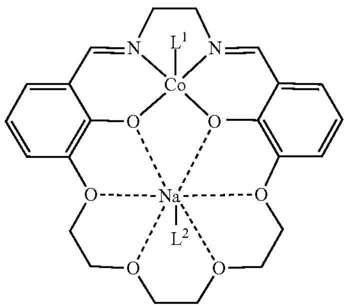

-continued
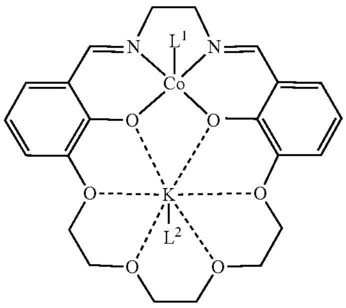
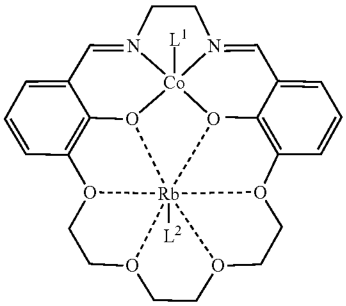
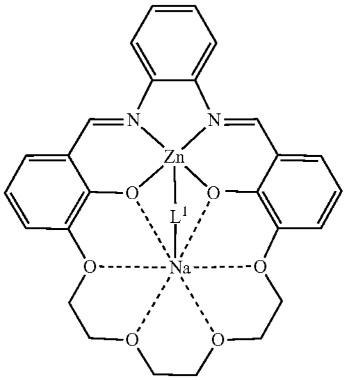
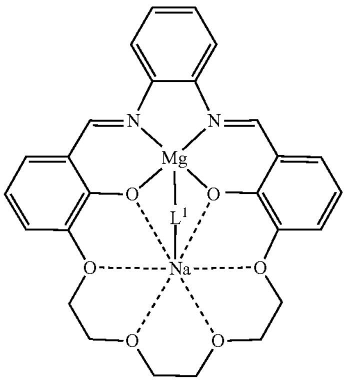
-continued
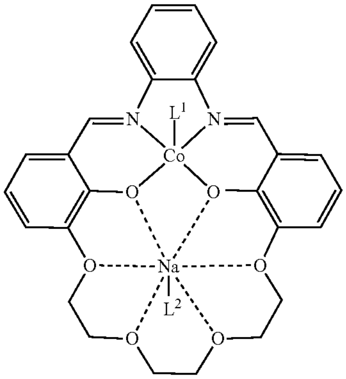
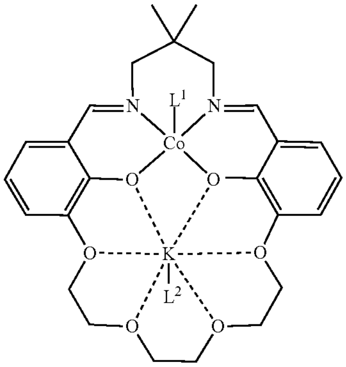
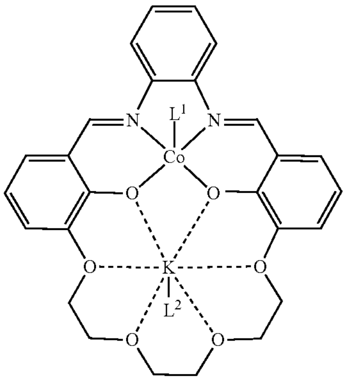
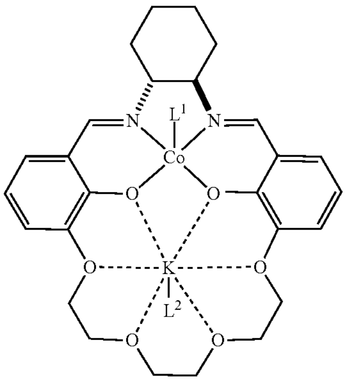

-continued
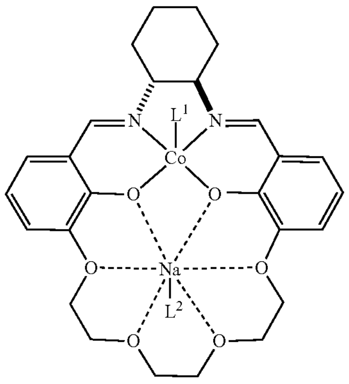
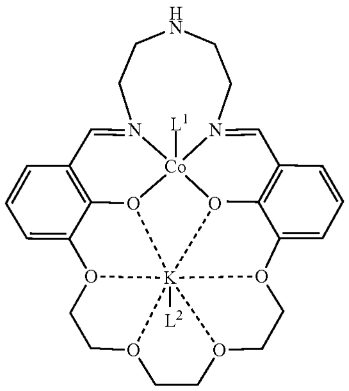
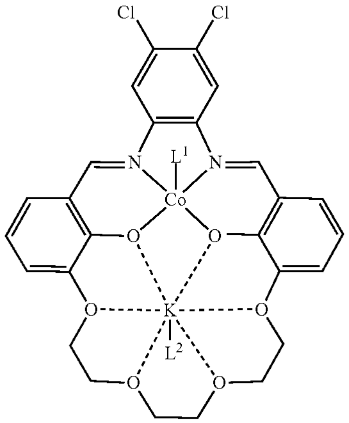
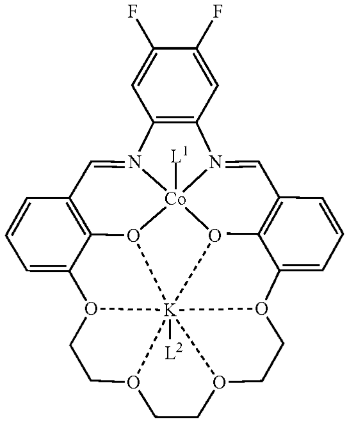
-continued
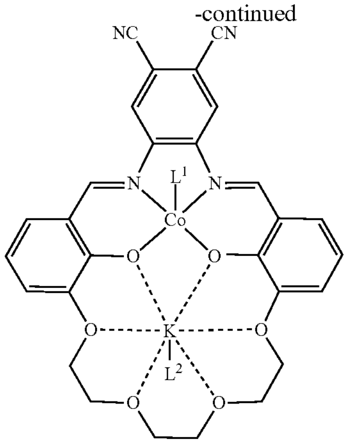
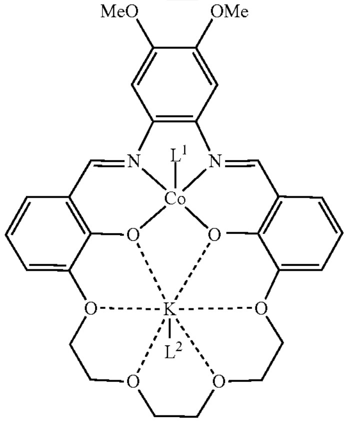
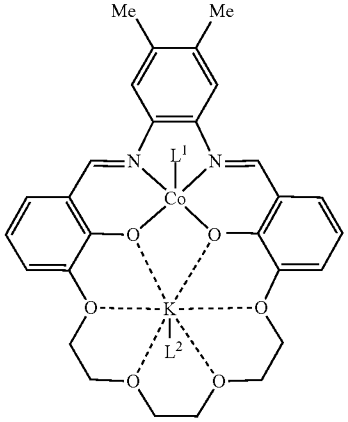
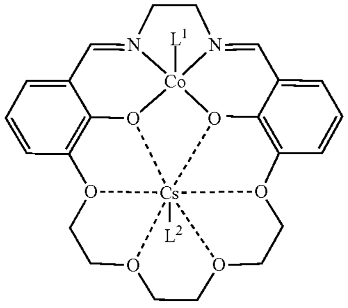
where $L^1$ and $L^2$ are present and have any of the definitions appearing hereinbefore. Most suitably, $L^1$ and $L^2$ are acetate.
It will be understood that $L^1$ and $L^2$ in any of the structures depicted throughout the entirety of the specification can adopt any of the configurations described anywhere herein.

For example, it may be that $L^1$ and $L^2$ are each associated with only one of $M^1$ and $M^2$. $L^1$ (and/or $L^2$) may also be associated with both of $M^1$ and $M^2$, thereby forming a bridge between them. $L^1$ and $L^2$ may both be solely associated with a single metal (e.g. $M^1$, such as Co). $L^1$ (and/or $L^2$), when present, may be associated with metals of two different compounds of Formula I, thus forming a bridge between the two compounds of Formula I. Accordingly, multiple compounds of Formula I can be linked together in this manner via their respective $L^1$ (and/or $L^2$). The same logic applies to $G^1$ and $G^2$, when present.

In a particular embodiment, the compound of Formula I has a structure according to any one of the following:

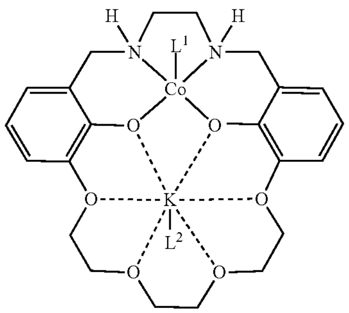

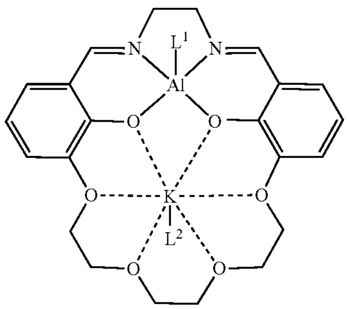

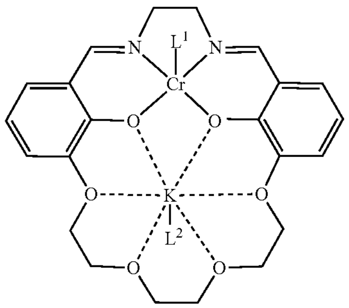

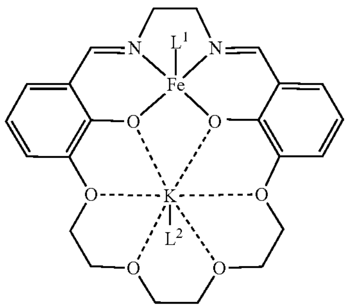

-continued

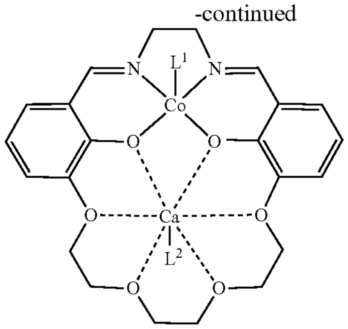

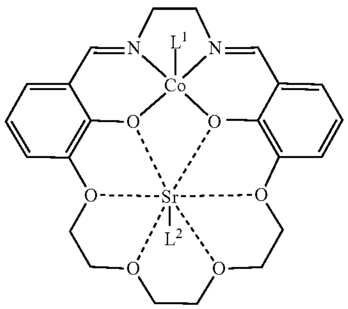

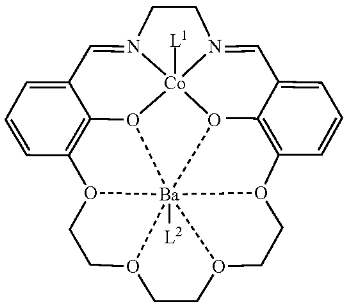

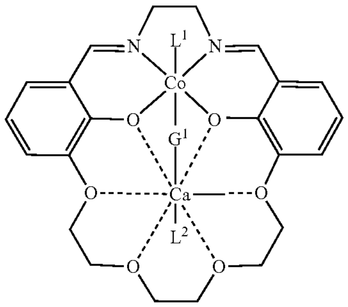

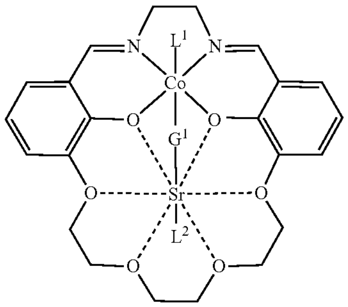

-continued
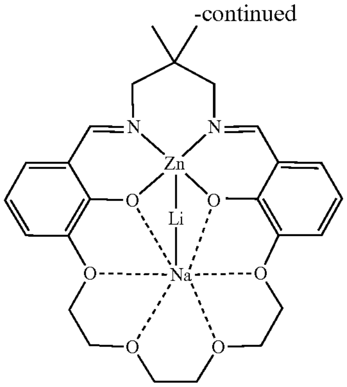
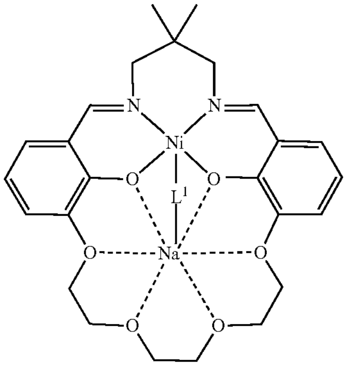
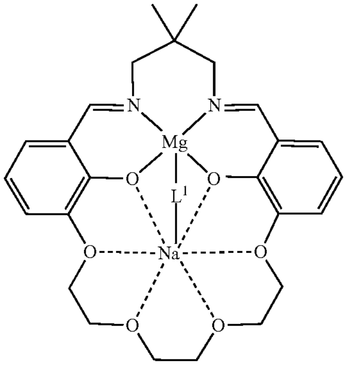
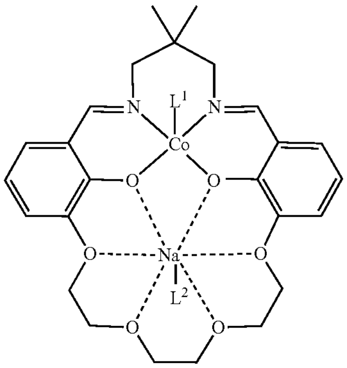
-continued
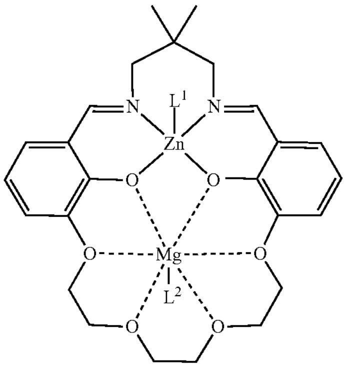
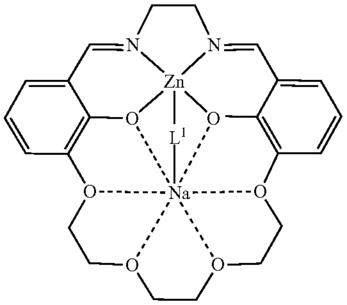
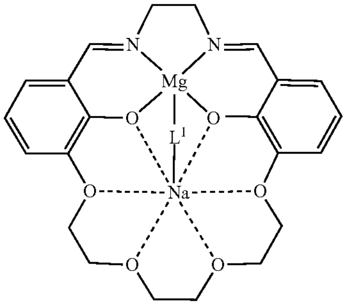
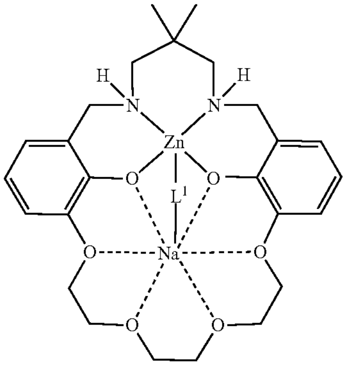
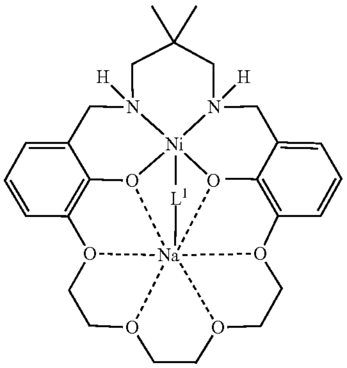

-continued
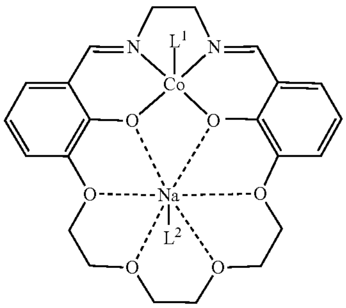
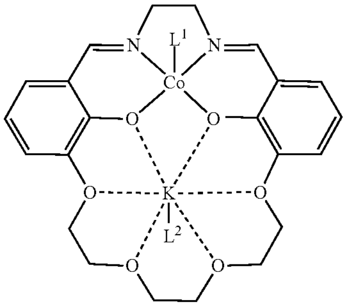
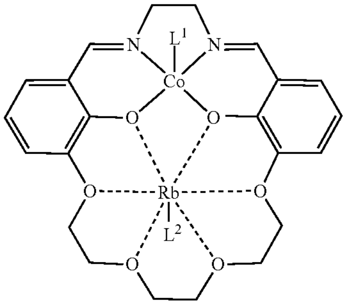
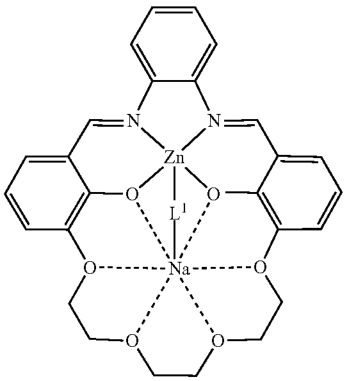
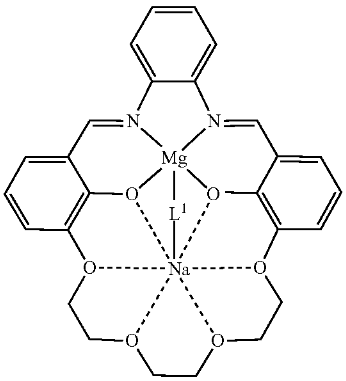
-continued
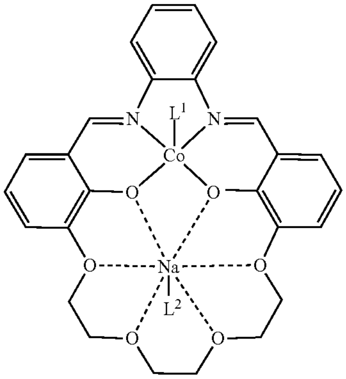
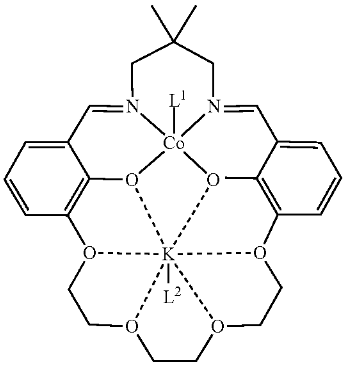
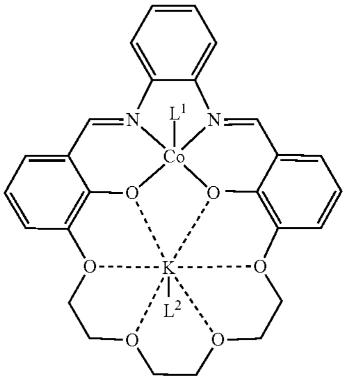
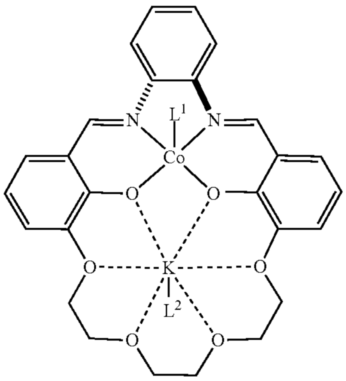

-continued
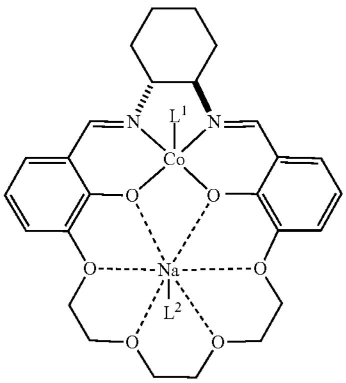
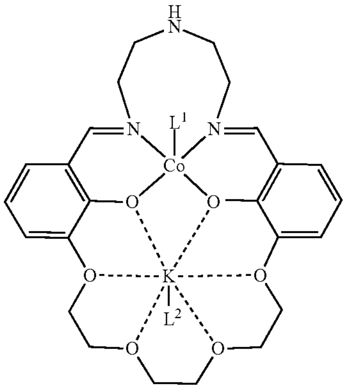
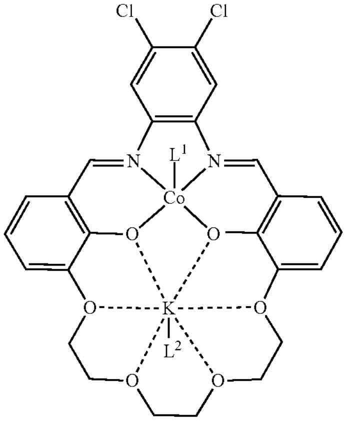
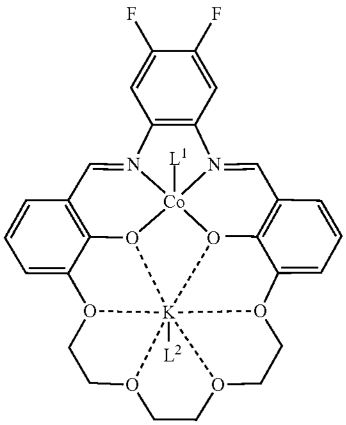
-continued
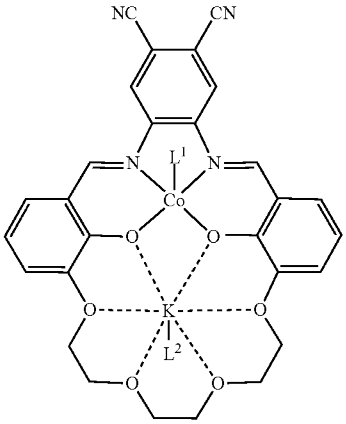
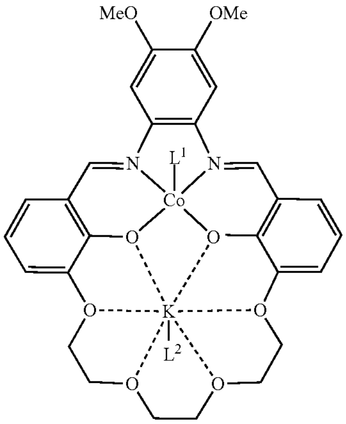
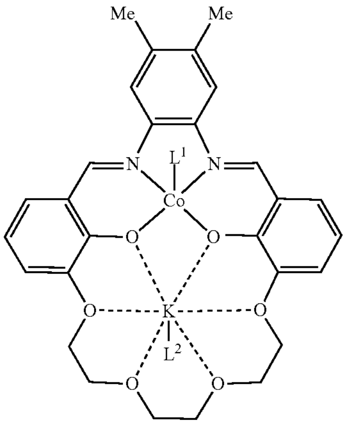
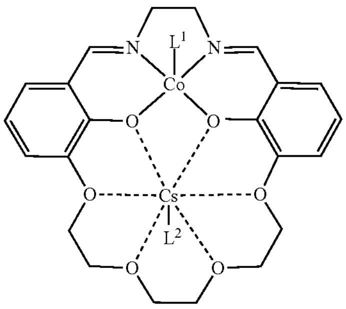

-continued
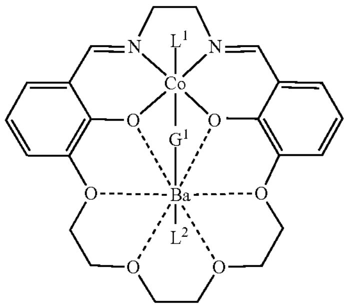
where $L^1$, $L^2$ and $G^1$ are present and have any of the definitions appearing hereinbefore. Most suitably, $L^1$, $L^2$ and $G^1$ are acetate or O-benzoyl.
In a particular embodiment, the compound of Formula I has a structure according to any one of the following:
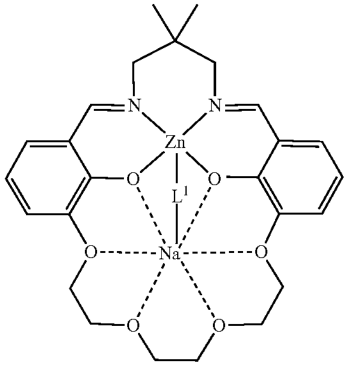
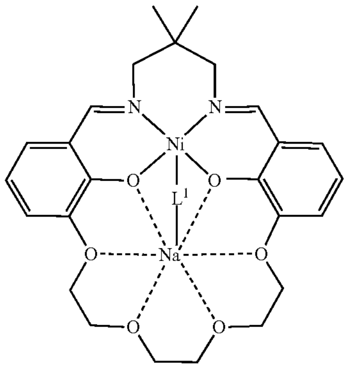
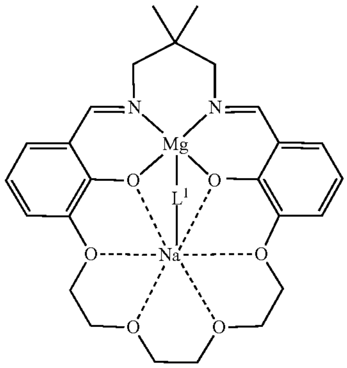
-continued
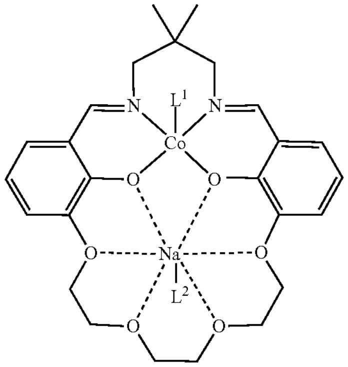
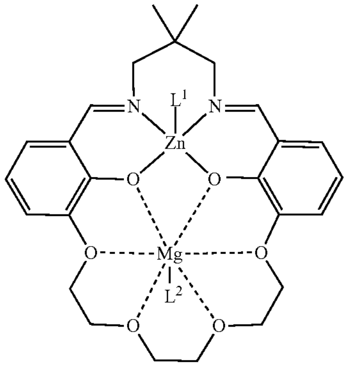
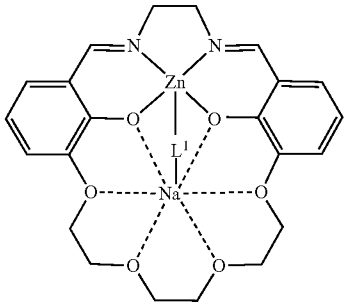
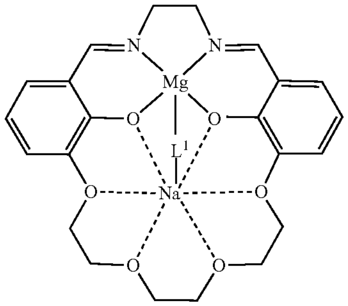
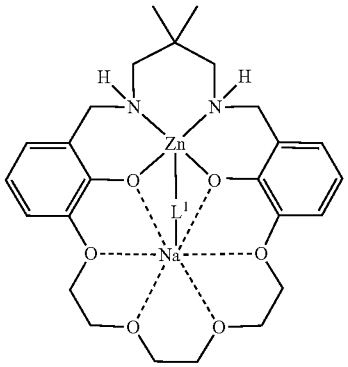

-continued
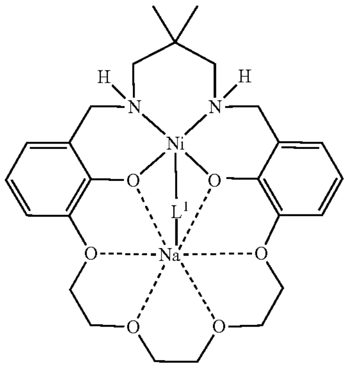
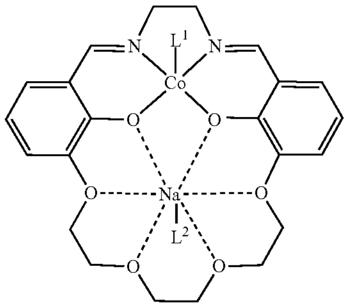
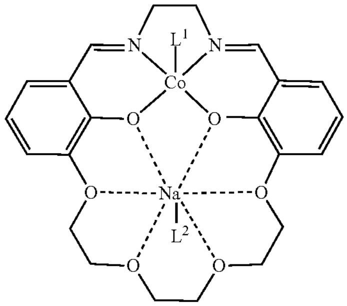
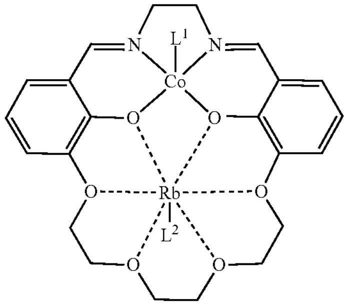
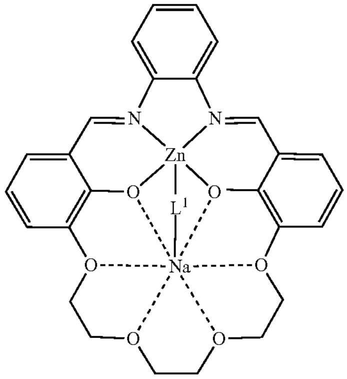
-continued
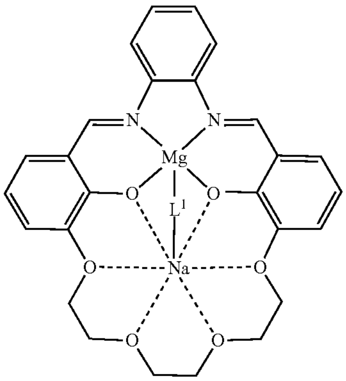
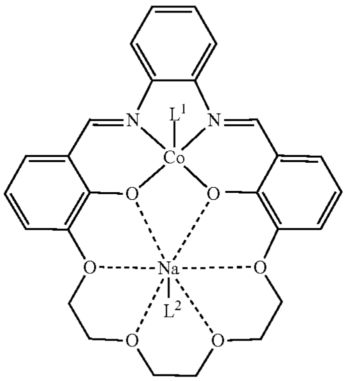
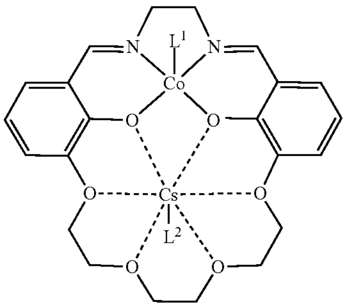
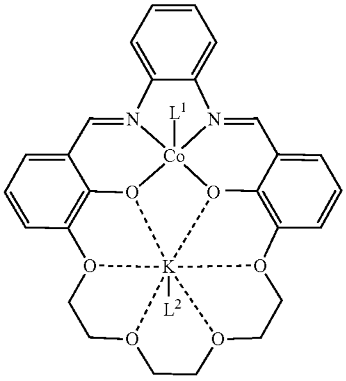

-continued
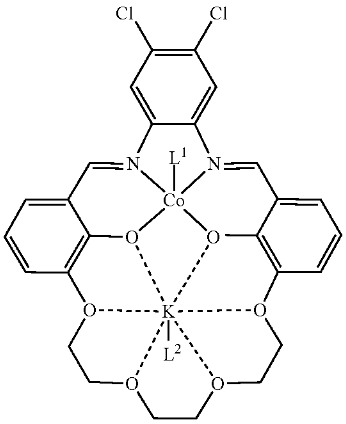
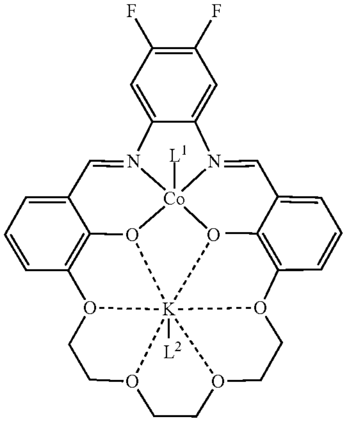
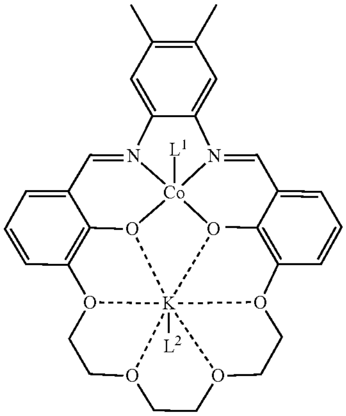
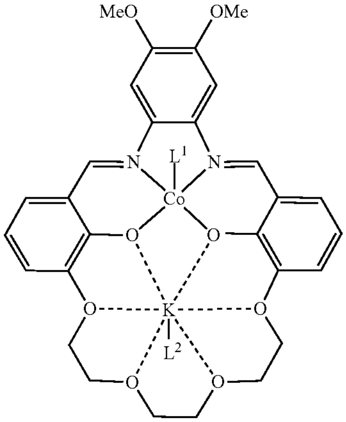
-continued
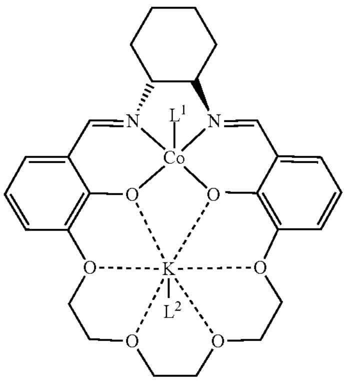
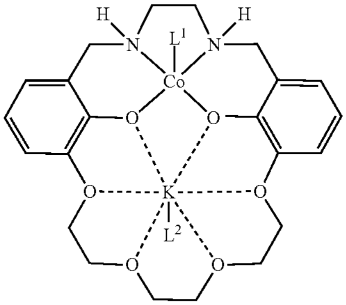
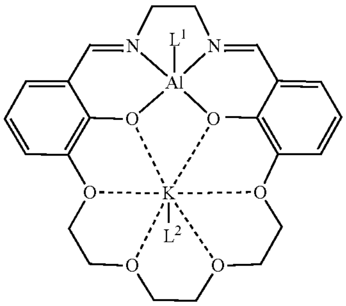
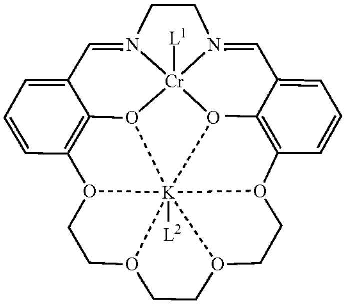
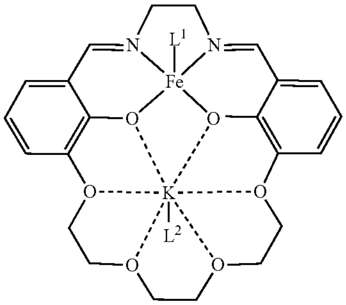

-continued
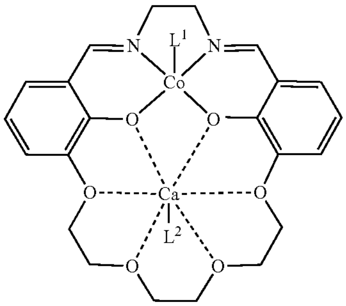
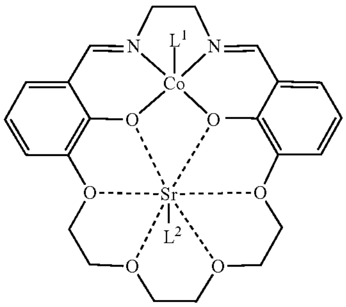
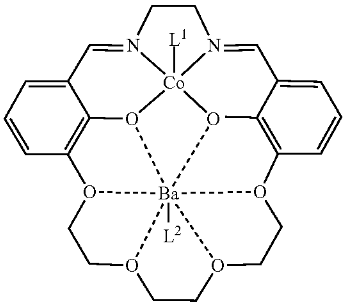
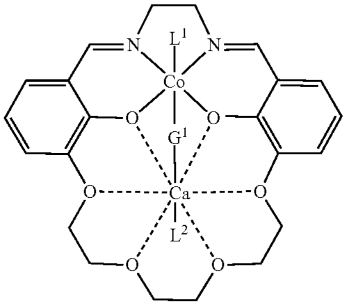
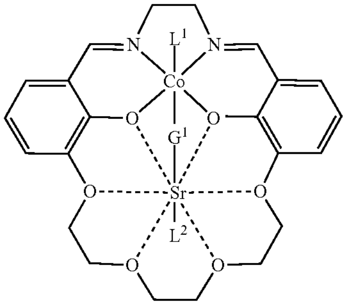
-continued
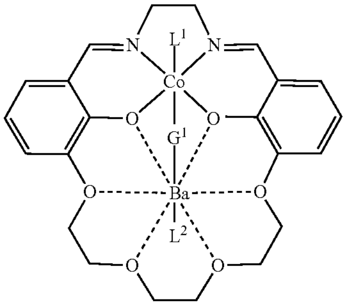
where $L^1$, $L^2$ and $G^1$ are present and have any of the definitions appearing hereinbefore. Most suitably, $L^1$, $L^2$ and G are acetate or O-benzoyl.
Suitably, the compound of Formula I has a structure according to any of the following:
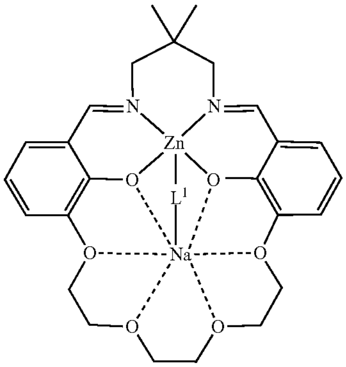
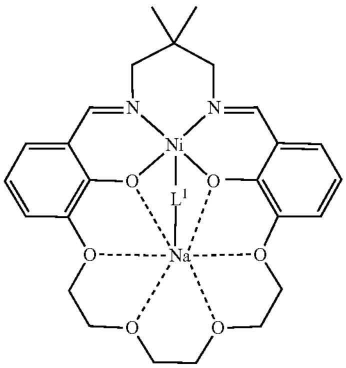
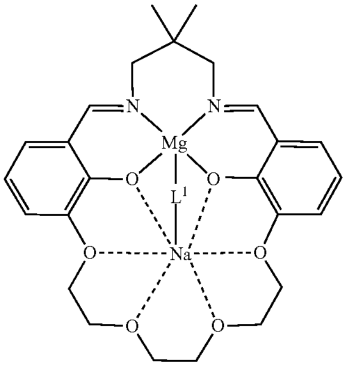

-continued
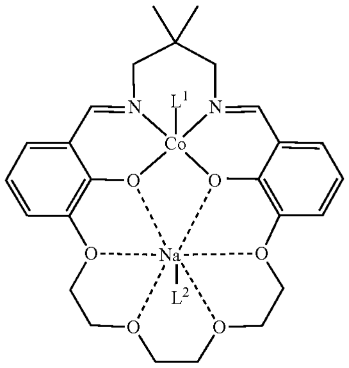
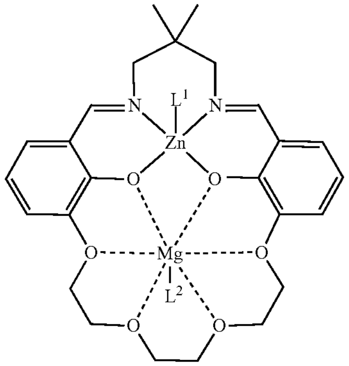
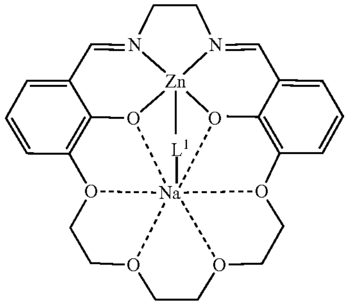
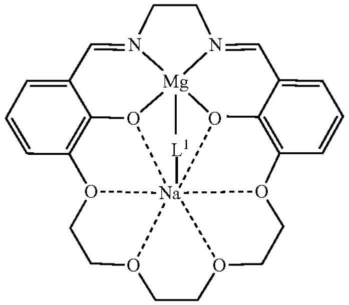
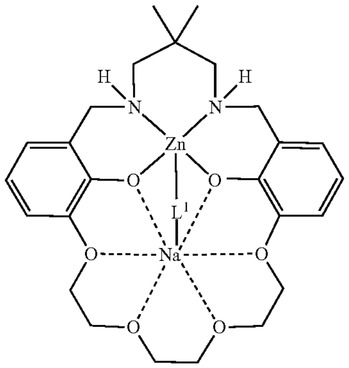
-continued
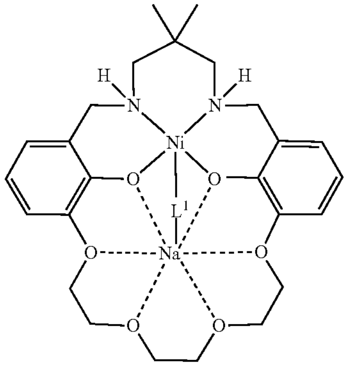
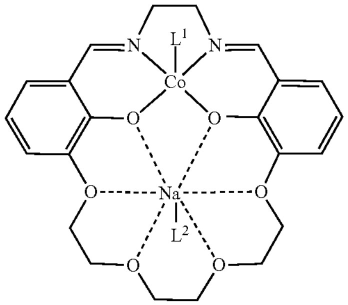
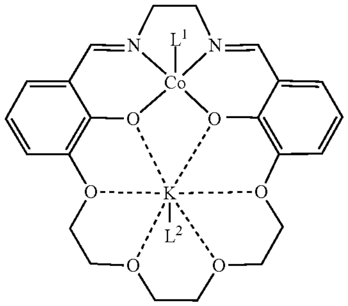
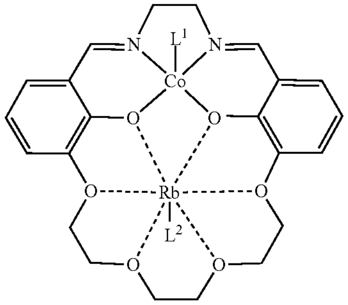
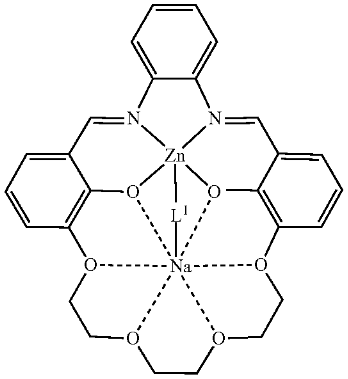

-continued

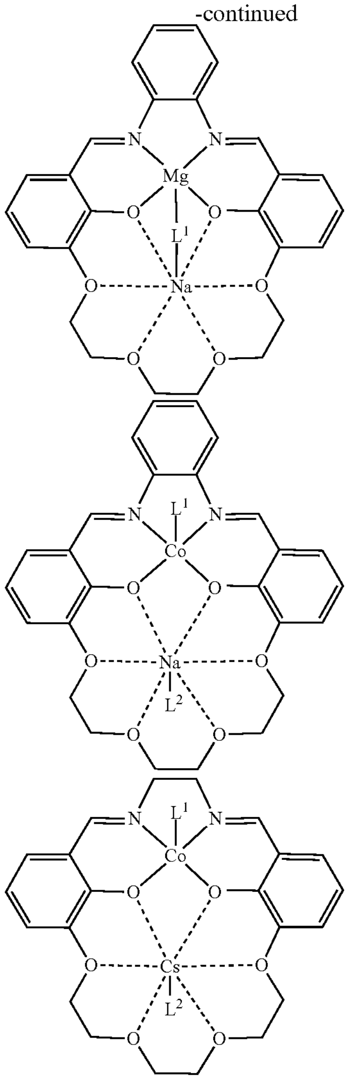

where $L^1$ and $L^2$ and $G^1$ are present and have any of the definitions appearing hereinbefore.

Most suitably, $L^1$ and $L^2$ are acetate or O-benzoyl.

The process of the first aspect invention is a ROCOP process, in which an epoxide is copolymerised with $CO_2$ to form a polycarbonate. Polycarbonates may be viewed as alternating copolymers of ring-opened epoxides and $CO_2$.

In an embodiment in step a), the compound of Formula I is present in an amount of 0.0001-0.5 mol % relative to the number of moles of epoxide. Suitably, in step a), the compound of Formula I is present in an amount of 0.001-0.3 mol % relative to the number of moles of epoxide. More suitably, in step a), the compound of Formula I is present in an amount of 0.01-0.1 mol % relative to the number of moles of epoxide. Yet more suitably, in step a), the compound of Formula I is present in an amount of 0.015-0.05 mol % relative to the number of moles of epoxide. Yet even more suitably, in step a), the compound of Formula I is present in an amount of 0.025 mol % relative to the number of moles of epoxide.

The polymerisation is suitably performed in a solution of the epoxide (i.e. an epoxide dissolved in a suitable solvent), or in neat epoxide, under a gaseous stream of $CO_2$. More suitably, the polymerisation process is performed in neat epoxide under a gaseous stream of $CO_2$.

The term epoxide as used herein refers to any compound comprising an epoxide moiety. The epoxide substrate may contain more than one epoxide moiety, i.e. it may be a bis-epoxide, a tris-epoxide, or a multi-epoxide containing moiety. It will be understood that reactions carried out in the presence of one or more compounds having more than one epoxide moiety may lead to cross-linking in the resulting polymer. It will be understood that the term "an epoxide" is intended to encompass one or more epoxides. In other words, the term "an epoxide" may refer to a single epoxide, or a mixture of two or more different epoxides.

In an embodiment the epoxide is located on a group which is cyclic or acyclic.

In an embodiment the epoxide is selected from cyclohexene oxide, styrene oxide, alkylene oxides (such as ethylene oxide, propylene oxide, vinyl-propylene oxide, and butylene oxide), cyclohexene oxides (such as limonene oxide, $C_{10}H_{16}O$ or 2-(3,4-epoxycyclohexyl)ethyltrimethoxysilane and $C_{11}H_{22}O$), oxiranes (such as oxirane, epichlorohydrin, 2-(2-methoxyethoxy)methyl oxirane, 2-(2-(2-methoxyethoxy)ethoxy)methyl oxirane, 2-(2-(2-(2-methoxyethoxy)ethoxy)ethoxy)methyl oxirane), 1,2-epoxybutane, glycidyl ethers (such as allyl glycidyl ether, tert-butyl glycidyl ether, glycidyl methyl ether, isopropyl glycidyl ether, butyl glycidyl ether, methoxyethyl glycidyl ether, phenyl glycidyl ether, benzyl glycidyl ether, m-tolyl glycidyl ether, glycidyl propargyl ether, beta-chloroethyl glycidyl ether, furfuryl glycidyl ether and tetrahydrofurfuryl glycidyl ether), glycidyl esters (such as glycidyl benzoate), glycidyl carbonates (such as methyl glycidyl carbonate, ethyl glycidyl carbonate and cholesteryl glycidyl carbonate), vinyl-cyclohexene oxide, 3-phenyl-1,2-epoxypropane, 1,2- and 2,3-epoxybutane, isobutylene oxide, cyclopentene oxide, 2,3-epoxy-1,2,3,4-tetrahydronaphthalene, indene oxide, THF-epoxide, and functionalized 3,5-dioxaepoxides and mixtures of two or more thereof. It will be appreciated that any of the aforementioned epoxides may or may not be substituted.

Suitably, the epoxide is selected from ethylene oxide, propylene oxide, vinyl-propylene oxide, butylene oxide, allyl glycidyl ether, tert-butyl glycidyl ether, epichlorohydrin, styrene oxide, cyclohexene oxide, vinyl-cyclohexene oxide, cyclopentene oxide, limonene oxide and mixtures of two or more thereof.

In a particularly suitable embodiment, the epoxide is propylene oxide or cyclohexene oxide.

In a particularly suitable embodiment, the epoxide is propylene oxide. In such embodiments, the product of the polymerisation process is polypropylene carbonate.

The catalytic process for the preparation of a polycarbonate according to the first aspect of the present invention may be optionally carried out in the presence of a chain transfer agent. The catalysts described herein are highly tolerant of chain transfer agents allowing easy access of polyols.

In an embodiment step a) is conducted in the presence of a chain transfer agent. Suitable chain transfer agents will be familiar to one of ordinary skill in the art.

The chain transfer agent may be water or a compound which has one or more groups independently selected from hydroxy, amino and thiol.

In an embodiment the chain transfer agent is selected from the group consisting of water, a mono-alcohol, a diol, a triol, a tetraol, a polyol, a mono-amine, a polyamine, a mono-thiol, a polythiol, a mono-carboxylic acid or a polycarboxylic acid. In an embodiment, the chain transfer agent is selected from the group consisting of water, mono-alcohols (i.e. alcohols with one OH group, for example, 4-ethylbenzenesulfonic acid, methanol, ethanol, propanol, butanol, pentanol, hexanol, phenol, cyclohexanol), diols (for example, 1,2-ethanediol, 1-2-propanediol, 1,3-propanediol, 1,2-butanediol, 1-3-butanediol, 1,4-butanediol, 1,5-pentanediol, 1,6-hexanediol, 1,2-diphenol, 1 3-diphenol, 1,4-diphenol, 1,2-benzenedimethanol, catechol and cyclohexenediol), triols (glycerol, benzenetriol, 1,2,4-butanetriol, tris(methylalcohol)propane, tris(methylalcohol)ethane, tris(methylalcohol)nitropropane, trimethylolpropane, preferably glycerol or benzenetriol), tetraols (for example, calix[4]arene, 2,2-bis(methylalcohol)-1,3-propanediol, di(trimethylolpropane)), polyols (for example, dipentaerythritol, 0-(+)-glucose or D-sorbitol), dihydroxy terminated polyesters (for example polylactic acid), dihydroxy terminated polyethers (for example poly(ethylene glycol)), acids (such as diphenylphosphinic acid), starch, lignin, mono-amines (i.e. methylamine, dimethylamine, ethylamine, diethylamine, propylamine, dipropylamine, butylamine, dibutylamine, pentylamine, dipentylamine, hexylamine, dihexylamine), diamines (for example 1,4-butanediamine), triamines, diamine terminated polyethers, diamine terminated polyesters, mono-carboxylic acids (for example, 3,5-di-tert-butylbenzoic acid), dicarboxylic acids (for example, maleic acid, malonic acid, succinic acid, glutaric acid or terephthalic acid, preferably maleic acid, malonic acid, succinic acid, glutaric acid), tricarboxylic acids (for example, citric acid, 1,3,5-benzenetricarboxylic acid or 1,3,5-cyclohexanetricarboxylic acid, preferably citric acid), mono-thiols, dithoils, trithiols, and compounds having a mixture of hydroxyl, amine, carboxylic acid and thiol groups, for example lactic acid, glycolic acid, 3-hydroxypropionic acid, natural amino acids, unnatural amino acids, monosaccharides, disaccharides, oligosaccharides and polysaccharides (including pyranose and furanose forms), preferably, the chain transfer agent is selected from cyclohexene dial, 1,2,4-butanetriol, tris(methylalcohol)propane, tris(methylalcohol) nitropropane, tris(methylalcohol)ethane, tri(methylalcohol)propane, tri(methylalcohol)butane, pentaerythritol, poly(propylene glycol), glycerol, mono- and diethylene glycol, propylene glycol, 2,2-bis(methylalcohol)-1,3-propanediol, 1,3,5-benzenetricarboxylic acid, 1,3,5-cyclohexanetricarboxylic acid, 1,4-butanediamine, 1,6-hexanediol, D-sorbitol, 1-butylamine, terephthalic acid, D-(+)-glucose, 3,5-di-tert-butylbenzoic acid, and water.

In an embodiment, the chain transfer agent is selected from the group consisting of water, diphenylphosphinic acid, 4-ethylbenzenesulfonic acid, methanol, ethanol, propanol, butanol, pentanol, hexanol, phenol, cyclohexanol, 1,2-cyclohexanediol, 1,2-ethanediol, 1-phenyl-1,2-ethanediol, 1-2-propanediol, 1,3-propanediol, 1,2-butanediol, 1-3-butanediol, 1,4-butanediol, 1,5-pentanediol, 1,6-hexanediol, 1,2-diphenol, 1,3-diphenol, 1,4-diphenol, 1,2-benzenedimethanol, catechol, cyclohexenediol, glycerol, benzenetriol, 1,2,4-butanetriol, tris(methylalcohol)propane, tris(methylalcohol)ethane, tris(methylalcohol)nitropropane, D-(+)-glucose, D-sorbitol, calix[4]arene, 2,2-bis(methylalcohol)-1,3-propanediol, polylactic acid, poly(ethylene glycol), starch, lignin, methylamine, dimethylamine, ethylamine, diethylamine, propylamine, dipropylamine, butylamine, dibutylamine, pentylamine, dipentylamine, hexylamine, dihexylamine, 1,4-butanediamine, 3,5-di-tert-butylbenzoic acid, maleic acid, malonic acid, succinic acid, glutaric acid, terephthalic acid, citric acid, 1,3,5-benzenetricarboxylic acid, 1,3,5-cyclohexanetricarboxylic acid, lactic acid, glycolic acid and 3-hydroxypropionic acid.

In an embodiment, the chain transfer agent is trans 1,2-cyclohexanediol.

In an embodiment, the molar ratio of the chain transfer agent to the catalyst of Formula I is 1:1 to 50:1. Suitably, the molar ratio of the chain transfer agent to the catalyst of Formula I is 3:1 to 30:1. More suitably, the molar ratio of the chain transfer agent to the catalyst of Formula I is 5:1 to 15:1

In an embodiment, the chain transfer agent is absent.

The catalysts of Formula I allow the polymerisation process to be conducted at remarkably low pressures of $CO_2$. In an embodiment, step a) is conducted at a pressure of 1-100 bar $CO_2$. Suitably, step a) is conducted at a pressure of 1-50 bar $CO_2$. More suitably, step a) is conducted at a pressure of 1-30 bar $CO_2$. Even more suitably, step a) is conducted at a pressure of 1-20 bar $CO_2$.

In a particularly suitable embodiment, step a) is conducted at a pressure of 10-20 bar $CO_2$.

In an embodiment, step a) is conducted at a pressure of 1-10 bar $CO_2$.

In an embodiment, step a) is conducted at a temperature of 0-250° C. Suitably, step a) is conducted at a temperature of 0-150° C. More suitably, step a) is conducted at a temperature of 30-120° C. Most suitably, step a) is conducted at a temperature of 40-70° C.

In a particularly suitable embodiment, step a) is conducted at a temperature of 50° C.

In a particularly suitable embodiment, step a) is conducted at a temperature of 100° C.

In an embodiment, step a), the compound of Formula I is present in an amount of 0.0001-0.5 mol % relative to the number of moles of epoxide;

the epoxide is propylene oxide or cyclohexene oxide;

step a) is conducted at a pressure of 10-20 bar $CO_2$; and step a) is conducted at a temperature of 30-120° C.

In an embodiment, step a) is conducted in the presence of a cyclic anhydride. In such embodiments, the resulting polycarbonate will comprise a quantity of polyester. Suitably, the cyclic anhydride comprises a moiety having a structure according to Formula II shown below:

Formula II

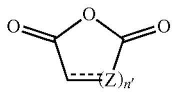

wherein n' is 1, 2, 3, 4, 5 or 6;

each Z is independently C, O, N or S; and is a double bond or a single bond, according to the valency of Z.

Suitably, n' is 1 or 2. Particular, non-limiting examples of the cyclic anhydride are:

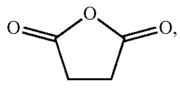 , 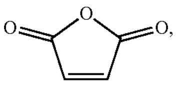 ,

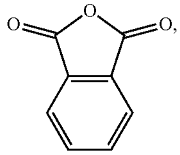 , 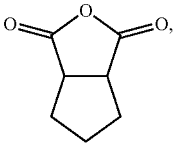 ,

-continued

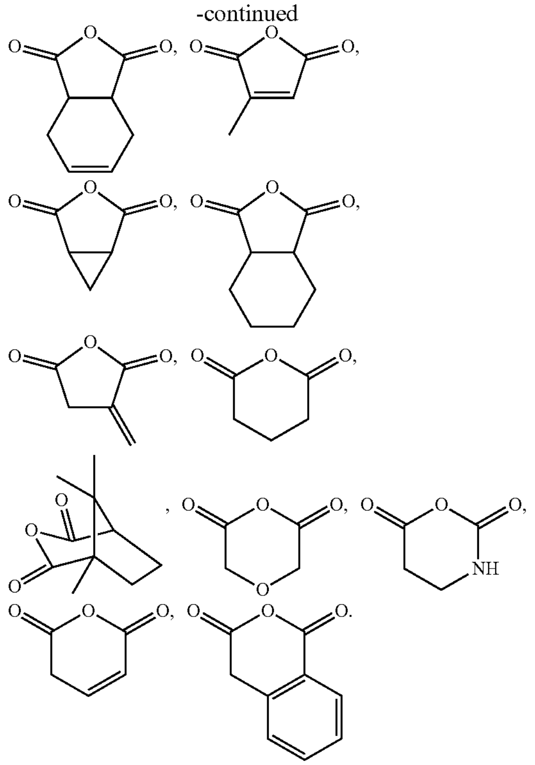

The complexes of Formula I engender both excellent activity and selectivity in the ROCOP of epoxides, without the need for the type of co-catalyst traditionally used with monometallic salen catalysts, such as quaternary ammonium salts. Therefore, in an embodiment, the process is conducted in the absence of a co-catalyst.

The polymer resulting from the polymerisation process is monomodal.

The polymer resulting from the polymerisation process has a polydispersity (0, calculated as described herein) of <1.3.

Catalytic Process for the Preparation of a Polyester

According to a second aspect of the present invention there is provided a process for the preparation of a polyester, the process comprising the following step:

a) contacting at least one epoxide with at least one cyclic anhydride, wherein step a) is conducted in the presence of a compound of Formula I as defined herein.

The inventors have surprisingly discovered that the compounds of Formula I are also active in the ROCOP of epoxides with cyclic anhydrides to yield a polyester.

The compound according to Formula I used in the second aspect of the invention may have any of those definitions recited hereinbefore in relation to the first aspect of the invention, including all definitions outlined in relation to all sub-formulae, as well as any and all specific compounds, which, solely for the sake of brevity, are not repeated below.

The process of the second aspect invention is a ROCOP process, in which an epoxide is copolymerised with a cyclic anhydride to form a polyester.

The cyclic anhydride comprises a moiety having a structure according to Formula II shown below:

Formula II

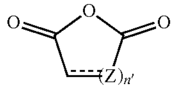

wherein n' is 1, 2, 3, 4, 5 or 6;

each Z is independently C, O, N or S; and

------ is a double bond or a single bond, according to the valency of Z.

Suitably, n' is 1 or 2. Particular, non-limiting examples of the cyclic anhydride are:

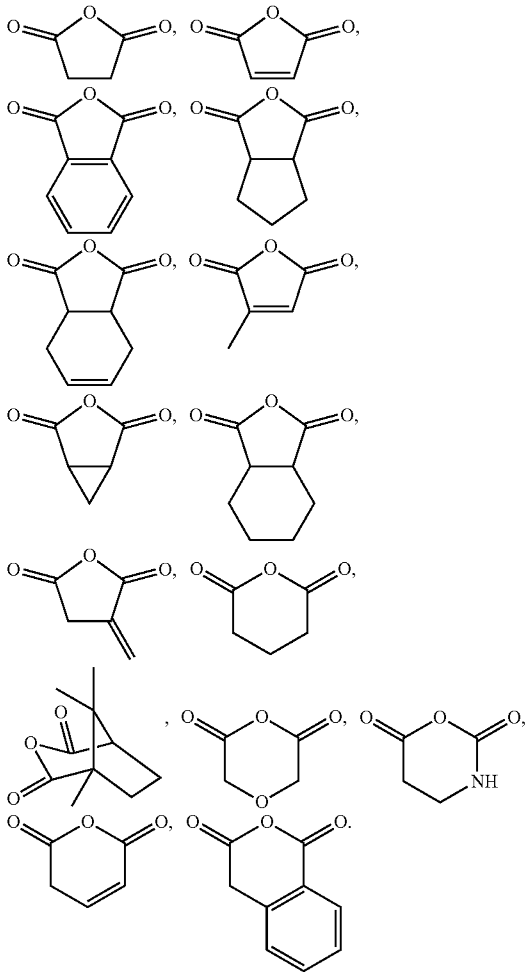

Features of the first aspect of the invention are also features of the second aspect of the invention, including preferred, suitable and optional definitions thereof. These include: the quantity of the compound of Formula I used in step a) relative to the quantity of epoxide: the definition of the epoxide used in step a), the definition and amount of a chain transfer agent used in step a); and the reaction conditions used for step a) (e.g. solvents, temperatures).

Compounds of the Invention

According to a third aspect of the present invention there is provided a compound having a structure according to Formula I as defined herein.

As discussed hereinbefore in relation to the first aspect of the invention, the compounds of Formula I present numerous advantages over those catalysts conventionally used in the ROCOP of epoxides in the presence of $CO_2$. The compounds are also surprisingly active in the ROCOP of epoxides in the presence of cyclic anhydrides to yield polyesters.

The compounds of the invention having a structure according to Formula I may have any of those definitions recited hereinbefore in relation to the first aspect of the invention, including all definitions outlined in relation to all sub-formulae, as well as any and all specific compounds, which, solely for the sake of brevity, are not repeated below.

The following numbered statements 1 to 149 are not claims, but instead describe particular aspects and embodiments of the claimed invention:

1. A process for the preparation of a polycarbonate, the process comprising the following step:
   a) contacting carbon dioxide with at least one epoxide,
   wherein step a) is conducted in the presence of a compound of Formula I shown below:

Formula I

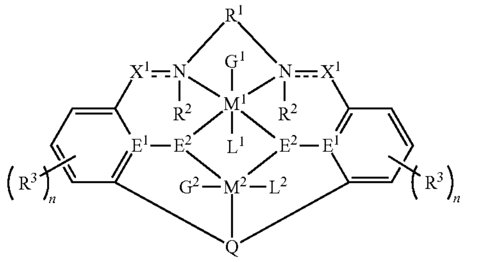

wherein $M^1$ is selected from the group consisting of a group 2 metal, a group 3 metal, a transition metal a group 13 metal, a group 14 metal and a lanthanide;

$M^2$ is selected from a group 1 metal, a group 2 metal, a group 3 metal, a group 13 metal or a lanthanide;

$R^1$ is selected from (2-5C)alkylene, (2-5C)alkenylene and (2-5C)alkynylene, wherein 0, 1 or 2 carbon atoms within any one of the said (2-5C)alkylene, (2-5C) alkenylene and (2-5C)alkynylene is replaced with a heteroatom selected from O and N, and wherein any carbon, O or N atom within the said (2-5C)alkylene, (2-5C)alkenylene and (2-5C)alkynylene may be independently optionally substituted with one or more $R^x$;

each $R^x$ is independently selected from halo, hydroxy, cyano, nitro, (1-20C)alkyl, (2-20C)alkenyl, (2-20C) alkynyl, (1-20C)haloalkyl, (1-20C)alkoxy, aryl, heteroaryl and —$NR^{xa}R^{xb}$, where any aryl or heteroaryl in $R^x$ is optionally substituted with one or more groups independently selected from halo, hydroxy, cyano, nitro, (1-20C)alkyl, (1-20C)haloalkyl and (1-20C) alkoxy, and where $R^{xa}$ and $R^{xb}$ are independently selected from hydrogen and (1-3C)alkyl, and/or two or more $R^x$ located on adjacent atoms are linked to one another, such that when taken in combination with the atoms to which they are attached, they form a monocyclic or bicyclic aromatic, heteroaromatic, carbocyclic or heterocyclic ring system, wherein any of the said monocyclic or bicyclic aromatic, heteroaromatic, carbocyclic or heterocyclic ring system is optionally substituted with one or more groups independently selected from halo, hydroxy, cyano, nitro, (1-20C)alkyl, (1-20C)haloalkyl and (1-20C)alkoxy;

each $R^2$ is independently selected from absent, hydrogen, (1-4C)alkyl, (2-4C)alkenyl, (2-4C)alkynyl, (1-4C)haloalkyl, aryl, aryl(1-2C)alkyl, heteroaryl, heteroaryl(1-2C)alkyl, —C(O)—$R^{2a}$, —C(O)—$OR^{2a}$ and —C(O)—$NR^{2a}R^{2b}$, where any aryl, aryl(1-2C)alkyl, heteroaryl and heteroaryl(1-2C)alkyl in $R^2$ is optionally substituted with one or more groups independently selected from halo, hydroxy, cyano, nitro, (1-4C)alkyl, (1-4C) haloalkyl and (1-4C)alkoxy, and where $R^{2a}$ and $R^{2b}$ are independently selected from hydrogen and (1-3C)alkyl;

each $X^1$ is independently selected from —CH—, —$CR^4$—, —$CH_2$—, —$CHR^4$—, —$CR^4R^4$— and —$PR^4R^4$—, where each $R^4$ is independently selected from (1-4C)alkyl, (2-4C)alkenyl, (2-4C)alkynyl, (1-4C)haloalkyl, aryl, aryl(1-2C)alkyl, heteroaryl and heteroaryl(1-2C)alkyl, where any aryl, aryl(1-2C)alkyl, heteroaryl and heteroaryl(1-2C)alkyl in $R^4$ is optionally substituted with one or more groups independently selected from halo, hydroxy, cyano, nitro, (1-4C)alkyl, (1-4C)haloalkyl and (1-4C)alkoxy;

$E^1$ is C and $E^2$ is O, S or N; or $E^1$ is N and $E^2$ is O;

each $R^3$ is independently selected from halo, hydroxy, cyano, nitro, (1-4C)alkyl, (2-4C)alkenyl, (2-4C)alkynyl, (1-4C)haloalkyl, (1-4C)alkoxy, aryl, aryl(1-2C) alkyl, heteroaryl, heteroaryl(1-2C)alkyl, —C(O)—$R^{3a}$, —C(O)—$OR^3$, —O—C(O)—$R^{3a}$, —C(O)—$NR^{3a}R^{3b}$, —$N(R^{3a})$C(O)—$R^{3b}$ and —$NR^{3a}R^{3b}$, where any aryl, aryl(1-2C)alkyl, heteroaryl and heteroaryl(1-2C)alkyl in $R^3$ is optionally substituted with one or more groups independently selected from halo, hydroxy, cyano, nitro, (1-4C)alkyl, (1-4C)haloalkyl and (1-4C)alkoxy, and where $R^{3a}$ and $R^{3b}$ are independently selected from hydrogen and (1-3C)alkyl;

and/or two $R^3$ located on adjacent atoms are linked to one another, such that when taken in combination with the atoms to which they are attached, they form a monocyclic aromatic, heteroaromatic, carbocyclic or heterocyclic ring system, wherein any of the said monocyclic aromatic, heteroaromatic, carbocyclic or heterocyclic ring system is optionally substituted with one or more groups independently selected from halo, hydroxy, cyano, nitro, (1-4C)alkyl, (1-4C)haloalkyl and (1-4C) alkoxy;

each n is independently selected from 0, 1, 2 and 3;

$L^1$ and $L^2$ are independently selected from absent, halo, nitrate, hydroxy, (1-20C)alkyl, (2-20C)alkenyl, (2-20C)alkynyl, (1-20C)heteroaliphatic, carbocyclyl, carbocyclyl(1-3C)alkyl, heterocyclyl, heterocyclyl(1-3C)alkyl, aryl, aryl(1-3C)alkyl, heteroaryl, heteroaryl (1-3C)alkyl, —O—C(O)—$R^a$, —O—C(O)O—$R^a$, —$OP(O)(R^a)_2$, —$P(O)(OR^a)_2$, —OR a, —O—$S(O)_2$—$R^a$ (e.g. triflate), —O—S(O)—$(R^a)_2$, —O—S(O)—$R^a$, —S(O)—$R^a$, —S—C(O)—$R^a$, —S—C(S)—O—$R^a$, —N(H)$S(O)_2$—$R^a$ (e.g. triflamide), —N—$(S(O)_2$—$R^a)_2$ (e.g. triflimide), —S—$R^a$, —$N(R^a)$—C(O)—$R^a$, —C(O)—$N(R^a)_2$, —$N(R^a)_2$ and —O—$Si(R^a)_x(OR^a)_y$ (where x and y are independently 0, 1, 2 or 3, with the proviso that x+y=3), in which any of the said (1-20C) alkyl, (2-20C)alkenyl, (2-20C)alkynyl, (1-20C)heteroaliphatic, carbocyclyl, carbocyclyl(1-3C)alkyl, heterocyclyl, heterocyclyl(1-3C)alkyl, aryl, aryl(1-3C) alkyl, heteroaryl and heteroaryl(1-3C)alkyl within $L^1$ or $L^2$ is optionally substituted with one or more $R^b$, with the proviso that at least one of $L^1$ and $L^2$ is not absent;

$R^a$ is independently selected from hydrogen, (1-25C)alkyl, (2-25C)alkenyl, (2-25C)alkynyl, (1-25C)heteroaliphatic, carbocyclyl, carbocyclyl(1-3C)alkyl, heterocyclyl, heterocyclyl(1-3C)alkyl, aryl, aryl(1-3C)alkyl, heteroaryl and heteroaryl(1-3C)alkyl, where any (1-25C)alkyl, (2-25C)alkenyl, (2-25C)alkynyl, (1-25C)heteroaliphatic, carbocyclyl, carbocyclyl(1-3C)alkyl, heterocyclyl, heterocyclyl(1-3C)alkyl, aryl, aryl(1-3C)alkyl, heteroaryl or heteroaryl(1-3C)alkyl present in $R^a$ is independently substituted with one or more groups independently selected from halo, cyano, nitro, amino, hydroxy, (1-4C)alkyl, (2-4C)alkenyl, (2-4C)alkynyl and (1-4C)alkoxy;

each $R^b$ is independently substituted with one or more groups independently selected from halo, cyano, nitro, amino, hydroxy, (1-4C)alkyl, (1-4C)haloalkyl, (2-4C)alkenyl, (2-4C)alkynyl and (1-4C)alkoxy;

$G^1$ and $G^2$ are independently selected from absent and a neutral or anionic donor ligand that is a Lewis base;

Q has a structure according to Q-I or Q-II shown below:

Q-I

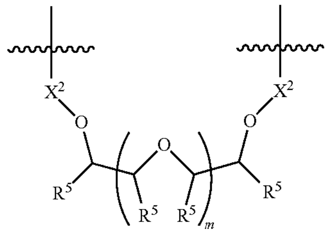

Q-II

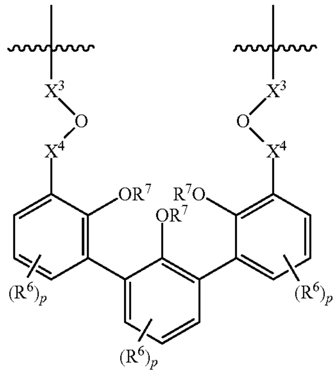

each $X^2$ is independently absent or (1-3C)alkylene, where said (1-3C)alkylene is optionally substituted with 1 or 2 groups independently selected from (1-2C)alkyl;

each $X^3$ is independently absent or (1-3C)alkylene, where said (1-3C)alkylene is optionally substituted with 1 or 2 groups independently selected from (1-2C)alkyl;

each $X^4$ is independently absent or methylene that is optionally substituted with 1 or 2 groups independently selected from (1-2C)alkyl;

m is 1, 2, 3 or 4;

each $R^5$ is independently selected from hydrogen, halo, hydroxy, cyano, nitro, (1-4C)alkyl, (2-4C)alkenyl, (2-4C)alkynyl, (1-4C)haloalkyl, (1-4C)alkoxy, aryl, aryl(1-2C)alkyl, heteroaryl, heteroaryl(1-2C)alkyl, —C(O)—$R^{5a}$, —C(O)—$OR^{5a}$, —O—C(O)—$R^{5a}$, —C(O)—$NR^{5a}R^{5b}$, —$N(R^{5a})C(O)$—$R^{5b}$ and —$NR^{5a}R^{5b}$, where any aryl, aryl(1-2C)alkyl, heteroaryl and heteroaryl(1-2C)alkyl in $R^5$ is optionally substituted with one or more groups independently selected from halo, hydroxy, cyano, nitro, (1-4C)alkyl, (1-4C)haloalkyl and (1-4C)alkoxy, and where $R^{5a}$ and $R^{5b}$ are independently selected from hydrogen and (1-3C)alkyl, and/or two $R^5$ located on adjacent atoms are linked to one another, such that when taken in combination with the atoms to which they are attached, they form a monocyclic aromatic, heteroaromatic, carbocyclic or heterocyclic ring system, wherein any of the said monocyclic aromatic, heteroaromatic, carbocyclic or heterocyclic ring system is optionally substituted with one or more groups independently selected from halo, hydroxy, cyano, nitro, (1-4C)alkyl, (1-4C)haloalkyl and (1-4C)alkoxy;

each $R^6$ is independently selected from halo, hydroxy, cyano, nitro, (1-4C)alkyl, (2-4C)alkenyl, (2-4C)alkynyl, (1-4C)haloalkyl, (1-4C)alkoxy, aryl, aryl(1-2C)alkyl, heteroaryl, heteroaryl(1-2C)alkyl, —C(O)—$R^{6a}$, —C(O)—$OR^{6a}$, —O—C(O)—$R^{6a}$, —C(O)—$NR^{6a}R^{6b}$, —$N(R^{6a})C(O)$—$R^{6b}$ and —$NR^{6a}R^{6b}$, where any aryl, aryl(1-2C)alkyl, heteroaryl and heteroaryl(1-2C)alkyl in $R^6$ is optionally substituted with one or more groups independently selected from halo, hydroxy, cyano, nitro, (1-4C)alkyl, (1-4C)haloalkyl and (1-4C)alkoxy, and where $R^{6a}$ and $R^{6b}$ are independently selected from hydrogen and (1-3C)alkyl, and/or two $R^6$ located on adjacent atoms are linked to one another, such that when taken in combination with the atoms to which they are attached, they form a monocyclic aromatic, heteroaromatic, carbocyclic or heterocyclic ring system, wherein any of the said monocyclic aromatic, heteroaromatic, carbocyclic or heterocyclic ring system is optionally substituted with one or more groups independently selected from halo, hydroxy, cyano, nitro, (1-4C)alkyl, (1-4C)haloalkyl and (1-4C)alkoxy;

each p is independently selected from 0, 1, 2 or 3; and each $R^7$ is independently selected from hydrogen or (1-3C)alkyl.

2. The process according to statement 1, wherein $M^1$ is selected from Co, Fe, Cr, Ni, Al, Ti and Zn.

3. The process according to statement 1, wherein $M^1$ is selected from Co, Fe, Cr, Ni, Mg, Al, Ti and Zn.

4. The process according to statement 1, wherein $M^1$ is selected from Co, Fe, Cr, Ni, Al, Zn and Mg.

5. The process according to statement 1, wherein $M^1$ is selected from Co, Ni, Mg and Zn.

6. The process according to statement 1, wherein $M^1$ is selected from Co, Ni and Zn.

7. The process according to statement 1, wherein $M^1$ is Co.

8. The process according to any preceding statement, wherein $M^2$ is selected from Li, Na, K, Rb, Cs, Mg, Ca, Sr, Ba, Y, Ln, Al, Ga and Sn.

9. The process according to any preceding statement, wherein $M^2$ is selected from Na, K, Rb and Cs.

10. The process according to any preceding statement, wherein $M^2$ is K or Na.

11. The process according to statement 1, wherein $M_1$ is selected from Co, Fe, Cr, Ni, Al, Ti, Zn and Mg; and $M_2$ is selected from Li, Na, K, Rb, Cs, Mg, Ca, Sr, Ba, Y, Ln, Al, Ga and Sn.

12. The process according to statement 1, wherein $M^1$ is selected from Co, Fe, Cr, Ni, Al, Ti and Zn; and $M^2$ is selected from Li, Na, K, Rb, Cs, Mg, Ca, Sr, Ba, Y, Ln, Al, Ga and Sn.
13. The process according to statement 1, wherein $M^1$ is selected from Co, Mg, Fe, Cr, Ni and Zn; and $M^2$ is selected from Na, K, Rb and Cs.
14. The process according to statement 1, wherein $M^1$ is selected from Co, Fe, Cr, Ni and Zn; and $M^2$ is selected from Na, K, Rb and Cs.
15. The process according to statement 1, wherein $M^1$ is selected from Co, Mg, Ni and Zn; and $M^2$ is selected from Na, K, Rb and Cs.
16. The process according to statement 1, wherein $M^1$ is selected from Co, Ni and Zn; and $M^2$ is selected from Na, K, Rb and Cs.
17. The process according to statement 1, wherein $M^1$ is Co and $M^2$ is selected from Na, K, Rb and Cs.
18. The process according to statement 1, wherein $M^1$ and $M^2$ are respectively Zn and Na, Ni and Na, Mg and Na, Co and Na, Co and Rb, Co and Cs, Zn and Mg, Co and K, Fe and Na, Fe and K, Cr and Na, Cr and K, Al and K, Co and Ca, Co and Sr, or Co and Ba.
19. The process according to statement 1, wherein $M^1$ and $M^2$ are respectively Zn and Na, Ni and Na, Mg and Na, Co and Na, Co and Rb, Co and Cs, Zn and Mg, Co and K, Fe and Na, Fe and K, Cr and Na, or Cr and K.
20. The process according to any preceding statement, wherein $R^1$ is (2-5C)alkylene, wherein 0, 1 or 2 carbon atoms within the said (2-5C)alkylene is replaced by a heteroatom selected from O and N, and wherein any carbon, O or N atom within the said (2-5C)alkylene may be independently optionally substituted with one or more $R^x$.
21. The process according to any preceding statement, wherein each $R^x$ is independently selected from halo, hydroxy, cyano, nitro, (1-10C)alkyl, (2-10C)alkenyl, (2-10C)alkynyl, (1-10C)haloalkyl, (1-10C)alkoxy, aryl, heteroaryl and —$NR^{xa}R^{xb}$, where any aryl or heteroaryl in $R^x$ is optionally substituted with one or more groups independently selected from halo, hydroxy, cyano, nitro, (1-10C)alkyl, (1-10C)haloalkyl and (1-10C)alkoxy, and where $R^{xa}$ and $R^{xb}$ are independently selected from hydrogen and (1-3C)alkyl;

and/or two or more $R^x$ located on adjacent atoms are linked to one another, such that when taken in combination with the atoms to which they are attached, they form a monocyclic or bicyclic aromatic, heteroaromatic, carbocyclic or heterocyclic ring system, wherein any of the said monocyclic or bicyclic aromatic, heteroaromatic, carbocyclic or heterocyclic ring system is optionally substituted with one or more groups independently selected from halo, hydroxy, cyano, nitro, (1-10C)alkyl, (1-10C)haloalkyl and (1-10C)alkoxy.

22. The process according to any preceding statement, wherein each $R^x$ is independently selected from halo, hydroxy, cyano, nitro, (1-4C)alkyl, (1-4C)haloalkyl, (1-4C)alkoxy, phenyl, 5-6 membered heteroaryl and —$NR^{xa}R^{xb}$, where any phenyl or 5-6 membered heteroaryl in $R^x$ is optionally substituted with one or more groups independently selected from halo, hydroxy, cyano, nitro, (1-4C)alkyl, (1-4C)haloalkyl and (1-4C) alkoxy, and where $R^{xa}$ and $R^{xb}$ are independently selected from hydrogen and (1-3C)alkyl;

and/or two or more $R^x$ located on adjacent atoms are linked to one another, such that when taken in combination with the atoms to which they are attached, they form a 5-7 membered monocyclic or 8-10 membered bicyclic aromatic, heteroaromatic, carbocyclic or heterocyclic ring system, wherein any of the said 5-7 membered monocyclic or 8-10 membered bicyclic aromatic, heteroaromatic, carbocyclic or heterocyclic ring system is optionally substituted with one or more groups independently selected from halo, hydroxy, cyano, nitro, (1-4C)alkyl, (1-4C)haloalkyl and (1-4C) alkoxy.

23. The process according to any preceding statement, wherein each $R^x$ is independently selected from halo, hydroxy, (1-4C)alkyl, (1-4C)haloalkyl, (1-4C)alkoxy, phenyl, 5-6 membered heteroaryl and —$NR^{xa}R^{xb}$, where any phenyl or 5-6 membered heteroaryl in $R^x$ is optionally substituted with one or more groups independently selected from halo, hydroxy, (1-2C)alkyl, (1-2C)haloalkyl and (1-2C)alkoxy, and where $R^{xa}$ and $R^{xb}$ are independently selected from hydrogen and (1-3C)alkyl;

and/or two or more $R^x$ located on adjacent atoms are linked to one another, such that when taken in combination with the atoms to which they are attached, they form a benzene, cyclohexane or naphthalene group, wherein either of the said benzene, cyclohexane or naphthalene groups is optionally substituted with one or more groups independently selected from halo, hydroxy, (1-2C)alkyl, (1-2C)haloalkyl and (1-2C) alkoxy.

24. The process according to claim 1, wherein $M^1$ is selected from Co, Fe, Cr, Ni, Al, Ti and Zn;

$M^2$ is selected from Na, K, Rb and Cs;

$R^1$ is (2-5C)alkylene, wherein 0, 1 or 2 carbon atoms within the said (2-5C)alkylene is a heteroatom selected from O and N, and wherein any carbon, O or N atom within the said (2-5C)alkylene may be independently optionally substituted with one or more $R^x$; and each $R^x$ is independently selected from halo, hydroxy, (1-4C) alkyl, (1-4C)haloalkyl, (1-4C)alkoxy, phenyl, 5-6 membered heteroaryl and —$NR^{xa}R^{xb}$, where any phenyl or 5-6 membered heteroaryl in $R^x$ is optionally substituted with one or more groups independently selected from halo, hydroxy, (1-2C)alkyl, (1-2C)haloalkyl and (1-2C)alkoxy, and where $R^{xa}$ and $R^{xb}$ are independently selected from hydrogen and (1-3C)alkyl;

and/or two or more $R^x$ located on adjacent atoms are linked to one another, such that when taken in combination with the atoms to which they are attached, they form a benzene, cyclohexane or naphthalene group, wherein either of the said benzene, cyclohexane or naphthalene groups is optionally substituted with one or more groups independently selected from halo, hydroxy, (1-2C)alkyl, (1-2C)haloalkyl and (1-2C) alkoxy.

25. The process according to claim 1, wherein $M^1$ is selected from Co, Mg, Fe, Cr, Ni, Al, Ti and Zn;

$M^2$ is selected from Na, K, Rb and Cs;

$R^1$ is (2-5C)alkylene, wherein 0, 1 or 2 carbon atoms within the said (2-5C)alkylene is a heteroatom selected from 0 and N, and wherein any carbon, 0 or N atom within the said (2-5C)alkylene may be independently optionally substituted with one or more $R^x$; and each $R^x$ is independently selected from halo, hydroxy, (1-4C)alkyl, (1-4C)haloalkyl, (1-4C)alkoxy, phenyl, 5-6 membered heteroaryl and —$NR^{xa}R^{xb}$, where any phenyl or 5-6 membered heteroaryl in $R^x$ is optionally substituted with one or more groups independently selected from halo, hydroxy, (1-2C)alkyl, (1-2C)haloalkyl and (1-2C)alkoxy, and where $R^{xa}$ and $R^{xb}$ are independently selected from hydrogen and (1-3C)alkyl;

and/or two or more $R^x$ located on adjacent atoms are linked to one another, such that when taken in combination with the atoms to which they are attached, they form a benzene, cyclohexane or naphthalene group, wherein either of the said benzene, cyclohexane or naphthalene groups is optionally substituted with one or more groups independently selected from halo, hydroxy, (1-2C)alkyl, (1-2C)haloalkyl and (1-2C) alkoxy.

26. The process according to any preceding statement, wherein $R^1$ has a structure according to Formula A shown below:

Formula A

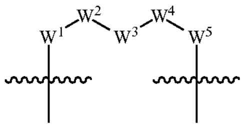

wherein $W^1$, $W^2$, $W^3$, $W^4$ and $W^5$ are each independently selected from absent, —$CH_2$—, —NH— and —O—, with the provisos that:

i) no more than 3 of $W^1$, $W^2$, $W^3$, $W^4$ and $W^5$ are absent, ii) at least 2 of $W^1$, $W^2$, $W^3$, $W^4$ and $W^5$ are —$CH_2$—, and iii) —NH— is not adjacent —O—;

and any —$CH_2$— is optionally substituted with one or two $R^x$, and any —NH— is optionally substituted with one $R^x$.

27. The process according to statement 26, wherein at least 3 of $W^1$, $W^2$, $W^3$, $W^4$ and $W^5$ are —$CH_2$—.

28. The process according to statement 26 or 27, wherein $W^1$, $W^2$, $W^3$, $W^4$ and $W^5$ are each independently selected from absent and —$CH_2$—, where any —$CH_2$— is optionally substituted with one or two $R^x$.

29. The process according to any preceding statement, wherein $R^1$ has a structure according to any one of the following:

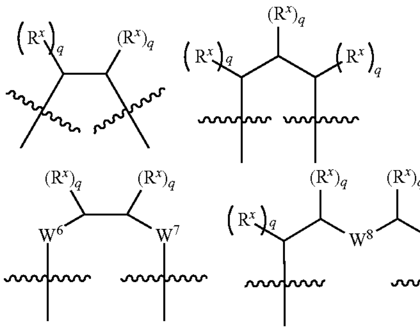

wherein both of $W^6$ and $W^7$ are —O— or both of $W^6$ and $W^7$ are —$CH_2$—, where each —$CH_2$— may be independently substituted with one or two $R^x$;

$W^6$ is —O— or —NH—, where —NH— may be substituted with $R^x$; and each q is 0, 1 or 2.

30. The process according to statement 29, wherein when $W^6$ and $W^7$ are —$CH_2$—, each —$CH_2$— may be independently substituted with one $R^x$.

31. The process according to statement 29 or 30, wherein each q is 0 or 1.

32. The process according to claim 1, wherein $M^1$ is selected from Co, Fe, Cr, Ni, Al, Ti and Zn; and $M^2$ is selected from Li, Na, K, Rb, Cs, Mg, Ca, Sr, Ba, Y, Ln, Al, Ga and Sn;

$R^1$ has a structure according to any one of the following:

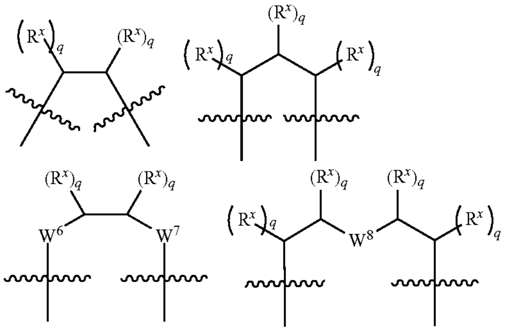

wherein both of $W^6$ and $W^7$ are —O— or both of $W^6$ and $W^7$ are —$CH_2$—, where each —$CH_2$— may be independently substituted with one or two $R^x$;

$W^6$ is —O— or —NH—, where —NH— may be substituted with $R^x$;

each $R^x$ is independently selected from halo, hydroxy, (1-4C)alkyl, (1-4C)haloalkyl, (1-4C)alkoxy, phenyl, 5-6 membered heteroaryl and —$NR^{xa}R^{xb}$, where any phenyl or 5-6 membered heteroaryl in $R^x$ is optionally substituted with one or more groups independently selected from halo, hydroxy, (1-2C)alkyl, (1-2C)haloalkyl and (1-2C)alkoxy, and where $R^{xa}$ and $R^{xb}$ are independently selected from hydrogen and (1-3C)alkyl;

and/or two or more $R^x$ located on adjacent atoms are linked to one another, such that when taken in combination with the atoms to which they are attached, they form a benzene, cyclohexane or naphthalene group, wherein either of the said benzene, cyclohexane or naphthalene groups is optionally substituted with one or more groups independently selected from halo, hydroxy, (1-2C)alkyl, (1-2C)haloalkyl and (1-2C) alkoxy; and each q is 0 or 1.

33. The process according to claim 1, wherein $M^1$ is selected from Co, Mg, Fe, Cr, Ni, Al, Ti and Zn; and $M^2$ is selected from Li, Na, K, Rb, Cs, Mg, Ca, Sr, Ba, Y, Ln, Al, Ga and Sn;

$R^1$ has a structure according to any one of the following:

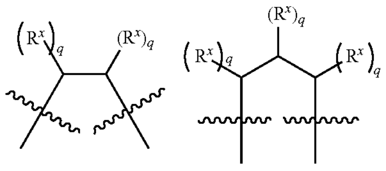

-continued

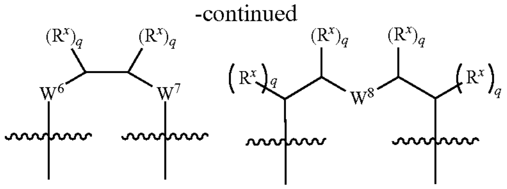

wherein both of $W^6$ and $W^7$ are —O— or both of $W^6$ and $W^7$ are —$CH_2$—, where each —$CH_2$— may be independently substituted with one or two $R^x$;

$W^8$ is —O— or —NH—, where —NH— may be substituted with $R^x$;

each $R^x$ is independently selected from halo, hydroxy, (1-4C)alkyl, (1-4C)haloalkyl, (1-4C)alkoxy, phenyl, 5-6 membered heteroaryl and —$NR^{xa}R^{xb}$, where any phenyl or 5-6 membered heteroaryl in $R^x$ is optionally substituted with one or more groups independently selected from halo, hydroxy, (1-2C)alkyl, (1-2C)haloalkyl and (1-2C)alkoxy, and where $R^{xa}$ and $R^{xb}$ are independently selected from hydrogen and (1-3C)alkyl;

and/or two or more $R^x$ located on adjacent atoms are linked to one another, such that when taken in combination with the atoms to which they are attached, they form a benzene, cyclohexane or naphthalene group, wherein either of the said benzene, cyclohexane or naphthalene groups is optionally substituted with one or more groups independently selected from halo, hydroxy, (1-2C)alkyl, (1-2C)haloalkyl and (1-2C) alkoxy; and each q is 0 or 1.

34. The process according to any preceding statement, wherein $R^1$ has a structure according to any one of the following:

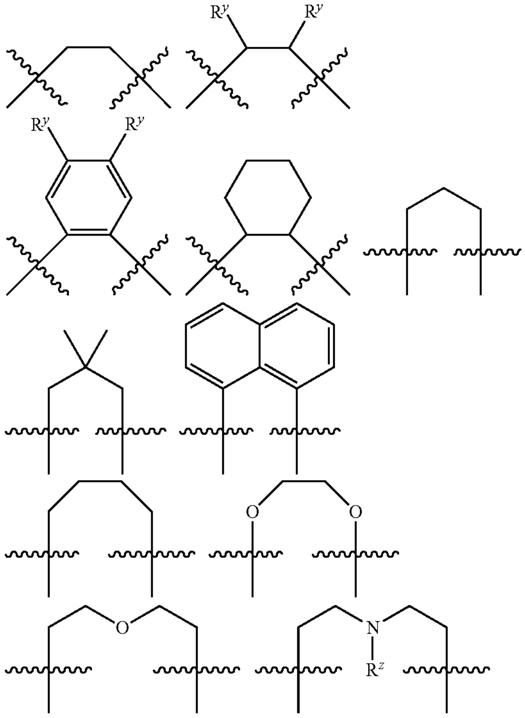

wherein each $R^y$ is independently selected from hydrogen, halo, cyano, (1-4C)alkyl, (1-4C)alkoxy, (1-4C)haloalkyl, phenyl, —$NH_2$ and $NMe_2$; and $R^z$ is selected from hydrogen and (1-2C)alkyl.

35. The process according to statement 34, wherein each $R^y$ is independently selected from hydrogen, halo, cyano, (1-2C)alkyl, (1-2C)alkoxy, (1-2C)haloalkyl, phenyl, —$NH_2$ and $NMe_2$, and $R^z$ is selected from hydrogen and methyl.

36. The process according to any preceding statement, wherein $R^1$ has a structure according to any one of the following:

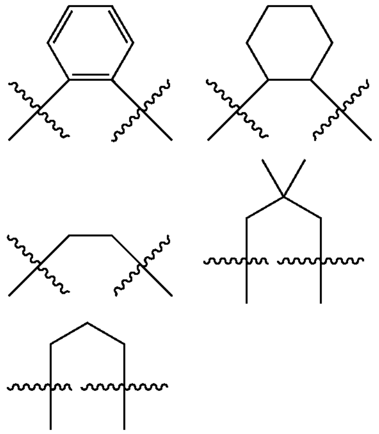

37. The process according to claim 1, wherein $M^1$ and $M^2$ are respectively Zn and Na, Ni and Na, Mg and Na, Co and Na, Co and Rb, Co and Cs, Zn and Mg, Co and K, Fe and Na, Fe and K, Cr and Na, or Cr and K; and $R^1$ has a structure according to any one of the following:

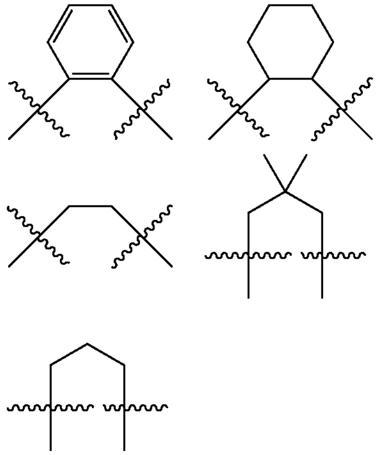

38. The process according to claim 1, wherein $M^1$ and $M^2$ are respectively Zn and Na, Ni and Na, Mg and Na, Co and Na, Co and Rb, Co and Cs, Zn and Mg, Co and K, Fe and Na, Fe and K, Cr and Na, Cr and K, Al and K, Co and Ca, Co and Sr, or Co and Ba; and $R^1$ has a structure according to any one of the following:

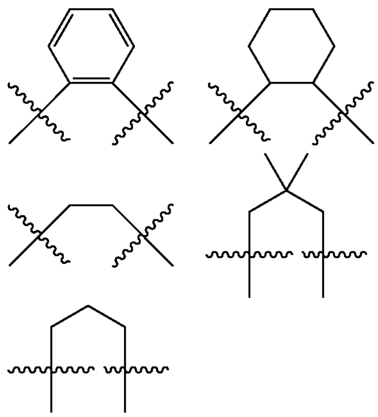

39. The process according to any preceding statement, wherein $R^1$ has a structure according to any one of the following:

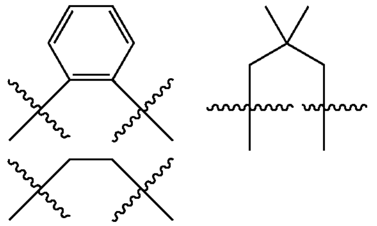

40. The process according to any preceding statement, wherein each $R^2$ is independently selected from absent, hydrogen, (1-4C)alkyl, (2-4C)alkenyl, (2-4C)alkynyl, phenyl, phenyl(1-2C)alkyl, 5-6 membered heteroaryl, 5-6 membered heteroaryl(1-2C)alkyl and —C(O)—$NR^{2a}R^{2b}$, where any phenyl, phenyl(1-2C)alkyl, 5-6 membered heteroaryl, 5-6 membered heteroaryl(1-2C) alkyl in $R^2$ is optionally substituted with one or more groups independently selected from halo, hydroxy, cyano, nitro, (1-4C)alkyl, (1-4C)haloalkyl and (1-4C) alkoxy, and where $R^{2a}$ and $R^{2b}$ are independently selected from hydrogen and (1-3C)alkyl.

41. The process according to any preceding statement, wherein each $R^2$ is independently selected from absent, hydrogen, (1-3C)alkyl, (2-3C)alkenyl, (2-3C)alkynyl, phenyl, benzyl and —C(O)—$NR^{2a}R^{2b}$, where any phenyl or benzyl in $R^2$ is optionally substituted with one or more groups independently selected from halo, hydroxy, cyano, nitro, (1-4C)alkyl, (1-4C)haloalkyl and (1-4C)alkoxy, and where $R^{2a}$ and $R^{2b}$ are independently selected from hydrogen and (1-3C)alkyl.

42. The process according to any preceding statement, wherein each $R^2$ is independently selected from absent, hydrogen, (1-3C)alkyl, phenyl, benzyl and —C(O)—$NR^{2a}R^{2b}$, where any phenyl or benzyl in $R^2$ is optionally substituted with one or more groups independently selected from halo, hydroxy, cyano, nitro, (1-4C)alkyl, (1-4C)haloalkyl and (1-4C)alkoxy, and where $R^{2a}$ and $R^{2b}$ are independently selected from hydrogen and (1-2C)alkyl.

43. The process according to any preceding statement, wherein each $R^2$ is independently selected from absent, hydrogen, (1-3C)alkyl, phenyl, benzyl and —C(O)—$NR^{2a}R^{2b}$, where any phenyl or benzyl in $R^2$ is optionally substituted with one or more groups independently selected from halo, hydroxy, (1-2C)alkyl, (1-2C)haloalkyl and (1-2C)alkoxy, and where $R^{2a}$ and $R^{2b}$ are independently selected from hydrogen and (1-2C)alkyl.

44. The process according to any preceding statement, wherein each $R^2$ is independently selected from absent, hydrogen and (1-2C)alkyl.

45. The process according to any preceding statement, wherein each $R^2$ is independently selected from absent or hydrogen.

46. The process according to any preceding statement, wherein each $X^1$ is independently selected from —CH—, —$CR^4$—, —$CH_2$—, —$CHR^4$—, —$CR^4R^4$— and —$PR^4R^4$—, where each $R^4$ is independently selected from (1-4C)alkyl, phenyl and phenyl(1-2C) alkyl, where any phenyl and phenyl(1-2C)alkyl in $R^4$ is optionally substituted with one or more groups independently selected from halo, hydroxy, cyano, nitro, (1-4C)alkyl, (1-4C)haloalkyl and (1-4C)alkoxy.

47. The process according to any preceding statement, wherein each $X^1$ is independently selected from —CH—, —$CR^4$—, —$CH_2$—, —$CHR^4$—, —$CR^4R^4$— and —$PR^4R^4$—, where each $R^4$ is independently selected from (1-2C)alkyl and phenyl, where any phenyl in $R^4$ is optionally substituted with one or more groups independently selected from halo, hydroxy, cyano, nitro, (1-2C)alkyl, (1-2C)haloalkyl and (1-2C) alkoxy.

48. The process according to any preceding statement, wherein each $X^1$ is independently selected from —CH—, —$CR^4$—, —$CH_2$—, —$CHR^4$— and —$CR^4R^4$, where each $R^4$ is independently selected from (1-2C)alkyl and phenyl, where any phenyl in $R^4$ is optionally substituted with one or more groups independently selected from halo, hydroxy, (1-2C)alkyl, (1-2C)haloalkyl and (1-2C)alkoxy.

49. The process according to any preceding statement, wherein each $X^1$ is independently selected from —CH—, —$CR^4$—, —$CH_2$—, —$CHR^4$— and —$CR^4R^4$, where each $R^4$ is independently (1-2C)alkyl.

50. The process according to any preceding statement, wherein each $X^1$ is independently selected from —CH— or —$CH_2$—.

51. The process according to claim 1, 24, 32 or 37, wherein $R^2$ is independently selected from absent, hydrogen, (1-3C)alkyl, phenyl, benzyl and —C(O)—$NR^{2a}R^{2b}$, where any phenyl or benzyl in $R^2$ is optionally substituted with one or more groups independently selected from halo, hydroxy, (1-2C)alkyl, (1-2C)haloalkyl and (1-2C)alkoxy, and where $R^{2a}$ and $R^{2b}$ are independently selected from hydrogen and (1-2C)alkyl; and each $X^1$ is independently selected from —CH—, —$CR^4$—, —$CH_2$—, —$CHR^4$— and —$CR^4R^4$, where each $R^4$ is independently selected from (1-2C)alkyl and phenyl, where any phenyl in $R^4$ is optionally substituted with one or more groups independently selected from halo, hydroxy, (1-2C)alkyl, (1-2C)haloalkyl and (1-2C)alkoxy.

52. The process according to any preceding statement, wherein $E^1$ is C and $E^2$ is O, S or N; or $E^1$ is N and $E^2$ is O.

53. The process according to any preceding statement, wherein $E^1$ is C and $E^2$ is O.

54. The process according to any preceding statement, wherein each $R^3$ is independently selected from halo, hydroxy, cyano, nitro, (1-4C)alkyl, (2-4C)alkenyl, (2-4C)alkynyl, (1-4C)haloalkyl, (1-4C)alkoxy, aryl, aryl(1-2C)alkyl, heteroaryl, heteroaryl(1-2C)alkyl, —C(O)—$R^{5a}$, —C(O)—O$R^{3a}$, —O—C(O)—$R^{3a}$, —C(O)—N$R^{3a}R^{3b}$, —N($R^{3a}$)C(O)—$R^{3b}$ and —N$R^{3a}R^{3b}$, where any aryl, aryl(1-2C)alkyl, heteroaryl and heteroaryl(1-2C)alkyl in $R^3$ is optionally substituted with one or more groups independently selected from halo, hydroxy, cyano, nitro, (1-4C)alkyl, (1-4C)haloalkyl and (1-4C)alkoxy, and where $R^{3a}$ and $R^{3b}$ are independently selected from hydrogen and (1-3C)alkyl.
55. The process according to any preceding statement, wherein each $R^3$ is independently selected from halo, hydroxy, cyano, nitro, (1-4C)alkyl, (2-4C)alkenyl, (2-4C)alkynyl, (1-4C)haloalkyl, (1-4C)alkoxy, aryl, aryl(1-2C)alkyl, 5-6 membered heteroaryl, 5-6 membered heteroaryl(1-2C)alkyl and —N$R^{3a}R^{3b}$, where any aryl, aryl(1-2C)alkyl, 5-6 membered heteroaryl, 5-6 membered heteroaryl(1-2C)alkyl in $R^3$ is optionally substituted with one or more groups independently selected from halo, hydroxy, cyano, nitro, (1-4C)alkyl, (1-4C)haloalkyl and (1-4C)alkoxy, and where $R^{3a}$ and $R^{3b}$ are independently selected from hydrogen and (1-3C)alkyl.
56. The process according to any preceding statement, wherein each $R^3$ is independently selected from halo, hydroxy, cyano, nitro, (1-4C)alkyl, (1-4C)haloalkyl, (1-4C)alkoxy, phenyl, 5-6 membered heteroaryl and —N$R^{3a}R^{3b}$, where any phenyl and 5-6 membered heteroaryl in $R^3$ is optionally substituted with one or more groups independently selected from halo, hydroxy, cyano, nitro, (1-4C)alkyl, (1-4C)haloalkyl and (1-4C)alkoxy, and where $R^{3a}$ and $R^{3b}$ are independently selected from hydrogen and (1-3C)alkyl.
57. The process according to any preceding statement, wherein each $R^3$ is independently selected from halo, hydroxy, cyano, nitro, (1-2C)alkyl, (1-2C)haloalkyl, (1-2C)alkoxy, phenyl and —N$R^{3a}R^{3b}$, where any phenyl in $R^3$ is optionally substituted with one or more groups independently selected from halo, hydroxy, (1-2C)alkyl, (1-2C)haloalkyl and (1-2C)alkoxy, and where $R^{3a}$ and $R^{3b}$ are independently selected from hydrogen and (1-3C)alkyl.
58. The process according to any preceding statement, wherein each $R^3$ is independently selected from halo, hydroxy, (1-2C)alkyl, (1-2C)haloalkyl, (1-2C)alkoxy and —N$R^{3a}R^{3b}$, where $R^{3a}$ and $R^{3b}$ are independently selected from hydrogen and (1-3C)alkyl.
59. The process according to any preceding statement, wherein each n is independently selected from 0, 1, 2 and 3.
60. The process according to any preceding statement, wherein each n is independently selected from 0, 1 and 2.
61. The process according to any preceding statement, wherein each n is independently selected from 0 and 1.
62. The process according to any preceding statement, wherein when n is 1, $R^3$ is meta to the $X^1$.
63. The process according to any preceding statement, wherein each n is 0.
64. The process according to claim 1, 24, 32, 37 or 51, wherein each $R^3$ is independently selected from halo, hydroxy, (1-2C)alkyl, (1-2C)haloalkyl, (1-2C)alkoxy and —N$R^{3a}R^{3b}$, where $R^{3a}$ and $R^{3b}$ are independently selected from hydrogen and (1-3C)alkyl;

each n is independently selected from 0 or 1; and when n is 1, $R^3$ is meta to the $X^1$.

65. The process according to any preceding statement, wherein $L^1$ and $L^2$ are independently selected from absent, halo, nitrate, hydroxy, (1-18C)alkyl, (2-18C)alkenyl, (2-18C)alkynyl, (1-18C)heteroaliphatic, carbocyclyl, heterocyclyl, aryl, aryl(1-3C)alkyl, heteroaryl, heteroaryl(1-3C)alkyl, —O—C(O)—$R^a$, —O—C(O)O—$R^a$, —OP(O)($R^a$)$_2$, —P(O)(O$R^a$)$_2$, —O$R^a$, —O—S(O)$_2$—$R^a$ (e.g. triflate), —O—S(O)—($R^a$)$_2$, —O—S(O)—$R^a$, —S(O)—$R^a$, —S—C(O)—$R^a$, —S—C(S)—O—$R^a$, —N(H)S(O)$_2$—$R^a$ (e.g. triflamide), —N—(S(O)$_2$—$R^a$)$_2$ (e.g. triflimide), —S—$R^a$, —N($R^a$)—C(O)—$R^a$, —C(O)—N($R^a$)$_2$, —N($R^a$)$_2$ and —O—Si($R^a$)$_x$(O$R^a$)$_y$ (where x and y are independently 0, 1, 2 or 3, with the proviso that x+y=3), in which any of the said (1-18C)alkyl, (2-18C)alkenyl, (2-18C)alkynyl, (1-18C)heteroaliphatic, carbocyclyl, heterocyclyl, aryl, aryl(1-3C)alkyl, heteroaryl and heteroaryl(1-3C)alkyl within $L^1$ or $L^2$ is optionally substituted with one or more $R^b$.
66. The process according to any preceding statement, wherein $L^1$ and $L^2$ are independently selected from absent, halo, nitrate, hydroxy, (1-15C)alkyl, (2-15C)alkenyl, (2-15C)alkynyl, (1-15C)heteroaliphatic, carbocyclyl, heterocyclyl, aryl, heteroaryl, —O—C(O)—$R^a$, —O—C(O)O—$R^a$, —OP(O)($R^a$)$_2$, —P(O)(O$R^a$)$_2$, —O$R^a$, —O—S(O)$_2$—$R^a$ (e.g. triflate), —O—S(O)—($R^a$)$_2$, —O—S(O)—$R^a$, —S(O)—$R^a$, —S—C(O)—$R^a$, —S—C(S)—O—$R^a$, —N(H)S(O)$_2$—$R^a$ (e.g. triflamide), —N—(S(O)$_2$—$R^a$)$_2$ (e.g. triflimide), —S—$R^a$, —N($R^a$)—C(O)—$R^a$, —C(O)—N($R^a$)$_2$, —N($R^a$)$_2$ and —O—Si($R^a$)$_x$(O$R^a$)$_y$ (where x and y are independently 0, 1, 2 or 3, with the proviso that x+y=3), in which any of the said (1-15C)alkyl, (2-15C)alkenyl, (2-15C)alkynyl, (1-15C)heteroaliphatic, carbocyclyl, heterocyclyl, aryl and heteroaryl within $L^1$ or $L^2$ is optionally substituted with one or more $R^b$.
67. The process according to any preceding statement, wherein $L^1$ and $L^2$ are independently selected from absent, halo, nitrate, hydroxy, (1-10C)alkyl, (2-10C)alkenyl, (2-10C)alkynyl, (1-10C)heteroaliphatic, phenyl, 5-6 membered heteroaryl, —O—C(O)—$R^a$, —O—C(O)O—$R^a$, —OP(O)($R^a$)$_2$, —P(O)(O$R^a$)$_2$, —O$R^a$, —O—S(O)$_2$—$R^a$ (e.g. triflate), —O—S(O)—($R^a$)$_2$, —O—S(O)—$R^a$, —S(O)—$R^a$, —S—C(O)—$R^a$, —S—C(S)—O—R a, —N(H)S(O)$_2$—$R^a$ (e.g. triflamide), —N—(S(O)$_2$—$R^a$)$_2$ (e.g. triflimide), —S—$R^a$, —N($R^a$)—C(O)—$R^a$, —C(O)—N($R^a$)$_2$, —N($R^a$)$_2$ and —O—Si($R^a$)$_x$(O$R^a$)$_y$ (where x and y are independently 0, 1, 2 or 3, with the proviso that x+y=3), in which any of the said (1-10C)alkyl, (2-10C)alkenyl, (2-10C)alkynyl, (1-10C)heteroaliphatic, phenyl and 5-6 membered heteroaryl within $L^1$ or $L^2$ is optionally substituted with one or more $R^b$.
68. The process according to any one of statement 65 to 67, wherein $R^a$ is independently selected from hydrogen, (1-22C)alkyl, (2-22C)alkenyl, (2-22C)alkynyl, (1-22C)heteroaliphatic, carbocyclyl, heterocyclyl, aryl, and heteroaryl, where any (1-22C)alkyl, (2-22C)alkenyl, (2-22C)alkynyl, (1-22C)heteroaliphatic, carbocyclyl, heterocyclyl, aryl, and heteroaryl present in $R^a$ is independently substituted with one or more groups independently selected from halo, cyano, nitro, amino, hydroxy, (1-4C)alkyl, (2-4C)alkenyl, (2-4C)alkynyl and (1-4C)alkoxy.

69. The process according to any one of statement 65 to 67, wherein $R^a$ is independently selected from hydrogen, (1-20C)alkyl, (2-20C)alkenyl, (2-20C)alkynyl, (1-20C)heteroaliphatic, carbocyclyl, heterocyclyl, aryl and heteroaryl, where any (1-20C)alkyl, (2-20C)alkenyl, (2-20C)alkynyl, (1-20C)heteroaliphatic, carbocyclyl, heterocyclyl, aryl or heteroaryl present in $R^a$ is independently substituted with one or more groups independently selected from halo, cyano, nitro, amino, hydroxy, (1-4C)alkyl, (2-4C)alkenyl, (2-4C)alkynyl and (1-4C)alkoxy.

70. The process according to any one of statement 65 to 67, wherein each $R^a$ is independently selected from hydrogen, (1-6C)alkyl, (2-6C)alkenyl, (2-6C)alkynyl, (1-6C)heteroaliphatic, phenyl and 5-6 membered heteroaryl, where any (1-6C)alkyl, (2-6C)alkenyl, (2-6C) alkynyl, (1-6C)heteroaliphatic, phenyl or 5-6 membered heteroaryl present in $R^a$ is independently substituted with one or more groups independently selected from halo, amino, hydroxy, (1-2C)alkyl and (1-4C)alkoxy.

71. The process according to any one of statements 65 to 70, wherein each $R^b$ is independently substituted with one or more groups independently selected from halo, cyano, nitro, amino, hydroxy, (1-4C)alkyl, (1-4C)haloalkyl and (1-4C)alkoxy 72. The process according to any one of statements 65 to 71, wherein each $R^b$ is independently substituted with one or more groups independently selected from halo, amino, hydroxy, (1-4C)alkyl, (1-4C)haloalkyl and (1-4C)alkoxy.

73. The process according to any preceding statement, wherein $L^1$ and $L^2$ are independently selected from absent and —O—C(O)—$R^a$, where $R^a$ is (1-20C)alkyl (e.g. acetate, i.e. "OAc", or stearate) or (2-25C)alkenyl (e.g. oleate).

74. The process according to any preceding statement, wherein $L^1$ and $L^2$ are independently selected from absent and acetate.

75. The process according to any preceding statement, wherein $G^1$ and $G^2$ are absent or have any of those definitions appearing in statements 65 to 73 in relation to $L^1$ and $L^2$.

76. The process according to any preceding statement, wherein each $X^2$ is independently absent or (1-2C) alkylene, where said (1-2C)alkylene is optionally substituted with 1 or 2 groups independently selected from (1-2C)alkyl.

77. The process according to any preceding statement, wherein each $X^2$ is independently absent or methylene, where said methylene is optionally substituted with 1 or 2 groups independently selected from (1-2C)alkyl.

78. The process according to any preceding statement, wherein each $X^2$ is independently absent or methylene, where said methylene is optionally substituted with 1 or 2 methyl groups.

79. The process according to any preceding statement, wherein each $X^2$ is independently absent or methylene.

80. The process according to any preceding statement, wherein each $X^3$ is independently absent or (1-2C) alkylene, where said (1-2C)alkylene is optionally substituted with 1 or 2 groups independently selected from (1-2C)alkyl.

81. The process according to any preceding statement, wherein each $X^3$ is independently absent or methylene, where said methylene is optionally substituted with 1 or 2 groups independently selected from (1-2C)alkyl.

82. The process according to any preceding statement, wherein each $X^3$ is independently absent or methylene, where said methylene is optionally substituted with 1 or 2 methyl groups.

83. The process according to any preceding statement, wherein each $X^3$ is independently absent or methylene.

84. The process according to any preceding statement, wherein each $X^4$ is independently methylene that is optionally substituted with 1 or 2 methyl groups.

85. The process according to any preceding statement, wherein each $X^4$ is methylene.

86. The process according to any preceding statement, wherein m is 1, 2 or 3.

87. The process according to any preceding statement, wherein m is 2.

88. The process according to claim 1, 24, 32, 37, 51 or 64 wherein $X^2$ is independently absent or methylene, where said methylene is optionally substituted with 1 or 2 methyl groups;

each $X^3$ is independently absent or methylene, where said methylene is optionally substituted with 1 or 2 methyl groups;

each $X^4$ is independently methylene that is optionally substituted with 1 or 2 methyl group; and m is 1, 2 or 3.

89. The process according to any preceding statement, wherein each $R^5$ is independently selected from hydrogen, halo, hydroxy, cyano, nitro, (1-4C)alkyl, (2-4C) alkenyl, (2-4C)alkynyl, (1-4C)haloalkyl, (1-4C)alkoxy, phenyl, phenyl(1-2C)alkyl, 5-6 membered heteroaryl, 5-6 membered heteroaryl(1-2C)alkyl and —$NR^{5a}R^{5b}$, where any phenyl, phenyl(1-2C)alkyl, 5-6 membered heteroaryl, 5-6 membered heteroaryl(1-2C)alkyl in $R^5$ is optionally substituted with one or more groups independently selected from halo, hydroxy, cyano, nitro, (1-4C)alkyl, (1-4C)haloalkyl and (1-4C)alkoxy, and where $R^{5a}$ and $R^{5b}$ are independently selected from hydrogen and (1-3C)alkyl, and/or two $R^5$ located on adjacent atoms are linked to one another, such that when taken in combination with the atoms to which they are attached, they form a benzene, 5-6 membered heteroaromatic, 5-6 membered carbocyclic or 5-6 membered heterocyclic ring, wherein any of the said benzene, 5-6 membered heteroaromatic, 5-6 membered carbocyclic or 5-6 membered heterocyclic rings is optionally substituted with one or more groups independently selected from halo, hydroxy, cyano, nitro, (1-4C)alkyl, (1-4C)haloalkyl and (1-4C)alkoxy.

90. The process according to any preceding statement, wherein each $R^5$ is independently selected from hydrogen, halo, hydroxy, cyano, nitro, (1-4C)alkyl, (1-4C) haloalkyl, (1-4C)alkoxy, phenyl, phenyl(1-2C)alkyl and —$NR^{5a}R^{5b}$, where any phenyl and phenyl(1-2C) alkyl in $R^5$ is optionally substituted with one or more groups independently selected from halo, hydroxy, (1-2C)alkyl, (1-2C)haloalkyl and (1-2C)alkoxy, and where $R^{5a}$ and $R^{5b}$ are independently selected from hydrogen and (1-2C)alkyl, and/or two $R^5$ located on adjacent atoms are linked to one another, such that when taken in combination with the atoms to which they are attached, they form a benzene, 5-6 membered heteroaromatic, 5-6 membered carbocyclic or 5-6 membered heterocyclic ring, wherein any of the said benzene, 5-6 membered heteroaromatic, 5-6 membered carbocyclic or 5-6 membered heterocyclic rings is optionally substituted with one or more groups independently selected from halo, hydroxy, (1-2C)alkyl, (1-2C)haloalkyl and (1-2C)alkoxy.

91. The process according to any preceding statement, wherein each $R^5$ is independently selected from hydrogen, halo, hydroxy, (1-3C)alkyl, (1-3C)haloalkyl, (1-3C)alkoxy, phenyl, phenyl(1-2C)alkyl and —$NR^{5a}R^{5b}$, where any phenyl and phenyl(1-2C)alkyl in $R^5$ is optionally substituted with one or more groups independently selected from halo, hydroxy, (1-2C)alkyl, (1-2C)haloalkyl and (1-2C)alkoxy, and where $R^{5a}$ and $R^{5b}$ are independently selected from hydrogen and (1-2C)alkyl, and/or two $R^5$ located on adjacent atoms are linked to one another, such that when taken in combination with the atoms to which they are attached, they form a benzene or 5-6 membered heteroaromatic ring, wherein any of the said benzene and 5-6 membered heteroaromatic rings is optionally substituted with one or more groups independently selected from halo, hydroxy, (1-2C)alkyl, (1-2C)haloalkyl and (1-2C)alkoxy.

92. The process according to any preceding statement, wherein each $R^5$ is independently selected from hydrogen and (1-2C)alkyl, and/or two $R^5$ located on adjacent atoms are linked to one another, such that when taken in combination with the atoms to which they are attached, they form a benzene ring that is optionally substituted with one or more groups independently selected from halo, hydroxy, (1-2C)alkyl, (1-2C)haloalkyl and (1-2C)alkoxy.

93. The process according to any preceding statement, wherein each $R^5$ is independently selected from hydrogen and (1-2C)alkyl.

94. The process according to any preceding statement, wherein each $R^6$ is independently selected from halo, hydroxy, cyano, nitro, (1-4C)alkyl, (2-4C)alkenyl, (2-4C)alkynyl, (1-4C)haloalkyl, (1-4C)alkoxy, aryl, aryl(1-2C)alkyl, heteroaryl, heteroaryl(1-2C)alkyl, —C(O)—$R^{6a}$, —C(O)—$OR^{6a}$, —O—C(O)—$R^{6a}$, —C(O)—$NR^{6a}R^{6b}$, —$N(R^{6a})C(O)$—$R^{6b}$ and —$NR^{6a}R^{6b}$, where any aryl, aryl(1-2C)alkyl, heteroaryl and heteroaryl(1-2C)alkyl in $R^6$ is optionally substituted with one or more groups independently selected from halo, hydroxy, cyano, nitro, (1-4C)alkyl, (1-4C)haloalkyl and (1-4C)alkoxy, and where $R^{6a}$ and $R^{6b}$ are independently selected from hydrogen and (1-3C)alkyl 95. The process according to any preceding statement, wherein each $R^6$ is independently selected from halo, hydroxy, cyano, nitro, (1-2C)alkyl, (1-2C)haloalkyl, (1-2C)alkoxy, phenyl and —$NR^{6a}R^{6b}$, where any phenyl in $R^6$ is optionally substituted with one or more groups independently selected from halo, hydroxy, (1-2C)alkyl, (1-2C)haloalkyl and (1-2C)alkoxy, and where $R^{6a}$ and $R^{6b}$ are independently selected from hydrogen and (1-3C)alkyl.

96. The process according to any preceding statement, wherein each $R^6$ is independently selected from halo, cyano, (1-2C)alkyl, (1-2C)haloalkyl, (1-2C)alkoxy and —$NR^{6a}R^{6b}$, where $R^{6a}$ and $R^{6b}$ are independently selected from hydrogen and (1-2C)alkyl.

97. The process according to any preceding statement, wherein each $R^6$ is independently selected from halo, (1-2C)alkyl, (1-2C)haloalkyl, (1-2C)alkoxy and —$NR^{6a}R^{6b}$, where $R^{6a}$ and $R^{6b}$ are independently selected from hydrogen and methyl.

98. The process according to any preceding statement, wherein each $R^6$ is independently selected from halo, methyl and methoxy.

99. The process according to any preceding statement, wherein each p is independently selected from 0, 1 or 2.

100. The process according to any preceding statement, wherein each p is independently selected from 0 and 1.

101. The process according to any preceding statement, wherein each $R^7$ is independently selected from hydrogen or (1-2C)alkyl.

102. The process according to any preceding statement, wherein each $R^7$ is independently selected from hydrogen or methyl.

103. The process according to any preceding statement, wherein each $R^7$ is methyl.

104. The process according to claim 1, 24, 32, 37, 51, 64 or 88 wherein each $R^5$ is independently selected from hydrogen and (1-2C)alkyl, and/or two $R^5$ located on adjacent atoms are linked to one another, such that when taken in combination with the atoms to which they are attached, they form a benzene ring that is optionally substituted with one or more groups independently selected from halo, hydroxy, (1-2C)alkyl, (1-2C)haloalkyl and (1-2C)alkoxy;

each $R^6$ is independently selected from halo, (1-2C)alkyl, (1-2C)haloalkyl, (1-2C)alkoxy and —$NR^{6a}R^{5b}$, where $R^{6a}$ and $R^{6b}$ are independently selected from hydrogen and methyl;

each p is independently selected from 0 and 1; and each $R^7$ is independently selected from hydrogen or methyl.

105. The process according to any preceding statement, wherein Q is Q-I.

106. The process according to any preceding statement, wherein Q has a structure according to any of the following:

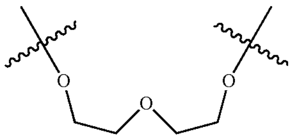

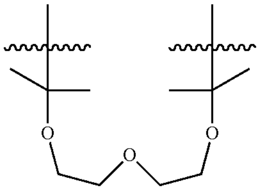

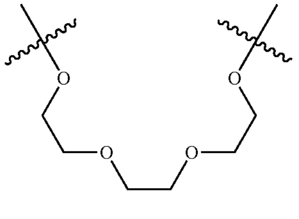

-continued

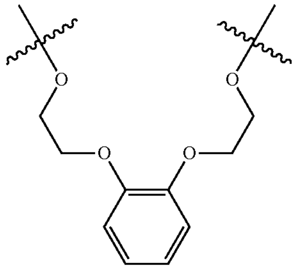

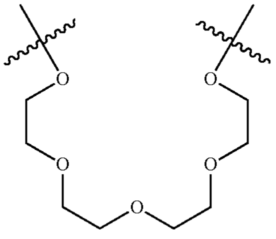

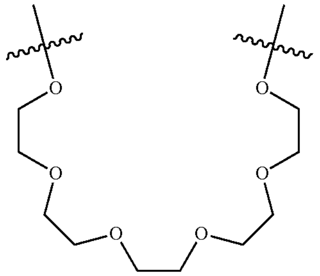

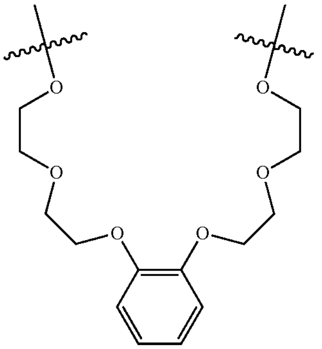

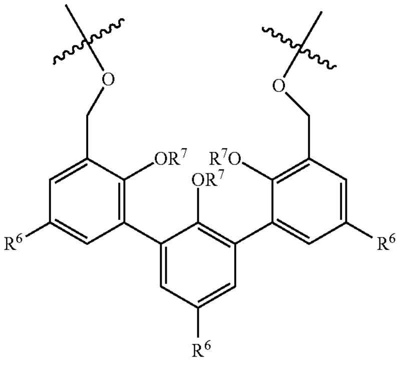

107. The process according to statement 106 wherein each $R^6$ is independently halo, methyl and methoxy and each $R^7$ is independently hydrogen or methyl.

108. The process according to any preceding statement, wherein Q has a structure according to the following:

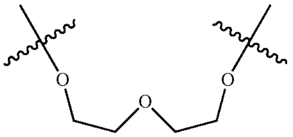

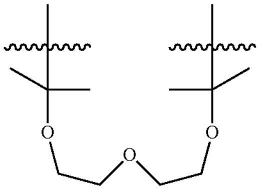

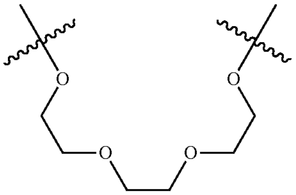 [SMILES: *OCCOCCOCCO*]

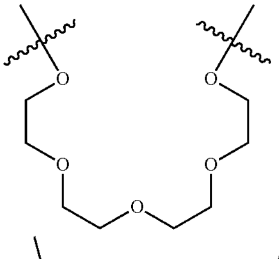

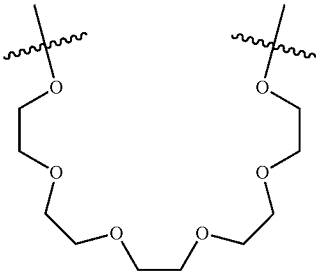

19. The process according to any preceding statement, wherein Q has a structure according to the following:

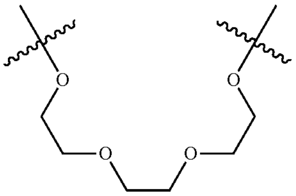

110. The process according to any preceding statement, wherein the compound of Formula I has a structure according to Formula I-1 as defined herein, wherein $M^1$, $M^2$, $R^1$, $R^2$, $R^3$, $R^5$, $X^1$, $X^2$, $E^1$, $E^2$, $L^1$, $L^2$, $G^1$, $G^2$, m, n and any sub-groups associated therewith have any of the definitions outlined in any preceding statement.

111. The process according to any preceding statement, wherein the compound of Formula I has a structure according to Formula I-II as defined herein, wherein $M^1$, $M^2$, $R^1$, $R^2$, $R^3$, $L^1$, $L^2$, $G^1$, $G^2$, Q and any sub-groups associated therewith have any of the definitions outlined in any preceding statement.

112. The process according to any preceding statement, wherein the compound of Formula I has a structure according to Formula I-Ill as defined herein, wherein $M^1$, $M^2$, $X^1$, $R^2$, $R^3$, $E^2$, $L^1$, $L^2$, $G^1$, $G^2$, n, Q, $W^1$, $W^2$, $W^3$, $W^4$, $W^5$ and any sub-groups associated therewith have any of the definitions outlined in any preceding statement.

113. The process according to any preceding statement, wherein the compound of Formula I has a structure according to Formula I-IV as defined herein, wherein $M^1$, $M^2$, $X^1$, $E^1$, $E^2$, $R^1$, $R^2$, $R^3$, $L^1$, $L^2$, $G^1$, $G^2$, n and any sub-groups associated therewith have any of the definitions outlined in any preceding statement.

114. The process according to any preceding statement, wherein the compound of Formula I has a structure according to Formula I-V as defined herein, wherein $M^1$, $M^2$, $R^2$, $R^3$, $E^1$, $E^2$, $L^1$, $L^2$, $G^1$, $G^2$, $W^1$, $W^2$, $W^3$, $W^4$, $W^5$, n and any sub-groups associated therewith have any of the definitions outlined in any preceding statement.

115. The process according to any preceding statement, wherein the compound of Formula I has a structure according to Formula I-VI as defined herein, wherein $M^1$, $M^2$, $R^1$, $R^2$, $L^1$, $L^2$ and any sub-groups associated therewith have any of the definitions outlined in any preceding statement.

116. The process of any preceding statement, wherein the compound of Formula I has a structure according to any one of the following:

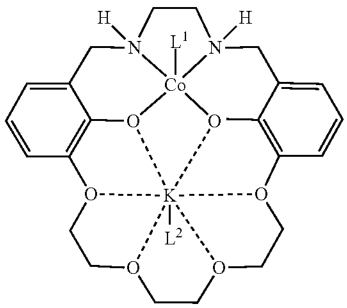

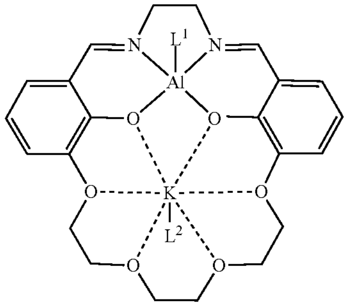

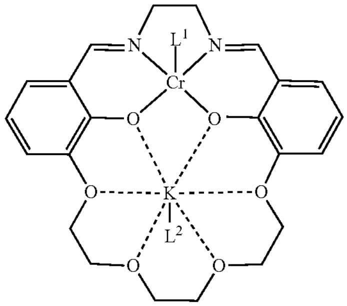

-continued

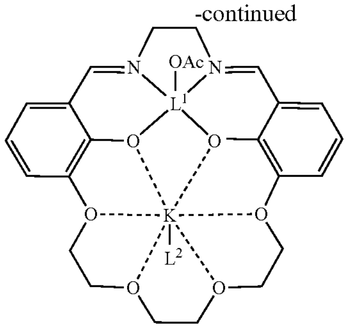

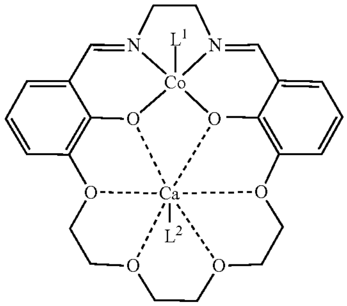

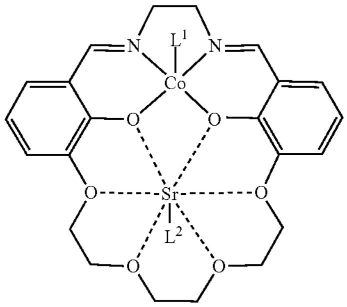

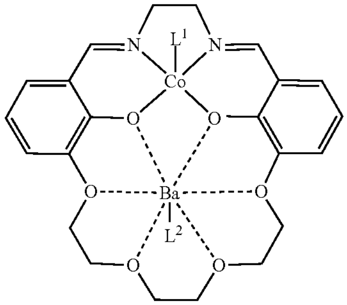

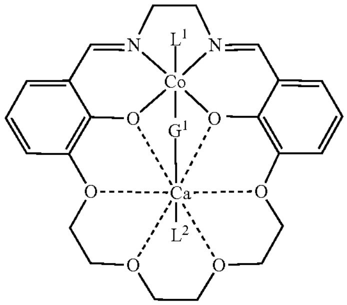

-continued
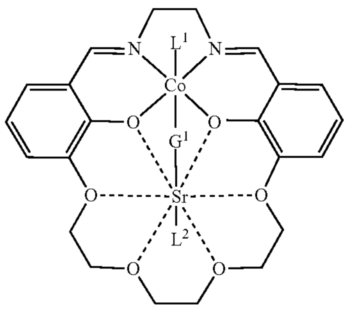
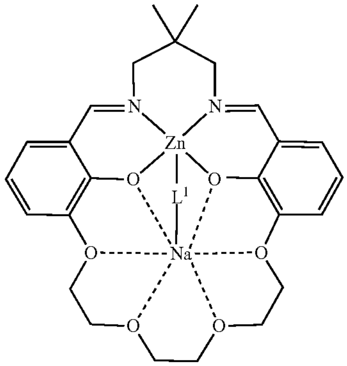
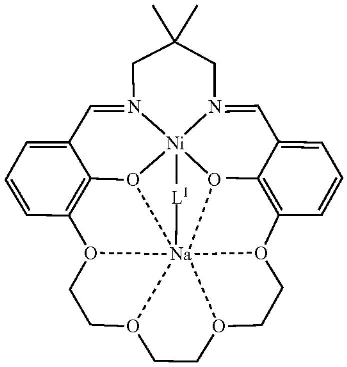
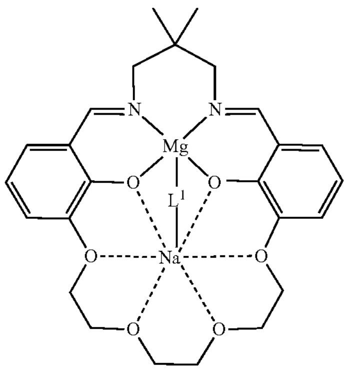
-continued
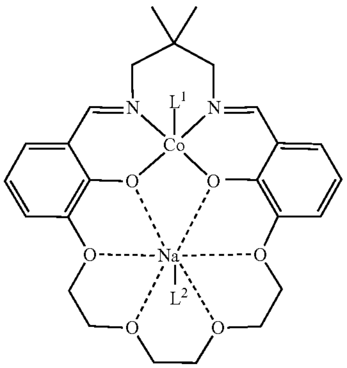
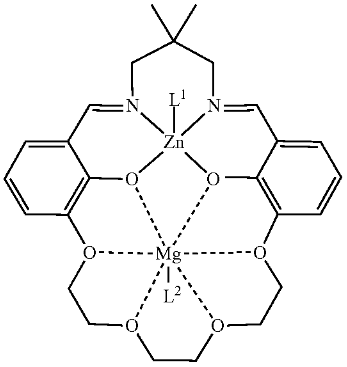
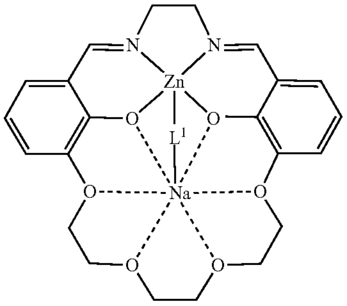
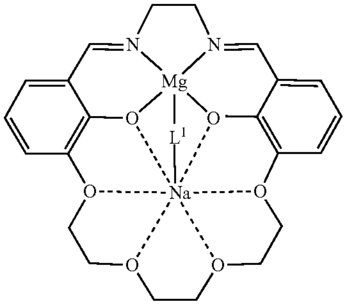
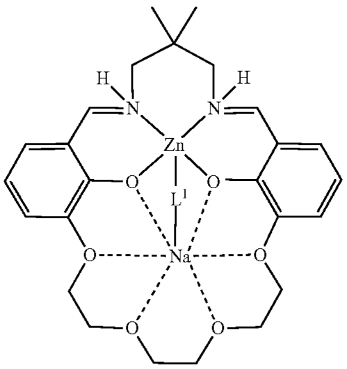

-continued
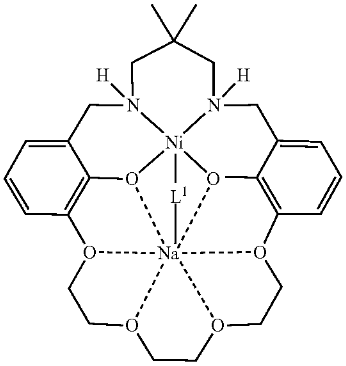
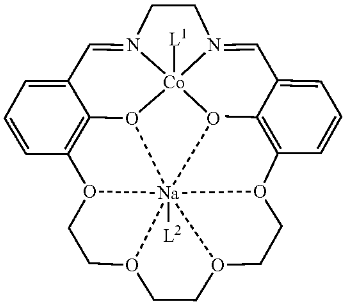
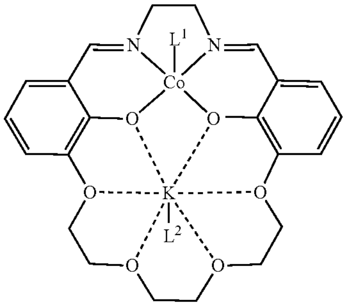
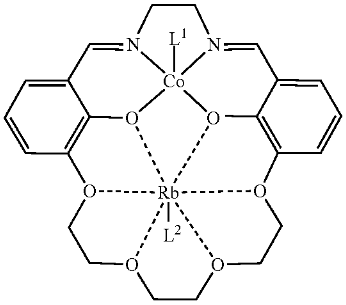
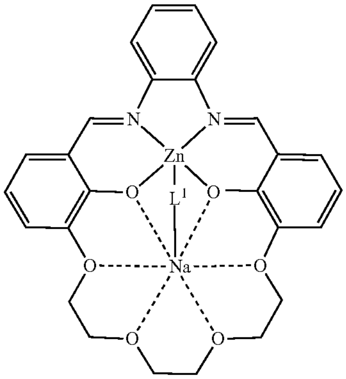
-continued
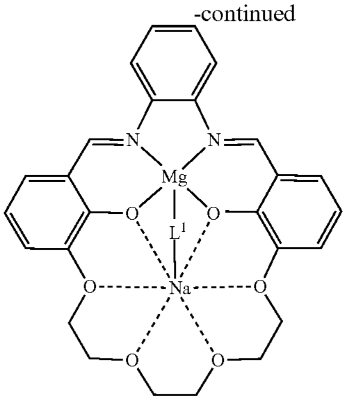
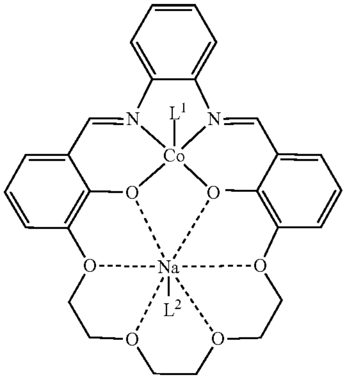
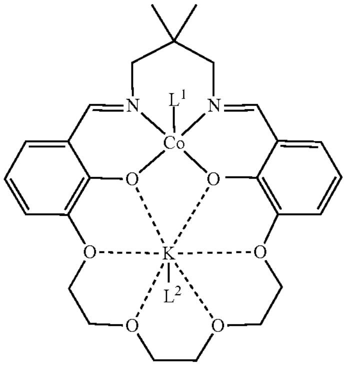
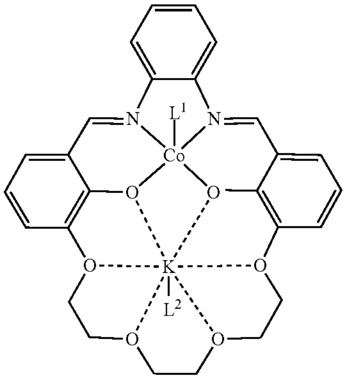

-continued
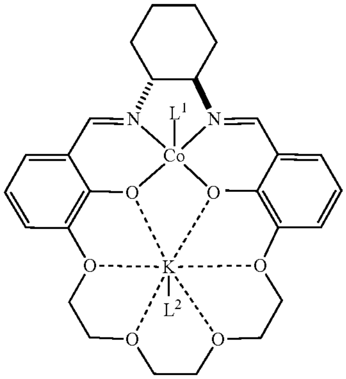
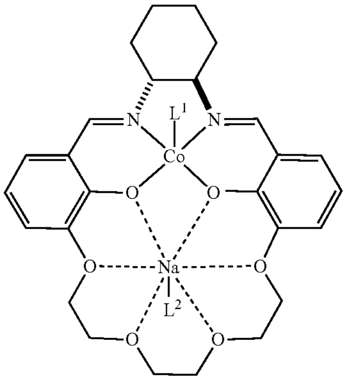
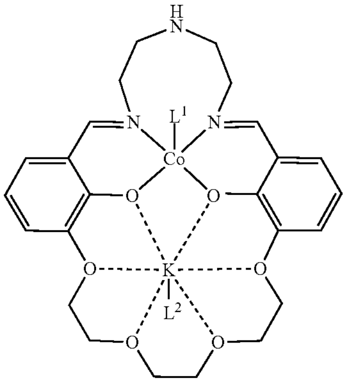
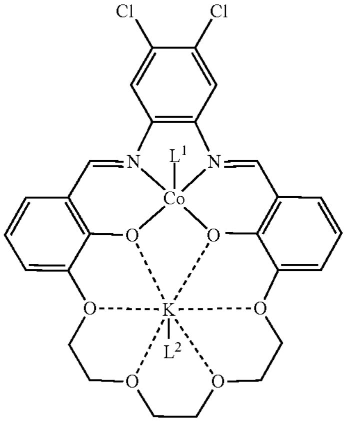
-continued
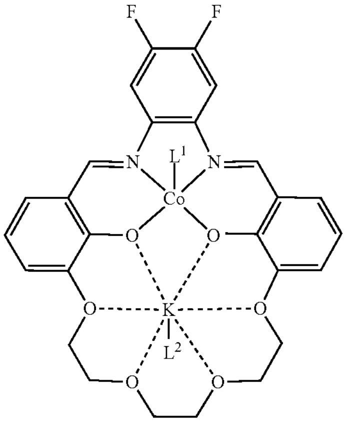
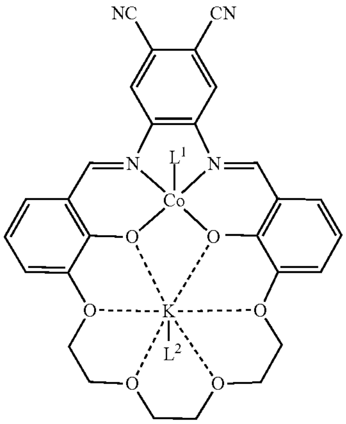
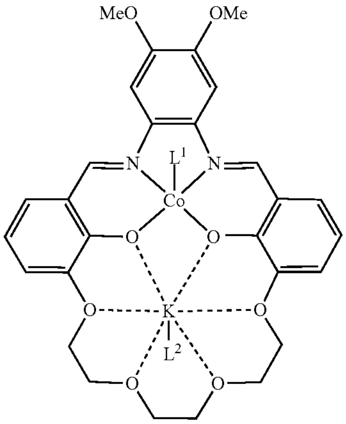
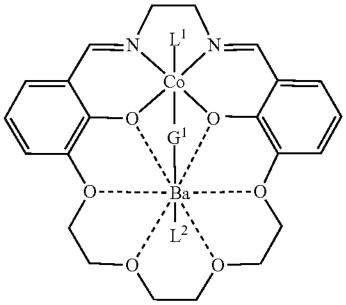

-continued
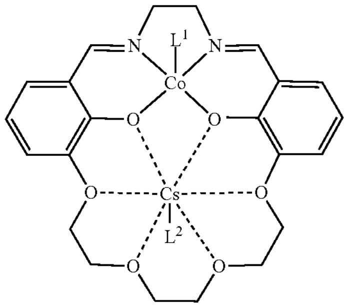
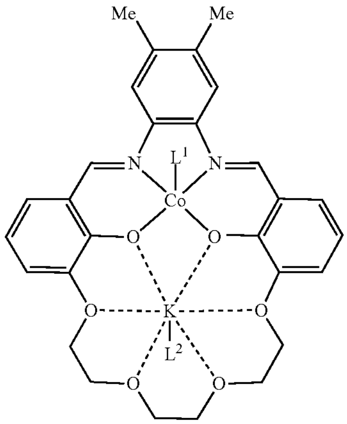
116. The process according to any preceding statement, wherein the compound of Formula I has a structure according to any of the following:
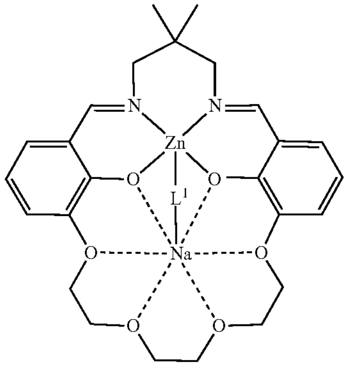
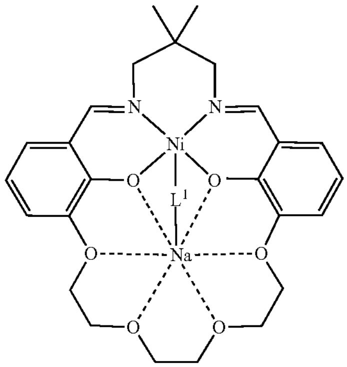
-continued
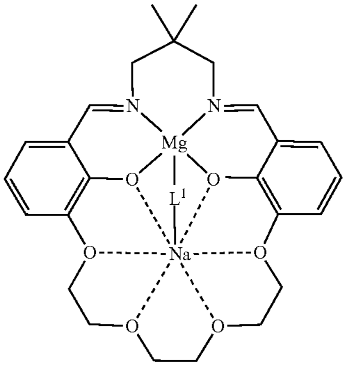
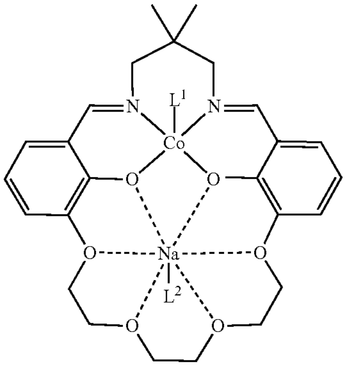
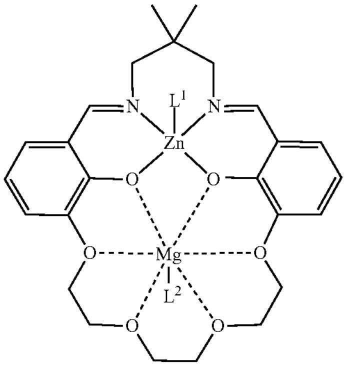
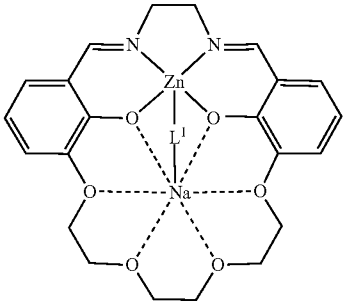
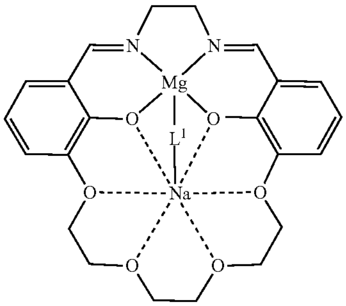

-continued
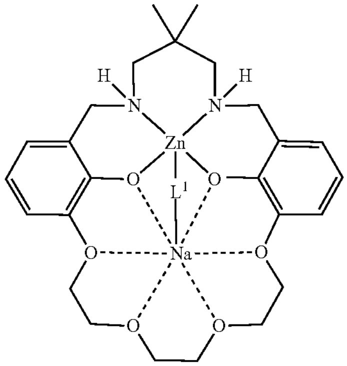
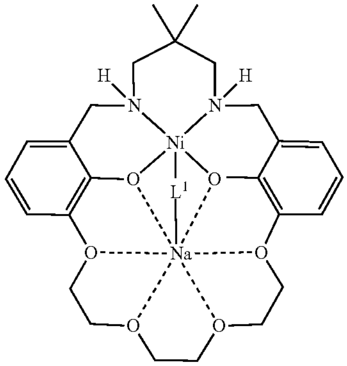
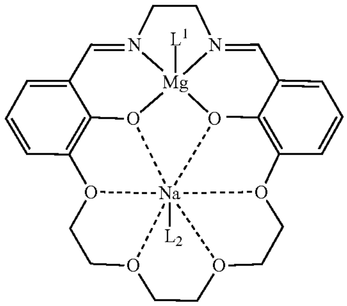
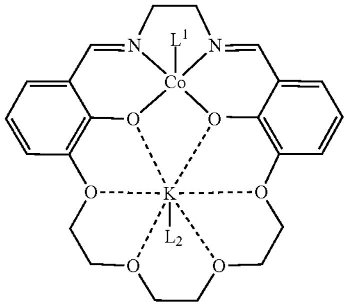
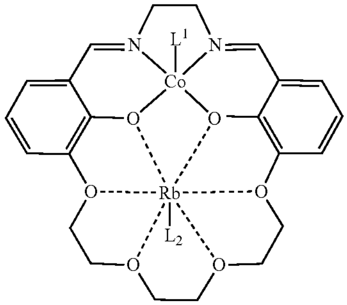
-continued
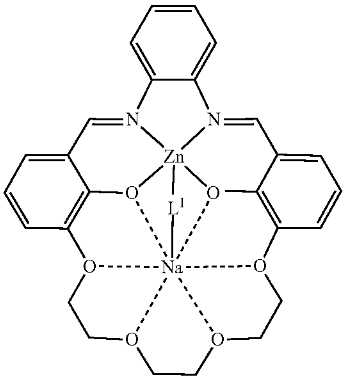
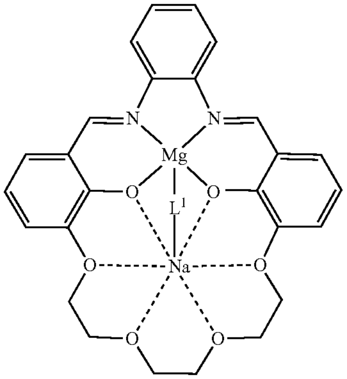
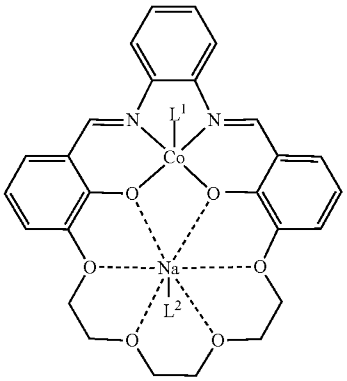
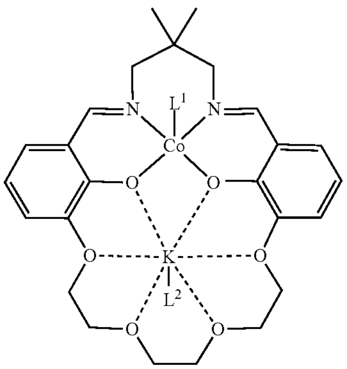

-continued
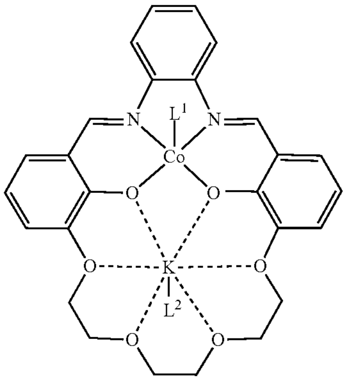
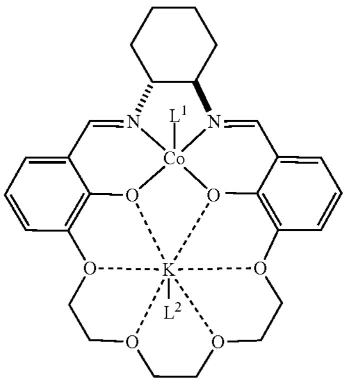
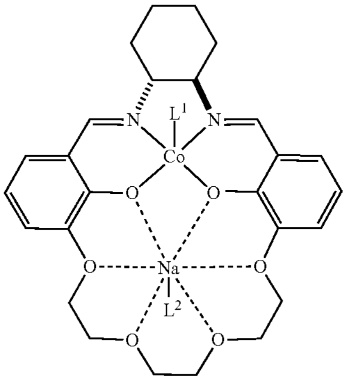
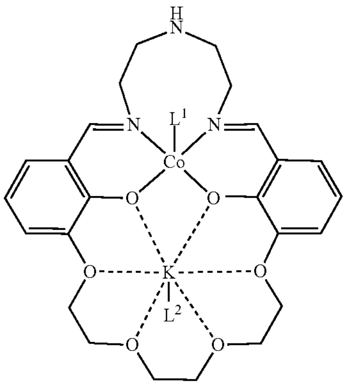
-continued
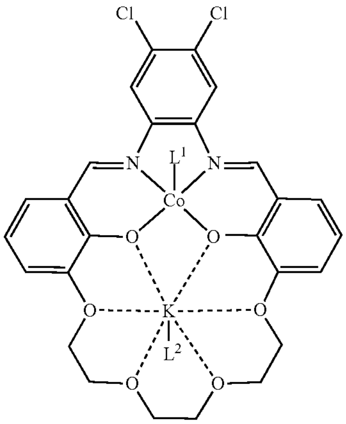
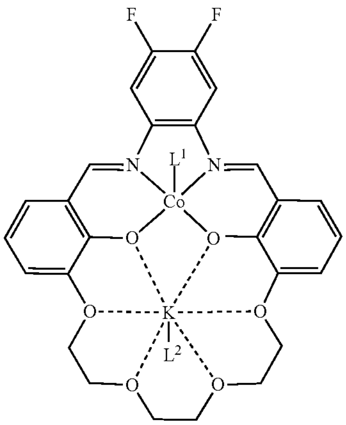
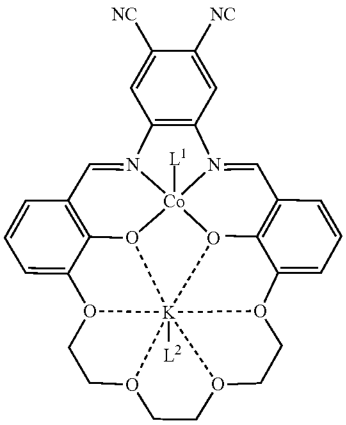
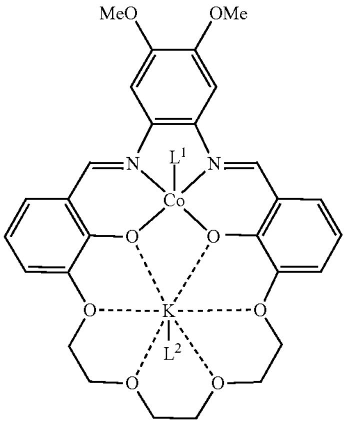

-continued

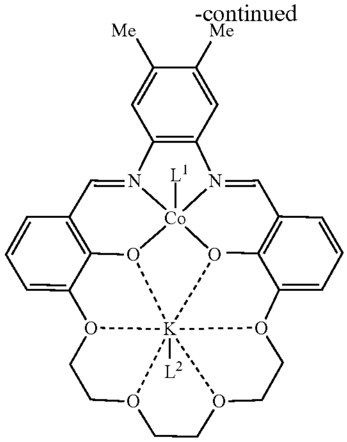

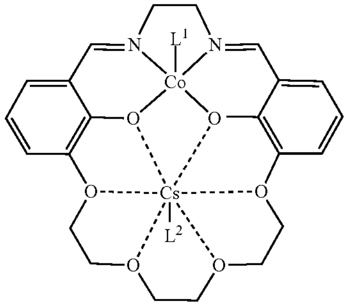

where $L^1$ and $L^2$ are present and have any of the definitions outlined in any preceding statement.

117. The process according to statement 116 wherein $L^1$ and $L^2$ are acetate.

118. The process according to any preceding statement, wherein in step a), the compound of Formula I is present in an amount of 0.0001-0.5 mol % relative to the number of moles of epoxide.

119. The process according to any preceding statement, wherein in step a), the compound of Formula I is present in an amount of 0.001-0.3 mol % relative to the number of moles of epoxide.

120. The process according to any preceding statement, wherein in step a), the compound of Formula I is present in an amount of 0.01-0.1 mol % relative to the number of moles of epoxide.

121. The process according to any preceding statement, wherein in step a), the compound of Formula I is present in an amount of 0.015-0.05 mol % relative to the number of moles of epoxide.

122. The process according to any preceding statement, wherein epoxide is located on a group which is cyclic or acyclic.

123. The process according to any preceding statement, wherein the epoxide is selected from cyclohexene oxide, styrene oxide, alkylene oxides (such as ethylene oxide, propylene oxide, vinyl-propylene oxide, and butylene oxide), cyclohexene oxides (such as limonene oxide, $C_{10}H_{16}O$ or 2-(3,4-epoxycyclohexyl)ethyltrimethoxysilane and $C_{11}H_{12}O$), oxiranes (such as oxirane, epichlorohydrin, 2-(2-methoxyethoxy)methyl oxirane, 2-(2-(2-methoxyethoxy)ethoxy)methyl oxirane, 2-(2-(2-(2-methoxyethoxy)ethoxy)ethoxy)methyl oxirane), 1,2-epoxybutane, glycidyl ethers (such as allyl glycidyl ether, tert-butyl glycidyl ether, glycidyl methyl ether, isopropyl glycidyl ether, butyl glycidyl ether, methoxyethyl glycidyl ether, phenyl glycidyl ether, benzyl glycidyl ether, m-tolyl glycidyl ether, glycidyl propargyl ether, beta-chloroethyl glycidyl ether, furfuryl glycidyl ether and tetrahydrofurfuryl glycidyl ether), glycidyl esters (such as glycidyl benzoate), glycidyl carbonates (such as methyl glycidyl carbonate, ethyl glycidyl carbonate and chloestryl glycidyl carbonate), vinyl-cyclohexene oxide, 3-phenyl-1,2-epoxypropane, 1,2- and 2,3-epoxybutane, isobutylene oxide, cyclopentene oxide, 2,3-epoxy-1,2,3,4-tetrahydronaphthalene, indene oxide, THF-epoxide, and functionalized 3,5-dioxaepoxides and mixtures of two or more thereof.

124. The process according to any preceding statement, wherein the epoxide is selected from ethylene oxide, propylene oxide, vinyl-propylene oxide, butylene oxide, allyl glycidyl ether, tert-butyl glycidyl ether, epichlorohydrin, styrene oxide, cyclohexene oxide, vinyl-cyclohexene oxide, cyclopentene oxide, limonene oxide and mixtures of two or more thereof.

125. The process according to any preceding statement, wherein the epoxide is propylene oxide or cyclohexene oxide.

126. The process according to any preceding statement, wherein the epoxide is propylene oxide.

127. The process according to any preceding statement, wherein step a) is conducted in the presence of a chain transfer agent.

128. The process according to statement 127, wherein the chain transfer agent is selected from the group consisting of water, a mono-alcohol, a diol, a triol, a tetraol, a polyol, a mono-amine, a polyamine, a mono-thiol, a polythiol, a mono-carboxylic acid or a polycarboxylic acid 129. The process according to statement 127 or 128, wherein the chain transfer agent is trans 1,2-cyclohexanediol.

130. The process according to statement 127, 128 or 129, wherein the molar ratio of the chain transfer agent to the catalyst of Formula I is 1:1 to 50:1.

131. The process according to statement 127, 128 or 129, wherein the molar ratio of the chain transfer agent to the catalyst of Formula I is 3:1 to 30:1.

132. The process according to any preceding statement, wherein the process to not comprise the use of a chain transfer agent.

133. The process according to any preceding statement, wherein step a) is conducted at a pressure of 1-100 bar $CO_2$.

134. The process according to any preceding statement, wherein step a) is conducted at a pressure of 1-30 bar $CO_2$.

135. The process according to any preceding statement, wherein step a) is conducted at a pressure of 1-20 bar $CO_2$.

136. The process according to any preceding statement, wherein step a) is conducted at a temperature of 0-250° C.

137. The process according to any preceding statement, wherein step a) is conducted at a temperature of 0-150° C.

138. The process according to any preceding statement, wherein step a) is conducted at a temperature of 40-70° C.

139. The process according to any preceding statement, wherein in step a), the compound of Formula I is present in an amount of 0.001-0.3 mol % relative to the number of moles of epoxide;

the epoxide is propylene oxide or cyclohexene oxide;

step a) is conducted at a pressure of 5-50 bar $CO_2$; and step a) is conducted at a temperature of 5-120° C.

140. The process according to any preceding statement, wherein step a) is conducted in the presence of a cyclic anhydride.

141. The process of statement 140, wherein the cyclic anhydride comprises a moiety having a structure according to Formula II shown below:

Formula II

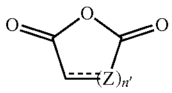

wherein n' is 1, 2, 3, 4, 5 or 6;

each Z is independently C, O, N or S; and

------ is a double bond or a single bond, according to the valency of Z.

142. The process of statement 140 or 141, wherein the cyclic anhydride is one or more of the following:

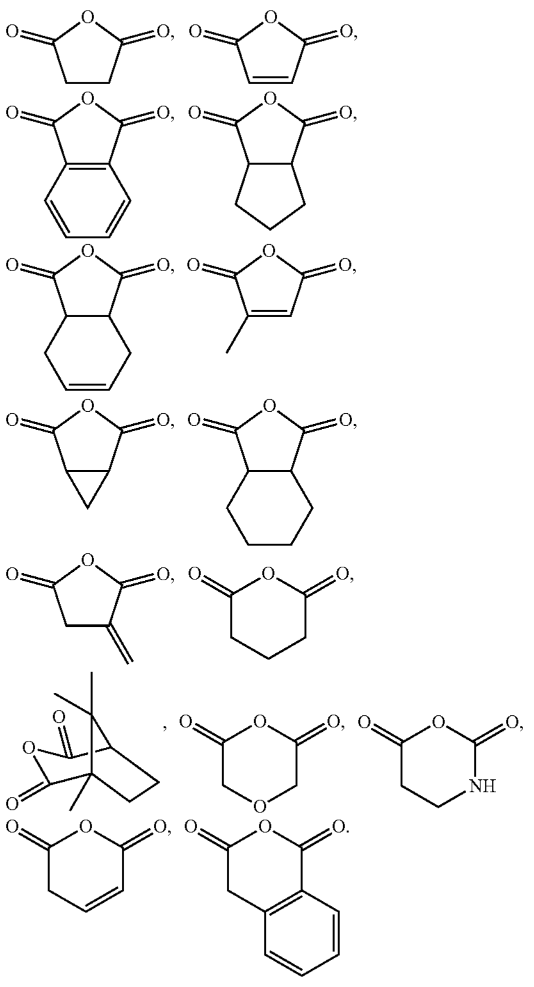

143. A process for the preparation of a polyester, the process comprising the following step:

a) contacting at least one epoxide with at least one cyclic anhydride, wherein step a) is conducted in the presence of a compound of Formula I as defined in any one of statements 1-117.

144. The process of statement 140, wherein the cyclic anhydride is as defined in any one of statements 141 and 142.

145. The process of statement 143 or 144, wherein the epoxide is as defined in any one of statements 122 to 126.

146. The process of statement 143, 144 or 145, wherein the quantity of compound of Formula I used in step a) is as defined in any one of statements 118 to 121.

147. The process of any one of statements 143 to 146, wherein step a) is conducted in the presence of a chain transfer agent as defined in any one of statements 127 to 132.

148. The process of any one of statements 143 to 147, wherein step a) is conducted at a temperature as defined in any one of statements 136 to 138.

149. A compound having a structure according to Formula I as defined in any one of statements 1-117.

EXAMPLES

One or more examples of the invention will now be described, for the purpose of illustration only, with reference to the accompanying figures, in which.

Figure 6:
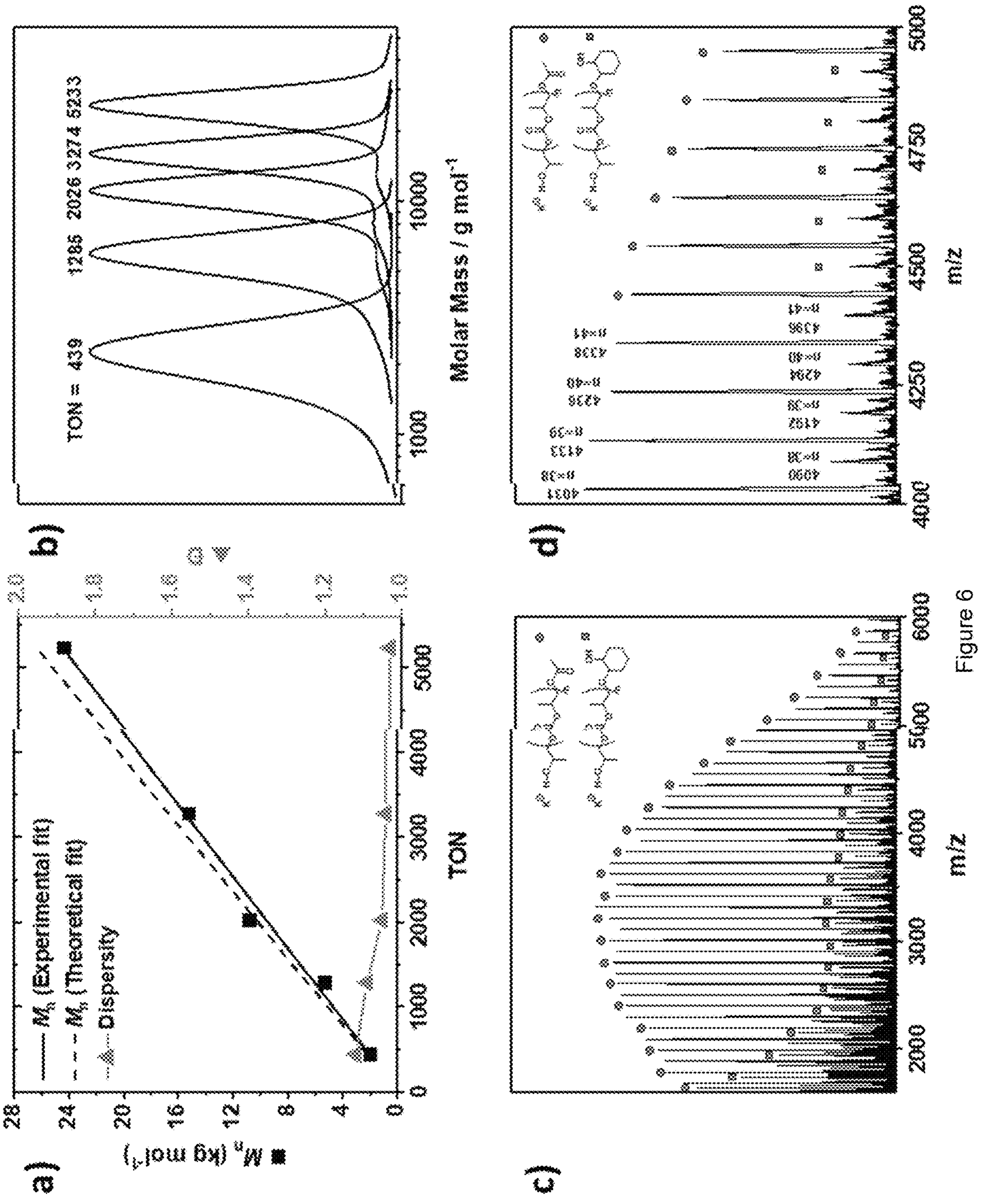

FIG. 6 shows polymerization data for complex 2: a) Plot of PPC molar mass (Mn: ■) and dispersity (Đ: ▲) versus turnover number (TON). b) Evolution of the PPC molar masses showing an increase in molar mass (g $mol^{-1}$) with turnover number (TON) (note the low molar mass shoulder present in some cases arises from chains initiated from catalyst acetate groups). c) MALDI-ToF spectrum (1000-6000 m/z) of PPC initiated from acetate (●) and cyclohexane diol+one ether linkage (■). d) Expanded region of the MALDI-ToF spectrum (4000-5000 m/z) showing both polymer distributions having a repeat unit of 102 g $mol^{-1}$ consistent with the value expected for PPC.

Figure 7:
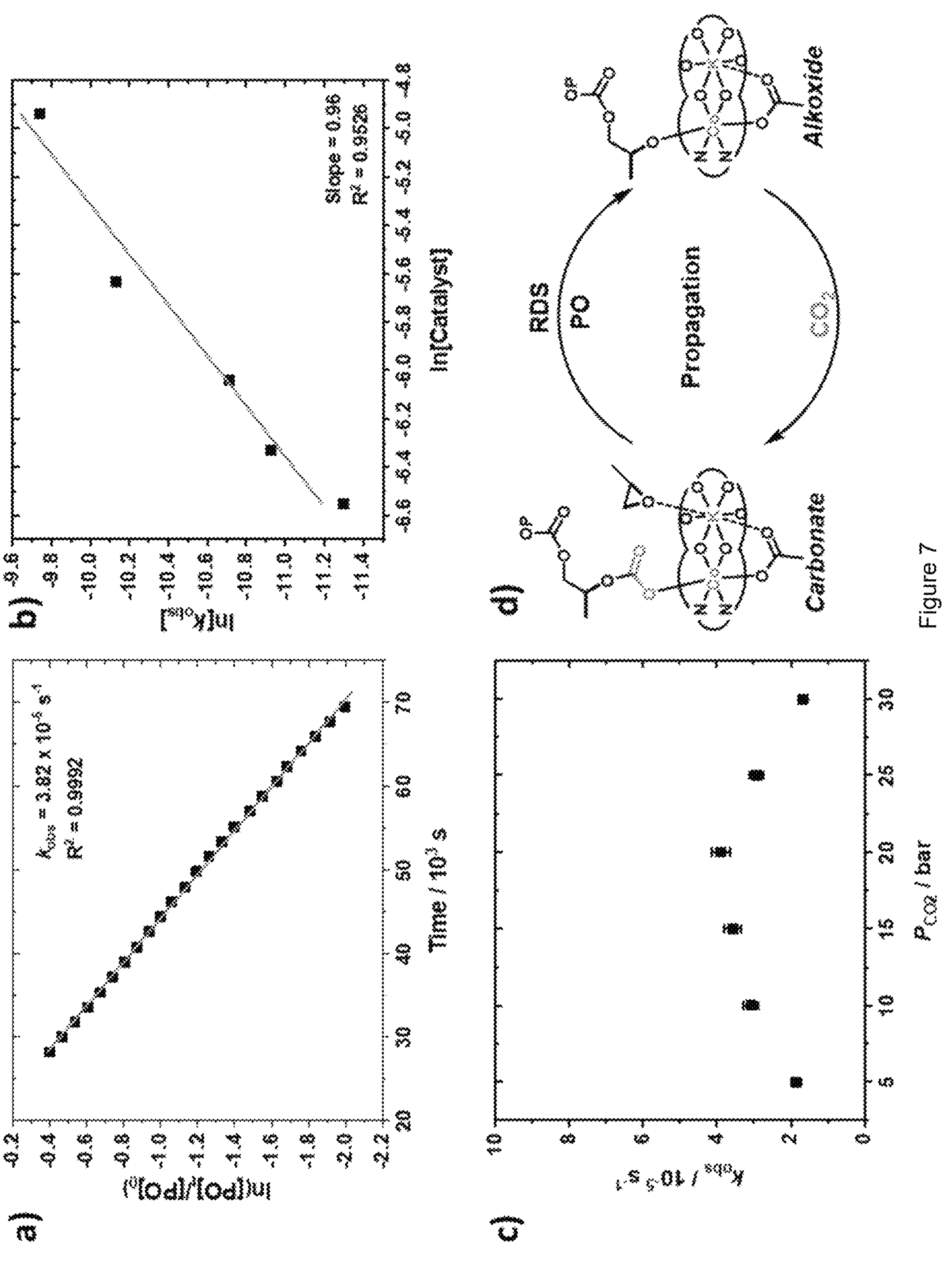

FIG. 7 shows Kinetic data and pathway for complex 2: a) Semilogarithmic plot of $\ln[PO]_t/[PO]_0$ versus time (Table 1, Entry 4). b) Plot of $\ln[k_{obs}]$ vslln[2], where [2]=1.56-7.13 mM. c) Plot of $k_{obs}$ vs $P_{CO2}$ from 5 to 30 bar. d) Illustration of polymerization pathway and rate-determining step. All errors are calculated from duplicate runs and there is an average error of ±5% on all data.

Figure 8:
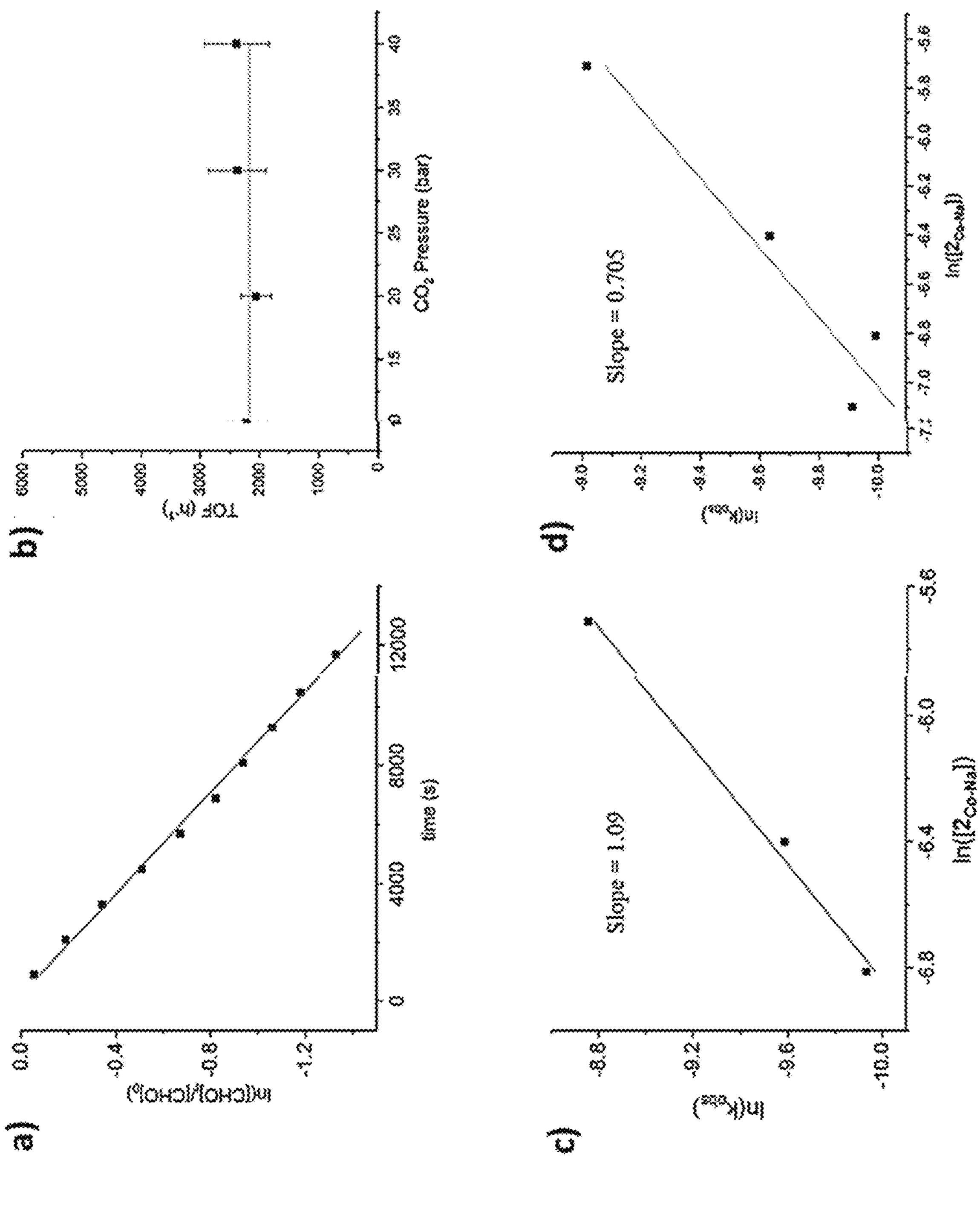

FIG. 8 shows, for complex 1, plots used to analyse the polymerization kinetics and determine the reaction orders in various monomers. a) Semilogarithmic plot of cyclohexene oxide concentration vs. time with a linear fit to data indicative of a first order dependence on cyclohexene oxide concentration. b) Plot of activity (TOF) vs. pressure of carbon dioxide, over the range 10-40 bar with a constant value consistent with zero order in $CO_2$ pressure. c) Logarithmic plot of pseudo first order rate coefficient, $k_{obs}$ vs. concentration of 7 and the linear fit to the data, used to determine a first order dependence on catalyst concentration d) order in Catalyst.

Figure 9:
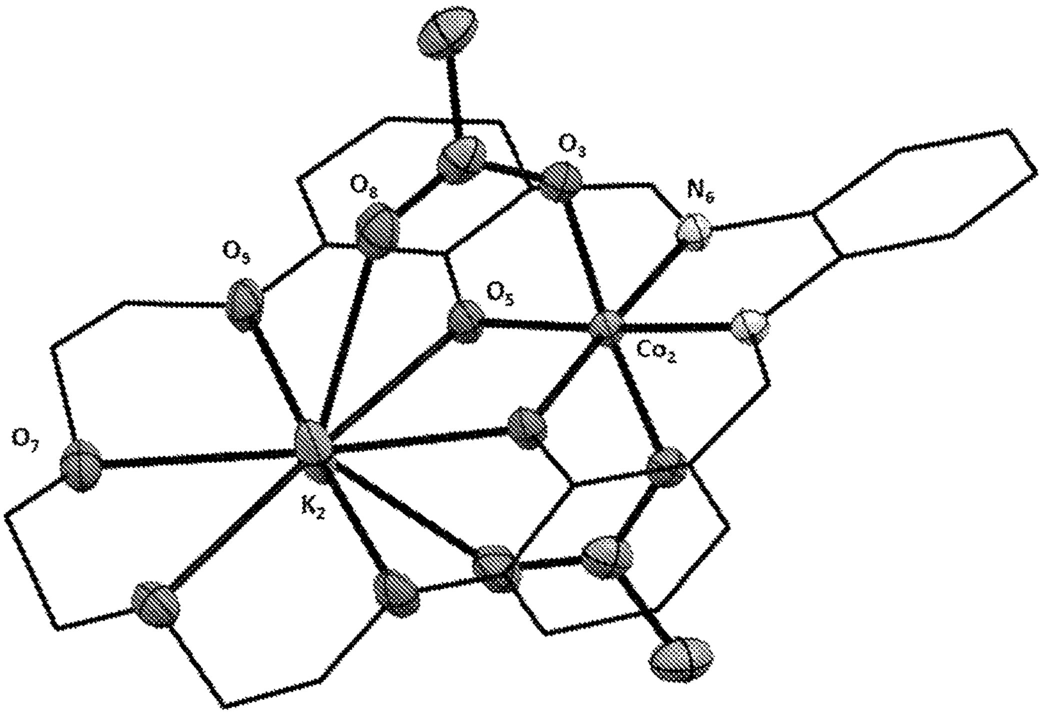

FIG. 9 shows a representation for the molecular structure of complex 17 with disorder and hydrogen atoms omitted for clarity.

Figure 10:
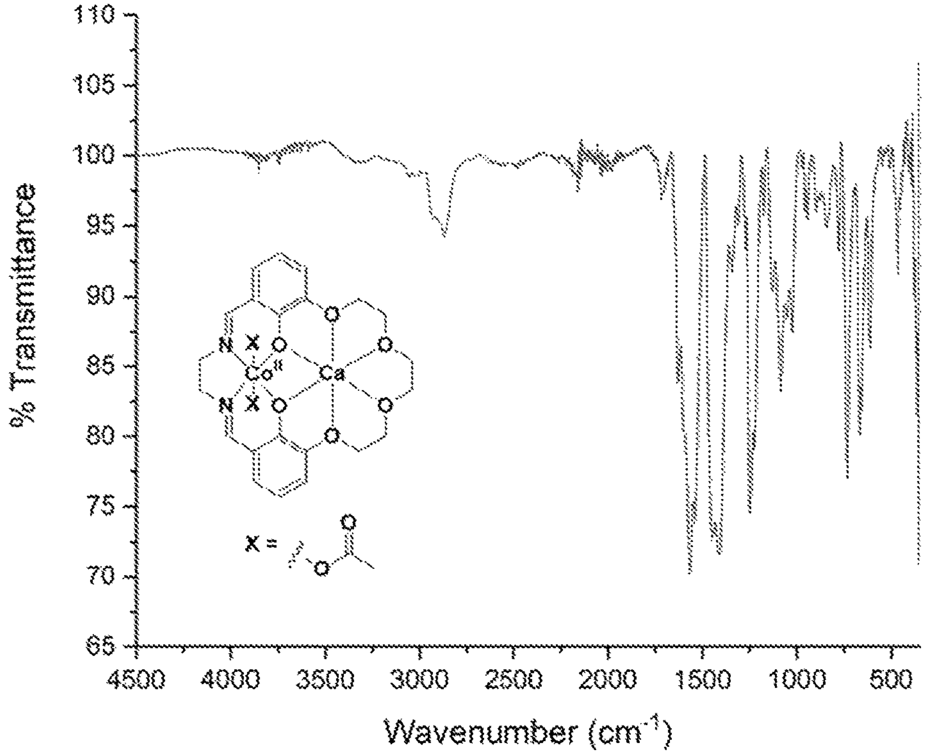

FIG. 10 shows an infrared spectrum for complex 27.

Figure 11:
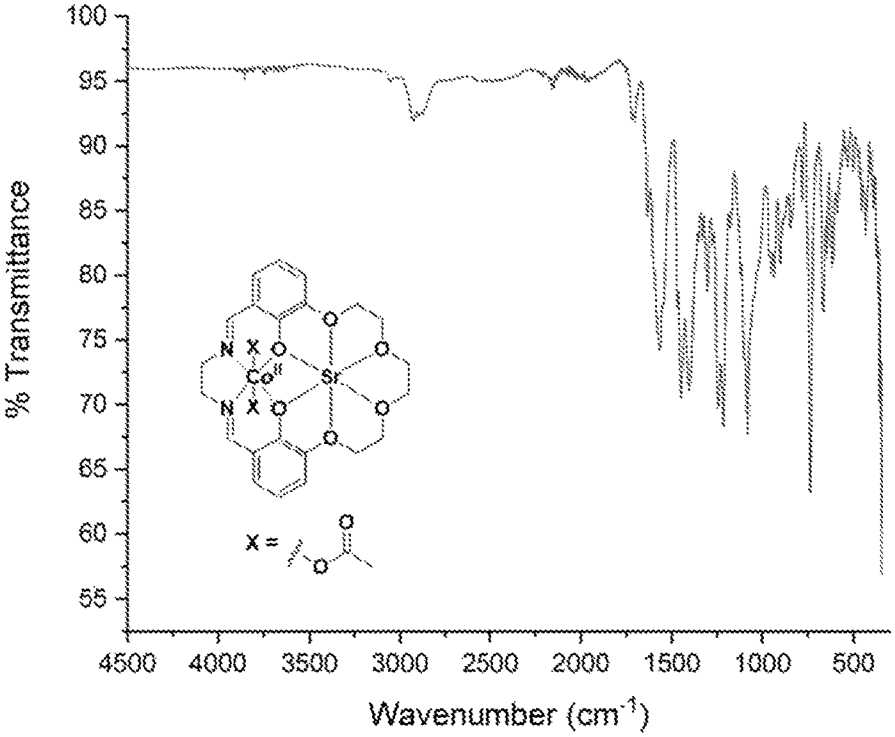

FIG. 11 shows an infrared spectrum for complex 28.

Figure 12:
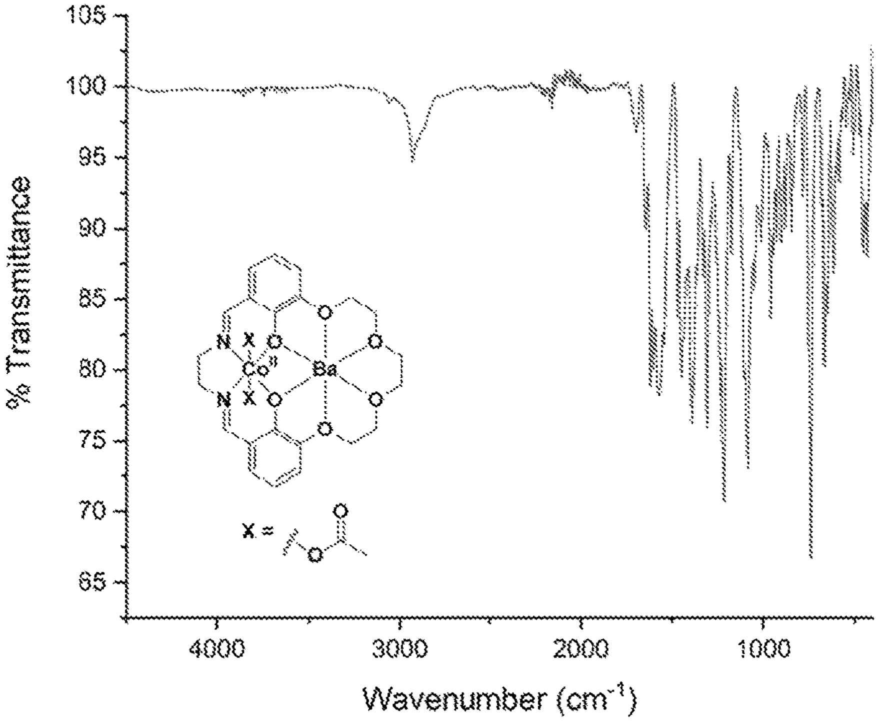

FIG. 12 shows an infrared spectrum for complex 29.

Figure 13:
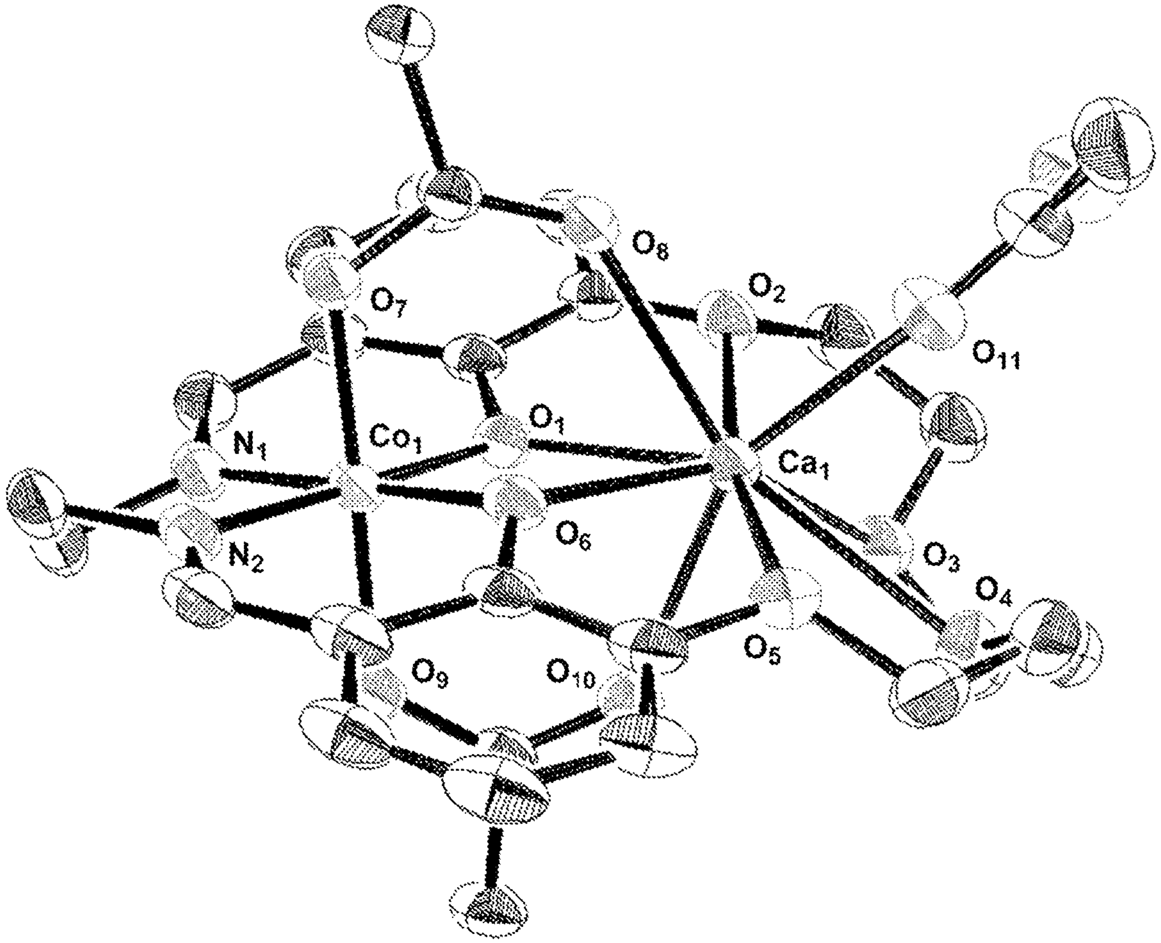

FIG. 13 shows ORTEP representation for the molecular structure of Complex 30 with disorder and hydrogen atoms omitted for clarity and thermal ellipsoids represented at 50% probability.

MATERIALS

Solvents and reagents were obtained from commercial sources and used as received unless stated otherwise. Acetonitrile was obtained from a solvent purification system, degassed by several freeze-pump-thaw cycles and further dried with 3 Å molecular sieves and stored under $N_2$. All epoxide monomers were dried over calcium hydride, fractionally distilled, degassed by bubbling $N_2$ gas and stored under $N_2$. Research-grade $CO_2$ was used for polymerization studies.

Methods

General Synthesis of the Pro-Ligand

The pro-ligand shown below was synthesized following a modified literature procedure[18]:

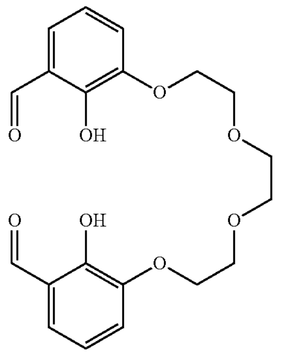

Pro-ligand

General Synthesis of the Catalytic Compounds

General synthesis of catalysts by diamine condensation and metal complexation was carried out in a one-pot procedure: $M^2(OAc)_x$ (where $M^2$ is Na, Mg, K, Rb or Cs and x is 1, 2 or 3 as appropriate) (1.03 mmol) was added to solution of pro-ligand (1.03 mmol) in acetonitrile (15 mL) and stirred for 30 mins at 25° C. under $N_2$. $M^1(OAc)_x$ (where $M^1$ is Co, Zn, Mg or Ni and x is 1, 2 or 3 as appropriate) (1.03 mmol) was added to the reaction mixture and stirred for a further 2 h at 25° C. under $N_2$. A diamine (shown below) (1.03 mmol) was added drop-wise to the reaction mixture and was stirred for 16 h at 25° C. under $N_2$.

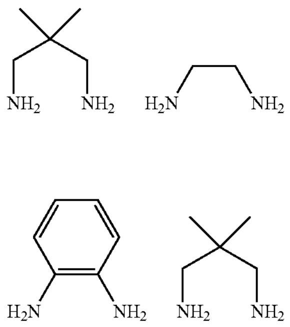

Diamine

The resulting complexes were oxidized by exposure to air and the addition of acetic acid (1.03 mmol) and was stirred for up to 72 h (followed by $^1H$ NMR spectroscopy). The solution was filtered and solvent volume reduced in vacuo. Excess acetic acid was removed by azeotropic evacuation with toluene (3×25 mL). The resulting solid was washed with pentane (3×50 mL) and dried in vacuo affording a solid.

The complexes were characterized by NMR spectroscopy, mass spectrometry, IR spectroscopy and single crystal X-ray diffraction, with purity determined by elemental analysis.

Characterisation

For $^1H$ NMR, solution state $^{13}C\{^1H\}$ NMR and all 2D NMR, a Bruker Avance III HD nanobay NMR equipped with a 9.4 T magnet ($^1H$ 400 MHz, $^{13}C$ 100 MHz) NMR spectrometer was used. For all solid state $^{13}C\{^1H\}$ NMR, a Bruker Avance III HD Solid state NMR equipped with a 9.4 T magnet ($^1H$ 400 MHz, $^{13}C$ 100 MHz) was used.

MALDI-ToF analysis was performed on a Micromass MALDI micro MX spectrometer. The matrix used in combination with complexes was trans-1-[3-(4-tertbutylphenyl)-2-methyl-2-propenyldene]-malonitrile. The matrix used in combination with polymers was dithranol.

Crystalline samples were isolated and mounted on a MiTeGen MircoMounts. The crystal is cooled to 150 K, with Oxford Cryosystems nitrogen cooling device. Data is collected using an Oxford Diffraction Supernova diffractometer using Cu Kα (λ=1.5417 Å) radiation. The resulting raw data was processed using CrysAlisPro. Structures were solved by SHELXT and full-matrix least squares refinements based on F2 were performed in SHELXL-14, as incorporated in the WinGX package.

Elemental analysis determined by Mr Eric Coleman at London Metropolitan University.

Gel permeation chromatography (GPC) analysis was conducted using a Shimadzu LC-20AD instrument, at 40° C., with two mixed bed PSS SDV linear S columns in series, and with THF as eluent at a flow rate of 1 mL/min.

General Procedure for Copolymerisation Reactions

A solution of catalyst and cyclohexene diol in epoxide (3-15 mL) was injected into a 100 mL Parr reactor fitted with a DiComp sentinel probe for insitu-IR spectroscopic measurements. The reactor vessel was then pressurized with $CO_2$ to the targeted reaction pressure and allowed to reach the required temperature.

Example 1—Catalyst Synthesis

Synthesis of Complex 1

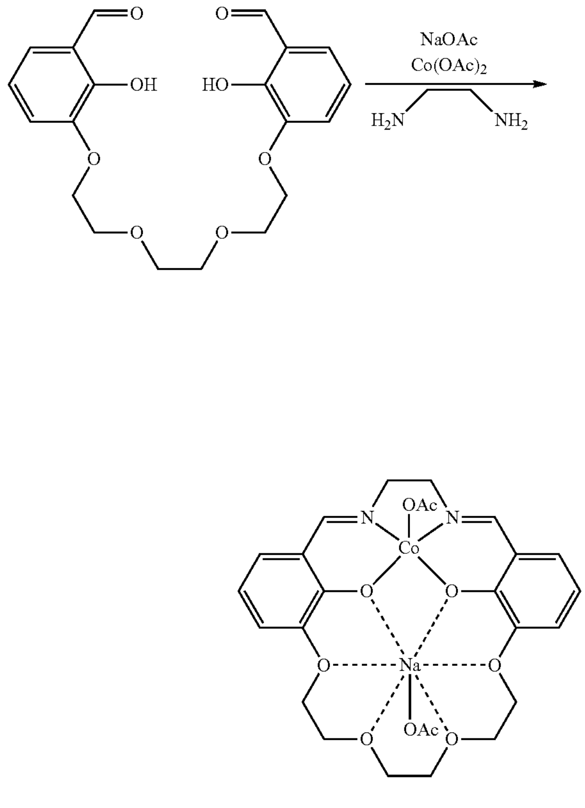

Complex 1 was synthesised by addition of sodium acetate, along with cobalt acetate, to the pro-ligand in acetonitrile at 25° C. under $N_2$ and stirred for 30 min. This was followed by the addition of ethylene diamine, under a $N_2$ atmosphere at 25° C. and stirred for 16 h. The resulting solution was exposed to air and oxidized by adding an additional equivalence of acetic acid. The resulting suspension was filtered, with excess acetic acid removed through azeotropic evaporation with toluene, followed by pentane washes resulting in a pale brown solid.

Complex 1: (0.37 g, 0.61 mmol, 59%)$^1$H NMR (400 MHz, $CDCl_3$, 298 K) δ (ppm): 7.76 (2H, s, HC═N) 6.88 (2H, d, meta-ArH) 6.79 (2H, d, meta-ArH) 6.44 (2H, t, para-ArH) 4.35 (4H, s, $CH_2N$═CH) 4.20-3.94 (16H, s, O—$CH_2$—) 1.44 (6H, s, $CH_3COO$). $^{13}C\{1H\}$ NMR (125 MHz, $CDCl_3$, 298 K) δ (ppm): 179.5 ($H_3CCOO$) 164.7 (HC═N) 157.0 (ipso-Ar) 152.0 (ortho-Ar) 126.5 (meta-Ar) 119.4 (ortho-Ar) 112.7 (meta-Ar) 112.4 (para-Ar) 69.1, 69.1, 67.2 (OCH2-) 58.9 ($CH_2$—N═CH) 24.2 ($H_3CCOO$). HRMS (ESI/FTMS) m/z: $[7\text{-}OAc]^+$ Calcd for $C_{24}H_{27}CoN_2NaO_8$ 553.0992; Found 553.0977. Anal. Calcd for $C_{26}H_{30}CoNaN_2O_{10}$: Calculated; C, 51.0; H, 4.9; N, 4.6%. Found: C, 50.7; H, 4.8; N, 4.4.

Figure 1:
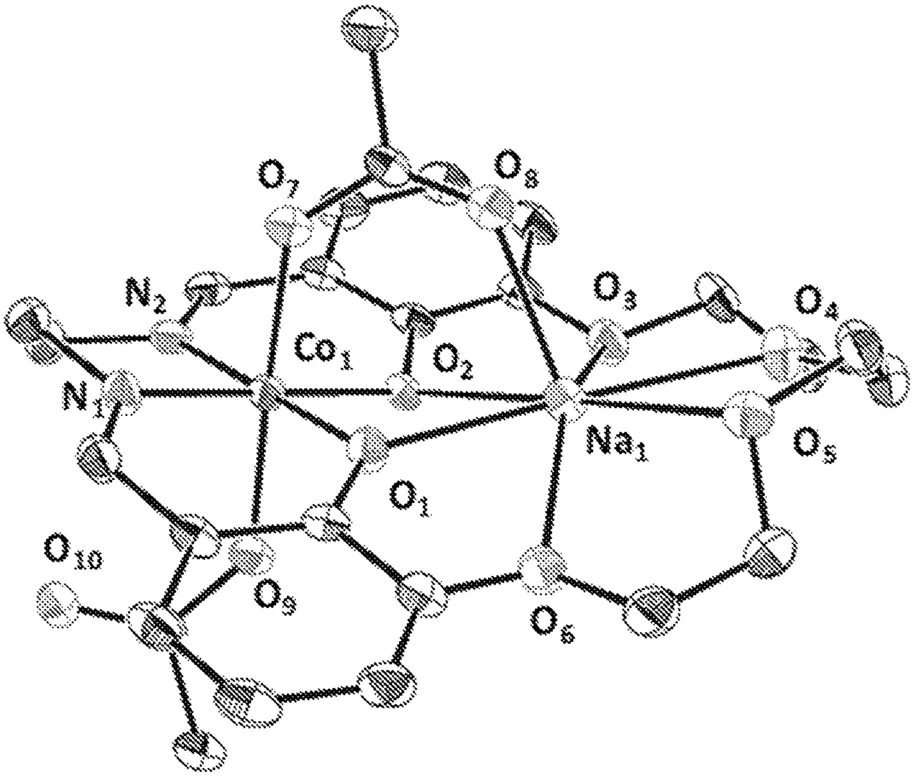
FIG. 1 shows the Oak Ridge Thermal Ellipsoid plot (ORTEP) representation of the molecular structure of Complex 1, with disorder and hydrogen atoms omitted for clarity and thermal ellipsoids represented at 50% probability.

FIG. 1 shows the ORTEP representation of the molecular structure of complex 1, with disorder and hydrogen atoms omitted for clarity and thermal ellipsoids represented at 50% probability.

Synthesis of Complex 2

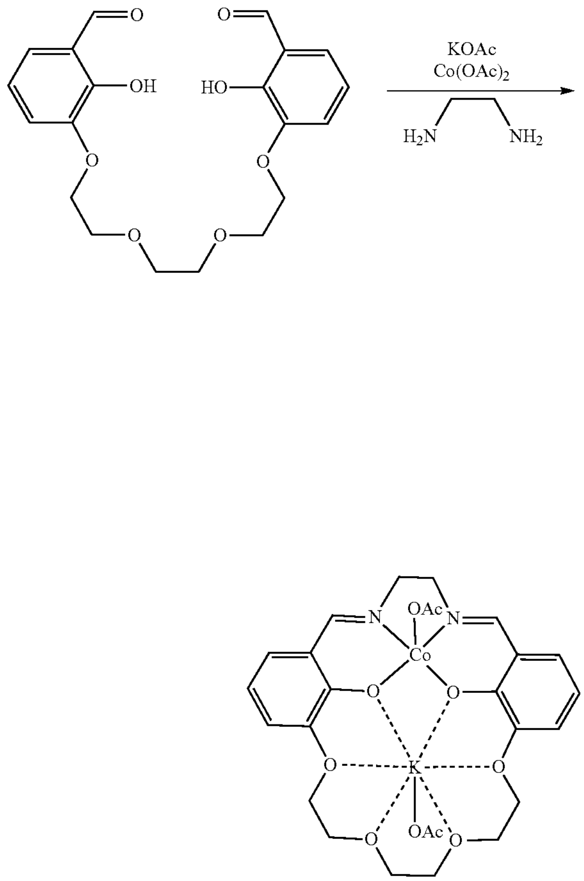

Complex 2 was synthesised by addition of potassium acetate, along with cobalt acetate, to the pro-ligand in acetonitrile at 25° C. under $N_2$ and stirred for 30 min. This was followed by the addition of ethylene diamine, under a $N_2$ atmosphere at 25° C. and stirred for 16 h. The resulting solution was exposed to air and oxidized by adding an additional equivalence of acetic acid. The resulting suspension was filtered, with excess acetic acid removed through azeotropic evaporation with toluene, followed by pentane washes resulting in a pale brown solid.

Complex 2: (0.92 g, 1.47 mmol, 74%)$^1$H NMR (400 MHz, $CDCl_3$, 298 K) δ (ppm): 7.70 (2H, s, HC═N) 6.85 (2H, d, meta-ArH) 6.70 (2H, d, meta-ArH) 6.40 (2H, t, para-ArH) 4.31 (4H, s, $CH_2N$═CH) 4.18-3.80 (16H, s, O—$CH_2$—) 1.45 (6H, s, $CH_3COO$). $^{13}C\{1H\}$ NMR (125 MHz, $CDCl_3$, 298 K) δ (ppm): 179.5 ($H_3CCOO$) 164.8 (HC═N) 157.1 (ip-so-Ar) 152.1 (ortho-Ar) 126.1 (meta-Ar) 119.0 (ortho-Ar) 112.6 (meta-Ar) 112.4 (para-Ar) 70.2, 69.6, 66.1 ($OCH_2$—) 59.4 ($CH_2$—N═CH) 24.8 ($H_3CCOO$). Molecular Cation (MALDI-ToF): 510.5 amu, $[LCo(II)K]^+$. Anal. Calcd for $C_{26}H_{30}CoKN_2O_{10}$ (628.6 g $mol^{-1}$); C, 49.7; H, 4.8; N, 4.5%. Found; C, 49.4; H, 4.7; N, 4.6%.

Figure 2:
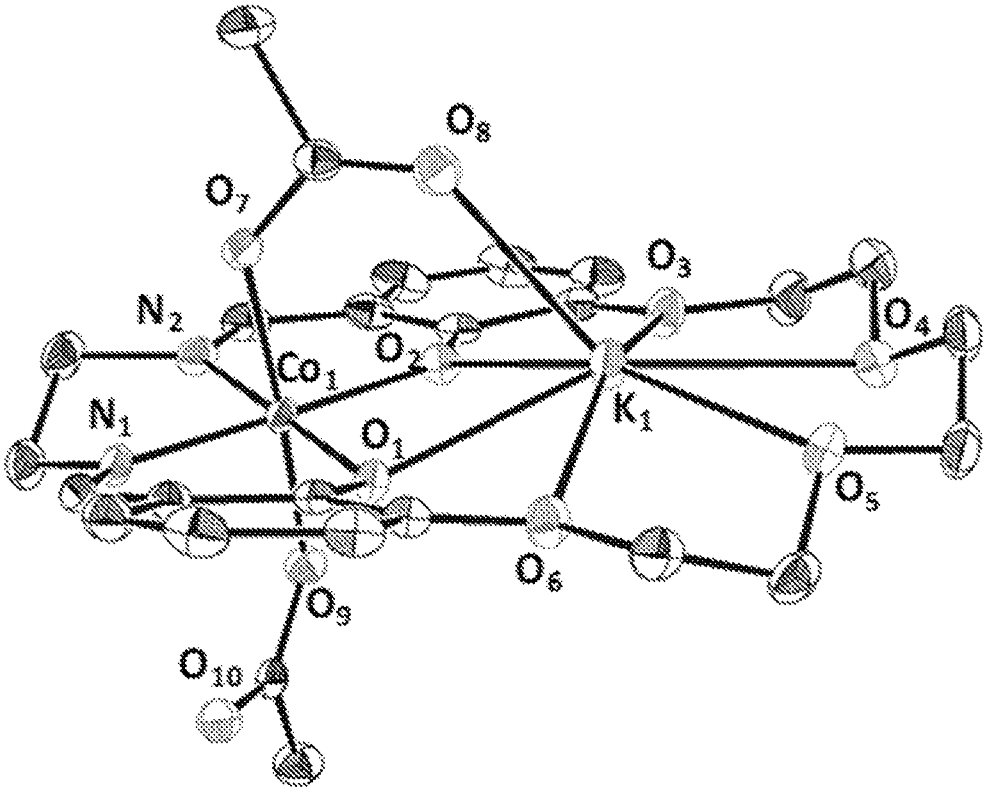
FIG. 2 shows ORTEP representation of the molecular structure of Complex 2, with disorder and hydrogen atoms omitted for clarity and thermal ellipsoids represented at 50% probability.

FIG. 2 shows the ORTEP representation of the molecular structure of complex 2, with disorder and hydrogen atoms omitted for clarity and thermal ellipsoids represented at 50% probability.

Synthesis of Complex 3

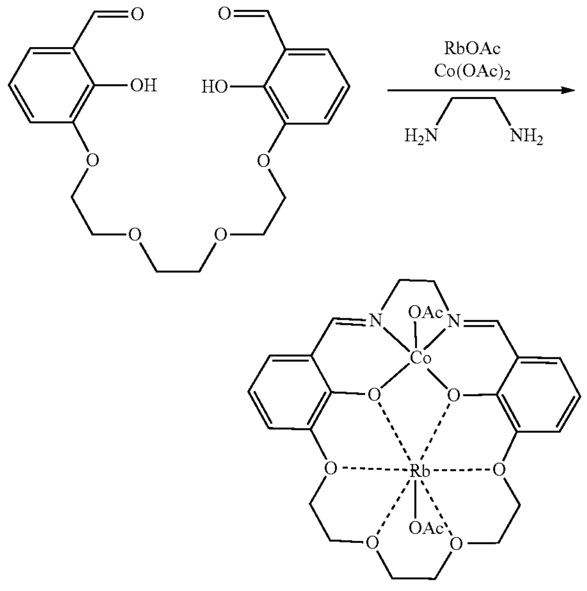

Complex 3 was synthesised by addition of rubidium acetate, along with cobalt acetate, to the pro-ligand in acetonitrile at 25° C. under $N_2$ and stirred for 30 min. This was followed by the addition of ethylene diamine, under a $N_2$ atmosphere at 25° C. and stirred for 16 h. The resulting solution was exposed to air and oxidized by adding an additional equivalence of acetic acid. The resulting suspension was filtered, with excess acetic acid removed through azeotropic evaporation with toluene, followed by pentane washes resulting in a pale brown solid.

Complex 3: (0.38 g, 0.56 mmol, 54%)$^1$H NMR (400 MHz, $CDCl_3$, 298 K) δ (ppm): 7.70 (2H, s, HC═N) 6.86 (2H, d, meta-ArH) 6.73 (2H, d, meta-ArH) 6.42 (2H, t, para-ArH) 4.42 (4H, s, $CH_2N$═CH) 4.19-3.84 (16H, s, O—$CH_2$—) 1.45 (6H, s, $CH_3COO$). $^{13}C\{1H\}$ NMR (125 MHz, $CDCl_3$, 298 K) δ (ppm): 180.1 ($H_3CCOO$) 165.4 (HC═N) 156.4 (ip-so-Ar) 151.9 (ortho-Ar) 126.2 (meta-Ar) 118.8 (ortho-Ar) 112.8 (meta-Ar) 112.6 (para-Ar) 69.8, 69.4, 66.4 ($OCH_2$—) 59.3 ($CH_2$—N═CH) 24.3 ($H_3CCOO$). Molecular Cation (MALDI-ToF): 556.0 amu, $[LCo(II)Rb]^+$. Anal. Calcd for $C_{26}H_{30}CoRbN_2O_{10}$ (674.9 g $mol^1$); C, 46.4; H, 4.5; N, 4.2%. Found; C, 46.3; H, 4.4; N, 4.0%.

Synthesis of Complex 4

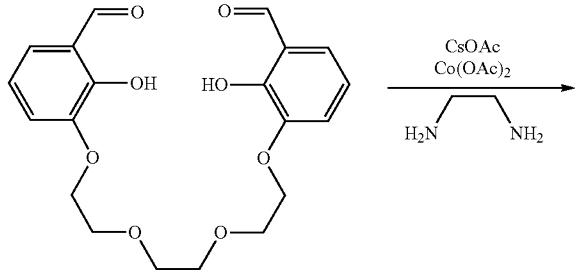

-continued

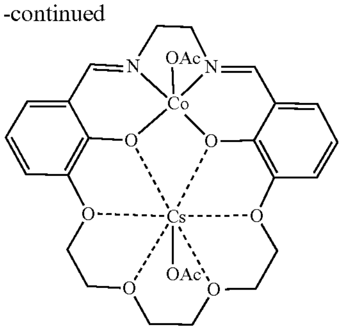

Complex 4 was synthesised by addition of caesium acetate, along with cobalt acetate, to the pro-ligand in acetonitrile at 25° C. under $N_2$ and stirred for 30 min. This was followed by the addition of ethylene diamine, under a $N_2$ atmosphere at 25° C. and stirred for 16 h. The resulting solution was exposed to air and oxidized by adding an additional equivalence of acetic acid. The resulting suspension was filtered, with excess acetic acid removed through azeotropic evaporation with toluene, followed by pentane washes resulting in a pale brown solid.

Complex 4: (0.28 g, 0.39 mmol, 51%)$^1$H NMR (400 MHz, $CDCl_3$, 298 K) δ (ppm): 7.73 (2H, s, HC═N) 6.89 (2H, d, meta-ArH) 6.74 (2H, d, meta-ArH) 6.45 (2H, t, para-ArH) 4.51 (4H, s, $CH_2N$═CH) 4.15-3.84 (16H, s, O—$CH_2$—) 1.46 (6H, s, $CH_3COO$). $^{13}C\{1H\}$ NMR (125 MHz, $CDCl_3$, 298 K) δ (ppm): 179.6 ($H_3CCOO$) 166.0 (HC═N) 155.4 (ipso-Ar) 151.2 (ortho-Ar) 126.5 (meta-Ar) 119.4 (ortho-Ar) 112.9 (meta-Ar) 112.8 (para-Ar) 69.2, 68.9, 66.5 ($OCH_2$—) 59.9 ($CH_2$—N═CH) 24.7 ($H_3CCOO$). Molecular Cation (MALDI-ToF): 604.4 amu, $[LCo(II)Cs]^+$. Anal. Calcd for $C_{26}H_{30}CoCsN_2O_{10}$ (722.37 g $mol^{-1}$); C, 43.2; H, 4.2; N, 3.9%. Found; C, 43.5; H, 4.0; N, 4.0%.

Synthesis of Complex 5

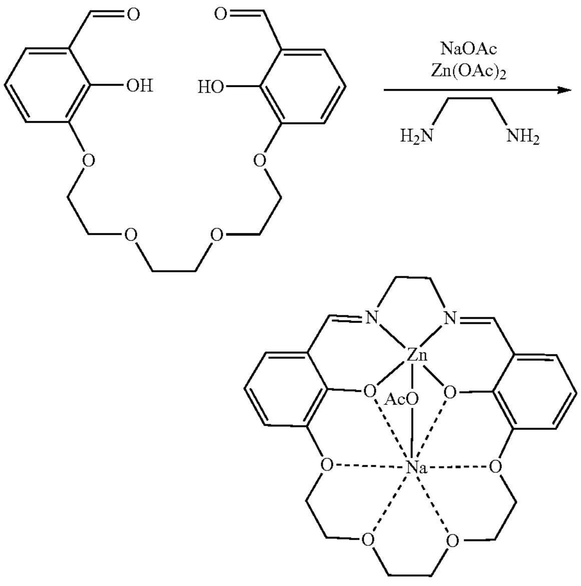

Complex 5 was synthesised by addition of the pro-ligand and sodium acetate to methanol. A solution of ethylene diamine in methanol was added dropwise over the course of 3 h. The solution was left to cool to room temperature, before $Zn(OAc)_2 \cdot 2(H_2O)$ was added and left to stir for 1 h. The solvent was removed under reduced pressure to obtain a pale yellow glassy solid as the crude product. This was triturated with dichloromethane and dried under vacuum at 60° C. to give a pure product.

Complex 5: (298 mg, 0.53 mmol, 69%) $^1$H NMR (400 MHz, $CDCl_3$, 298 K) δ (ppm): 8.29 (2H, s, —HC═N—), 6.81 (4H, m, Ar—$H_{meta}$), 6.41 (2H, m, Ar—$H_{para}$), 4.22-3.60 (16H, m, —O—$CH_2$—, ═N—$CH_2$—), 1.81 (3H, s, $H_3C$—C(O)O). $^{13}$C NMR (100 MHz, $CDCl_3$, 298 K) δ (ppm): 177.0 (—C(O)O), 167.6 (—HC═N—), 150.8 (Ar—$C_{ortho}$—O—$CH_2$), 128.0 (Ar—$C_{meta}$), 120.0 (Ar—$C_{ipso}$), 117.7 (Ar—$C_{meta}$), 112.0 (Ar—$C_{para}$), 70.1 (—O—$CH_2$—), 69.8 (—O—$CH_2$—), 67.8 (—O—$CH_2$—), 56.1 (═N—$CH_2$—), 23.6 ($H_3C$—C(O)O). Anal. Calcd for $C_{28}H_{27}N_2NaO_8Zn$: C, 51.49; H, 4.86; N, 5.00. Found: C, 51.80; H, 4.97; N, 5.22.

Synthesis of Complex 6

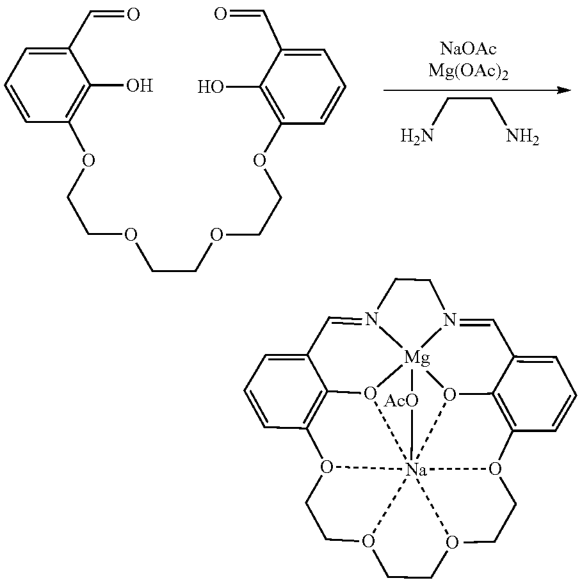

Complex 6 was synthesised by addition of the pro-ligand and sodium acetate to methanol. A solution of ethylene diamine in methanol was added dropwise over the course of 3 h. The solution was left to cool to room temperature, before $Mg(OAc)_2 \cdot 4(H_2O)$ was added and left to stir for 1 h. The solvent was removed under reduced pressure to obtain a pale yellow glassy solid as the crude product. The product was recrystallized from methanol/diethyl ether mixture (1:10) at −20° C. The crystals were washed with pentane and triturated with chloroform and dried under vacuum at 40° C. to obtain the pure product.

Complex 6: (59.1 mg, 0.11 mmol, 15%) $^1$H NMR (400 MHz, $CDCl_3$, 298 K) δ (ppm): 8.20 (2H, s, —HC═N—), 6.79 (4H, m, Ar—$H_{meta}$), 6.33 (2H, t, Ar—$H_{para}$, $^3J_{H-H}$=7.7 Hz), 4.38-3.42 (16H, m, —O—$CH_2$—, ═N—$CH_2$—), 1.75 (3H, s, $H_3C$—C(O)O). $^{13}$C NMR (100 MHz, $CDCl_3$, 298 K) δ (ppm): 179.2 (—C(O)O), 167.8 (—HC═N—), 161.0 (Ar—$C_{ortho}$—HC═N—), 150.6 (Ar—$C_{ortho}$—O—$CH_2$), 128.3 (Ar—$C_{meta}$), 121.7 (Ar—$C_{ipso}$), 118.5 (Ar—$C_{meta}$), 111.8 (Ar—$C_{para}$), 70.6 (—O—$CH_2$—), 69.9 (—O—$CH_2$—), 67.9 (—O—$CH_2$—), 57.2 (═N—$CH_2$—), 24.2 ($H_3C$—C(O)O).

Synthesis of Complex 7

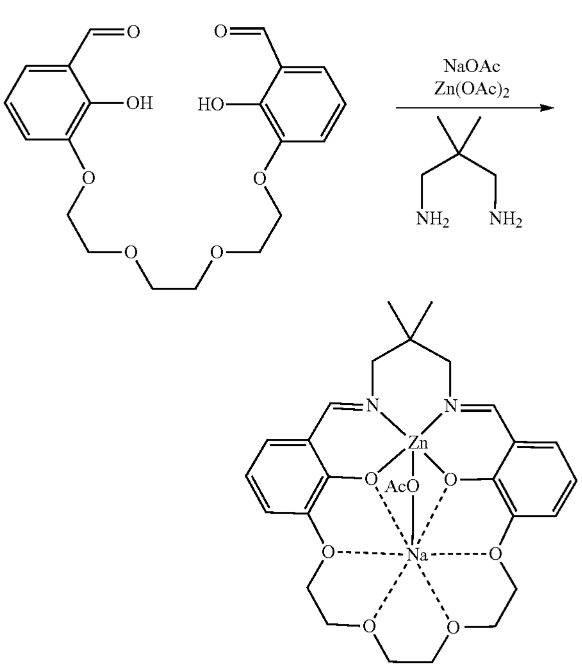

Complex 7 was synthesised by addition of the pro-ligand and sodium acetate to methanol. A solution of 2,2-dimethylpropane-1,3-diamine in methanol was added dropwise over the course of 3 h. The solution was left to cool to room temperature, before $Zn(OAc)_2 \cdot 2(H_2O)$ was added and left to stir for 1 h. The solvent was removed under reduced pressure to obtain a pale yellow glassy solid as the crude product. This was triturated with ethanol and dichloromethane and dried under vacuum at 40° C. to give a pure product.

Complex 7: (343 mg, 0.57 mmol, 74%) $^1$H NMR (400 MHz, $C_2D_2Cl_4$, 298 K) δ (ppm): 7.87 (s, 2H, —HC═N—), 6.85 (dd, 2H, Ar—$H_{meta}$, $^3J_{H-H}$=7.6 Hz, $^4J_{H-H}$=1.8 Hz), 6.81 (dd, 2H, Ar—$H_{meta}$, $^3J_{H-H}$=7.6 Hz, $^4J_{H-H}$=1.8 Hz), 6.42 (t, 2H, Ar—$H_{para}$, $^3J_{H-H}$=7.7 Hz), 4.26-3.64 (m, 14H, —$H_2C$—N═, —O—$CH_2$—), 3.09 (d, 2H, —$H_2C$—N═, $^3J_{H-H}$=12.0 Hz), 1.89 (s, 3H, $H_3C$—C(O)O), 1.08 (s, 3H, $H_3C$—C—), 0.82 (s, 3H, $H_3C$—C—). $^{13}$C NMR (100 MHz, $C_2D_2Cl_4$, 298 K) δ (ppm): 177.5 (—C(O)O), 168.6 (—HC═N—), 162.1 (Ar—$C_{ortho}$), 150.5 (Ar—$C_{ortho}$), 128.3 (Ar—$C_{meta}$), 119.06 (Ar—$C_{meta}$), 117.46 (Ar—$C_{ipso}$), 111.6 (Ar—$C_{para}$), 74.65 (—$H_2C$—N═), 68.93 (—$H_2C$—N═, —O—$CH_2$—), 68.48 (—$H_2C$—N═, —O—$CH_2$—), 68.40 (—$H_2C$—N═, —O—$CH_2$—), 36.13 ($(H_3C)_2$—C—), 27.28 ($H_3C$—C—), 24.73 ($H_3C$—C(O)O), 22.29 ($H_3C$—C—). Anal calcd (found) for $C_{27}H_{33}N_2NaO_3Zn$: C, 53.88 (53.81); H, 5.53 (5.62); N, 4.65 (4.60).

Figure 3:
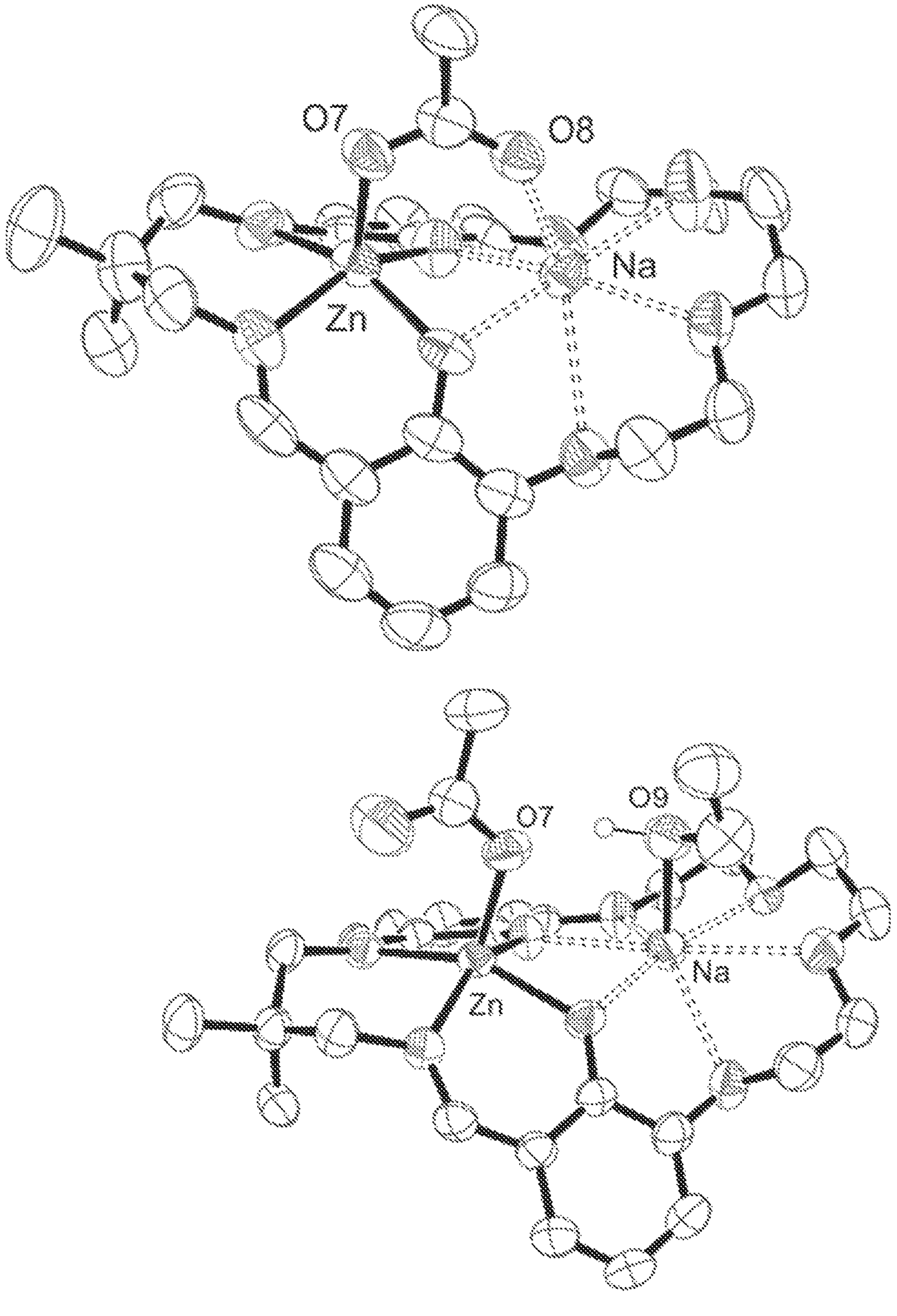
FIG. 3 shows ORTEP representation for the molecular structure of Complex 7 (top) and Complex 7-(EtOH) (bottom) with disorder and hydrogen atoms omitted for clarity and thermal ellipsoids represented at 50% probability.

FIG. 3 shows ORTEP representation for the molecular structure of complex 7 with disorder and hydrogen atoms omitted for clarity and thermal ellipsoids represented at 50% probability.

Synthesis of Complex 8

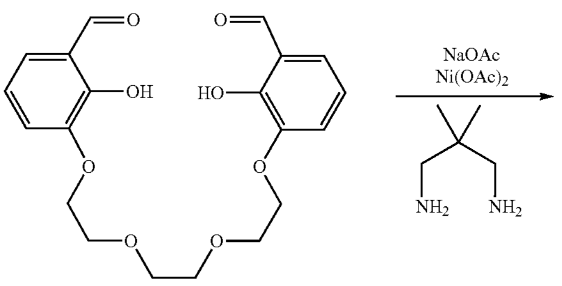

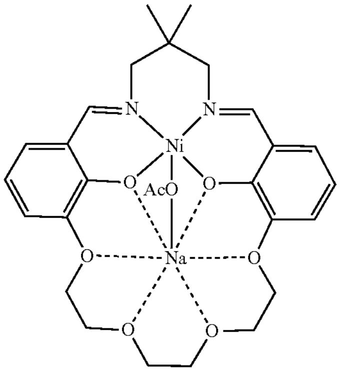

Complex 8 was synthesised by addition of the pro-ligand and sodium acetate to methanol. A solution of 2,2-dimethylpropane-1,3-diamine in methanol was added dropwise over the course of 3 h. The solution was left to cool to room temperature, before $Ni(OAc)_2 \cdot 4(H_2O)$ was added and left to stir for 1 h. The solvent was removed under reduced pressure to obtain a pale yellow glassy solid as the crude product. This was triturated with ethanol and dichloromethane and dried under vacuum at 40° C. to give a pure product.

Complex 8: (262 mg, 0.45 mmol, 58%)

Synthesis of Complex 9

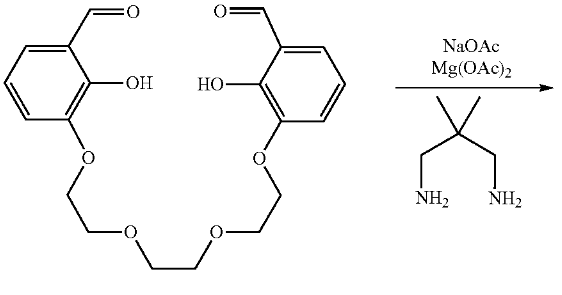

-continued

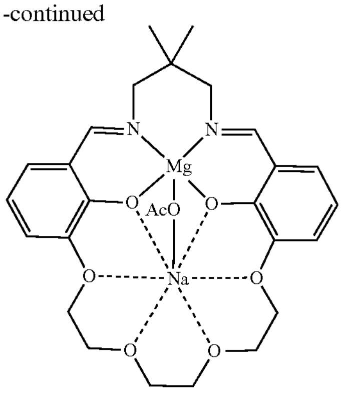

Complex 9 was synthesised by addition of the pro-ligand and sodium acetate to methanol. A solution of 2,2-dimethylpropane-1,3-diamine in methanol was added dropwise over the course of 3 h. The solution was left to cool to room temperature before $Mg(OAc)_2 \cdot 4(H_2O)$ was added and left to stir for 1 h. The solvent was removed under reduced pressure to obtain a pale yellow glassy solid as the crude product. This was triturated with ethanol and dichloromethane and dried under vacuum at 40° C. to give a pure product.

Complex 9: (179 mg, 0.32 mmol, 63%)$^1$H NMR (400 MHz, $C_2D_2Cl_4$, 398 K) δ (ppm): 8.05 (s, 2H, —HC═N—), 6.88 (m, 4H, Ar—$H_{meta}$), 6.46 (t, 2H, Ar—$H_{para}$, $^3J_{H\text{-}H}$=7.5 Hz), 4.25-3.61 (m, 16H, —$H_2$C—N═, —O—$CH_2$—), 1.99 (s, 6H, $H_3$C—C(O)O), 1.01 (s, 6H, $H_3$C—C—). Anal calcd (found) for $C_{27}H_{33}MgN_2NaO_8$: C, 57.82 (55.15); H, 5.93 (6.21); N, 4.99 (4.40).

Synthesis of Complex 10

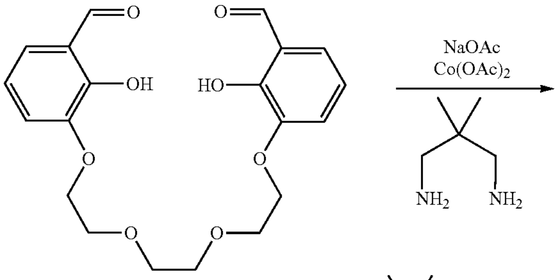

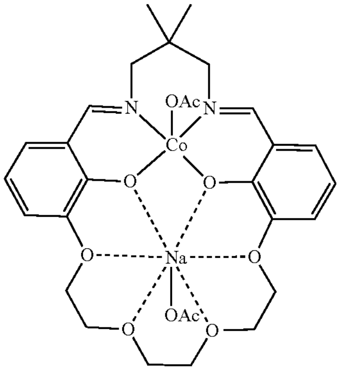

Complex 10 was synthesised by addition of the pro-ligand and sodium acetate to methanol under $N_2$. A solution of 2,2-dimethylpropane-1,3-diamine in methanol was added dropwise over the course of 3 h under an atmosphere of $N_2$.

The solution was left to cool to room temperature before $Co(OAc)_2 \cdot 4(H_2O)$ (256 mg, 1.03 mmol) was added and the solution left to stir overnight. The mixture was further stirred under ambient conditions for 24 h. The solvent was removed under reduced pressure to obtain a dark brown glassy solid. This was dissolved in acetonitrile and diluted with diethyl ether. The precipitate was isolated by filtration and triturated once with chloroform to obtain the product.

Complex 10: (533 mg, 0.81 mmol, 79%)$^1$H NMR (400 MHz, $C_2D_2Cl_2$, 298 K) δ (ppm): 7.24 (s, 2H, —HC═N—), 6.82 (dt, 2H, Ar—$H_{meta}$, $^3J_{H-H}$=21.4, $^4J_{H-H}$=5.3 Hz), 6.55-6.44 (mm, 2H, Ar—$H_{meta}$), 4.30-3.69 (m, 12H, —O—$CH_2$—), 3.41 (s, 4H, —$H_2C$—N═), 1.47 (s, 6H, $H_3C$—C(O)O), 1.19 (S, 6H, $H_3C$—C—). $^{13}$C NMR (100 MHz, $C_2D_2Cl_2$, 298 K) δ (ppm): 180.8 (—C(O)O), 166.2 (—HC═N—), 157.1 (Ar—$C_{ortho}$), 151.9 (Ar—$C_{ortho}$), 126.3 (Ar—$C_{meta}$), 122.6 (Ar—$C_{ipso}$), 117.25 (Ar—$C_{meta}$), 114.2 (Ar—$C_{para}$), 71.22 (═N—$CH_2$—), 68.77 (—O—$CH_2$—), 68.08 (—O—$CH_2$—), 35.07 ($(H_3C)_2$—C—$(CH_2)_2$), 25.13 ($H_3C$—C(O)O, $H_3C$—C—), 24.62 ($H_3C$—C(O)O), $H_3C$—C—). Anal calcd (found) for $C_{27}H_{33}CoN_2NaO_3$: C, 54.46 (53.57); H, 5.59 (5.38); N, 4.70 (4.73).

Figure 5:
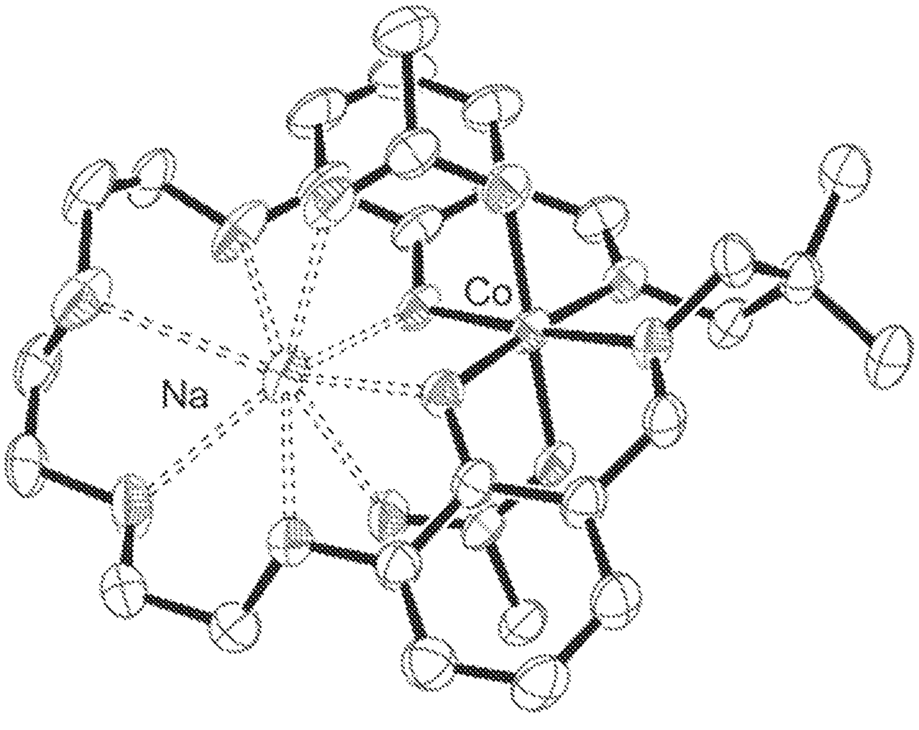
FIG. 5 shows ORTEP representation for the molecular structure of Complex 10 with disorder and hydrogen atoms omitted for clarity and thermal ellipsoids represented at 50% probability.

FIG. 5 shows ORTEP representation for the molecular structure of complex 10 with disorder and hydrogen atoms omitted for clarity and thermal ellipsoids represented at 50% probability.

Synthesis of Complex 11

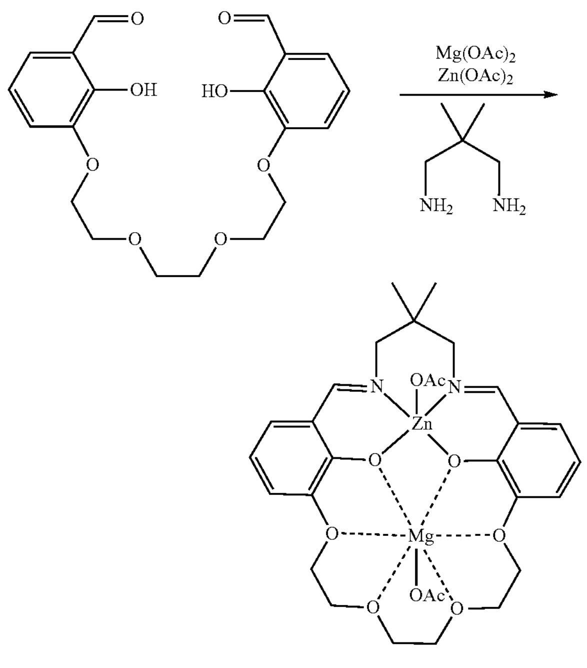

Complex 11 was synthesised by addition of the pro-ligand and $Mg(OAc)_2 \cdot 4(H_2O)$ to methanol. A solution of 2,2-dimethylpropane-1,3-diamine in methanol was added dropwise over the course of 3 h. The solution was left to cool to room temperature, before the $Zn(OAc)_2 \cdot 2(H_2O)$ was added and left to stir for 1 h. The solvent was removed under reduced pressure to obtain a pale yellow glassy solid as the crude. This was triturated with ethanol and dichloromethane and dried under vacuum at 40° C. to give a pure product.

Complex 11: (359 mg, 0.554 mmol, 72%)$^1$H NMR (400 MHz, $C_2D_2Cl_4$, 328 K) δ (ppm): 8.00 (s, 2H, —HC═N—), 6.80 (dd, 4H, Ar—$H_{meta}$, $^3J_{H-H}$=18.5 Hz, $^4J_{H-H}$=7.8 Hz), 6.59 (t, 2H, Ar—$H_{para}$, $^3J_{H-H}$=7.9 Hz), 4.32 (d, 2H, —$H_2C$—N═, $^2J_{H-H}$=11.9 Hz), 4.21 (s, 4H, —O—$CH_2$—), 3.98-3.60 (m, 8H, —O—$CH_2$—), 3.13 (d, 2H, —$H_2C$—N═, $^2J_{H-H}$=11.9 Hz), 2.00 (s, 6H, $H_3C$—C(O)O), 1.13 (s, 3H, $H_3C$—C—), 0.85 (s, 3H, $H_3C$—C—). $^{13}$C NMR (100 MHz, $C_2D_2Cl_4$, 328 K). δ (ppm): 168.2 (—HC═N—), 157.9 (Ar—$C_{ortho}$), 148.9 (Ar—$C_{ortho}$), 126.5 (Ar—$C_{meta}$), 118.3 (Ar—$C_{ipso}$), 113.4 (Ar—$C_{para}$), 112.4 (Ar—$C_{meta}$), 74.42 (—$H_2C$—N═), 69.36 (—O—$CH_2$—), 68.10 (—O—$CH_2$—), 66.66 (—O—$CH_2$—), 57.90 (—O—$CH_2$—), 35.56 ($(H_3C)_2$—C—), 26.69 ($H_3C$—C—), 21.51 ($H_3C$—C—, $H_3C$—C(O)O). Anal calcd (found) for $C_{29}H_{36}MgN_2O_{10}Zn$: C, 52.59 (52.48); H, 5.48 (5.29); N, 4.23 (4.25).

Synthesis of Complex 12

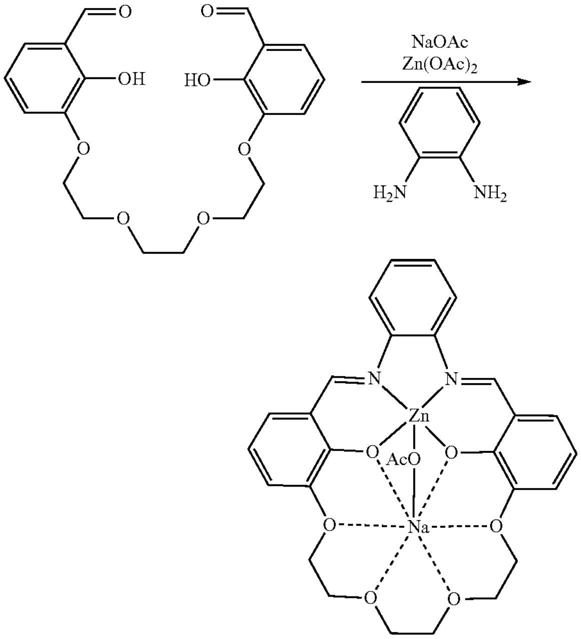

Complex 12 was synthesised by addition of the pro-ligand and sodium acetate to methanol. A solution of O-phenylenediamine in methanol was added dropwise over the course of 3 h. The solution was left to cool to room temperature, before $Zn(OAc)_2 \cdot 2(H_2O)$ was added and left to stir for 1 h. The solvent was removed under reduced pressure leaving a yellow-orange powder contaminated by acetic acid. The solid crude was triturated with methanol and washed with diethyl ether to remove the acid by-product to give the target compound.

Complex 12: (0.53 mmol, 320 mg, 68%)$^1$H NMR (400 MHz, $CDCl_3$, 298 K) δ (ppm): 8.68 (2H, s, —HC═N—), 7.57 (2H, m, Ar—$H_{ortho'}$), 7.31 (2H, m, Ar—$H_{meta'}$), 6.96 (2H, dd, Ar—$H_{meta}$, $^3J_{H-H}$=8.02 Hz, $^4J_{H-H}$=1.69 Hz), 6.90 (2H, dd, Ar—$H_{meta}$, $^3J_{H-H}$=7.60 Hz, $^4J_{H-H}$=1.73 Hz), 6.46 (2H, t, Ar—$H_{para}$, $^3J_{H-H}$=7.75 Hz), 4.34-3.76 (12H, m, —O—$CH_2$—), 1.79 (3H, S, $H_3C$—C(O)O). $^{13}$C{$^1$H} CP-MAS (100 MHz, 298 K) δ (ppm): 178.0 (—C(O)O), 162.8, 161.5, 159.6, 151.3 (Ar—$C_{ortho}$—O—$CH_2$), 139.3 (Ar—$C_{ipso}$), 127.7, 125.5 (Ar—$C_{meta'}$, Ar—$C_{meta}$), 118.6, 115.7, 110.1 (Ar—$C_{para}$, Ar—$C_{meta}$, Ar—$C_{ortho'}$), 73.3 (—O—$CH_2$—), 69.3 (—O—$CH_2$—), 67.5 (—O—$CH_2$—), 65.8 —O—$CH_2$—), 24.5 ($H_3C$—C(O)O). Anal. Calcd for $C_{28}H_{27}N_2NaO_8Zn$: C 55.32; H, 4.48; N, 4.61. Found: C 55.19; H, 4.62; N, 4.49.

Figure 4:
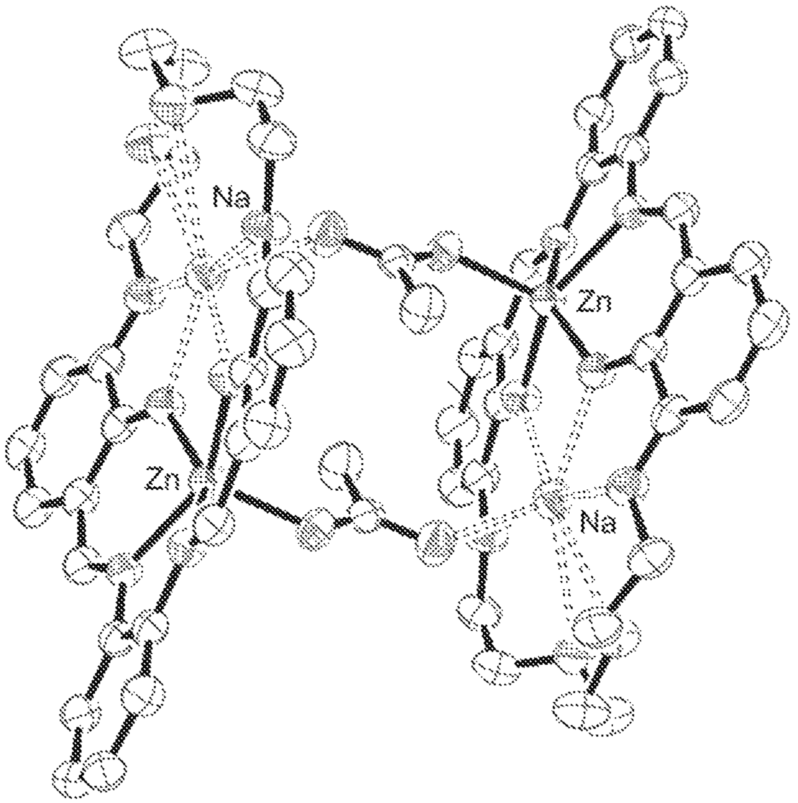
FIG. 4 shows ORTEP representation for the molecular structure of Complex 12 with disorder and hydrogen atoms omitted for clarity and thermal ellipsoids represented at 50% probability. The two molecules of Complex 12 are shown coordinated to one another via acetate co-ligands.

FIG. 4 shows ORTEP representation for the molecular structure of complex 12 with disorder and hydrogen atoms omitted for clarity and thermal ellipsoids represented at 50% probability.

Synthesis of Complex 13

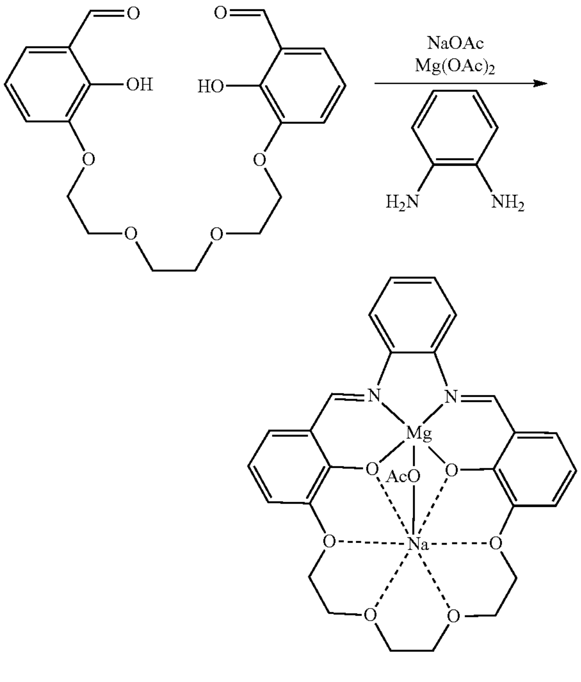

Complex 13 was synthesised by addition of the pro-ligand and sodium acetate to methanol. A solution of 0-phenylenediamine in methanol was added dropwise over the course of 3 h. The solution was left to cool to room temperature, before $Mg(OAc)_2 \cdot 4(H_2O)$ was added and left to stir for 1 h. The solvent was removed under reduced pressure leaving a yellow-orange powder. The solid crude was triturated with methanol and chloroform and washed with diethyl ether, then stirred in excess ethanol overnight. Ethanol was removed under reduced pressure to give pure product.

Complex 13: (0.25 mmol, 144 mg, 33%)$^{1}$H NMR (400 MHz, $CDCl_3$, 298 K) δ (ppm): 8.68 (2H, s, —HC═N—), 7.57 (2H, m, Ar—$H_{ortho'}$), 7.32 (2H, m, Ar—$H_{meta'}$), 6.96 (2H, dd, Ar—$H_{meta}$, $^{3}J_{H-H}$=8.02 Hz, $^{4}J_{H-H}$=1.69 Hz), 6.91 (2H, dd, Ar—$H_{meta}$, $^{3}J_{H-H}$=7.60 Hz, $^{4}J_{H-H}$=1.73 Hz), 6.46 (2H, t, Ar—$H_{para}$, $^{3}J_{H-H}$=7.75 Hz), 4.33-3.76 (12H, m, —O—$CH_2$—), 1.79 (3H, S, $H_3C$—C(O)O). $^{13}C\{^{1}H\}$ CP-MAS (100 MHz, 298K) δ (ppm): 177.0 (—C(O)O), 161.5, 160.2 (Ar—$C_{ortho}$—HC═N—, HC═N—), 151.2 (Ar—$C_{ortho}$—O—$CH_2$), 141.2 (Ar—$C_{ipso'}$), 127.7, 125.6 (Ar—$C_{ortho'}$, Ar—$C_{meta}$), 120.4 (Ar—$C_{ipso}$), 117.9, 115.5, 111.6 (Ar—$C_{para}$, Ar—$C_{meta}$, Ar—$C_{meta'}$), 73.1 (—O—$CH_2$—), 69.3 (—O—$CH_2$—), 67.4 (—O—$CH_2$—), 65.9 (—O—$CH_2$—), 24.6 ($H_3C$—C(O)O). Anal. Calcd for $C_{28}H_{27}N_2NaO_8Mg$: C, 59.33; H, 4.80; N, 4.94. Found: C, 59.14; H, 4.76; N, 4.83.

Synthesis of Complex 14

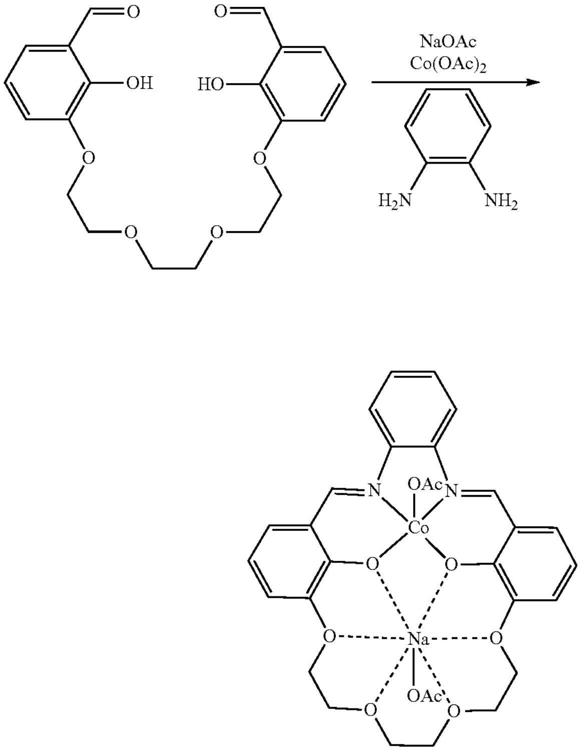

Complex 14 was synthesised by addition of the pro-ligand and sodium acetate to methanol under $N_2$. A solution of 0-phenylenediamine in methanol was added dropwise over the course of 3 h under an atmosphere of $N_2$. The solution was left to cool to room temperature before $Co(OAc)_2$ $4(H_2O)$ (256 mg, 1.03 mmol) was added and the solution left to stir overnight.

The mixture was further stirred under ambient conditions for 24 h. The solvent was removed under reduced pressure to obtain a dark brown glassy powder. This was dissolved in acetonitrile and diluted with diethyl ether, precipitating a black solid which was removed by filtration and triturated once with chloroform obtaining the pure product.

Complex 14: (291 mg, 0.44 mmol, 43%)$^{1}$H NMR (400 MHz, $CDCl_3$, 298 K) δ (ppm): 8.23 (2H, s, —HC═N—), 8.00 (2H, m, Ar—$H_{ortho'}$), 7.38 (2H, m, Ar—$H_{meta'}$), 7.04 (2H, d, Ar—$H_{meta}$, $^{3}J_{H-H}$=7.96 Hz), 6.82 (2H, d, Ar—$H_{meta}$, $^{3}J_{H-H}$=7.55 Hz), 6.51 (2H, t, Ar—$H_{para}$, $^{3}J_{H-H}$=7.81 Hz), 4.23 (4H, m, —O—$CH_2$—), 3.85 (4H, m, —O—$CH_2$—), 3.65 (4H, s, —O—$CH_2$—), 1.38 (3H, s, $H_3C$—C(O)O). $^{13}C\{^{1}H\}$CP-MAS (100 MHz, 298K) δ (ppm): 181.7 (—C(O)O), 178.1 (—C(O)O), 160.7, 157.5, 151.9 (Ar—$C_{ortho}$—O—$CH_2$), 146.1 (Ar—$C_{ipso}$), 128.5, 126.5 (Ar—$C_{ortho'}$, Ar—$C_{meta}$), 119.1 (Ar—$C_{ipso}$), 118.6, 115.9, 113.4 (Ar—$C_{para}$, Ar—$C_{meta'}$, Ar—$C_{meta}$), 80.9 (—O—$CH_2$—), 70.3 (—O—$CH_2$—), 68.2 (—O—$CH_2$—), 66.9 (—O—$CH_2$—), 25.3 ($H_3C$—C(O)O), 23.6 ($H_3C$—C(O)O). Anal. Calcd for $C_{30}H_{30}N_2NaO_{10}Zn$: C, 54.55; H, 4.58; N, 4.24. Found: C, 54.35; H, 4.44; N, 4.14. HRMS (ESI/FTMS) m/z: [10-OAc]$^{+}$ Calcd for $C_{28}H_{27}CoN_2NaO_8$ 601.0992; Found 601.0980.

Synthesis of Complex 15

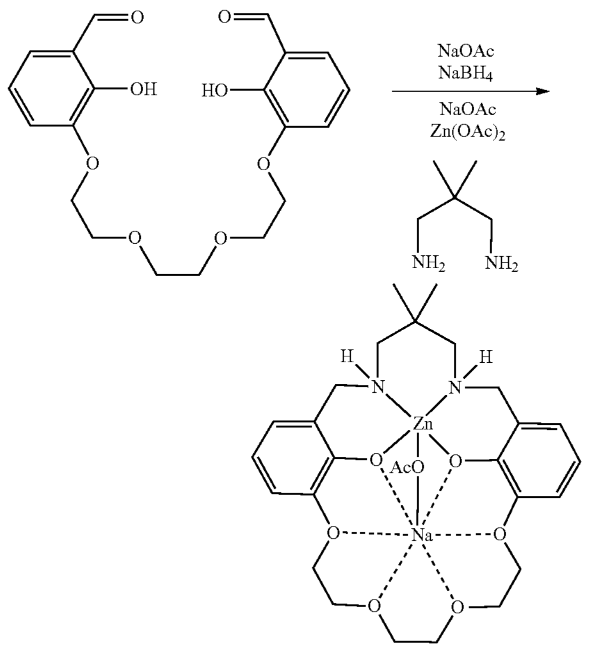

Complex 15 was synthesised by addition of the pro-ligand and sodium acetate to methanol. A solution of 2,2-dimethylpropane-1,3-diamine in methanol was added dropwise over the course of 3 h. The solvent was removed under reduced pressure to obtain a pale yellow glassy solid as the crude product. The resultant solid was washed with deionized water, then dissolved in MeOH. 20 equiv. of $NaBH_4$ was added in one portion and left to stir for 2 h. Water was added to quench the excess $NaBH_4$ and the solvent was subsequently removed under reduced pressure. The resulting solid was washed with distilled water. The solid was then dissolved in MeOH before $Zn(OAc)_2 \cdot 2(H_2O)$ and sodium acetate was added and left to stir for 1 h. The solvent was removed under reduced pressure to obtain a yellow glassy solid as the crude product. This was triturated with ethanol and dichloromethane and dried under vacuum at 40° C. to give a pure product.

Complex 15: (256 mg, 0.424 mmol, 65%)$^1$H NMR (500 MHz, $C_2D_2Cl_4$, 298 K) δ (ppm): 6.79 (2H, d, Ar—$H_{meta}$, $^3J_{H\text{-}H}$=7.9 Hz), 6.67 (2H, d, Ar—$H_{meta}$, $^3J_{H\text{-}H}$=7.4 Hz), 6.50 (2H, t, Ar—$H_{para}$, $^3J_{H\text{-}H}$=7.7 Hz), 4.22-3.58 (16H, m, —O—$CH_2$—, —NH—$CH_2$—Ar), 3.16 ($CH_2$—NH—$CH_2$), 2.75 (2H, t, —NH—$CH_2$—$C(CH_3)_2$—, $^3J_{H\text{-}H}$=12.4 Hz), 2.41 (2H, d, —NH—$CH_2$—$C(CH_3)_2$—, $^3J_{H\text{-}H}$=11.4 Hz), 1.83 (6H, s, $H_3C$—C(O)O), 1.23 (3H, s, C—$CH_3$), 0.90 (3H, s, C—$CH_3$). $^{13}$C NMR (125 MHz, $C_2D_2Cl_4$, 298 K) δ (ppm): 177.1 (—C(O)O), 154.7 (Ar—$C_{ortho}$—O—$CH_2$), 149.6 (Ar—$C_{ortho}$—$CH_2$), 124.9 (Ar—$C_{ipso}$), 123.7 (Ar—$C_{meta}$), 114.33 (Ar—$C_{meta}$), 113.6 (Ar—$C_{para}$), 69.40 (—O—$CH_2$—), 69.12 (—O—$CH_2$—), 67.93 (—O—$CH_2$—), 61.82 ($(CH_3)_2C$—$CH_2$—$NH_2$), 54.19 ($NH_2$—$CH_2$—Ar), 34.12 ($C(CH_3)_2$), 31.17 (C—$CH_3$), 22.52 ($H_3C$—C(O)O, C—$CH_3$). Anal calcd (found) for $C_{27}H_{37}N_2NaO_3Zn$: C, 53.52 (53.67); H, 6.15 (6.06); N, 4.62 (4.68).

Synthesis of Complex 16

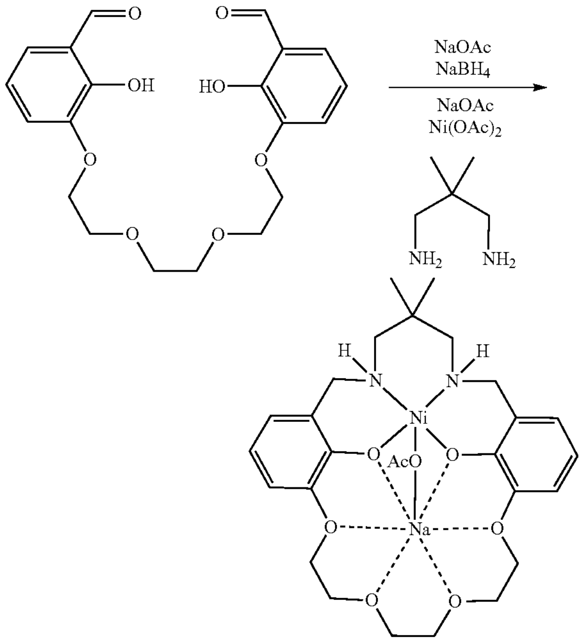

Complex 16 was synthesised by addition of the pro-ligand and sodium acetate to methanol. A solution of 2,2-dimethylpropane-1,3-diamine in methanol was added dropwise over the course of 3 h. The solvent was removed under reduced pressure to obtain a pale yellow glassy solid as the crude product. The resultant solid was washed with deionized water, then dissolved in MeOH. 20 equiv. of $NaBH_4$ was added in one portion and left to stir for 2 h. Water was added to quench the excess $NaBH_4$ and the solvent was subsequently removed under reduced pressure. The resulting solid was washed with distilled water. The solid was then dissolved in MeOH before $Ni(OAc)_2 \cdot 4(H_2O)$ and sodium acetate was added and left to stir for 1 h. The solvent was removed under reduced pressure to obtain a yellow glassy solid as the crude product. This was triturated with ethanol and dichloromethane and dried under vacuum at 40° C. to give a pure product.

Complex 16: (244 mg, 0.41 mmol, 53%)

Synthesis of Complex 17

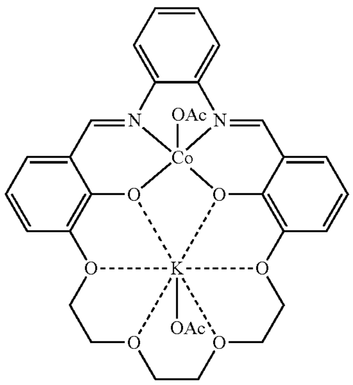

Complex 17 was synthesised under a nitrogen atmosphere. The appropriate KOAc (0.769 mmol) was added to solution of the ligand (0.30 g, 0.769 mmol) in acetonitrile (15-40 mL) and the solution was stirred for 30 mins, at 25° C. Next, $Co(OAc)_2$ (0.769 mmol) was added and the reaction mixture was stirred for a further 2 h at 25° C. 1,2-phenylene diamine (0.769 mmol) was added, dropwise, to the reaction mixture and it was stirred for 16 h, at 25° C. The complexes were oxidized by exposure to air and by the addition of 1 equivalents of acetic acid (44 μL, 0.769 mmol) and the solution was stirred for up to 72 h with reaction progress being monitored using $^1$H NMR spectroscopy. Once the oxidation was complete, the suspension was filtered, and residual solvent volume reduced in vacuo. Excess acetic acid was removed by azeotropic distillation with toluene (3×50 mL). The resulting solid was washed with pentane (3×50 mL) and dried in vacuo to afford the target complex as a brown solid.

Complex 17 (42% yield): $^1$H NMR (400 MHz, $CDCl_3$, 298 K). δ (ppm): 8.20 (2H, s, —HC═N—), 8.02 (2H, m, Ar—$H_{ortho}$), 7.38 (2H, m, Ar—$H_{meta}$), 7.01 (2H, d, Ar—$H_{meta}$, $^3J_{H-H}$=8.60 Hz), 6.82 (2H, d, Ar—$H_{meta}$, $^3J_{H-H}$=8.60 Hz), 6.47 (2H, t, Ar—$H_{para}$, $^3J_{H-H}$=7.80 Hz), 4.21 (4H, m, —O—$CH_2$—), 3.98 (4H, m, —O—$CH_2$—), 3.83 (4H, s, —O—$CH_2$—), 1.39 (3H, s, $H_3C$—C(O)O).

FIG. 9 shows a representation for the molecular structure of complex 17 with disorder and hydrogen atoms omitted for clarity.

Synthesis of Complex 18

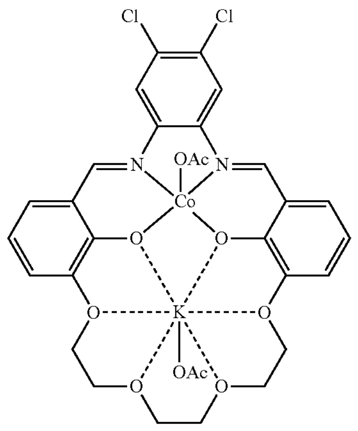

Complex 18 was synthesised under a nitrogen atmosphere. The appropriate KOAc (0.769 mmol) was added to solution of the ligand (0.30 g, 0.769 mmol) in acetonitrile (15-40 mL) and the solution was stirred for 30 mins, at 25° C. Next, $Co(OAc)_2$ (0.769 mmol) was added and the reaction mixture was stirred for a further 2 h at 25° C. 4,5-dichloro-o-phenylenediamine (0.769 mmol) was added, dropwise, to the reaction mixture and it was stirred for 16 h, at 25° C.

The complexes were oxidized by exposure to air and by the addition of 1 equivalents of acetic acid (44 μL, 0.769 mmol) and the solution was stirred for up to 72 h with reaction progress being monitored using $^1$H NMR spectroscopy. Once the oxidation was complete, the suspension was filtered, and residual solvent volume reduced in vacuo. Excess acetic acid was removed by azeotropic distillation with toluene (3×50 mL). The resulting solid was washed with pentane (3×50 mL) and dried in vacuo to afford the target complex as a brown solid.

Complex 18 (45% yield): $^1$H NMR (500 MHz, $CDCl_3$, 298K). δ (ppm): 8.06 (4H, s, —HC═N—, ClC—HC═C—N—), 6.99 (2H, m, Ar—$H_{meta}$), 6.74 (2H, m, Ar—$H_{meta}$), 6.48 z (2H, t, Ar—$H_{para}$, $^3J_{H-H}$=7.8 Hz), 4.24-3.82 (12H, m, —O—$CH_2$—), 1.39 (6H, s, $H_3C$—C(O)O). $^{13}$C NMR (125 MHz, $CDCl_3$, 298K). δ (ppm): 179.38 (—C(O)O), 158.90 (—HC═N—), 157.21 (Ar—$C_{ipso}$—O—, Ar—$C_{ortho}$—O/CH), 151.64 (Ar—$C_{ipso}$—O—, Ar—$C_{ortho}$—O/CH), 146.15 (Ar—C—$C_1$, Ar—C—N), 130.67 (Ar—C—$C_1$, Ar—C—N), 127.04 (Ar—$C_{meta}$), 117.78 (Ar—ClC═CH—), 116.36 (Ar—$C_{ipso}$—O—, Ar—$C_{ortho}$—O/CH), 113.36+113.25 (Ar—$C_{para}$, Ar—$C_{meta}$), 69.90 (—O—$CH_2$—), 69.03 (—O—$CH_2$—), 66.10 (—O—$CH_2$—), 24.46 ($H_3C$—C(O)O).

Synthesis of Complex 19

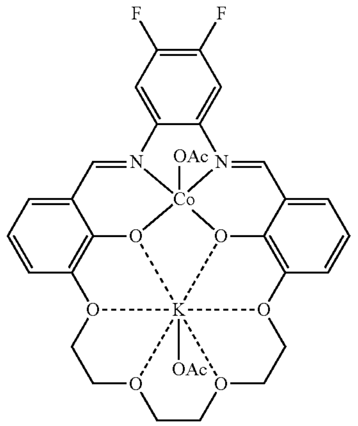

Complex 19 was synthesised under a nitrogen atmosphere. The appropriate KOAc (0.769 mmol) was added to solution of the ligand (0.30 g, 0.769 mmol) in acetonitrile (15-40 mL) and the solution was stirred for 30 mins, at 25° C. Next, $Co(OAc)_2$ (0.769 mmol) was added and the reaction mixture was stirred for a further 2 h at 25° C. 1,2-diamine-4,5-difluoro-benzene (0.769 mmol) was added, dropwise, to the reaction mixture and it was stirred for 16 h, at 25° C. The complexes were oxidized by exposure to air and by the addition of 1 equivalents of acetic acid (44 μL, 0.769 mmol) and the solution was stirred for up to 72 h with reaction progress being monitored using $^1$H NMR spectroscopy. Once the oxidation was complete, the suspension was filtered, and residual solvent volume reduced in vacuo. Excess acetic acid was removed by azeotropic distillation with toluene (3×50 mL). The resulting solid was washed with pentane (3×50 mL) and dried in vacuo to afford the target complex as a brown solid.

Complex 19 (9.1% yield): $^1$H NMR (500 MHz, $CDCl_3$, 298K). δ (ppm): 7.98 (2H, s, —HC═N—), 7.81 (2H, t, FC—HC═C—N—, $^3J_{H-F}$=9.1 Hz), 6.99 (2H, dd, Ar—$H_{meta}$, $^3J_{H-H}$=8.1 Hz, 1.4 Hz), 6.75 (2H, dd, Ar—$H_{meta}$, $^3J_{H-H}$=7.6 Hz, 1.5 Hz), 6.50 (2H, t, Ar—$H_{para}$, $^3J_{H-H}$=7.8 Hz), 4.24-3.82 (12H, m, —O—$CH_2$—), 1.40 (6H, s, $H_3C$—C(O)O). $^{13}$C NMR (125 MHz, $CDCl_3$, 298K). δ (ppm): 179.45 (—C(O)O), 158.77 (—HC═N—), 157.18 (Ar—$C_{ipso}$—O—, Ar—$C_{ortho}$—O/CH), 151.88 (Ar—

$C_{ipso}$—O—, Ar—$C_{ortho}$—O/CH), 143.16 (Ar—C—F, Ar—C—N), 127.27 (Ar—$C_{meta}$), 118.13 (Ar—$C_{ipso}$—O—, Ar—$C_{ortho}$—O/CH), 113.51+113.45 (Ar—$C_{para}$, Ar—$C_{meta}$), 103.86 (Ar—FC—CH—), 70.14 (—O—$CH_2$—), 69.38 (—O—$CH_2$—), 66.33 (—O—$CH_2$—), 24.85 ($H_3C$—C(O)O).

Synthesis of Complex 20

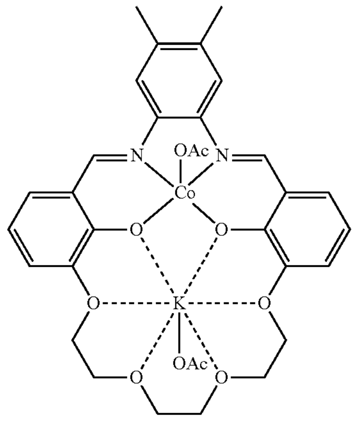

Complex 20 was synthesised under a nitrogen atmosphere. The appropriate KOAc (0.769 mmol) was added to solution of the ligand (0.30 g, 0.769 mmol) in acetonitrile (15-40 mL) and the solution was stirred for 30 mins, at 25° C. Next, $Co(OAc)_2$ (0.769 mmol) was added and the reaction mixture was stirred for a further 2 h at 25° C. 4,5-dimethyl-1,2-phenylenediamine (0.769 mmol) was added, dropwise, to the reaction mixture and it was stirred for 16 h, at 25° C. The complexes were oxidized by exposure to air and by the addition of 1 equivalents of acetic acid (44 μL, 0.769 mmol) and the solution was stirred for up to 72 h with reaction progress being monitored using $^1$H NMR spectroscopy. Once the oxidation was complete, the suspension was filtered, and residual solvent volume reduced in vacuo. Excess acetic acid was removed by azeotropic distillation with toluene (3×50 mL). The resulting solid was washed with pentane (3×50 mL) and dried in vacuo to afford the target complex as a brown solid.

Complex 20 (52% yield): $^1$H NMR (400 MHz, $d^6$-DMSO, 298K). δ(ppm): 8.47 (2H, s, —HC═N—), 8.13 (2H, s, MeC—HC═C—N—), 7.18 (2H, dd, Ar—$H_{meta}$, $^3J_{H-H}$=8.1 Hz, 1.5 Hz), 6.86 (2H, dd, Ar—$H_{meta}$, $^3J_{H-H}$=7.7 Hz, 1.5 Hz), 6.46 (2H, t, Ar—$H_{para}$, $^3J_{H-H}$=7.8 Hz), 4.22-3.80 (12H, m, —O—$CH_2$—), 2.38 (2H, s, $H_3C$—C═HC) 1.40 (6H, s, $H_3C$—C(O)O).

Synthesis of complex 21

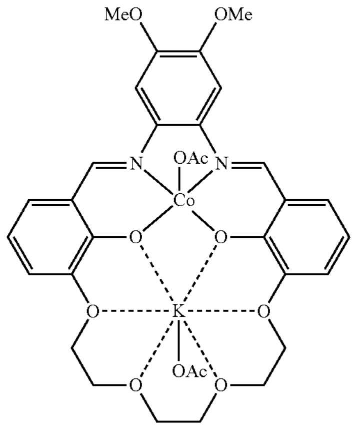

Complex 21 was synthesised by charging a round-bottom flask with $LH_2$ (300 mg, 0.769 mmol), $Ba(ClO_4)_2$ (258 mg, 0.769 mmol), 4,5-dimethoxybenzene-1,2-diamine (129 mg, 0.769 mmol) and 200 mL of 1:1 MeOH:$CHCl_3$ and left to stir for 2 hours. The solvent was removed under vacuum and the solid dissolved in 200 mL of $CHCl_3$. Guanidine sulphate (1.34 g, 12.29 mmol) dissolved in 100 mL of deionised water which was subsequently added to the solution and stirred overnight. The layers were separated, and the product extracted into $CHCl_3$, which was then dried over magnesium sulphate. The solvent was removed under reduced pressure to give a pale yellow solid (250 mg, 62% yield). A schlenk was charged with the resulting solid (200 mg, 0.383 mmol), $Co(OAc)_2$ (67.8 mg, 0.383 mmol), KOAc (37.6 mg, 0.383 mmol) and acetonitrile (40 mL). This was left to stir for 48 h before being exposed to air and AcOH (33 μL, 0.383 mmol) was added. The mixture was left to stir for a further 48 h before being evaporated to dryness. The solid was triturated with toluene (3×50 mL) and pentane (3×50 mL) and dried under vacuum to give a brown solid.

Complex 21 (75 mg, 29%): $^1$H NMR (500 MHz, $CDCl_3$, 298K). δ (ppm): 8.15 (2H, s, —HC═N—), 7.79 (2H, s, MeOC—HC═C—N—), 7.01 (2H, d, Ar—$H_{meta}$, $^3J_{H-H}$=8.6 Hz), 6.72 (2H, d, Ar—$H_{meta}$, $^3J_{H-H}$=8.0 Hz), 6.46 (2H, s, Ar—$H_{para}$), 4.24-3.75 (12H, m, —O—$CH_2$—), 2.40 (6H, s, $H_3C$—0), 1.39 (6H, s, $H_3C$—C(O)O).

Synthesis of Complex 22

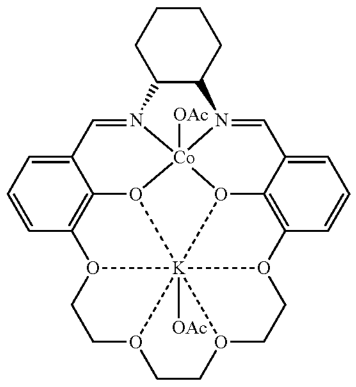

Complex 22 was synthesised under a nitrogen atmosphere. The appropriate KOAc (0.769 mmol) was added to solution of the ligand (0.30 g, 0.769 mmol) in acetonitrile (15-40 mL) and the solution was stirred for 30 mins, at 25° C. Next, $Co(OAc)_2$ (0.769 mmol) was added and the reaction mixture was stirred for a further 2 h at 25° C. (1R,2R)-(−)-1,2-diaminecyclohexane (0.769 mmol) was added, dropwise, to the reaction mixture and it was stirred for 16 h, at 25° C. The complexes were oxidized by exposure to air and by the addition of 1 equivalents of acetic acid (44 μL, 0.769 mmol) and the solution was stirred for up to 72 h with reaction progress being monitored using $^1$H NMR spectroscopy. Once the oxidation was complete, the suspension was filtered, and residual solvent volume reduced in vacuo. Excess acetic acid was removed by azeotropic distillation with toluene (3×50 mL). The resulting solid was washed with diethyl ether (3×50 mL) and dried in vacuo to afford the target complex as a brown solid.

Complex 22 (68% yield): $^1$H NMR (500 MHz, $CDCl_3$, 298K). δ (ppm): 7.51 (2H, s, —HC═N—), 6.87 (2H, dd, Ar—$H_{meta}$, $^3J_{H-H}$=8.0 Hz, 1.5 Hz), 6.69 (2H, dd, Ar—$H_{meta}$, $^3J_{H-H}$=7.7 Hz, 1.5 Hz), 6.40 (2H, t, Ar—$H_{para}$, $^3J_{H-H}$=7.8 Hz), 4.24-3.72 (14H, m, —O—$CH_2$—, —N—CH—), 2.87-2.85 (2H, m, —CH—$CH_2$—$CH_2$, —$CH_2$—$CH_2$—CH—), 2.08-1.97 (4H, m, —CH—$CH_2$—$CH_2$—$CH_2$—$CH_2$—CH—), 1.64-1.55 (2H, m, —$CH_2$—$CH_2$—$CH_2$—$CH_2$—), 1.37 (6H, s, $H_3C$—C(O)O). $^{13}$C NMR (125 MHz, $CDCl_3$, 298K). δ (ppm): 180.13 (—C(O)O), 161.09 (—HC═N—), 156.95 (Ar—$C_{ortho}$—), 152.16 (Ar—$C_{ortho}$—), 126.42 (Ar—$C_{meta}$), 119.18 (Ar—$C_{ipso}$), 112.59 (Ar—$C_{para}$, Ar—$C_{meta}$), 70.21 (—O—$CH_2$—, —N—CH—), 69.51 (—O—$CH_2$—, —N—CH—), 69.48 (—O—$CH_2$—, —N—CH—), 66.26 (—O—$CH_2$—, —N—CH—), 29.84 (—CH—$CH_2$—$CH_2$—$CH_2$—$CH_2$—CH—), 25.03 (—$CH_2$—$CH_2$—$CH_2$—$CH_2$—), 24.67 ($H_3C$—C(O)O).

Synthesis of complex 23

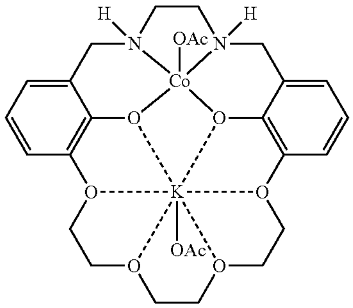

Complex 23 was synthesised by charging a round-bottom flask with $LH_2$ (1 g, 2.56 mmol), $Ba(ClO_4)_2$ (862 mg, 2.56 mmol) and 100 mL of 1:1 MeOH:$CHCl_3$. A solution of ethylene diamine (171 μL, 2.56 mmol) in 5 mL of MeOH was added over the course of 10 min before the solution was stirred for a further 2 hours. The solvent was removed under vacuum and the solid dissolved in 300 mL of $CHCl_3$. Guanidine sulphate (1.34 g, 12.29 mmol) dissolved in 200 mL of deionised water which was subsequently added to the solution and stirred overnight. The layers were separated, and the product extracted into $CHCl_3$, which was then dried over magnesium sulphate. The solvent was removed under reduced pressure to give a pale yellow solid (656 mg, 62% yield). The resulting solid (570 mg, 1.38 mmol) is dissolved in a 400 mL mixture of 1:1 ratio of methanol and chloroform. $NaBH_4$ (3×110 mg, 3×2.91 mmol) is added in three portions over the course of an hour and then left to stir overnight. The solvent is removed under vacuum and the resulting solid is treated with 100 mL of deionised water. The solid is then dissolved in 100 mL of dry $CHCl_3$ and dried over molecular sieves. The sieves are filtered out and the solution evaporated to dryness. The solid is dissolved in minimum amount of $CHCl_3$ (5 mL), precipitated out with $Et_2O$ (30 mL) and the solid collected by filtration to obtain a pale yellow/cream product.

Complex 23: $^1$H NMR (400 MHz, $CDCl_3$, 298K). δ (ppm): 6.93-6.55 (6H, m, Ar—H), 4.75 (2H, broad s —HN—), 4.30-3.50 (20H, m, —O—$CH_2$—, —HN—$CH_2$—$CH_2$, Ar—$CH_2$—HN—), 3.26-2.80 (5 h, m, —HN—, $H_3C$—C(O)O—), 1.55 (3 h, s, $H_3C$—C(O)O—).

Synthesis of complex 24

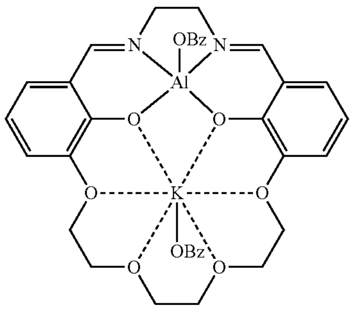

Complex 24 was synthesised by charging a schlenk with potassium benzoate (250 mg, 1.03 mmol) and the pro-ligand (0.40 g, 1.03 mmol) in acetonitrile (40 mL) for an hour under a $N_2$ atmosphere. Subsequently, ethylene diamine (69 μL, 1.03 mmol) was added and left to the solution was stirred overnight. Next, $AlEt_3$ (175 μL, 1.08 mmol) was added and the reaction mixture was stirred for a further 16 h at 25° C. Benzoic acid was added (131 mg, 1.08 mmol) and the reaction mixture was heated overnight at 60° C. The solid was dried in vacuo to afford the target complex as a yellow solid.

Complex 24: $^1$H NMR (400 MHz, $CDCl_3$, 298K). δ (ppm): 8.08 (2H, s, —HC═N—), 8.03 (2H, m), 7.51 (1H, m), 7.39 (2H, m), 6.70 (4H, m, Ar—$H_{meta}$), 6.41 (2H, t, Ar—$H_{para}$, $^3J_{H-H}$=7.8 Hz), 4.14-3.70 (16H, m, —O—$CH_2$—, —N—CH—).

Synthesis of Complex 25

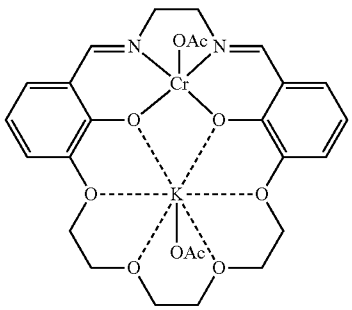

Complex 25 was synthesised under a nitrogen atmosphere. The appropriate KOAc (0.769 mmol) was added to solution of the ligand (0.30 g, 0.769 mmol) in acetonitrile (15-40 mL) and the solution was stirred for 30 mins, at 25° C. Next, $Cr(OAc)_2$ (0.769 mmol) was added and the reaction mixture was stirred for a further 2 h at 25° C. Ethylene diamine (0.769 mmol) was added, dropwise, to the reaction mixture and it was stirred for 16 h, at 25° C. The complexes were oxidized by exposure to air and by the addition of 1 equivalents of acetic acid (44 μL, 0.769 mmol) and the solution was stirred for up to 72 h with reaction progress being monitored using $^1H$ NMR spectroscopy. Once the oxidation was complete, the suspension was filtered, and residual solvent volume reduced in vacuo. Excess acetic acid was removed by azeotropic distillation with toluene (3×50 mL). The resulting solid was washed with pentane (3×50 mL) and dried in vacuo to afford the target complex as a brown solid.

Complex 25 (33% yield).

Synthesis of Complex 26

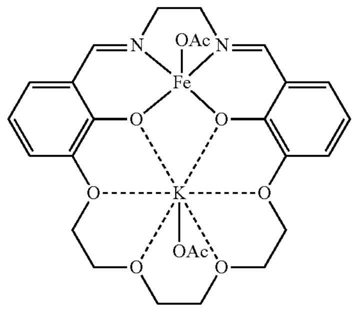

Complex 26 was synthesised under a nitrogen atmosphere. The appropriate KOAc (0.769 mmol) was added to solution of the ligand (0.30 g, 0.769 mmol) in acetonitrile (15-40 mL) and the solution was stirred for 30 mins, at 25° C. Next, $Fe(OAc)_2$ (0.769 mmol) was added and the reaction mixture was stirred for a further 2 h at 25° C. Ethylene diamine (0.769 mmol) was added, dropwise, to the reaction mixture and it was stirred for 16 h, at 25° C. The complexes were oxidized by exposure to air and by the addition of 1 equivalents of acetic acid (44 μL, 0.769 mmol) and the solution was stirred for up to 72 h with reaction progress being monitored using $^1H$ NMR spectroscopy. Once the oxidation was complete, the suspension was filtered, and residual solvent volume reduced in vacuo. Excess acetic acid was removed by azeotropic distillation with toluene (3×50 mL). The resulting solid was washed with pentane (3×50 mL) and dried in vacuo to afford the target complex as a brown solid.

Synthesis of complex 27

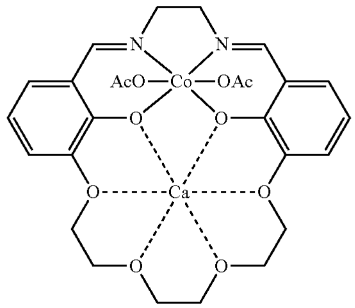

Complex 27 was synthesised under a $N_2$ atmosphere. The appropriate metal acetate ([M(OAc)n], where M=Na, K, Rb, Cs, Ca, Sr or Ba) (1.03 mmol) was added to solution of the pro-ligand (0.40 g, 1.03 mmol) in acetonitrile (15 mL) and the solution was stirred for 30 mins, at 25° C. Next, $Co(OAc)_2$ (0.18 g, 1.03 mmol) was added and the reaction mixture was stirred for a further 2 h at 25° C. Ethylene diamine (69 μL, 1.03 mmol) was added, dropwise, to the reaction mixture and it was stirred for 16 h, at 25° C. Acetic acid was removed by azeotropic distillation with toluene (3×25 mL). The resulting solid was washed with pentane (3×50 mL) and dried in vacuo to afford the target complex as a brown solid.

Complex 27: (0.55 g, 0.88 mmol, 86%)

FIG. 10 shows an infrared spectrum for complex 27.

Synthesis of complex 28

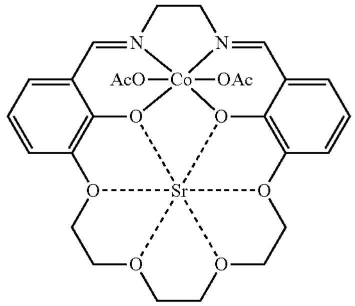

Complex 28 was synthesised under a $N_2$ atmosphere. The appropriate metal acetate ([M(OAc)n], where M=Na, K, Rb, Cs, Ca, Sr or Ba) (1.03 mmol) was added to solution of the pro-ligand (0.40 g, 1.03 mmol) in acetonitrile (15 mL) and the solution was stirred for 30 mins, at 25° C. Next, $Co(OAc)_2$ (0.18 g, 1.03 mmol) was added and the reaction mixture was stirred for a further 2 h at 25° C. Ethylene diamine (69 μL, 1.03 mmol) was added, dropwise, to the reaction mixture and it was stirred for 16 h, at 25° C. Acetic acid was removed by azeotropic distillation with toluene (3×25 mL). The resulting solid was washed with pentane (3×50 mL) and dried in vacuo to afford the target complex as a brown solid.

Complex 28: (0.68 g, 0.91 mmol, 89%)

FIG. 11 shows an infrared spectrum for complex 28.

Synthesis of complex 29

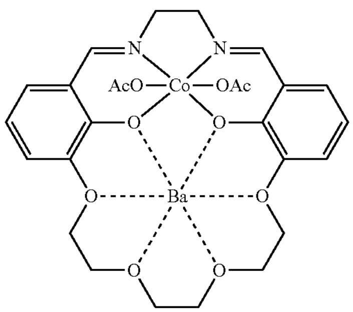

Complex 29 was synthesised under a $N_2$ atmosphere. The appropriate metal acetate ([M(OAc)n], where M=Na, K, Rb, Cs, Ca, Sr or Ba) (1.03 mmol) was added to solution of the pro-ligand (0.40 g, 1.03 mmol) in acetonitrile (15 mL) and the solution was stirred for 30 mins, at 25° C. Next, $Co(OAc)_2$ (0.18 g, 1.03 mmol) was added and the reaction mixture was stirred for a further 2 h at 25° C. Ethylene diamine (69 μL, 1.03 mmol) was added, dropwise, to the reaction mixture and it was stirred for 16 h, at 25° C. Acetic acid was removed by azeotropic distillation with toluene (3×25 mL). The resulting solid was washed with pentane (3×50 mL) and dried in vacuo to afford the target complex as a brown solid.

Complex 29: (0.63 g, 0.88 mmol, 86%): Anal. Calcd for $C_{26}H_{30}BaCoN_2O_{10}$ (726.8 g $mol^{-1}$): C, 43.0; H, 4.2; N, 3.9%. Found; C, 43.1; H, 4.4; N, 3.9%.

FIG. 12 shows an infrared spectrum for complex 29.

Synthesis of Complex 30

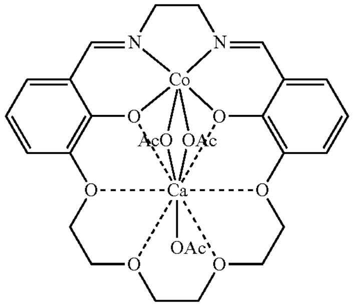

Complex 30 was synthesised by combining the dialdehyde pro-ligand (1.02 mmol), $Co(OAc)_2$ (1.02 mmol) and $Ca(OAc)_2$ (1.02 mmol) in dry acetonitrile (15 ml) to form a yellow-orange suspension and stirred at room temperature for 30 mins under a nitrogen atmosphere. To the suspension was added ethylene diamine (1.02 mmol), immediately giving a deep red-brown solution. The solution was stirred overnight at room temperature under a nitrogen atmosphere before adding acetic acid (2.04 mmol) and stirring for three days with the reaction open to air. The solution was filtered to remove the insoluble, unreacted Co(II) species and the brown solution evaporated in vacuo to give a dark brown solid. Azeotropic washes were performed on the solid with toluene (3×50 mL) to remove residual acetic acid, and hexane (3×50 mL) to remove residual toluene. The solid was then dried in vacuo overnight.

Complex 30 (56% yield): (0.39 g, 0.57 mmol, 56%)$^1$H NMR (400 MHz, $CDCl_3$, 298 K) δ (ppm): 7.81 (2H, s, HC═N) 6.94 (4H, m, meta-ArH) 6.51 (2H, t, para-ArH) 4.49-3.92 (16H, s, O—$CH_2$—) 1.44 (6H, s, $CH_3COO$).

FIG. 13 shows ORTEP representation for the molecular structure of Complex 30 with disorder and hydrogen atoms omitted for clarity and thermal ellipsoids represented at 50% probability.

Complex 31

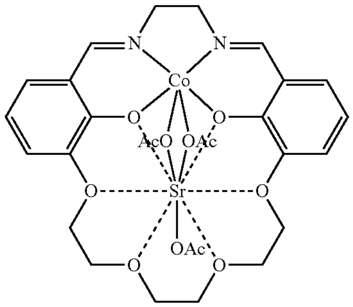

Complex 31 was synthesised by combining the dialdehyde pro-ligand (1.02 mmol), $Co(OAc)_2$ (1.02 mmol) and $Sr(OAc)_2$ (1.02 mmol) in dry acetonitrile (15 ml) to form a yellow-orange suspension and stirred at room temperature for 30 mins under a nitrogen atmosphere. To the suspension was added ethylene diamine (1.02 mmol), immediately giving a deep red-brown solution. The solution was stirred overnight at room temperature under a nitrogen atmosphere before adding acetic acid (2.04 mmol) and stirring for three days with the reaction open to air. The solution was filtered to remove the insoluble, unreacted Co(II) species and the brown solution evaporated in vacuo to give a dark brown solid. Azeotropic washes were performed on the solid with toluene (3×50 mL) to remove residual acetic acid, and hexane (3×50 mL) to remove residual toluene. The solid was then dried in vacuo overnight.

Complex 31 (40% yield): (0.30 g, 0.41 mmol, 40%)$^1$H NMR (400 MHz, $CDCl_3$, 298 K) δ(ppm): 7.73 (2H, s, HC═N) 6.87 (4H, m, meta-ArH) 6.59 (2H, t, para-ArH) 4.55-3.79 (16H, s, O—$CH_2$—) 1.38 (6H, s, $CH_3COO$).

Complex 32

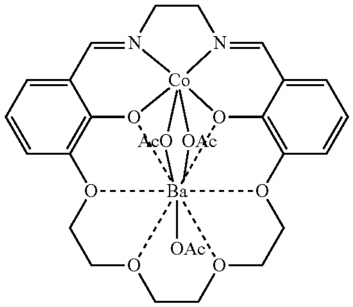

Complex 32 was synthesised by combining the dialdehyde pro-ligand (1.02 mmol), $Co(OAc)_2$ (1.02 mmol) and $Ba(OAc)_2$ (1.02 mmol) in dry acetonitrile (15 ml) to form a yellow-orange suspension and stirred at room temperature for 30 mins under a nitrogen atmosphere. To the suspension was added ethylene diamine (1.02 mmol), immediately giving a deep red-brown solution. The solution was stirred overnight at room temperature under a nitrogen atmosphere before adding acetic acid (2.04 mmol) and stirring for three days with the reaction open to air. The solution was filtered to remove the insoluble, unreacted Co(II) species and the brown solution evaporated in vacuo to give a dark brown solid. Azeotropic washes were performed on the solid with toluene (3×50 mL) to remove residual acetic acid, and hexane (3×50 mL) to remove residual toluene. The solid was then dried in vacuo overnight.

Complex 32 (21% yield): (0.17 g, 0.22 mmol, 21%)$^1$H NMR (400 MHz, $CDCl_3$, 298 K) δ (ppm): 7.67 (2H, s, HC═N) 6.83 (4H, m, meta-ArH) 6.51 (2H, t, para-ArH) 4.57-3.70 (16H, s, O—$CH_2$—) 1.45 (6H, s, $CH_3COO$).

Example 2—Characterisation

$^1$H NMR Spectroscopy

Successful metalation of the pro-ligand was observed by $^1$H NMR spectroscopy by observing the reduction of the phenolic oxygen peak at 10.86 ppm and the addition of acetate proton resonances at 0.80-2.00 ppm ($CDCl_3$, 298 K). Furthermore, a significant up-field shift is observed comparing the aldehyde in the pro-ligand to the imine (where applicable) in the catalyst. The two metal precursors were able to be added together and selectively form Complexes 1-4 due to the size difference of the metals (Co(II); 0.75 Å, Na(1); 1.10 Å, K(I); 1.50 Å, Rb(I); 1.60 Å and Cs(I); 1.70 Å) and the coordination environments in each of the binding cavities ($N_2O_2$; 1.9 Å, 18—C—6; 2.7 Å).

Complexes 7-11 are typically highly fluxional at room temperature in solution ($CDCl_3$, $C_2D_2Cl_4$), facilitated by the flexible C3 diimine backbone. Variable temperature NMR spectroscopy (328-398 K) permitted the characterisation of these complexes in fast-exchange regimes. Complex 10, distinct in its possession of two acetate co-ligands capping each face of the macrocyclic framework, produces well-defined NMR spectra at room temperature, implying a more rigid ligand conformation enforced by this saturated coordination environment consistent with the solid state structure observed (FIG. 5). Complex 1, on the other hand, shows two different binding modes of the acetate, but one in the NMR implying a fast exchange between the two different binding modes. All of complexes 12, 13 and 14 displayed very low solubility between 298 K and 398 K, which required $^{13}$C NMR characterisation by CP-MAS solid state NMR spectroscopy. In general, the observation of 1 imine and 3 crown-ether environments by $^1$H NMR spectroscopy indicates $C_2n$ time-averaged molecular symmetry. However, Complexes 6, 11, 13, and 15 all display additional splitting of the crown-methylene resonances. This desymmetrisation of the complex is likely caused by increased rigidity in the crown moiety, although unsymmetrical metal binding to the macrocycle cannot be discounted. All complexes are believed to be monomeric in solution and under reaction conditions.

2D DOSY NMR Spectroscopy

2D DOSY NMR experiments ($CDCl_3$, 298 K) result in a single diffusion coefficient for each of complexes 1-4, indicative of a single species in solution. An approximate hydrodynamic radii is calculated using the Stokes-Einstein equation (viscosity of chloroform 0.54 mPa·s) resulting in solution hydrodynamic radii of 5.14 Å, 5.17 Å, 5.65 Å, and 6.66 Å for complexes 1-4, respectively. This hydrodynamic radii in solution agrees well with the hydrodynamic radii calculated in the solid state for complexes 1 and 2, indicating a monomeric complex for both solid and solution states. On the other-hand, complexes 3 and 4 result in smaller hydrodynamic radii in solution state than that calculated for the solid state, suggesting a monomeric nuclearity in solution but dimeric/multimeric in the solid state. This has been previously observed for other complexes that incorporate an 18-crown-6 moiety and is rationalized by the increase ionic radii of Rb and Cs and their accessibility to higher coordination numbers resulting in multimeric species.

MALDI-ToF Mass Spectrum

The MALDI-ToF mass spectrum displays peaks at 495 m/z, 511 m/z and 604 m/z corresponding to the molecular cation, [pro-ligand-Co(II)$M^2$]+ for complexes 1, 2 and 4, respectively. Furthermore, the isotropic distribution pattern measured match that which was computed for the molecular formula of Complexes 1-4.

Paramagnetism Studies

The Ni(II) complexes, 8 and 16 were both observed to be paramagnetic, μ=2.47 and 2.57 BM respectively. Attempts to characterise the complexes by X-band electron paramagnetic resonance (EPR) spectroscopy were unsuccessful; EPR silence of Ni(II) complexes can result from large zero field splitting, rendering active transitions unobservable.

Although concentrated samples (10 mM, toluene) of Ni complexes did produce a weak resonance at g=1.999, by comparison to an 2.7 mM Cu(II) standard (Cu-tetraphenyl porphyrin), the approximate concentration of this weak component was determined at <1 nM. This is proposed to arise from a Ni(II)/Ni(Ill) equilibrium, with spin density localised at the phenolate moiety, as has previously been observed in paramagnetic phenolate complexes.

Crystallographic Studies

The structure of the prepared complexes could in some cases be confirmed by X-ray crystallography:

Complexes 1 and 2

Crystals suitable for single crystal X-ray diffraction were obtained via vapor diffusion of pentane (Complex 1) or diethyl ether (Complex 2) into a saturated solution of complex in dichloromethane and are shown in FIGS. 1 and 2 respectively. Structural elucidation confirmed the formation of the desired heterodinuclear complexes. Complexes 1 and 2 were shown to be isostructural, both monomeric in the solid state with an $O_h$ cobalt centre occupying the imine-phenol cavity and the group 1 metal occupying the crown-ether moiety. There is a measurable increase in the Co-$M^2$ distance ($M^2$–Na=3.388 Å, K=3.698 Å, Rb=3.877 Å) consistent with the larger van der Waal radii of potassium in comparison to sodium. One acetate is shown to bridge between the cobalt centre and the alkali metal centre whereas the other is terminal on the cobalt. The structures of Complexes 1 and 2 suggest the formation of a cobalt 'ate' species.

Complexes 7, 10, 12 and 15

Single crystals suitable for X-ray diffraction were obtained for Complexes 7, 10, 12 and 15 from slow evaporation of $CHCl_3$ solutions. Crystals of Complex 7-(EtOH) were obtained from slow evaporation of an ethanol solution and crystals from complex 10 were obtained from slow diffusion of pentane into dichloromethane. Complex 7, Complex 7-(EtOH) and Complex 10, adopt monomeric structures in the solid-state, while Complex 12 was observed to be dimeric with bridging acetate ions. All of the Complexes demonstrate the formation of 'ate' complexes with the anionic acetate oxygen localised at the transition metal, as evidenced by the unsymmetrical C—O bond distances of the co-ligand and short M-O distances of towards the metal in the salen moiety. This is most dramatically illustrated in Complex 7-(EtOH), which displays acetate binding at zinc, alongside one ethanol molecule bound at the sodium ion. The formation of '-ate' complexes allows for the retention of a Lewis acidic sodium ion, predisposed towards epoxide coordination. Interestingly, Complex 10 shows two acetates bridging between the cobalt and the sodium while Complex 1 has one bridging and one monodentate acetate. Complex 15 forms a coordination polymer linked intramolecularly by bridging acetate co-ligands, either causing, or resulting from, significant distortion of the solid-state structure, with highly unsymmetrical binding of sodium to the crown-ether moiety. In the context of these data, it is possible to contrast the C, molecular symmetry of Complex 15 (inferred from NMR spectroscopy), with the $C_2n$ symmetry inferred from the highly fluxional $^1H$ NMR observed for Complex 7, despite their similar C3 N,N'-backbones.

Example 3—Polymerisation Studies

The synthesised complexes were explored as catalysts for the copolymerisation of a variety of epoxide monomers, including PO and CHO:

Propylene Oxide

Complexes 1-4 were tested in the ROCOP of $CO_2$/PO with 3.5 mM catalyst, neat PO (6 mL, 14 M), 20 bar $CO_2$ pressure at 50° C. Conversions were calculated using $^1H$ NMR by comparison of the methine proton on PO (4.92 ppm) against an internal standard (mesitylene 10 equiv.).

The polymerisation results are presented in Table 1 below:

TABLE 1

PO ROCOP in the presence of $CO_2$ using complexes 1-4[a] as well as selected catalysts from the literature

| Entry | Complex | Time (h) | Conv. (%)[b] | $CO_2$ (%)[c] | Polym. (%)[d] | TON[e] | TOF ($h^{-1}$)[f] | $k_p \times 10^3$ ($dm^3$ $mol^{-1}$ $s^{-1}$)[g] | $M_n$ [Đ] (kg $mol^{-1}$)[h] |
|---|---|---|---|---|---|---|---|---|---|
| 1 | 1 | 5 | 15 | >99 | 79 | 584 | 117 | 2.09 | 2.3 [1.08] |
| 2 | 2 | 4 | 34 | >99 | 98 | 1352 | 326 | 11.20 | 5.9 [1.10] |
| 3 | 2 | 4 | 25 | >99 | 94 | 976 | 266 | 6.50 | 9.4 [1.04] |
| 4 | 2 | 21 | 48 | >99 | 94 | 1920 | 89 | 2.47 | 33.8 [1.04]<br>16.2 [1.04] |
| 5 | 2 | 24 | 21 | >99 | 83 | 820 | 34 | 0.73 | 33.7 [1.11]<br>14.4 [1.04] |
| 6[i] | 2 | 1.4 | 28 | >99 | 93 | 1126 | 834 | 24.0 | 5800 [1.07] |
| 7[j] | 2 | 19.8 | 90 | >99 | 98 | 1790 | 91 | 10.70 | 8800 [1.04] |
| 8 | 3 | 23 | 31 | >99 | 91 | 1216 | 52 | 1.77 | 6.5 [1.07] |
| 9 | 4 | 23 | 27 | >99 | 84 | 1049 | 46 | 1.76 | 5.6 [1.08] |
| 10[K19] | [(Salen)Co(2,4-NP)]/18C6/KI | 3.0 | 27 | >99 | 41 | 540 | 182 | — | 4700 [1.43] |
| 11[L20] | [(Salcy)Co($O_2CCF_3$)][PPN($O_2CCF_3$) (20 $H_2O$) | 48 | 95 | >99 | >99 | 475 | 10 | — | 7800 [1.06] |
| 12[M21] | [(Salen[$Pip^+$]$_2$)Co(OAc)$_2$] (20 MeOH) | 20 | 95 | >99 | 96 | 1900 | 95 | — | 5100 [1.06] |
| 13[N22] | [(Salen[$NBu_3^+$]$_4$)Co(OAc)]($NO_2$)$_4$ (400 adipic acid) | 1 | 10 | >99 | >99 | 10,300 | 10,300 | — | 2600 [1.05] |
| 14[O23] | $Et_3B$:[$NBu_4^+$]$_2$[$O_3C^{2-}$] | 14 | 95 | 91 | 95 | 37 | 3 | — | 4100 [1.10] |
| 15[P24] | Zn—Co-DMCC (15 sebacic acid) | 30 | 64 | 75 | 98 | 1280 g/g | 43 g/g/h | — | 1500 [1.10] |

[a]Reaction conditions: catalyst (0.025 mol %), PO (6 mL, 14M), 1,2-cyclohexene diol (0.5 mol %, 70 mM), 20 bar $CO_2$, 50° C., except for entries 3, 4 and 5, where 0.25 mol %, 0.125 mol % and 0 mol % respectively of 1,2-cyclohexene diol were used.
[b]Expressed as a percentage of PO conversion vs the theoretical maximum (100%); determined from the $^1H$ NMR spectrum by comparison of the relative integrals of the resonances assigned to the polycarbonate (4.92 ppm), cyclic carbonate (4.77 ppm) and polyether (3.46-3.64 ppm) against the internal standard mesitylene (6.70 ppm, 10 equiv.).
[c]Expressed as a percentage of $CO_2$ uptake vs the theoretical maximum (100%); determined by comparison of the relative integrals of the $^1H$ NMR resonances due to polycarbonate (4.92 ppm) and cyclic carbonate (4.77 ppm) against polyether (3.46-3.64 ppm).
[d]Expressed as a percentage of polymer formation vs the theoretical maximum (100%); determined by comparison of the relative integrals of the $^1H$ NMR resonances due to polycarbonate (4.92 ppm) against cyclic carbonate (4.77 ppm).
[e]Turn-over number (TON) = number of moles of PO consumed/number of moles catalyst.
[f]Turn-over frequency (TOF) = TON/time (h).
[g]$k_p = k_{obs}/[cat]^1$; $k_{obs}$ determined as the gradient of the semi-logarithmic plot of In[PO]$_t$/[PO]$_0$ vs time.
[h]Determined by GPC, in THF, calibrated using narrow-$M_n$ polystyrene standards.
[i]Catalyst (0.025 mol %, 3.5 mM), PO (6 mL, 14M), 1,2-cyclohexanediol (0.5 mol %, 70 mM), 30 bar $CO_2$, 70° C.
[J]Catalyst (0.025 mol %, 3.5 mM), PO (3 mL, 7M) Diethylcarbonate (3 mL), 1,2-cyclohexanediol (0.5 mol %, 70 mM), 20 bar $CO_2$, 50° C.
[K]Catalyst (0.05 mol %, 7.1 mM), PO (14 mL, 14M), KI (0.05 mol %, 7.1 mM), 15 bar $CO_2$, 25° C.
[L]Catalyst (0.2 mol %, 10.0 mM), PO (0.5 mL, 4.6M) Toluene/Chloroform (1 mL), PPNX (0.2 mol %, 10.0 mM), $H_2O$ (2.0 mol %, 1M), 15 bar $CO_2$, 25° C.
[M]Catalyst (0.05 mol %, 7.2 mM), PO (1 mL, 7M) 1,2-dimethoxyethane (1 mL), Methanol (1.0 mol %, 0.14M), 14 bar $CO_2$, 25° C.
[N]Catalyst (0.001 mol %, 1.7 μM), PO (12 mL, 14M), adipic acid (0.4 mol %, 0.68M), 25 bar $CO_2$, 75° C.
[O]Catalyst (7.5 mol %, 0.25M, 1 mL from a 1M THF solution), tributyl ammonium carbonate (TBAC) (2.5 mol %, 0.09M), PO (2 mL, 7M), THF (1 mL), 10 bar $CO_2$, 40° C.
[P]Catalyst (50 mg), PO (100 mL, 14M), sebacic acid (95 mmol, 0.95M), 40 bar $CO_2$, 50° C.

Table 1 shows that the catalysts of the present invention (entries 1-9, Table 1), in particular complex 2, exhibit excellent catalytic performance in terms of activity, selectivity and yields for PPC polyols with very high $CO_2$ uptake. Additionally, the data highlights the ability of the catalysts of the present invention to prepare low molar mass polycarbonate polyols with high efficiency without the need for unfeasibly large acid loading.

By utilizing data obtained through catalytic loading experiments, a plot of molar mass (kg $mol^{-1}$) vs turn-over number (TON) can be obtained (FIG. 6*a*). A linear increase in molar mass vs TON is observed whilst maintaining narrow, monomodal dispersity (Đ<1.10) indicative of well-controlled polymerisations.

A primary disadvantage to the traditional salen:cocatalyst combination for ROCOP catalysis is the complexity of the resultant rate law. Often reported to have a dependence in catalyst order between 1 and 2, with a cocatalyst dependence of between 0.5 and 2, a first order dependence in epoxide concentration and a zeroth order in $CO_2$ pressure. The complexity of the rate law has led to a lack of understanding of the role of cocatalyst, whether it solely provides an attacking nucleophile for ring-opening, stabilizes the metal-containing Salen species to provide the attacking nucleophile or a combination is yet to be fully resolved as its role also appears dependent on both its ratio towards catalyst and concentration. Having a thorough understanding of the rate law underpinning the polymerisation process of the present invention will facilitate future industrial optimisation and scale up.

To determine the order dependence in epoxide concentration, 3.57 mM of Complex 2 was dissolved in a 50:50 mixture of PO:diethyl carbonate (total volume 6 mL) with a resulting PO concentration of 7M and heated to 50° C. A sigmoidal feature in the conversion time plot was observed which may correspond to poor initiation under dilution. A semi-logarithmic plot of epoxide concentration vs. time ($\ln([PO]_t/[PO]_0)$ vs t) from 30-90% epoxide conversion showed a linear relationship ($k_{obs}$=3.82×$10^{-5}$ $s^{-1}$ $R^2$=0.9992) indicative of a first order dependence on epoxide concentration (FIG. 7*a*).

To determine the order dependence in catalyst concentration, a series of PO/$CO_2$ ROCOP reactions were carried out in neat PO (14 M), 20 bar $CO_2$ at 50° C. using a range of Complex 2 concentrations (1.56-7.13 mM). All polymerization reactions afforded perfectly alternating PPC with no ether linkages or significant cyclic carbonate (<5%) by-products observed by H NMR spectroscopy. A linear relationship between the logarithm of the observed rate and the logarithm of catalyst concentration ($\ln(k_{obs})$ vs ln([cat])) was observed with a gradient of 0.96 ($R^2$=0.9526) indicating a first order dependence on catalyst concentration (FIG. 7*b*).

The dependence on $CO_2$ pressure was determined by measuring the observed rate constant ($k_{obs}$) across the $CO_2$ pressure range 5-30 bar using 3.57 mM catalyst, neat PO (14 M) at 50° C. A plot of observed rate constant versus pressure ($k_{obs}$ vs $P_{CO2}$) resulted in an approximate zeroth order dependence on $CO_2$ pressure between 10-25 bar. A decrease in rate is observed at pressures<10 bar and is attributed to the increased formation of cyclic carbonate. At $CO_2$ pressures>20 bar a decrease in activity is observed, in line with previous observations and may be due to $CO_2$ gas expansion reducing the overall catalyst and epoxide concentrations (FIG. 7*c*).

$$\text{Rate} = [Cat]^1[PO]^1[CO_2]^0$$

Overall, the reaction operates via an approximate second order rate law; first order in both catalyst and epoxide concentrations and a near zeroth order in $CO_2$ pressure. This is in-line with previously reported dinuclear systems for $CO_2$/CHO copolymerisation and matches the simplified rate laws obtained using the quaternary ammonium salt appended salens.

Certain complexes were tested in the ROCOP of $CO_2$/PO. The polymerisation results are presented in Tables 1a to 1d below.

TABLE 1a

Polymerization data for PO/$CO_2$ ROCOP using complexes 17-22[a]

| Complex | PPC Selec. (%) | Conversion (%) | TON | $TOF_{PPC}$ ($h^{-1}$) | $TOF_{CC}$ ($h^{-1}$) | $k_{obs,\ PPC}$ * $10^5$/ $k_{obs,\ CC}$ * $10^5$ ($s^{-1}$) | $k_p$ * $10^2$ ($dm^3$ $mol^{-1}$ $s^{-1}$) | $M_{n,\ exp.}$ (g $mol^{-1}$) [Đ] |
|---|---|---|---|---|---|---|---|---|
| 22 | 81 | 26 | 1051 | 117 | 28 | 8.66/5.31 | 2.42/1.49 | 4600 [1.10] |
| 17 | >99 | 24 | 973 | 389 | 0 | 15.3 | 4.29 | 4000 [1.06] |
| 18 | 12.3 | 9 | 347 | 2 | 16 | —/2.67 | —/0.747 | — |
| 19 | 80 | 30 | 1196 | 73 | 19 | 4.39/0.145 | 1.23/0.0406 | 4400 [1.11] |
| 20 | 85 | 35 | 1377 | 101 | 17 | 6.82/1.20 | 1.91/0.336 | 5500 [1.15] |
| 21 | 96 | 37 | 1493 | 191 | 8 | 6.46/2.16 | 1.81/0.604 | 8900 [1.11] |

[a]Reaction conditions: Catalyst (0.025 mol %, 3.5 mM), PO (6 mL, 14M), 1,2-cyclohexanediol (0.5 mol %, 70 mM), 20 bar $CO_2$, 50° C.

TABLE 1b

Polymerization data for PO/$CO_2$ ROCOP using complex 24

| Complex | Time (h) | $CO_2$ selectivity (%) | PPC Selectivity (%) | Conversion (%) | $TOF_{PPC}$ ($h^{-1}$) | $TOF_{CC}$ ($h^{-1}$) | $M_{n,\ exp.}$ (g $mol^{-1}$) [Đ] |
|---|---|---|---|---|---|---|---|
| 24 | 23 | 62 | 16 | 12 | 0.5 | 1.3 | — |

TABLE 1c

Polymerization data for $PO/CO_2$ ROCOP using complexes 1-4[a]

| Complex | Co(III)/ M(I) | Time (h) | Conv. (%)[b] | $CO_2$ (%)[c] | Polym. (%)[d] | TON[e] | TOF ($h^{-1}$)[f] | $M_n$ [Đ] (g $mol^{-1}$)[h] |
|---|---|---|---|---|---|---|---|---|
| 1 | Na | 5.0 | 15 | >99 | 79 | 600 | 120 | 2300 [1.08] |
| 2 | K | 4.0 | 34 | >99 | 98 | 1360 | 340 | 5900 [1.10] |
| 2 | K | 1.4 | 28 | >99 | 93 | 1120 | 800 | 5800 [1.07] |
| 2 | K | 19.8 | 90 | >99 | 98 | 1800 | 91 | 8800 [1.04] |
| 3 | Rb | 23 | 31 | >99 | 91 | 1240 | 54 | 6500 [1.07] |
| 4 | Cs | 23 | 27 | >99 | 84 | 1080 | 47 | 5600 [1.08] |

[a]Reaction conditions: Catalyst (0.025 mol %, 3.5 mM), PO (6 mL, 14M), 1,2-cyclohexanediol (0.5 mol %, 70 mM), 20 bar $CO_2$, 50° C.

TABLE 1d

Polymerization data for $PO/CO_2$ ROCOP using complexes 27 and 29[a]

| Complex | Co(II)/ M(II) | Time (h) | Conv. (%)[b] | $CO_2$ (%)[c] | Polym. (%)[d] | TON[e] | TOF ($h^{-1}$)[f] | $M_n$ [Đ] (g $mol^{-1}$)[h] |
|---|---|---|---|---|---|---|---|---|
| 27 | Ca | 24 | Trace | >99 | >99 | — | — | — |
| 29 | Ba | 24 | 7 | >99 | >99 | 263 | 12 | 7200 [1.10] |

[a]Reaction conditions: Catalyst (0.025 mol %, 3.5 mM), CHO (6 mL, 9.9M), 1,2-cyclohexanediol (0.5 mol %, 70 mM), 20 bar $CO_2$, 50° C.

An investigation into the temperature dependence on rate and selectivity of $PO/CO_2$ ROCOP using Complex 2 was also undertaken across the temperature range 40-70° C. The polymerizations were carried out with a 3.57 mM catalyst loading, neat PO (14 M) under high $CO_2$ pressure (20 bar). The polymerisation results are presented in Table 2 below:

TABLE 2

Temperature dependence of $CO_2$/PO on complex 2

| Entry | Temp (° C.) | Time (h) | Conv (%)[b] | $CO_2$ (%)[c] | Polym (%)[d] | TON[e] | TOF ($h^{-1}$)[f] | $k_p$ ×$10^3$ ($dm^{-3}$ $mol^{-1}$ $s^{-1}$)[g] | Mn (kg $mol^{-1}$) [Đ][h] |
|---|---|---|---|---|---|---|---|---|---|
| 1 | 40 | 6.5 | 22 | >99 | 97 | 870 | 134 | 3.4 | 3.9 [1.07] |
| 2 | 45 | 4.1 | 24 | >99 | 95 | 925 | 226 | 5.1 | 4.2 [1.07] |
| 3 | 50 | 3.2 | 32 | >99 | >99 | 1285 | 408 | 10.0 | 5.9 [1.07] |
| 4 | 55 | 2.9 | 34 | >99 | 92 | 1328 | 455 | 11.6 | 5.2 [1.07] |
| 5 | 60 | 2.0 | 28 | >99 | 92 | 1124 | 577 | 14.1 | 5.6 [1.08] |
| 6 | 70 | 1.4 | 30 | >99 | 63 | 1180 | 833 | 17.4 | 4.1 [1.08] |
| 7* | 70 | 1.4 | 28 | >99 | 93 | 1126 | 834 | 24.0 | 5.8 [1.07] |

[a]Reaction conditions: catalyst (0.025 mol %), PO (6 mL, 14M), CTA (20 equiv.), 20 bar $CO_2$.

[b]Expressed as a percentage of PO conversion vs the theoretical maximum (100%); determined from the $^1H$ NMR spectrum by comparison of the relative integrals of the resonances assigned to the polycarbonate (4.92 ppm), cyclic carbonate (4.77 ppm) and polyether (3.46-3.64 ppm) against the internal standard mesitylene (6.70 ppm, 10 equiv.).

[c]Expressed as a percentage of $CO_2$ uptake vs the theoretical maximum (100%); determined by comparison of the relative integrals of the $^1H$ NMR resonances due to polycarbonate (4.92 ppm) and cyclic carbonate (4.77 ppm) against polyether (3.46-3.64 ppm).

[d]Expressed as a percentage of polymer formation vs the theoretical maximum (100%); determined by comparison of the relative integrals of the $^1H$ NMR resonances due to polycarbonate (4.92 ppm) against cyclic carbonate (4.77 ppm).

[e]Turn-over number (TON) = number of moles of PO consumed/number of moles catalyst.

[f]Turn-over frequency (TOF) = TON/time (h).

[g]$k_p = k_{obs}/[cat]^1$; $k_{obs}$ determined as the gradient of the semi-logarithmic plot of $In[PO]_t/[PO]_0$ vs time.

[h]Determined by GPC, in THF, calibrated using narrow-$M_n$ polystyrene standards.

*30 bar $CO_2$

All polymerisations displayed excellent $CO_2$ uptake (>99%) with trace polyether linkages observed by $^1H$ NMR spectroscopy. An increase in activity was observed from 134 $h^{-1}$ to 834 $h^{-1}$ at 40° C. and 70° C., respectively. At 70° C., 20 bar $CO_2$, a decrease in polymer selectivity from 93% to 63% was observed and concurrently an increase in PC was measured. Carrying out the reaction at an elevated $CO_2$ pressure (30 bar) negated the formation of cyclic carbonate and restored polymer selectivity>90%. Furthermore, all polymerizations resulted in well-controlled, monomodal, polymer distributions (Đ<1.1).

Cyclohexene Oxide

The synthesised complexes were also explored as catalysts for ROCOP of $CO_2$/CHO. Polymerisations were typically run at 1 bar $CO_2$ pressure and 100° C. with 10 equivalence of trans-1,2-cyclohexanediol as chain transfer agent (CTA) producing low molecular weight polyols. The catalyst loading was varied for the higher rate complexes to avoid high viscosity regime. The polymerisation results are presented in Table 3 below:

TABLE 3 polymerisation data for $CO_2$/CHO ROCOP with various complexes[j]

| Entry | Complex | Time (h) | Temperature (° C.) | PCHC Selectivity[a] | Conversion[b] | TON[c] | TOF ($h^{-1}$)[d] | $M_n$ ($g \cdot mol^{-1}$) [Đ][e] |
|---|---|---|---|---|---|---|---|---|
| 1[f] | 7 | 26 | 80 | >99% | 30% | 301 | 12 | 1500 [1.13] |
| 2[f] | 5 | 8 | 100 | 94% | 24% | 235 | 29 | 1700 [1.13] |
| 3[f] | 12 | 8 | 100 | 97% | 27% | 265 | 33 | 2000 [1.17] |
| 4[f] | 15 | 14 | 100 | 93% | 32% | 318 | 23 | 2500 [1.13] |
| 5[f] | 9 | 20 | 80 | 73% | 4% | 29 | 1.5 | n.d. |
| 6[f] | 6 | 24 | 100 | 48% | 18% | 177 | 7 | 400 [1.43] |
| 7[f] | 13 | 24 | 100 | 43% | 14% | 140 | 6 | 400 [133] |
| 8[f] | 11 | 22 | 100 | — | 0% | 0 | 0 | n.d. |
| 6[f] | 8 | 4 | 100 | >99% | 22% | 222 | 56 | 2000 [1.11] |
| 10[f] | 16 | 4 | 100 | 98% | 41% | 412 | 103 | 3100 [1.14] |
| 11[f] | 10 | 14 | 100 | 95% | 58% | 581 | 42 | 3000 [1.17] |
| 12[g] | 1 | 0.5 | 100 | >99% | 16% | 795 | 1590 | 5300 [1.07]<br>2200 [1.05] |
| 13[h] | 1 | 1 | 120 | >99% | 17% | 4343 | 4343 | 15700 [1.03]<br>6700 [1.17] |
| 14[i] | 14 | 4 | 100 | >99% | 48% | 480 | 119 | 3700 [1.17] |

[a]Selectivity for PCHC against trans-cyclohexene carbonate (no ether observed). Measured by integration of $^1H$ NMR resonances for cyclic carbonate (δ 4.00 ppm) and ether linkages (δ 3.45 ppm) against PCHC (δ 4.65 ppm).

[b]Cyclohexene oxide consumed as a percentage of total starting amount, determined by $^1H$ NMR spectroscopy.

[c]Turnover number (TON) = moles of CHO consumed/moles catalyst, moles of CHO consumed determined by the addition of integrals of $^1H$ NMR resonances of cyclic carbonate (δ 4.00 ppm) and PCHC (δ 4.65 ppm) over addition of CHO (δ 3.05 ppm), cyclic carbonate (δ 4.00 ppm) and PCHC (δ 4.65 ppm), multiplied by initial moles of CHO.

[d]Turnover frequency (TOF) = TON/time.

[e]Determined by SEC, in THF, calibrated against narrow $M_n$ polystyrene standards; polydispersity given in square brackets.

[f]0.1 mol % catalyst loading;

[g]0.02 mol % catalyst loading, 1:10:4000.

[h]0.004 mol % catalyst loading, 1:10:25000, 120° C., 20 bar $CO_2$.

[i]0.02 mol % catalyst loading

[j]Catalysis conditions:catalyst:CHD:CHO 1:10:1000, 1 bar pressure $CO_2$ and in neat epoxide.

The turnover frequencies (TOFs) span 4 orders of magnitude (0-1590 $h^{-1}$) at 1 bar $CO_2$ pressure, while selectivity for polycyclohexene carbonate (PCHC) formation ranges from 43->99%. In general, the onset of trans-cyclic carbonate formation becomes significant above 100° C., although this barrier was lower for selected catalysts. For all magnesium catalysts, lower TOFs (0-7 $h^{-1}$) and lower selectivities for PCHC formation (43-73%) are observed, the latter driven by competitive trans-cyclic carbonate formation (Table 3, entries 5-7). The zinc catalysts were moderately active (12-33 $h^1$) and in the case of Complex 7, no side products could be detected by $^1H$ NMR spectroscopy. Across the zinc series, the more flexible C3 backbone in Complex 7 appears to decrease polymerisation rate (Table 3, entries 1-3), while use of the diamine variant complex 15 led to a slight increase in activity alongside a concomitant decrease in selectivity (Table 3, entries 1 and 4).

Significant improvements were observed for the nickel analogues, with Complex 16 displaying TOFs up to 103 $h^{-1}$ at 98% selectivity (Table 3, entries 9 and 10). However, most remarkable is the observed variation in polymerisation rate for the cobalt series (Table 3, entries 11, 13 and 14), with a greater than 30-fold rate acceleration observed on substituting the aliphatic C3 and C2 backbones. For Complex 1, a TOF of 1590 $h^{-1}$ was recorded, making this the most active, highly selective catalyst for CHO/$CO_2$ ROCOP at 1 bar $CO_2$ reported to date. Increasing the polymerisation temperature to 120° C. led to the accelerated formation of trans-cyclic carbonate. Increasing the $CO_2$ pressure to 20 bar in a stainless-steel reactor with improved stirring efficiency allowed for increased TOFs of 4343 $h^1$ at 120° C. (Table 3, entry 13).

Given the impressive activity of Complex 1, the polymerisation kinetics were studied by in-situ FTIR spectroscopy as dilute solutions in diethyl carbonate. A close to first-order kinetics with respect to the catalyst was observed as can be seen from the linear log plots of $k_{obs}$ vs concentration of the catalyst (FIGS. 8*c* and 8*d*). This is qualitatively supported by the very high TOFs accessible at very low catalyst loading ([CHO]:[Cat]=1:25000, Table 3, entry 13). The order in epoxide was determined by a log plot of concentration over time from 5-70% conversion (FIG. 8*a*). The data shows a linear decrease of ln([CHO]/[CHO]o), indicating a first order dependence in [CHO]. No statistically significant correlation was observed between $CO_2$ pressure and rate, demonstrating a zero-order gas dependence (FIG. 8*b*).

Other Epoxide Monomers

Complex 2 was tested in the ROCOP of $CO_2$ with a series of acyclic and cyclic epoxide monomers. The polymerisation results are presented in Table 4 below:

TABLE 4 monomer scope for ROCOP of CO2/epoxide using complex 2[a]

| Entry | Epoxide | | Time (h) | Conv. (%)[b] | $CO_2$ (%)[c] | Polym (%)[d] | TON[e] | TOF ($h^{-1}$)[f] | $k_p$ ×$10^3$ ($dm^3$ $mol^{-1}$ $s^{-1}$)[g] | $M_n$ [Đ] (kg $mol^{-1}$)[h] |
|---|---|---|---|---|---|---|---|---|---|---|
| 1 | Acyclic | PO | 4.2 | 34 | >99 | >99 | 1352 | 326 | 11.2 | 5.9 [1.10] |
| 2 | | vPO | 23.5 | 60 | >99 | >99 | 2091 | 89 | 5.9 | 4.1 [1.30] |
| 3 | | AGE | 5.6 | 51 | >99 | >99 | 1220 | 219 | 15.4 | 3.9 [1.28] |
| 4 | | $^t$BGE | 7.9 | | >99 | 92 | 908 | 116 | 7.39 | 5.1 [1.15] |
| 5 | Cyclic | CHO | 2.3 | 52 | >99 | >99 | 1430 | 631 | 31.7 | 5.9 [1.10] |
| 6 | | vCHO | 3.2 | 60 | >99 | >99 | 1285 | 408 | 24.6 | 9.5 [1.08] |
| 7 | | CPO | 6.3 | 32 | >99 | 95 | 1062 | 162 | 5.1 | 4.2 [1.07] |

[a]Reaction conditions: catalyst (3.57 mM), neat epoxide (6 mL), CTA (20 equiv.), 20 bar $CO_2$, 50° C.

[b]Expressed as a percentage of PO conversion vs the theoretical maximum (100%); determined from the $^1$H NMR spectrum by comparison of the relative integrals of the resonances assigned to the polycarbonate (4.81 ppm, 1H), cyclic carbonate (4.38 ppm, 1H) and polyether (3.30-3.55 ppm, 3H) against an internal standard mesitylene (6.59 ppm, 10 equiv. (30H)).

[c]Expressed as a percentage of $CO_2$ uptake vs the theoretical maximum (100%); determined by comparison of the relative integrals of the $^1$H NMR resonances due to polycarbonate (4.81 ppm, 1H) and cyclic carbonate (4.38 ppm, 1H) against polyether (3.30-3.55 ppm, 3H).

[d]Expressed as a percentage of polymer formation vs the theoretical maximum (100%); determined by comparison of the relative integrals of the $^1$H NMR resonances due to polycarbonate (4.81 ppm, 1H) against cyclic carbonate (4.38 ppm, 1H).

[e]Turn-over number (TON) = number of moles of PO consumed/number of moles catalyst.

[f]Turn-over frequency (TOF) = TON/time (h).

[g]kp = $k_{obs}$/$[cat]^1$; $k_{obs}$ determined as the gradient of the semi-logarithmic plot of In$[PO]_t$/$[PO]_0$ vs time, [cat] = 3.57 mM.

[h]Determined by GPC, in THF, calibrated using narrow-$M_n$ polystyrene standards.

PO = propylene oxide, vPO = vinyl propylene oxide, AGE = allyl glycidyl ether, $^t$BGE = tert-butyl glycidyl ether, CHO = cyclohexene oxide, vCHO = vinyl cyclohexene oxide, CPO = cyclopentene oxide.

Overall, the catalyst displayed excellent $CO_2$ selectivity (>99%) with no polyether linkages observed by $^1$H NMR spectroscopy. Excellent polycarbonate selectivity (>95%) with trace quantities of cyclic carbonate (<5%) was observed, with the exception of styrene oxide (SO).

On the whole, cyclic epoxides proceeded with a higher rate constant in comparison to acyclic examples. Furthermore, the 6-membered ring epoxides (CHO and vCHO) proceeded faster than 5-membered ring epoxides (CPO).

Cyclopentene oxide is a particularly interesting epoxide monomer as its polycarbonate shows unusual depolymerization to recover the monomer (instead of backbiting to trans-cyclopentene carbonate) thus accessing potential for recyclable polymers. The copolymerization of cyclopentene oxide with $CO_2$ showed excellent selectivity (95%) with trace cis-cyclopenetene oxide (5%) observed by $^1$H NMR spectroscopy (Table 4, Entry 10). An activity of 162 $h^{-1}$ was observed under the optimized conditions (0.025 mol % cat, 50° C., 20 bar $CO_2$, neat CPO). This represents a 4-fold increase in activity compared to the best reported cobalt-salen with a tethered quaternary ammonium salt (42 $h^{-1}$, 0.1 mol % cat, 50° C., 20 bar $CO_2$) and a 2-fold increase in activity compared to its chromium derivative (77 $h^{-1}$, 0.1 mol % cat, 70° C., 20 bar $CO_2$).[25]

While specific embodiments of the invention have been described herein for the purpose of reference and illustration, various modifications will be apparent to a person skilled in the art without departing from the scope of the invention as described by the appended claims.

REFERENCES

[1] A. M. Chapman, C. Keyworth, M. R. Kember, A. J. J. Lennox, C. K. Williams, ACS Catal. 2015, 5, 1581-1588.

[2] N. von der Assen, A. Bardow, Green Chem. 2014, 16, 3272-3280.

[3] S. H. Lee, A. Cyriac, J. Y. Jeon, B. Y. Lee, Polym. Chem. 2012, 3, 1215.

[4] J. Langanke, A. Wolf, J. Hofmann, K. Böhm, M. A. Subhani, T. E. Müller, W. Leitner, C. Gürtler, Green Chem. 2014, 16, 1865-1870.

[5] T. Stößer, C. Li, J. Unruangsri, P. K. Saini, R. J. Sablong, M. A. R. Meier, C. K. Williams, C. Koning, Polym. Chem. 2017, 8, 6099-6105.

[6] O. Hauenstein, M. Reiter, S. Agarwal, B. Rieger, A. Greiner, Green Chem. 2016, 18, 760-770.

[7] O. J. Darensbourg, Chem. Rev. 2007, 107, 2388-2410.

[8] X.-B. Lu, D. J. Darensbourg, Chem. Soc. Rev. 2012, 41, 1462-1484

[9] Z. Qin, C. M. Thomas, S. Lee, G. W. Coates, Angew. Chem. Int. Ed. 2003, 42, 5484-5487.

[10] Y. Wang, D. J. Darensbourg, Coord. Chem. Rev. 2018, 372, 85-100.

[11] M. I. Childers, J. M. Longo, N. J. Van Zee, A. M. LaPointe, G. W. Coates, Chem. Rev. 2014, 114, 8129-8152.

[12] D. J. Darensbourg, R. M. Mackiewicz, J. Am. Chem. Soc. 2005, 127, 14026-14038.

[13] C. T. Cohen, G. W. Coates, J. Polym. Sci. Pol. Chem. 2006, 44, 5182-5191.

[14] P. C. B. Widger, S. M. Ahmed, G. W. Coates, Macromolecules 2011, 44, 5666-5670.

[15] D. J. Darensbourg, J. C. Yarbrough, C. Ortiz, C. C. Fang, J. Am. Chem. Soc. 2003, 125, 7586-7591.

[16] E. K. Noh, S. J. Na, S. S, S.-W. Kim, B. Y. Lee, J. Am. Chem. Soc. 2007, 129, 8082-8083.

[17] S. S, J. K. Min, J. E. Seong, S. J. Na, B. Y. Lee, Angew. Chem. Int. Ed. 2008, 47, 7306-7309.

[18] C. J. Van Staveren, J. Van Eerden, F. C. J. M. Van Veggel, S. Harkema, D. N. Reinhoudt, J. Am. Chem. Soc. 1988, 110, 4994-5008.

[19] Lu, X. B.; Shi, L.; Wang, Y. M.; Zhang, R.; Zhang, Y. J.; Peng, X. J.; Zhang, Z. C.; Li, B., Design of highly active binary catalyst systems for $CO_2$/epoxide copolymerization: Polymer selectivity, enantioselectivity, and stereochemistry control. *J. Am. Chem. Soc.* 2006, 128 (5), 1664-1674.

[20] Darensbourg, D. J.; Wu, G. P., A One-Pot Synthesis of a Triblock Copolymer from Propylene Oxide/Carbon Dioxide and Lactide: Intermediacy of Polyol Initiators. *Angew. Chem. Int. Ed.* 2013, 52 (40), 10602-10606.

[21] Nakano, K.; Kamada, T.; Nozaki, K., Selective formation of polycarbonate over cyclic carbonate: Copolymerization of epoxides with carbon dioxide catalyzed by a cobalt(III) complex with a piperidinium end-capping arm. *Angew. Chem. Int. Ed.* 2006, 45 (43), 7274-7277.

[22] Cyriac, A.; Lee, S. H.; Varghese, J. K.; Park, E. S.; Park, J. H.; Lee, B. Y., Immortal $CO_2$/Propylene Oxide Copolymerization: Precise Control of Molecular Weight and Architecture of Various Block Copolymers. *Macromolecules* 2010, 43 (18), 7398-7401.

[23] Patil, N. G.; Boopathi, S. K.; Alagi, P.; Hadjichristidis, N.; Gnanou, Y.; Feng, X., Carboxylate Salts as Ideal Initiators for the Metal-Free Copolymerization of $CO_2$ with Epoxides: Synthesis of Well-Defined Polycarbonates Diols and Polyols. *Macromolecules* 2019, 52 (6), 2431-2438.

[24] Gao, Y.; Gu, L.; Qin, Y.; Wang, X.; Wang, F., Dicarboxylic acid promoted immortal copolymerization for controllable synthesis of low-molecular weight oligo(carbonate-ether) diols with tunable carbonate unit content. *J. Polym. Sci, Part A: Polym. Chem.* 2012, 50 (24), 5177-5184.

[25] Darensbourg, D. J., Yeung, A. D. & Wei, S.-H. Base initiated depolymerization of polycarbonates to epoxide and carbon dioxide co-monomers: a computational study. Green Chemistry, 2013, 15, 1578-1583.

The invention claimed is:

1. A process for the preparation of a polycarbonate, the process comprising the following step:

a) contacting carbon dioxide with at least one epoxide, wherein step a) is conducted in the presence of a compound of Formula I shown below:

Formula I

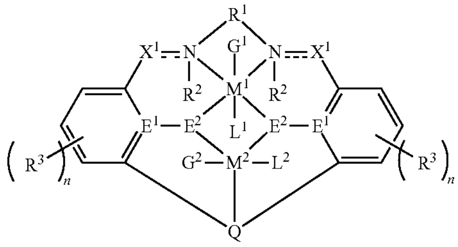

wherein $M^1$ is selected from the group consisting of a group 2 metal, a group 3 metal, a transition metal, a group 13 metal, a group 14 metal and a lanthanide;

$M^2$ is selected from a group 1 metal, a group 2 metal, a group 3 metal, a group 13 metal or a lanthanide;

$R^1$ is selected from (2-5C)alkylene, (2-5C)alkenylene or (2-5C)alkynylene, wherein 0, 1 or 2 carbon atoms within any one of the said (2-5C)alkylene, (2-5C) alkenylene and (2-5C)alkynylene is replaced with a heteroatom selected from O or N, and wherein any carbon, O or N atom within the said (2-5C)alkylene, (2-5C)alkenylene and (2-5C)alkynylene may be independently optionally substituted with one or more $R^x$;

each $R^x$ is independently selected from the group consisting of halo, hydroxy, cyano, nitro, (1-20C)alkyl, (2-20C)alkenyl, (2-20C)alkynyl, (1-20C)haloalkyl, (1-20C)alkoxy, aryl, heteroaryl and —$NR^{xa}R^{xb}$, where any aryl or heteroaryl in $R^x$ is optionally substituted with one or more groups independently selected from halo, hydroxy, cyano, nitro, (1-20C)alkyl, (1-20C)haloalkyl or (1-20C)alkoxy, and where $R^{xa}$ and $R^{xb}$ are independently selected from hydrogen or (1-3C)alkyl, and/or two or more $R^x$ located on adjacent atoms are linked to one another, such that when taken in combination with the atoms to which they are attached, they form a monocyclic or bicyclic aromatic, heteroaromatic, carbocyclic or heterocyclic ring system, wherein any of the said monocyclic or bicyclic aromatic, heteroaromatic, carbocyclic or heterocyclic ring system is optionally substituted with one or more groups independently selected from halo, hydroxy, cyano, nitro, (1-20C)alkyl, (1-20C)haloalkyl or (1-20C)alkoxy;

each $R^2$ is independently selected from absent, hydrogen, (1-4C)alkyl, (2-4C)alkenyl, (2-4C)alkynyl, (1-4C)haloalkyl, aryl, aryl(1-2C)alkyl, heteroaryl, heteroaryl(1-2C)alkyl, —C(O)—$R^{2a}$, —C(O)—$OR^{2a}$ or —C(O)—$NR^{2a}R^{2b}$, where any aryl, aryl(1-2C)alkyl, heteroaryl and heteroaryl(1-2C)alkyl in $R^2$ is optionally substituted with one or more groups independently selected from halo, hydroxy, cyano, nitro, (1-4C)alkyl, (1-4C) haloalkyl or (1-4C)alkoxy, and where $R^{2a}$ and $R^{2b}$ are independently selected from hydrogen and or (1-3C) alkyl;

each $X^1$ is independently selected from —CH—, —$CR^4$—, —$CH_2$—, —$CHR^4$—, —$CR^4R^4$ or —$PR^4R^4$—, where each $R^4$ is independently selected from (1-4C)alkyl, (2-4C)alkenyl, (2-4C)alkynyl, (1-4C)haloalkyl, aryl, aryl(1-2C)alkyl, heteroaryl or heteroaryl(1-2C)alkyl, where any aryl, aryl(1-2C)alkyl, heteroaryl and heteroaryl(1-2C)alkyl in $R^4$ is optionally substituted with one or more groups independently selected from halo, hydroxy, cyano, nitro, (1-4C)alkyl, (1-4C)haloalkyl or (1-4C)alkoxy;

$E^1$ is C and $E^2$ is O, S or N; or $E^1$ is N and $E^2$ is O;

each $R^3$ is independently selected from halo, hydroxy, cyano, nitro, (1-4C)alkyl, (2-4C)alkenyl, (2-4C)alkynyl, (1-4C)haloalkyl, (1-4C)alkoxy, aryl, aryl(1-2C) alkyl, heteroaryl, heteroaryl(1-2C)alkyl, —C(O)—$R^{3a}$, —C(O)—$OR^{3a}$, —O—C(O)—$R^{3a}$, —C(O)—$NR^{3a}R^{3b}$, —$N(R^{3a})C(O)$—$R^{3b}$ or —$NR^{3a}R^{3b}$, where any aryl, aryl(1-2C)alkyl, heteroaryl and heteroaryl(1-2C)alkyl in $R^3$ is optionally substituted with one or more groups independently selected from halo, hydroxy, cyano, nitro, (1-4C)alkyl, (1-4C)haloalkyl or (1-4C)alkoxy, and where $R^{3a}$ and $R^{3b}$ are independently selected from hydrogen or (1-3C)alkyl;

and/or two $R^3$ located on adjacent atoms are linked to one another, such that when taken in combination with the atoms to which they are attached, they form a monocyclic aromatic, heteroaromatic, carbocyclic or heterocyclic ring system, wherein any of the said monocyclic aromatic, heteroaromatic, carbocyclic or heterocyclic ring system is optionally substituted with one or more groups independently selected from halo, hydroxy, cyano, nitro, (1-4C)alkyl, (1-4C)haloalkyl or (1-4C) alkoxy;

each n is independently selected from 0, 1, 2 or 3;

$L^1$ and $L^2$ are independently selected from absent, halo, nitrate, hydroxy, (1-20C)alkyl, (2-20C)alkenyl, (2-20C)alkynyl, (1-20C) heteroaliphatic, carbocyclyl, carbocyclyl(1-3C)alkyl, heterocyclyl, heterocyclyl(1-3C)alkyl, aryl, aryl(1-3C)alkyl, heteroaryl, heteroaryl (1—3C)alkyl, —O—C(O)—$R^a$, —O—C(O)O—$R^a$, —$OP(O)(R^a)_2$, —$P(O)(OR^a)_2$, —$OR^a$, —O—$S(O)_2$—$R^a$ (e.g. triflate), —O—S(O)—$(R^a)_2$, —O—S(O)—$R^a$, —S(O)—$R^a$, —S—C(O)—$R^a$, —S—C(S)—O—$R^a$, —N(H) $S(O)_2$—$R^a$ (e.g. triflamide), —N—$(S(O)_2$—$R^a)_2$ (e.g. triflimide), —S—$R^a$, —$N(R^a)$—C(O)—$R^a$, —C(O)—$N(R^a)_2$, —$N(R^a)_2$ or —O—$Si(R^a)_x(OR^a)_y$ (where x and y are independently 0, 1, 2 or 3, with the proviso that x+y=3), in which any of the said (1-20C)

alkyl, (2-20C)alkenyl, (2-20C)alkynyl, (1-20C)heteroaliphatic, carbocyclyl, carbocyclyl(1-3C)alkyl, heterocyclyl, heterocyclyl(1-3C)alkyl, aryl, aryl(1-3C) alkyl, heteroaryl and heteroaryl(1-3C)alkyl within $L^1$ or $L^2$ is optionally substituted with one or more Rb, with the proviso that at least one of $L^1$ and $L^2$ is not absent;

$R^a$ is independently selected from hydrogen, (1-25C) alkyl, (2-25C)alkenyl, (2-25C)alkynyl, (1-25C)heteroaliphatic, carbocyclyl, carbocyclyl(1-3C)alkyl, heterocyclyl, heterocyclyl(1-3C)alkyl, aryl, aryl(1-3C) alkyl, heteroaryl or heteroaryl(1-3C)alkyl, where any (1-25C)alkyl, (2-25C)alkenyl, (2-25C)alkynyl, (1-25C) heteroaliphatic, carbocyclyl, carbocyclyl(1-3C)alkyl, heterocyclyl, heterocyclyl(1-3C)alkyl, aryl, aryl(1-3C) alkyl, heteroaryl or heteroaryl(1-3C)alkyl present in $R^a$ is independently substituted with one or more groups independently selected from halo, cyano, nitro, amino, hydroxy, (1-4C)alkyl, (2-4C)alkenyl, (2-4C)alkynyl or (1-4C)alkoxy;

each $R^b$ is independently substituted with one or more groups independently selected from halo, cyano, nitro, amino, hydroxy, (1-4C)alkyl, (1-4C)haloalkyl, (2-4C) alkenyl, (2-4C)alkynyl or (1-4C)alkoxy;

$G^1$ and $G^2$ are independently selected from absent and a neutral or anionic donor ligand that is a Lewis base;

Q has a structure according to Q-I or Q-II shown below:

Q-I

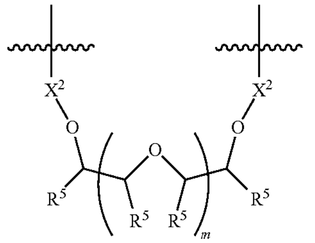

Q-II

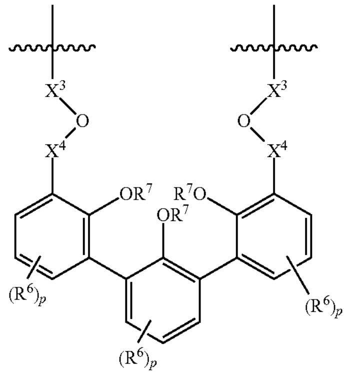

each $X^2$ is independently absent or (1-3C)alkylene, where said (1-3C)alkylene is optionally substituted with 1 or 2 groups independently selected from (1-2C)alkyl;

each $X^3$ is independently absent or (1-3C)alkylene, where said (1-3C)alkylene is optionally substituted with 1 or 2 groups independently selected from (1-2C)alkyl;

each $X^4$ is independently absent or methylene that is optionally substituted with 1 or 2 groups independently selected from (1-2C)alkyl;

m is 1, 2, 3 or 4;

each $R^5$ is independently selected from hydrogen, halo, hydroxy, cyano, nitro, (1-4C)alkyl, (2-4C)alkenyl, (2-4C)alkynyl, (1-4C)haloalkyl, (1-4C)alkoxy, aryl, aryl(1-2C)alkyl, heteroaryl, heteroaryl(1-2C)alkyl, $—C(O)—R^{5a}$, $—C(O)—OR^{5a}$, $—O—C(O)—R^{5a}$, $—C(O)—NR^{5a}R^{5b}$, $—N(R^{5a})\ C(O)—R^{5b}$ or $—NR^{5a}R^{5b}$, where any aryl, aryl(1-2C)alkyl, heteroaryl and heteroaryl(1-2C)alkyl in $R^5$ is optionally substituted with one or more groups independently selected from halo, hydroxy, cyano, nitro, (1-4C)alkyl, (1-4C)haloalkyl or (1-4C)alkoxy, and where $R^{5a}$ and $R^{5b}$ are independently selected from hydrogen or (1-3C)alkyl, and/or two $R^5$ located on adjacent atoms are linked to one another, such that when taken in combination with the atoms to which they are attached, they form a monocyclic aromatic, heteroaromatic, carbocyclic or heterocyclic ring system, wherein any of the said monocyclic aromatic, heteroaromatic, carbocyclic or heterocyclic ring system is optionally substituted with one or more groups independently selected from halo, hydroxy, cyano, nitro, (1-4C)alkyl, (1-4C)haloalkyl or (1-4C) alkoxy;

each $R^6$ is independently selected from halo, hydroxy, cyano, nitro, (1-4C)alkyl, (2-4C)alkenyl, (2-4C)alkynyl, (1-4C)haloalkyl, (1-4C)alkoxy, aryl, aryl(1-2C) alkyl, heteroaryl, heteroaryl(1-2C)alkyl, $—C(O)—R^{6a}$, $—C(O)—OR^{6a}$, $—O—C(O)—R^{6a}$, $—C(O)—NR^{6a}R^{6b}$, $—N(R^{6a})C(O)—R^{6b}$ or $—NR^{6a}R^{6b}$, where any aryl, aryl(1-2C)alkyl, heteroaryl and heteroaryl(1-2C)alkyl in $R^6$ is optionally substituted with one or more groups independently selected from halo, hydroxy, cyano, nitro, (1-4C)alkyl, (1-4C)haloalkyl or (1-4C)alkoxy, and where $R^{6a}$ and $R^{6b}$ are independently selected from hydrogen or (1-3C)alkyl, and/or two $R^6$ located on adjacent atoms are linked to one another, such that when taken in combination with the atoms to which they are attached, they form a monocyclic aromatic, heteroaromatic, carbocyclic or heterocyclic ring system, wherein any of the said monocyclic aromatic, heteroaromatic, carbocyclic or heterocyclic ring system is optionally substituted with one or more groups independently selected from halo, hydroxy, cyano, nitro, (1-4C)alkyl, (1-4C)haloalkyl or (1-4C) alkoxy;

each p is independently selected from 0, 1, 2 or 3; and each $R^7$ is independently selected from hydrogen or (1-3C)alkyl.

2. The process of claim 1, wherein $M^1$ is selected from Co, Fe, Cr, Ni, Al, Ti or Zn.

3. The process of claim 1, wherein $M^2$ is selected from Li, Na, K, Rb, Cs, Mg, Ca, Sr, Ba, Y, Ln, Al, Ga or Sn.

4. The process of claim 1, wherein $R^1$ has a structure according to Formula A shown below:

Formula A

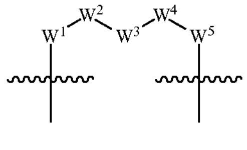

wherein $W^1$, $W^2$, $W^3$, $W^4$ and $W^5$ are each independently selected from absent, —$CH_2$—, —NH— or —O—, with the provisos that:

i) no more than 3 of $W^1$, $W^2$, $W^3$, $W^4$ and $W^5$ are absent, ii) at least 2 of $W^1$, $W^2$, $W^3$, $W^4$ and $W^5$ are —$CH_2$—, and iii) —NH— is not adjacent —O—;

and any —$CH_2$— is optionally substituted with one or two $R^x$, and any —NH— is optionally substituted with one $R^x$;

each $R^x$ is independently selected from halo, hydroxy, cyano, nitro, (1-4C)alkyl, (1-4C)haloalkyl, (1-4C) alkoxy, phenyl, 5-6 membered heteroaryl or —$NR^{Xa}R^{xb}$, where any phenyl or 5-6 membered heteroaryl in $R^x$ is optionally substituted with one or more groups independently selected from halo, hydroxy, cyano, nitro, (1-4C)alkyl, (1-4C)haloalkyl or (1-4C) alkoxy, and where $R^{xa}$ and $R^{xb}$ are independently selected from hydrogen or (1-3C)alkyl, and/or two or more $R^x$ located on adjacent atoms are linked to one another, such that when taken in combination with the atoms to which they are attached, they form a 5-7 membered monocyclic or 8-10 membered bicyclic aromatic, heteroaromatic, carbocyclic or heterocyclic ring system, wherein any of the said 5-7 membered monocyclic or 8-10 membered bicyclic aromatic, heteroaromatic, carbocyclic or heterocyclic ring system is optionally substituted with one or more groups independently selected from halo, hydroxy, cyano, nitro, (1-4C)alkyl, (1-4C)haloalkyl or (1-4C) alkoxy.

5. The process of claim 1, wherein $R^1$ has a structure according to any one of the following:

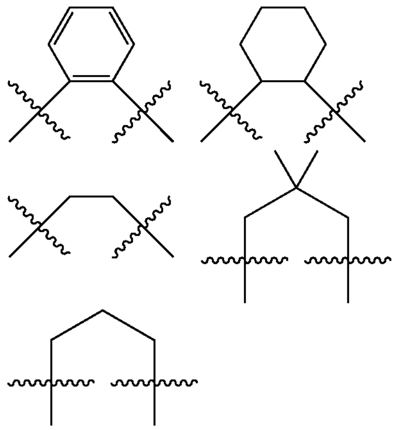

6. The process of claim 1, wherein each $R^2$ is independently selected from absent, hydrogen, (1-3C)alkyl, phenyl, benzyl and or —C(O)—$NR^{2a}R^{2b}$, where any phenyl or benzyl in $R^2$ is optionally substituted with one or more groups independently selected from halo, hydroxy, (1-2C) alkyl, (1-2C)haloalkyl or (1-2C)alkoxy, and where $R^{2a}$ and $R^{2b}$ are independently selected from hydrogen or (1-2C) alkyl.

7. The process of claim 1, wherein each $X^1$ is independently selected from —CH—, —$CR^4$—, —$CH_2$—, —$CHR_4$— or —$CR^4R^4$, where each $R^4$ is independently selected from (1-2C)alkyl or phenyl, where any phenyl in $R^4$ is optionally substituted with one or more groups independently selected from halo, hydroxy, (1-2C)alkyl, (1-2C) haloalkyl or (1-2C)alkoxy.

8. The process of claim 1, wherein $E^1$ is C and $E^2$ is O, and wherein $G^1$ and $G^2$ are absent.

9. The process of claim 1, wherein each $R^3$ is independently selected from halo, hydroxy, cyano, nitro, (1-2C) alkyl, (1-2C)haloalkyl, (1-2C)alkoxy, phenyl or —$NR^{3a}R^{3b}$, where any phenyl in $R^3$ is optionally substituted with one or more groups independently selected from halo, hydroxy, (1-2C)alkyl, (1-2C)haloalkyl or (1-2C)alkoxy, and where $R^{3a}$ and $R^{3b}$ are independently selected from hydrogen or (1-3C)alkyl; and each n is independently selected from 0, 1 or 2.

10. The process of claim 1, wherein $L^1$ and $L^2$ are independently selected from absent or —O—C(O)—$R^a$, where $R^a$ is (1-20C)alkyl (e.g. acetate, i.e. "OAc", or stearate) or (2-25C)alkenyl (e.g. oleate).

11. The process of claim 1, wherein each $X^2$ is independently absent or methylene, where said methylene is optionally substituted with 1 or 2 groups independently selected from (1-2C)alkyl;

each $X^3$ is independently absent or (1-2C)alkylene, where said (1-2C)alkylene is optionally substituted with 1 or 2 groups independently selected from (1-2C)alkyl; and each $X^4$ is independently methylene that is optionally substituted with 1 or 2 methyl groups.

12. The process of claim 1, wherein each $R^5$ is independently selected from hydrogen, halo, hydroxy, (1-3C)alkyl, (1-3C)haloalkyl, (1-3C)alkoxy, phenyl, phenyl (1-2C)alkyl or —$NR^{5a}R^{5b}$, where any phenyl and phenyl (1-2C)alkyl in $R^5$ is optionally substituted with one or more groups independently selected from halo, hydroxy, (1-2C)alkyl, (1-2C) haloalkyl or (1-2C)alkoxy, and where $R^{5a}$ and $R^{5b}$ are independently selected from hydrogen or (1-2C)alkyl, and/or two $R^5$ located on adjacent atoms are linked to one another, such that when taken in combination with the atoms to which they are attached, they form a benzene or 5-6 membered heteroaromatic ring, wherein any of the said benzene and 5-6 membered heteroaromatic rings is optionally substituted with one or more groups independently selected from halo, hydroxy, (1-2C)alkyl, (1-2C)haloalkyl or (1-2C)alkoxy.

13. The process of claim 1, wherein each $R^6$ is independently selected from halo, hydroxy, cyano, nitro, (1-2C) alkyl, (1-2C)haloalkyl, (1-2C)alkoxy, phenyl or —$NR^{6a}R^{6b}$, where any phenyl in $R^6$ is optionally substituted with one or more groups independently selected from halo, hydroxy, (1-2C)alkyl, (1-2C)haloalkyl or (1-2C)alkoxy, and where $R^{6a}$ and $R^{6b}$ are independently selected from hydrogen or (1-3C)alkyl; and each p is independently selected from 0 or 1.

14. The process of claim 1, wherein Q is Q-I.

15. The process of claim 1, wherein Q has a structure according to any of the following:

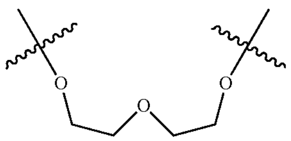

-continued
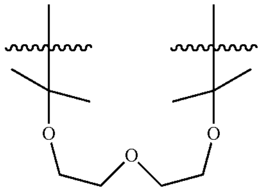
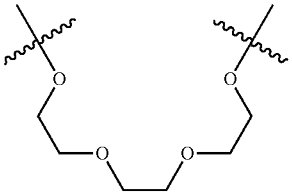
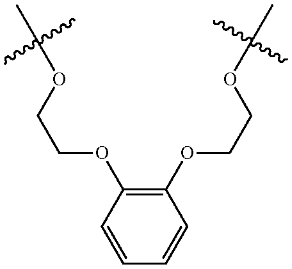
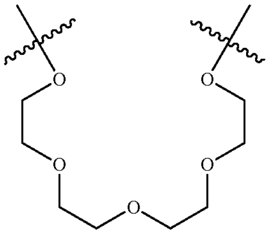
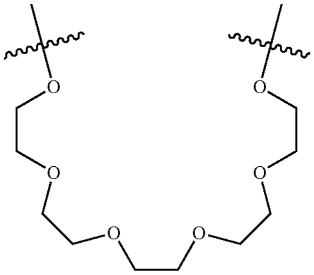
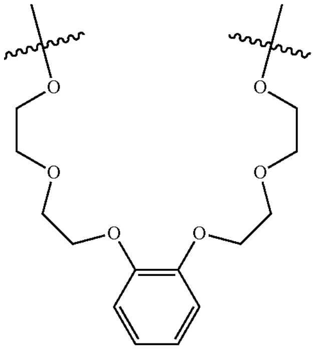
-continued
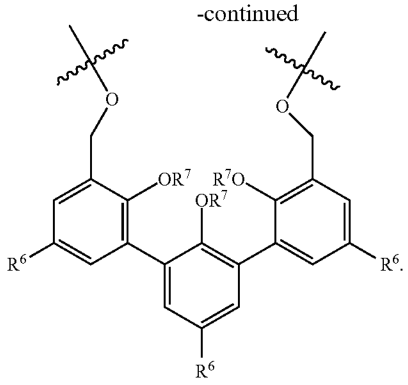
16. The process of claim 1, wherein the compound of Formula I has a structure according to any of the following:
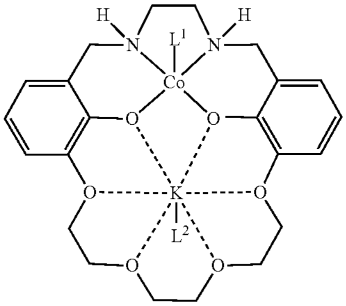
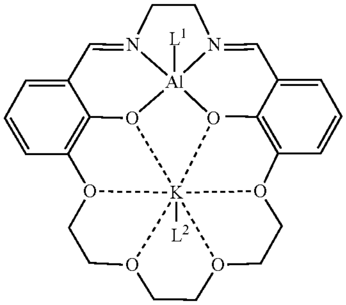
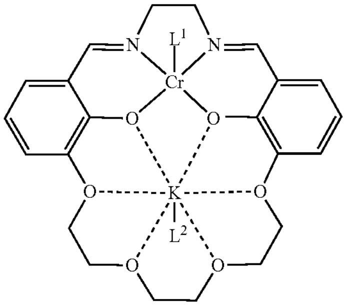
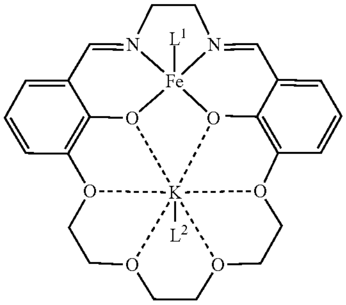

-continued
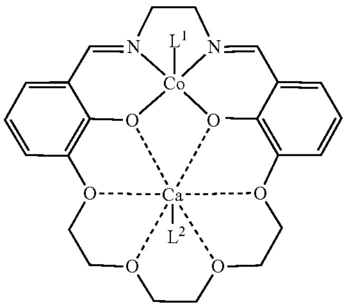
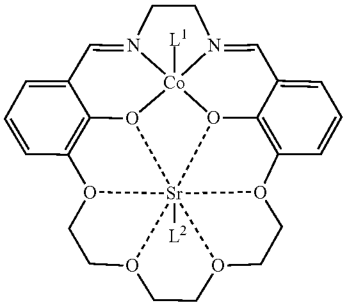
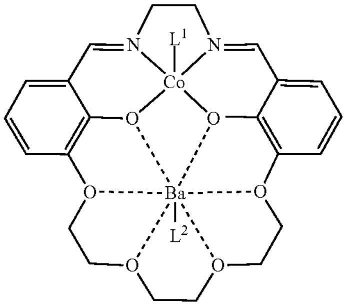
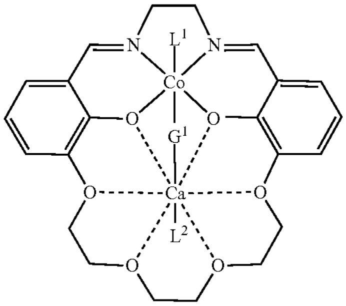
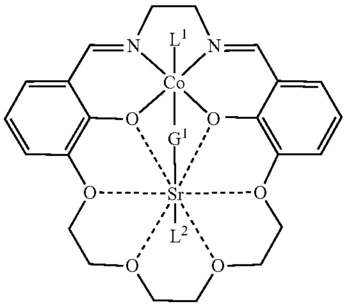
-continued
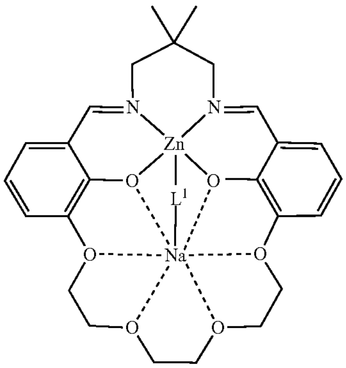
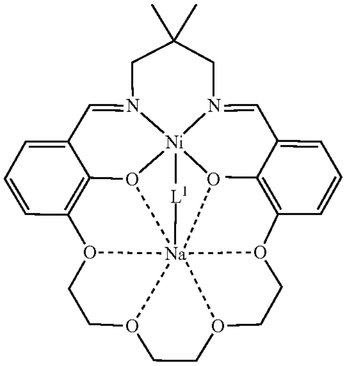
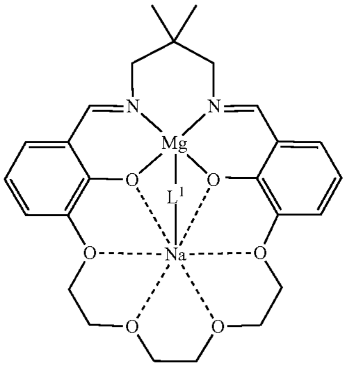
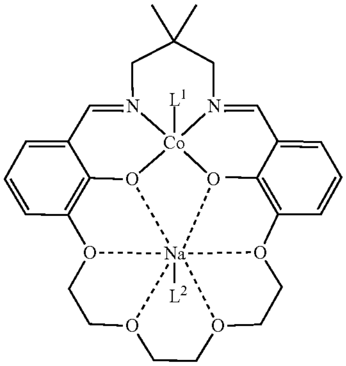

-continued
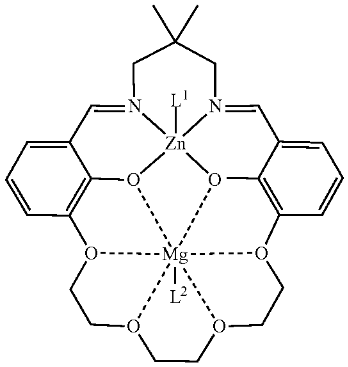
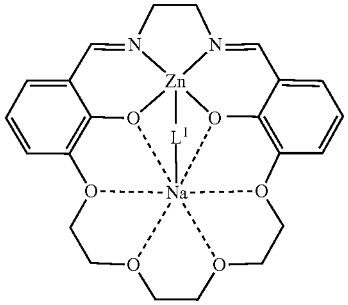
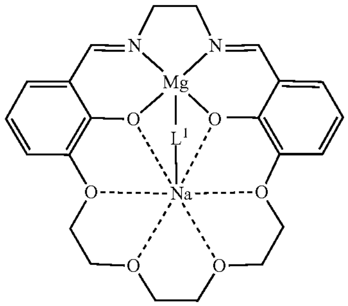
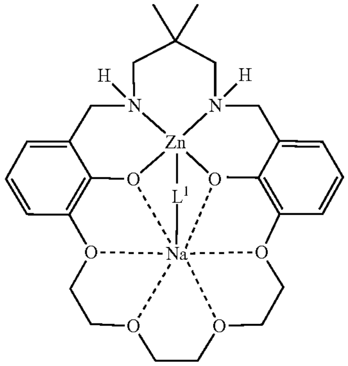
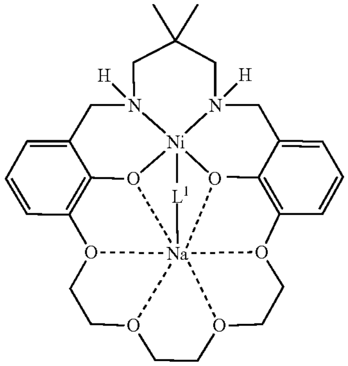
-continued
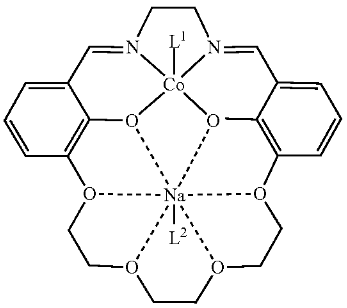
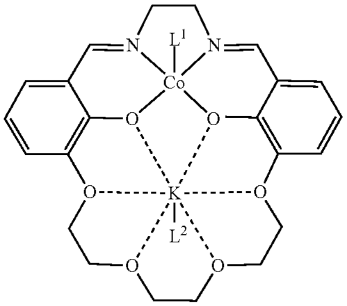
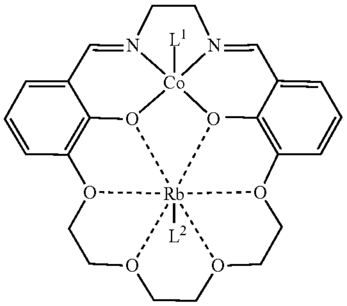
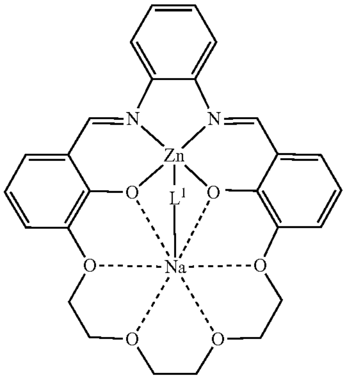
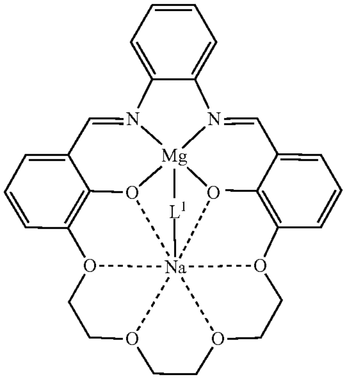

-continued
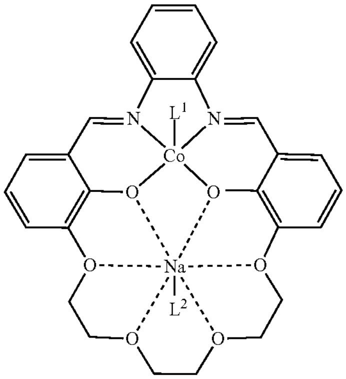
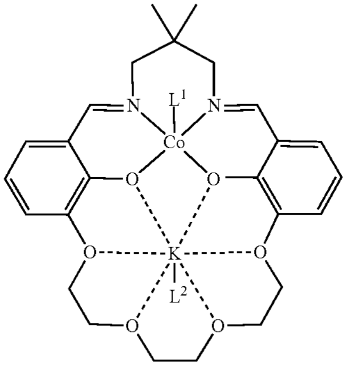
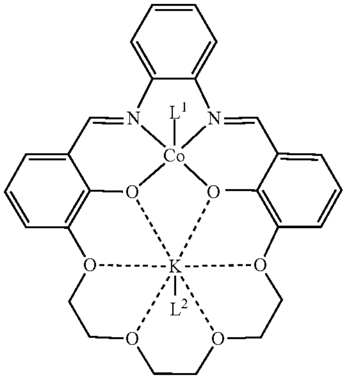
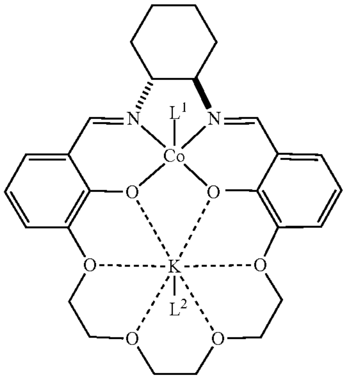
-continued
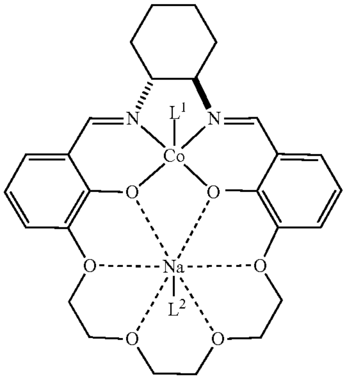
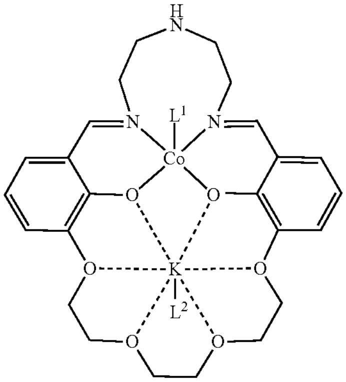
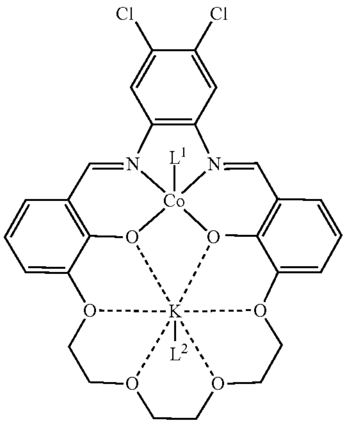
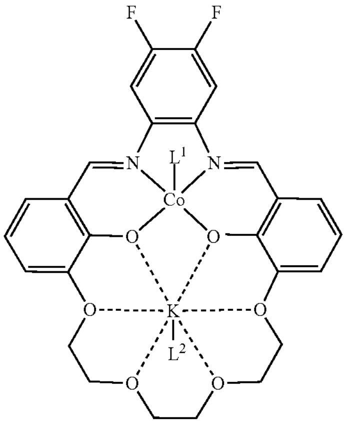

-continued

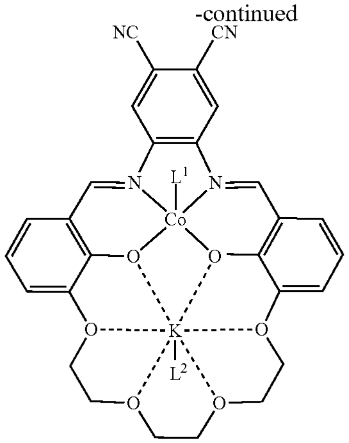

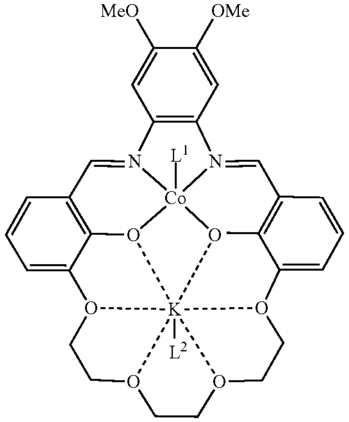

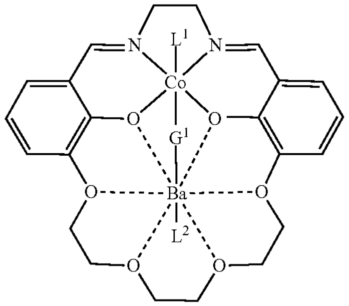

-continued

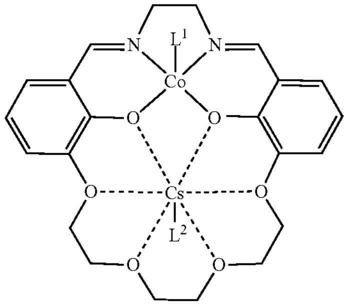

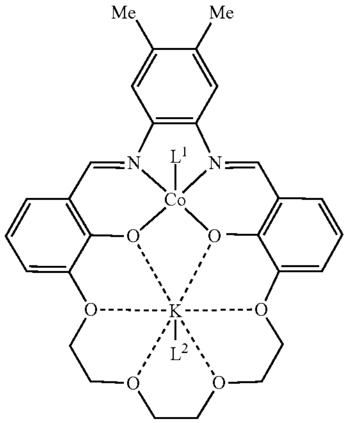

17. The process of claim 1, wherein the epoxide is selected from the group consisting of ethylene oxide, propylene oxide, vinyl-propylene oxide, butylene oxide, allyl glycidyl ether, tert-butyl glycidyl ether, epichlorohydrin, styrene oxide, cyclohexene oxide, vinyl-cyclohexene oxide, cyclopentene oxide, limonene oxide and mixtures of two or more thereof.

18. The process of claim 1, wherein the epoxide is propylene oxide or cyclohexene oxide.

19. The process of claim 1, wherein step a) is conducted in the presence of a chain transfer agent.

* * * * *